(12) United States Patent
Mochizuki et al.

(10) Patent No.: US 11,502,794 B2
(45) Date of Patent: Nov. 15, 2022

(54) COMMUNICATION SYSTEM, COMMUNICATION TERMINAL DEVICE, AND COMMUNICATION NODE

(71) Applicant: Mitsubishi Electric Corporation, Chiyoda-ku (JP)

(72) Inventors: Mitsuru Mochizuki, Tokyo (JP); Tadahiro Shimoda, Tokyo (JP); Noriyuki Fukui, Tokyo (JP); Fumihiro Hasegawa, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 92 days.

(21) Appl. No.: 16/756,622

(22) PCT Filed: Nov. 2, 2018

(86) PCT No.: PCT/JP2018/040845
§ 371 (c)(1),
(2) Date: Apr. 16, 2020

(87) PCT Pub. No.: WO2019/098059
PCT Pub. Date: May 23, 2019

(65) Prior Publication Data
US 2021/0126753 A1    Apr. 29, 2021

(30) Foreign Application Priority Data

Nov. 15, 2017  (JP) .............................. JP2017-219829
Jan. 9, 2018   (JP) .............................. JP2018-001111

(51) Int. Cl.
*H04W 72/08*   (2009.01)
*H04L 5/00*    (2006.01)
*H04W 72/04*   (2009.01)

(52) U.S. Cl.
CPC ....... *H04L 5/0037* (2013.01); *H04W 72/0453* (2013.01); *H04W 72/085* (2013.01)

(58) Field of Classification Search
None
See application file for complete search history.

(56) References Cited

U.S. PATENT DOCUMENTS

2015/0334705 A1* 11/2015 Zhao ................. H04W 72/0446
                                                       370/329
2016/0081082 A1   3/2016 Cao et al.
(Continued)

FOREIGN PATENT DOCUMENTS

CN    105323852 A    2/2016
JP    2011-199564 A  10/2011
(Continued)

OTHER PUBLICATIONS

Extended European Search Report dated Jul. 21, 2021 in corresponding European Patent Application No. 188796111 citing documents AA and AX therein, 13 pages.
(Continued)

*Primary Examiner* — Jenkey Van
(74) *Attorney, Agent, or Firm* — Oblon, McClelland, Maier & Neustadt, L.L.P.

(57) ABSTRACT

Provided is a communication system, etc. with low latency and high reliability, under New Radio (NR). A communication system includes a communication terminal device, and a plurality of nodes configured to be connected to the communication terminal device for radio communication and to provide a split bearer for the communication terminal device. The communication terminal device is configured to perform uplink transmission to an uplink transmission node among the plurality of nodes. The uplink transmission node is determined by an uplink transmission node determination process in which a node that provides the uplink transmis-
(Continued)

sion from the communication terminal device with lower latency among the plurality of nodes is determined as the uplink transmission node.

7 Claims, 60 Drawing Sheets

(56) References Cited

U.S. PATENT DOCUMENTS

| | | | | |
|---|---|---|---|---|
| 2016/0234847 | A1* | 8/2016 | Zhang | H04W 28/08 |
| 2016/0255551 | A1* | 9/2016 | Susitaival | H04W 28/0278 370/334 |
| 2017/0331670 | A1* | 11/2017 | Parkvall | H04W 52/028 |
| 2018/0007673 | A1* | 1/2018 | Fwu | H04L 5/0092 |
| 2018/0035483 | A1 | 2/2018 | Nagasaka et al. | |
| 2019/0075578 | A1* | 3/2019 | Kim | H04W 28/0236 |

FOREIGN PATENT DOCUMENTS

| | | |
|---|---|---|
| JP | 2015-46815 A | 3/2015 |
| WO | WO 2016/163432 A1 | 10/2016 |

OTHER PUBLICATIONS

InterDigital Inc., "Split SRB and SRB Duplication", 3GPP TSG-RAN WG2 #98, R2-1704927, May 15-19, 2017, pp. 1-3.
International Search Report dated Jan. 22, 2019, in PCT/JP2018/040845 filed Nov. 2, 2018, citing documents AA, AC, AD and AE therein, 1 page.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release14),"3GPP TS 36.300 V14.3.0, Jun. 2017, 331 pages.
"LS on HNB/HeNB Open Access Mode," 3GPP SA WG1, 3GPP TSG-SA1 #42 S1-083461, Oct. 2008, 2 pages.
"3rd Generation Partnership Project; Technical Specification Group Radio Access Network; Evolved Universal Terrestrial Radio Access (E-UTRA); Further advancements for E-UTRA physical layer aspects (Release 9)," 3GPP TR 36.814 V9.2.0, Mar. 2017, 105 pages.
"3rd Generation Partnership Project; Technical Specification Group Radio Access Network; Feasibility study for Further Advancements for E-UTRA (LTE-Advanced) (Release 14)," 3GPP TR 36.912 V14.0.0, Mar. 2017, 252 pages.
Petar Popovski, et al., "Scenarios, requirements and KPIs for 5G mobile and wireless system," METIS, ICT-317669-METIS/D1.1, Apr. 29, 2013, 84 pages.
"3rd Generation Partnership Project; Technical Specification Group Services and System Aspects; Study on Architecture for Next Generation System (Release 14)," 3GPP TR 23.799 V14.0.0, Dec. 2016, 522 pages.
"3rd Generation Partnership Project; Technical Specification Group Radio Access Network; Study on new radio access technology; Radio access architecture and interfaces (Release 14)," 3GPP TR 38.801 V14.0.0, Mar. 2017, 91 pages.
"3rd Generation Partnership Project; Technical Specification Group Radio Access Network; Study on New Radio Access Technology Physical Layer Aspects (Release 14)," 3GPP TR 38.802 V14.1.0, Jun. 2017, 144 pages.
"3rd Generation Partnership Project; Technical Specification Group Radio Access Network; Study on New Radio Access Technology; Radio Interface Protocol Aspects (Release 14)," 3GPP TR 38.804 V14.0.0, Mar. 2017, 57 pages.
"3rd Generation Partnership Project; Technical Specification Group Radio Access Network; Study on New Radio (NR) access technology (Release 14)," 3GPP TR 38.912 V14.0.0, Mar. 2017, 74 pages.
"Revised WID on New Radio Access Technology," NTT Docomo, Inc., 3GPP TSG RAN Meeting #77, RP-172115, Sep. 2017, 47 pages.
"3rd Generation Partnership Project; Technical Specification Group Radio Access Network; Evolved Universal Terrestrial Radio Access (E-UTRA) and NR; Multi-connectivity; Stage 2 (Release 15)," 3GPP TS 37.340 V1.0.2, Sep. 2017, 45 pages.
"WF on LTE-NR DL TDM Coexistence Mechanisms," Huawei, et al., 3GPP TSG RAN WG1 AH_NR Meeting, R1 -1701527, Jan. 2017, 3 pages.
"On eMBBand URLLC multiplexing for Uplink," Fujitsu, 3GPP TSG RAN WG1 Meeting #90, R1-1712747, Aug. 2017, 5 pages.
"3rd Generation Partnership Project; Technical Specification Group Radio Access Network; NR; Physical channels and modulation (Release 15)," 3GPP TS 38.211 V1.0.0, Sep. 2017, 37 pages.
"3rd Generation Partnership Project; Technical Specification Group Radio Access Network; NR; NR and NG-RAN Overall Description; Stage 2 (Release 15)," 3GPP TS 38.300 V1.1.1, Oct. 2017, 63 pages.
"3rd Generation Partnership Project; Technical Specification Group Radio Access Network; Evolved Universal Terrestrial Radio Access (E-UTRA); User Equipment (UE) procedures in idle mode (Release 14)," 3GPP TS 36.304 V14.4.0, Sep. 2017, 49 pages.
"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V14.4.0, Sep. 2017, 753 pages.
Combined Chinese Office Action and Search Report dated Mar. 23, 2022, in corresponding Chinese Patent Application No. 201880072358.1 (with English Translation) citing document AO therein, 21 pages.
Office Action dated Mar. 23, 2022, in corresponding Indian Patent Application No. 202047017600 (with English Translation), citing document AZ therein, 8 pages.
Combined Russian Office Action and Search Report dated Apr. 28, 2022, in corresponding Russian Patent Application No. 2020119004/07(032225) (with English Translation), 12 pages.
Kyocera, "User plane aspects to support uplink split bearer", 3GPP TSG-RAN WG2 #89-bis, R2-151539, Apr. 20-24, 2015, 5 pages.

\* cited by examiner

F I G. 1
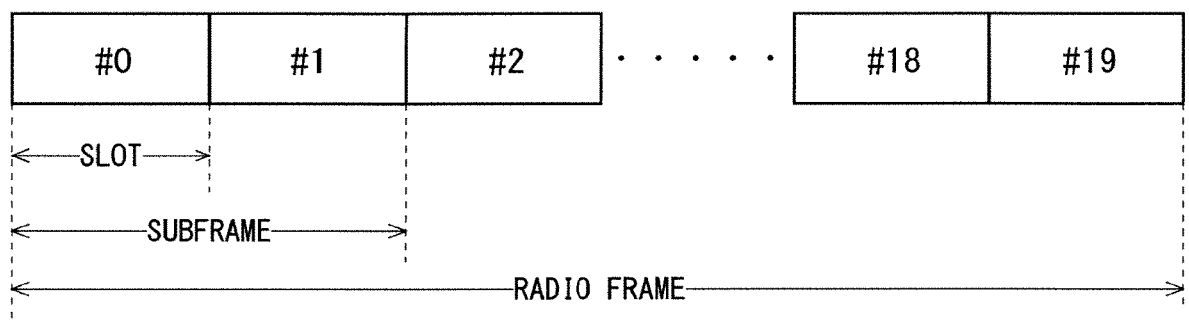

F I G. 2
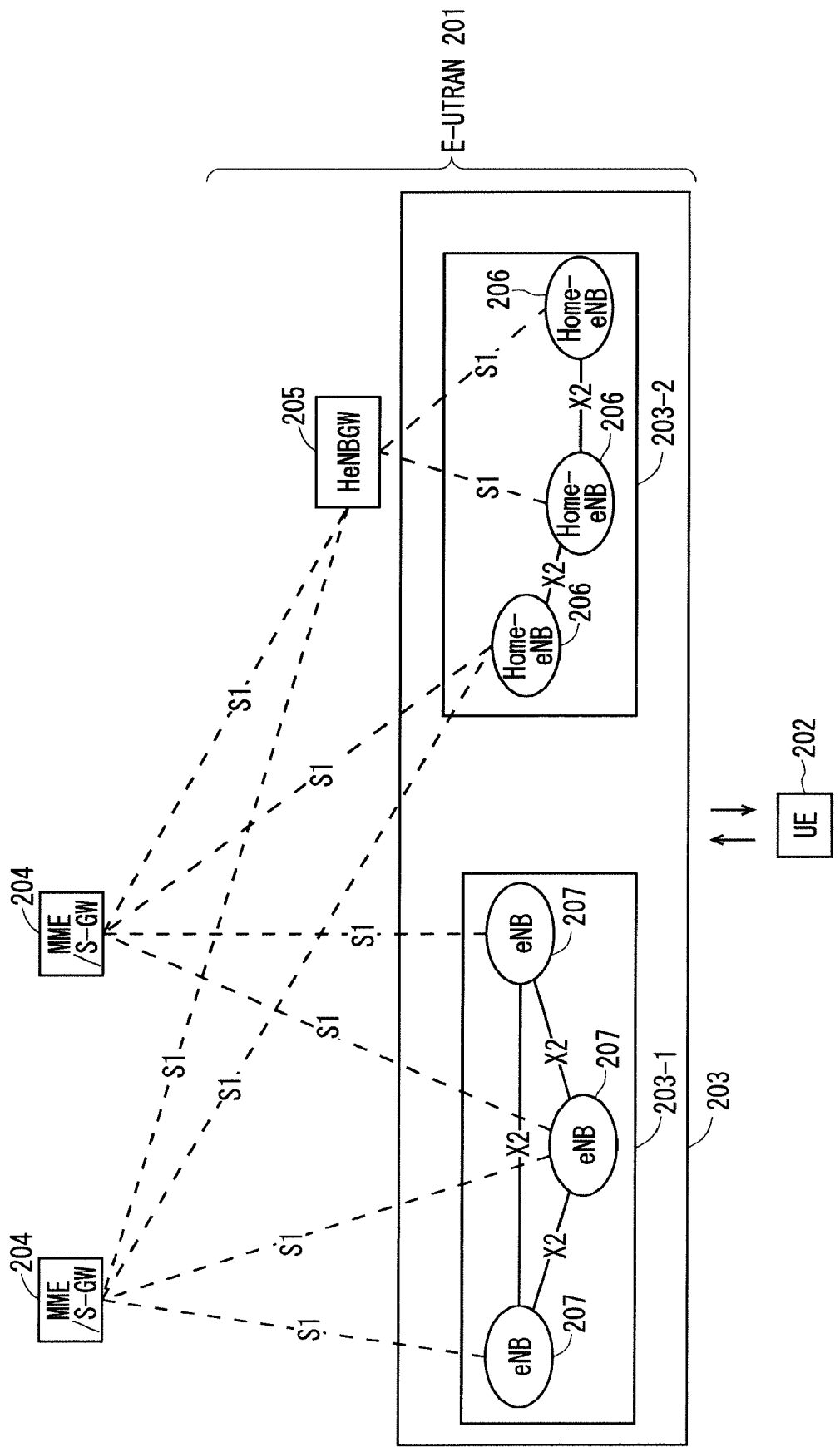

F I G. 7
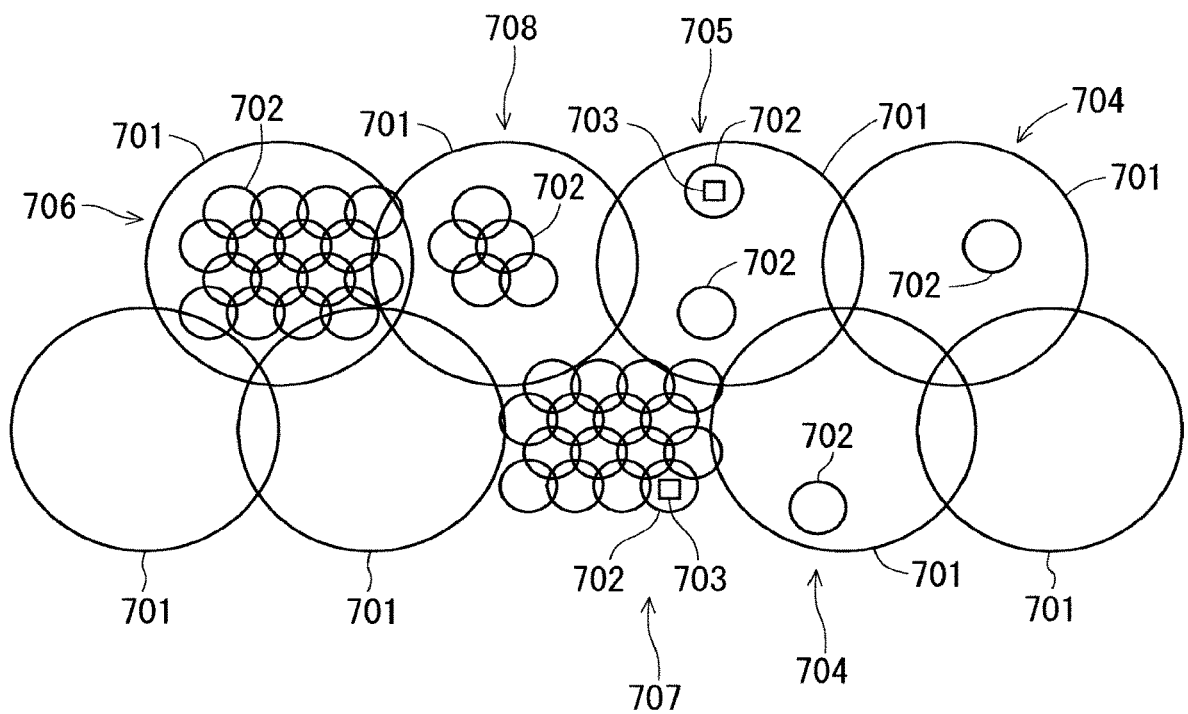

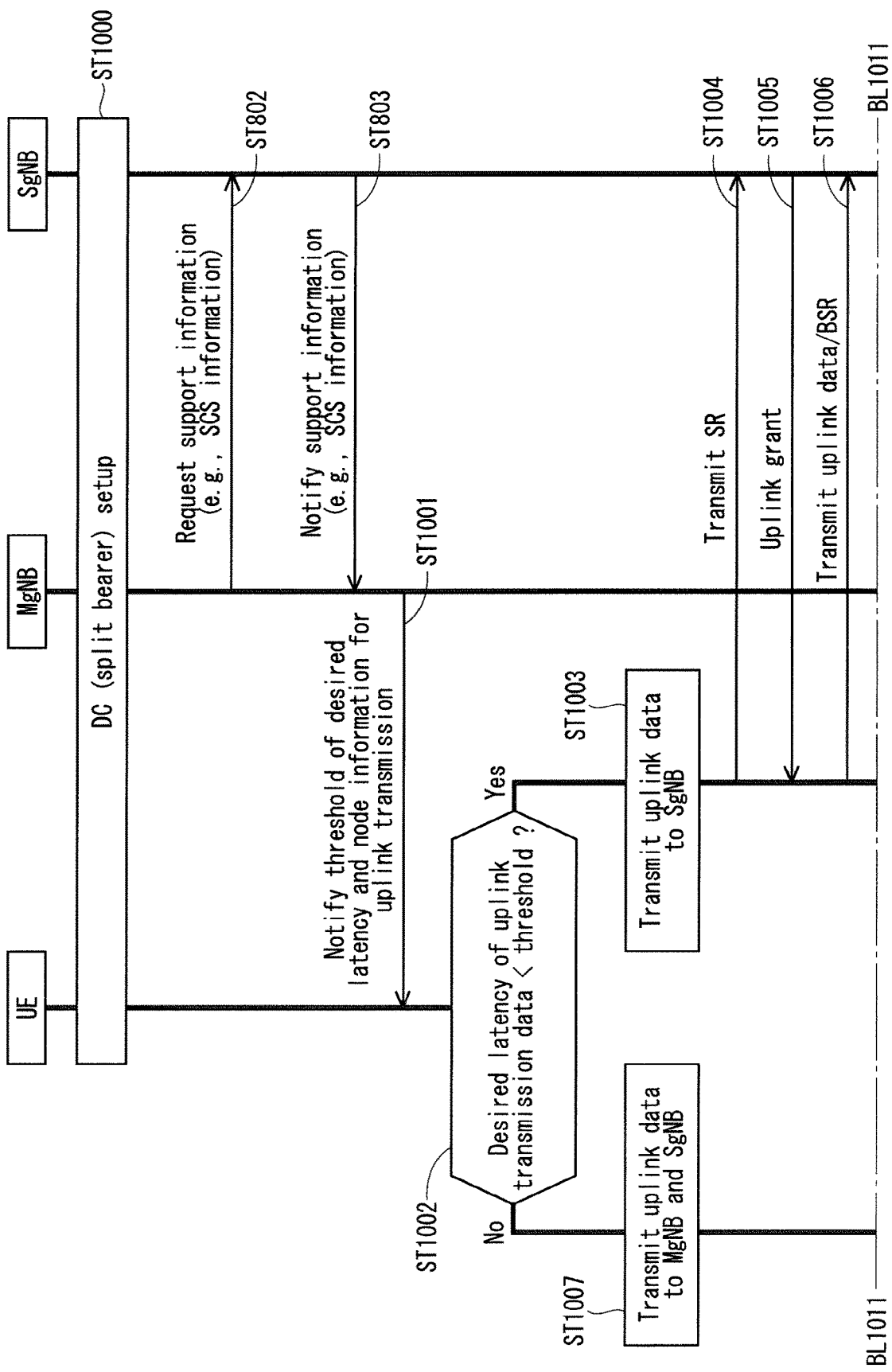
F I G. 1 0

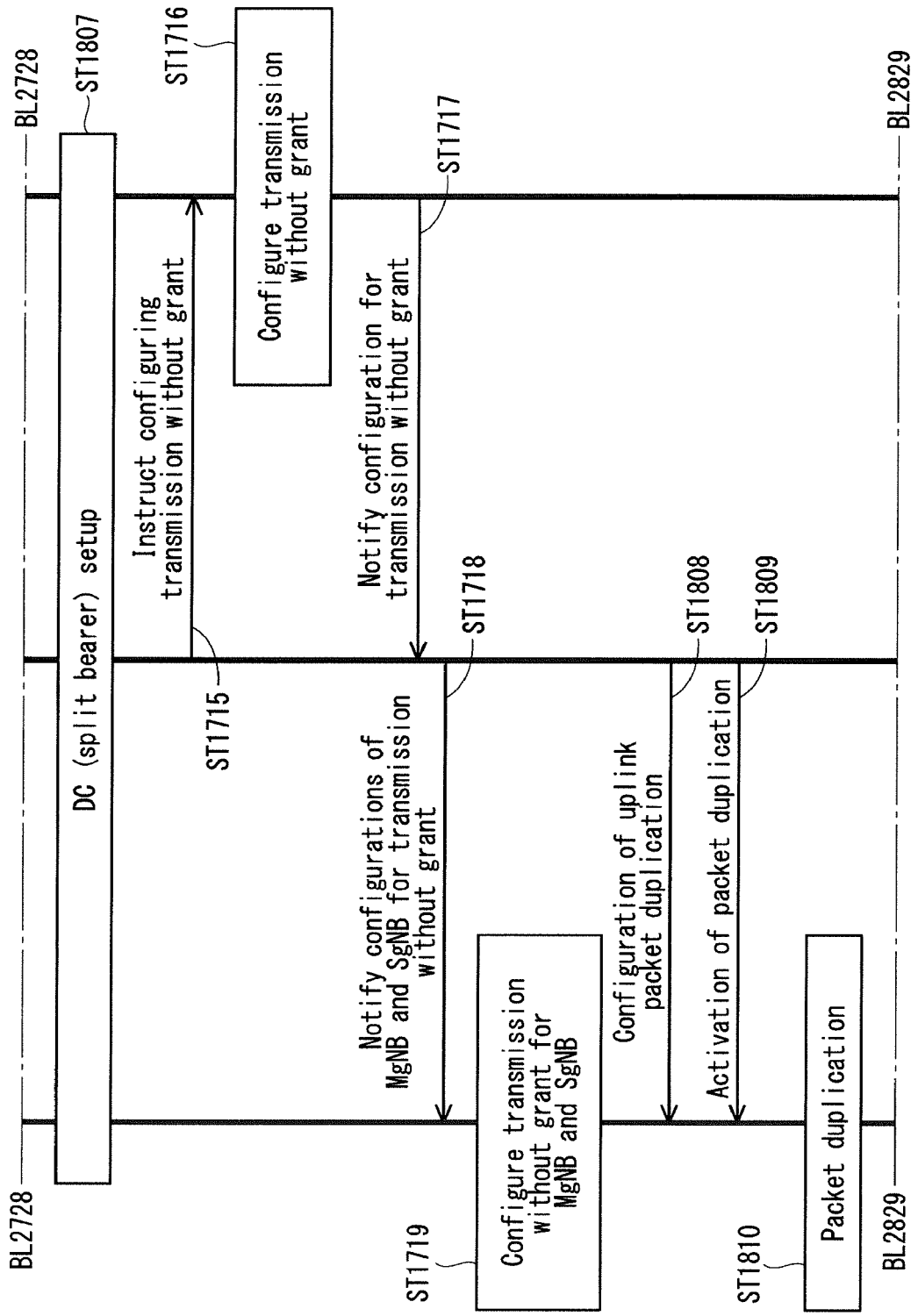
F I G. 28

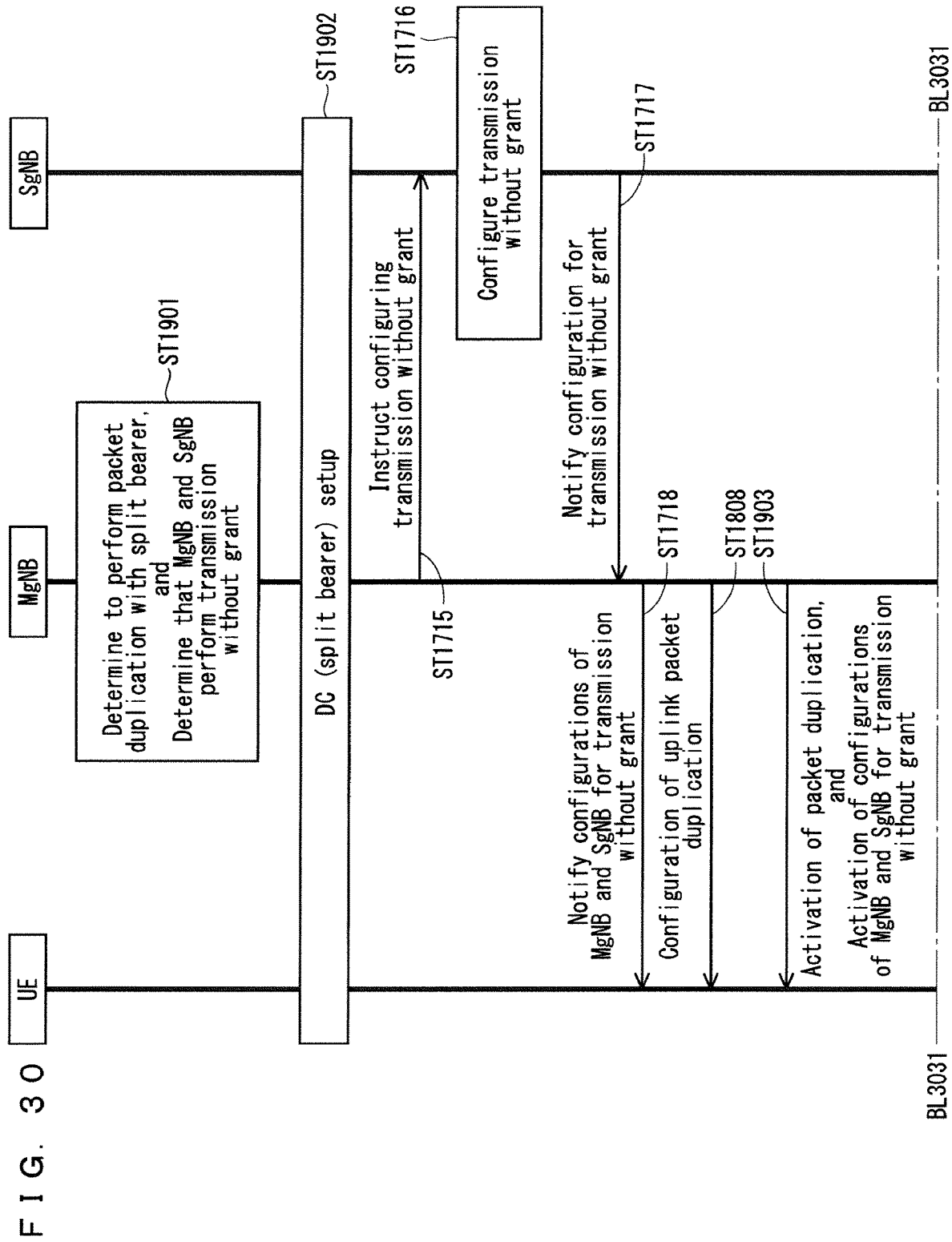
F I G. 30

F I G. 4 2
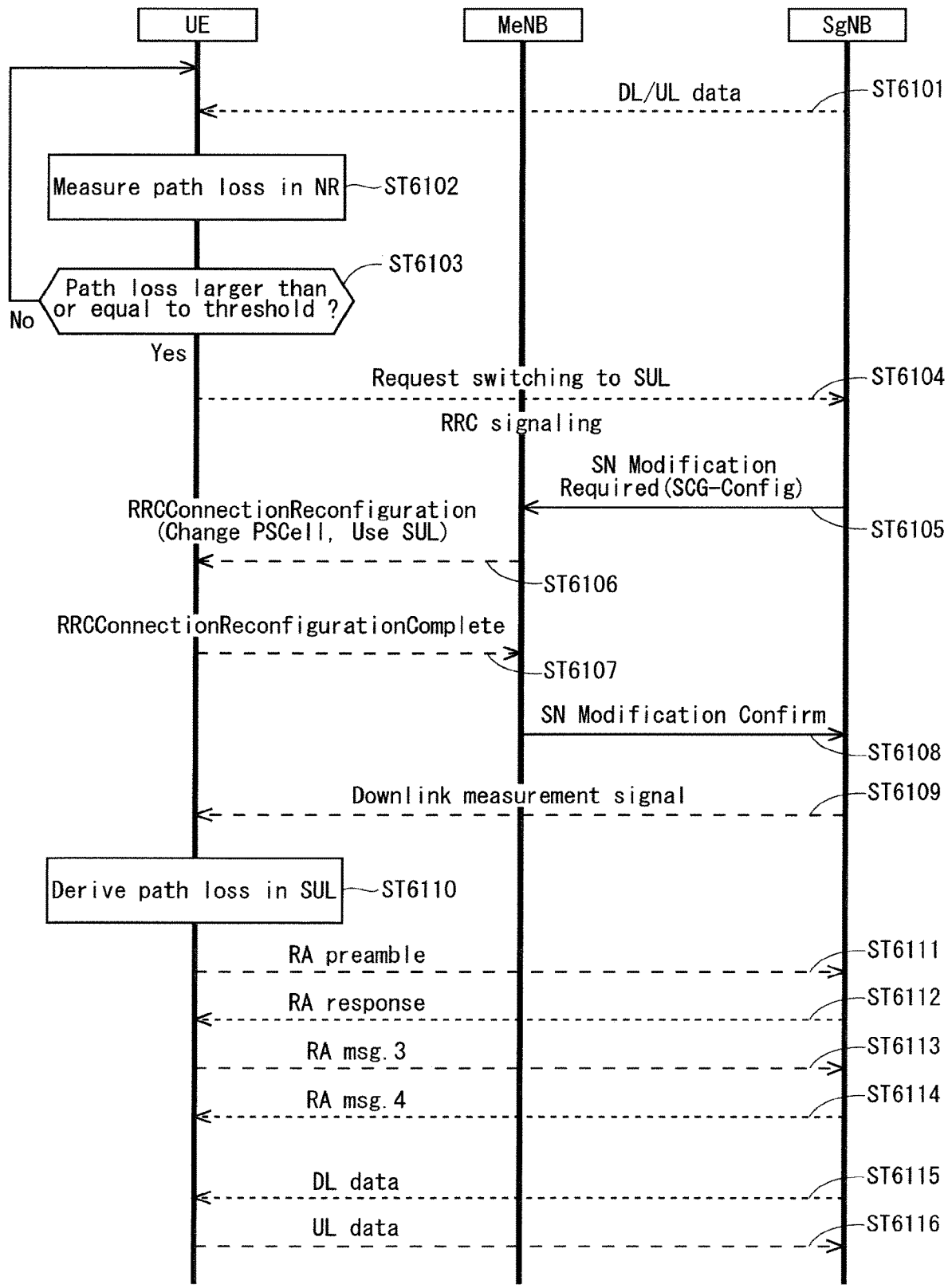

F I G. 5 3
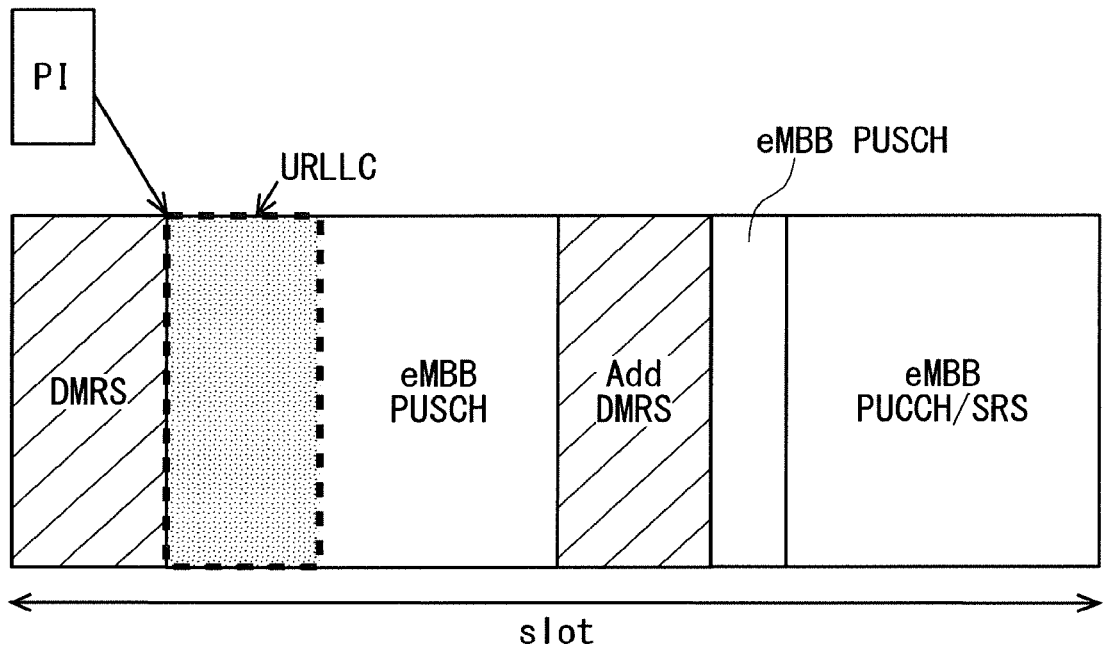
F I G. 5 4
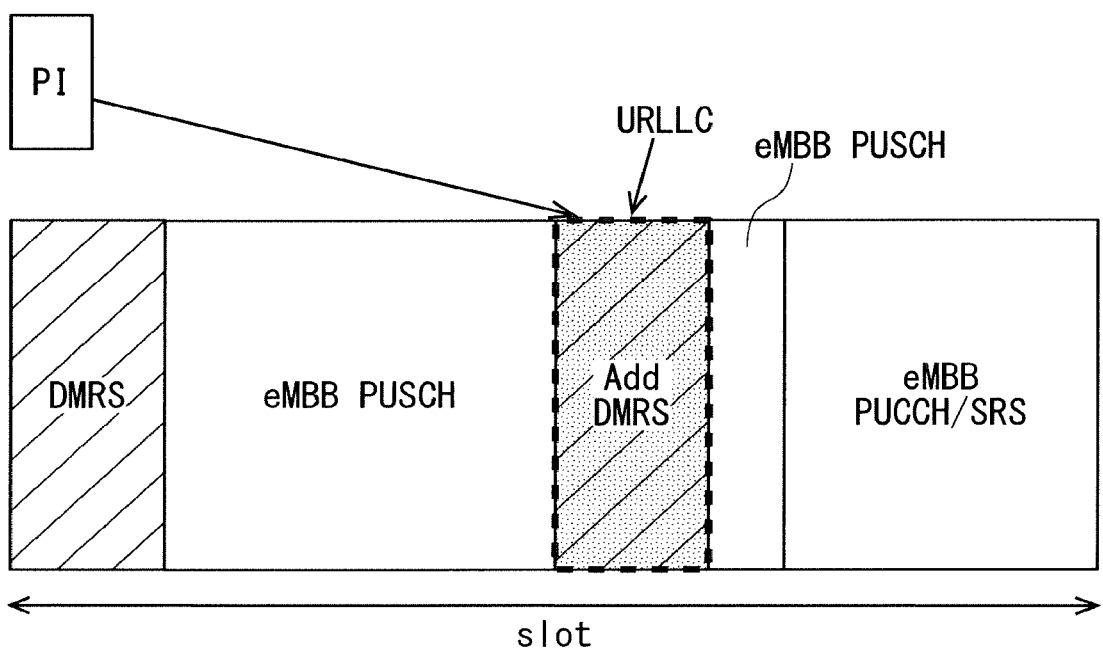

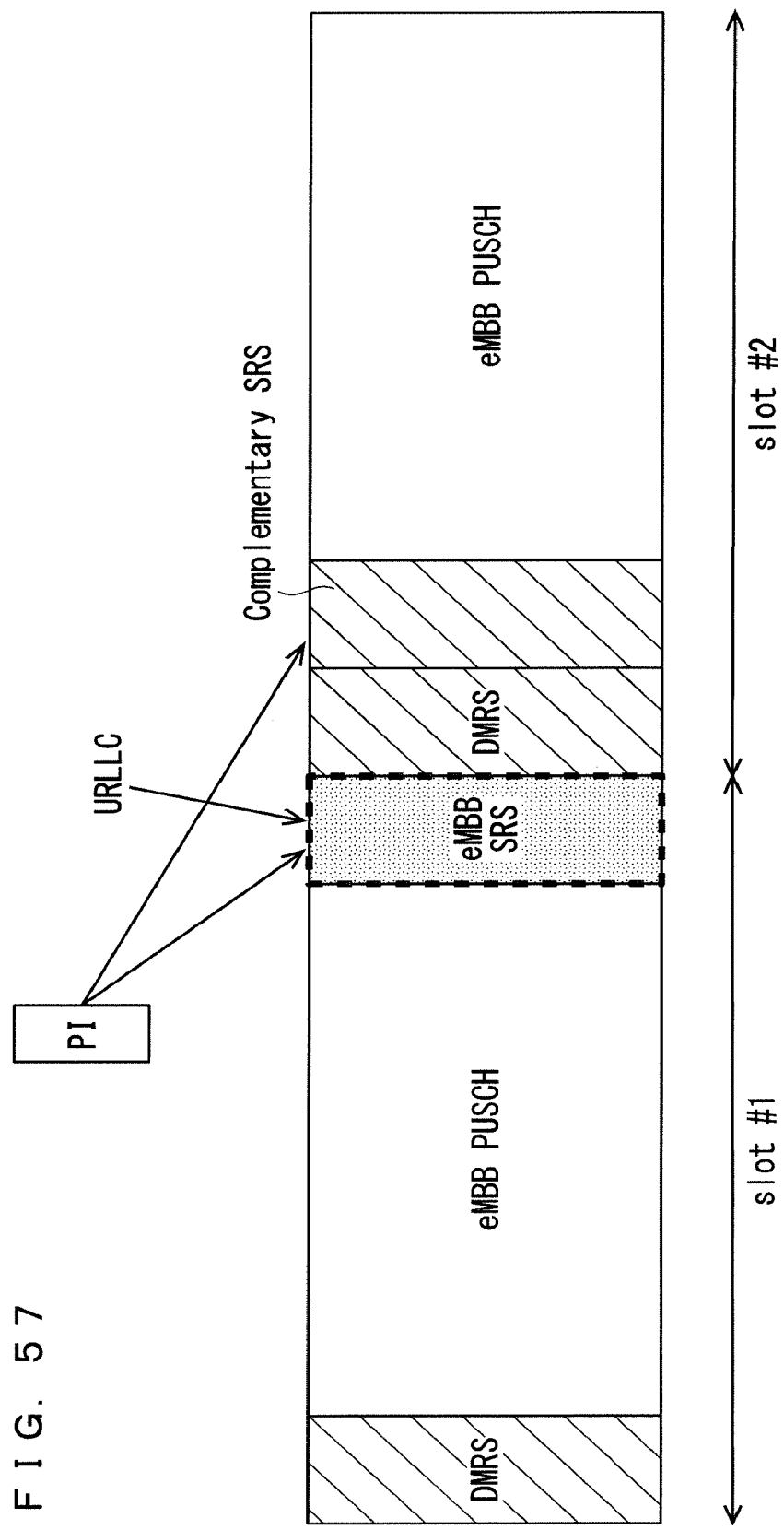
F I G. 5 7

F I G. 5 9
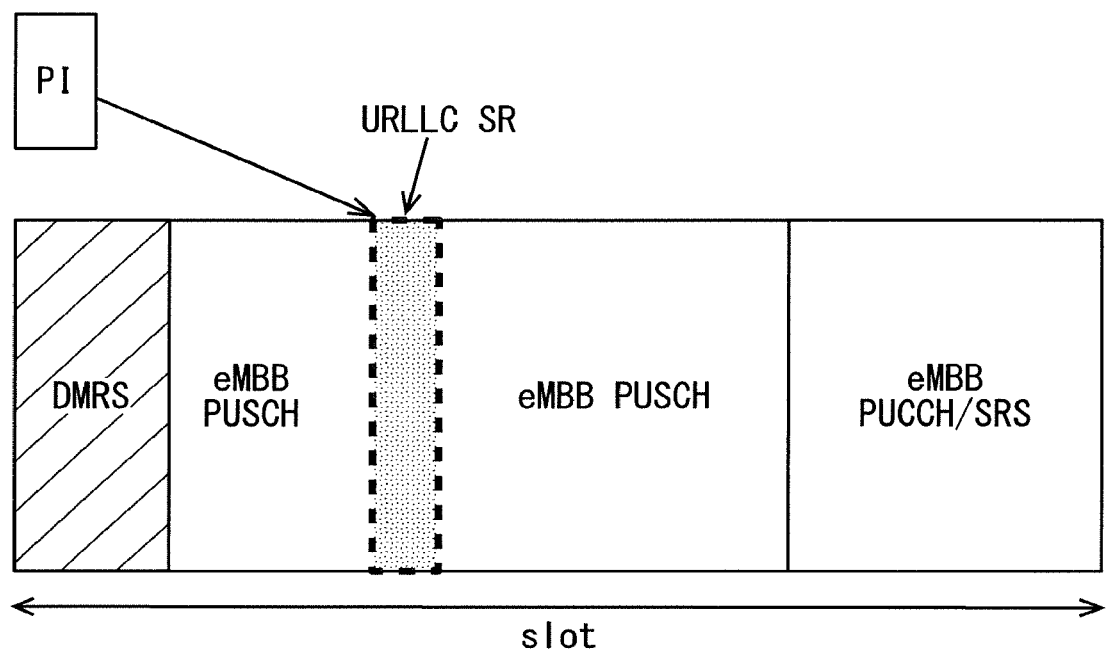

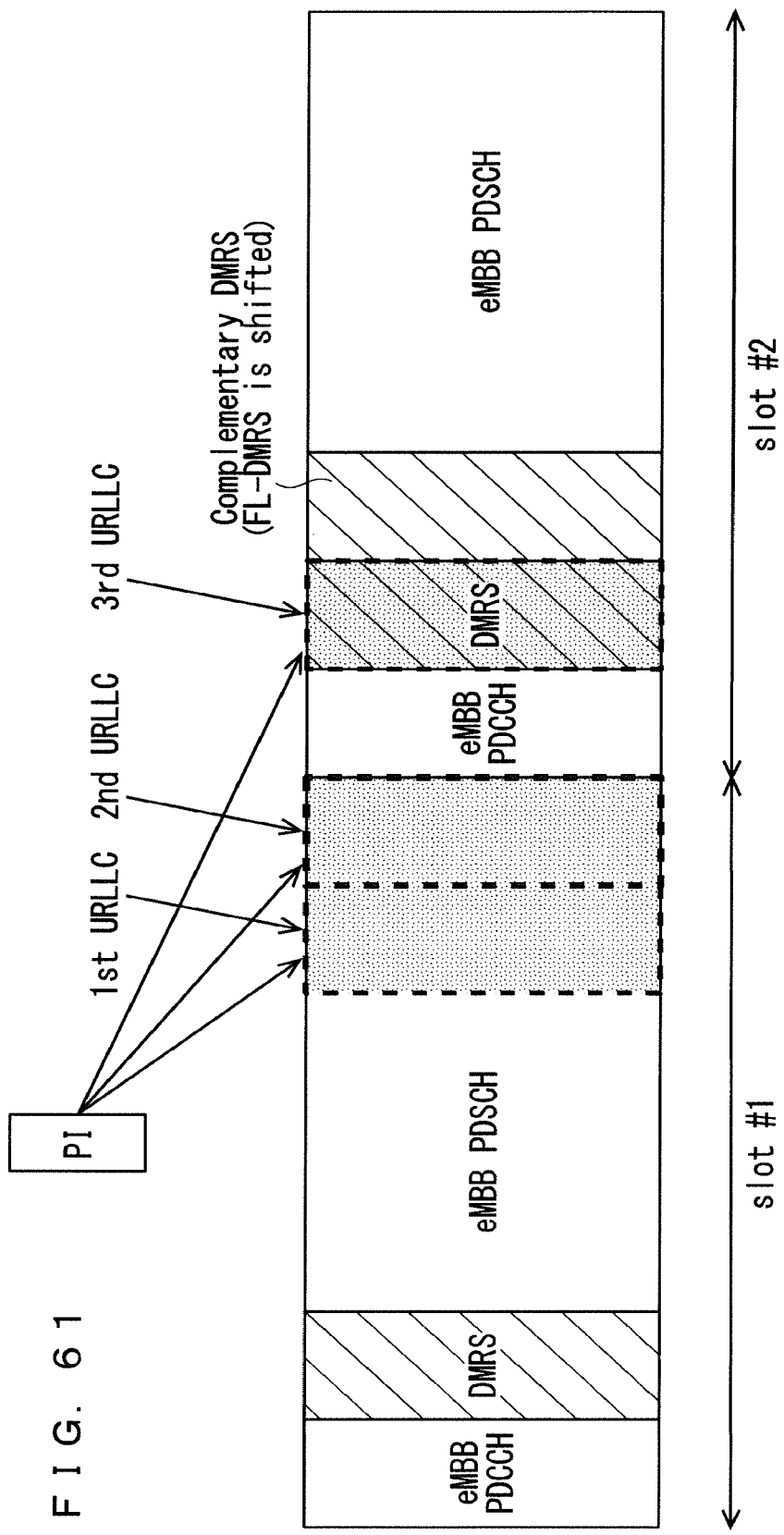
F I G. 61

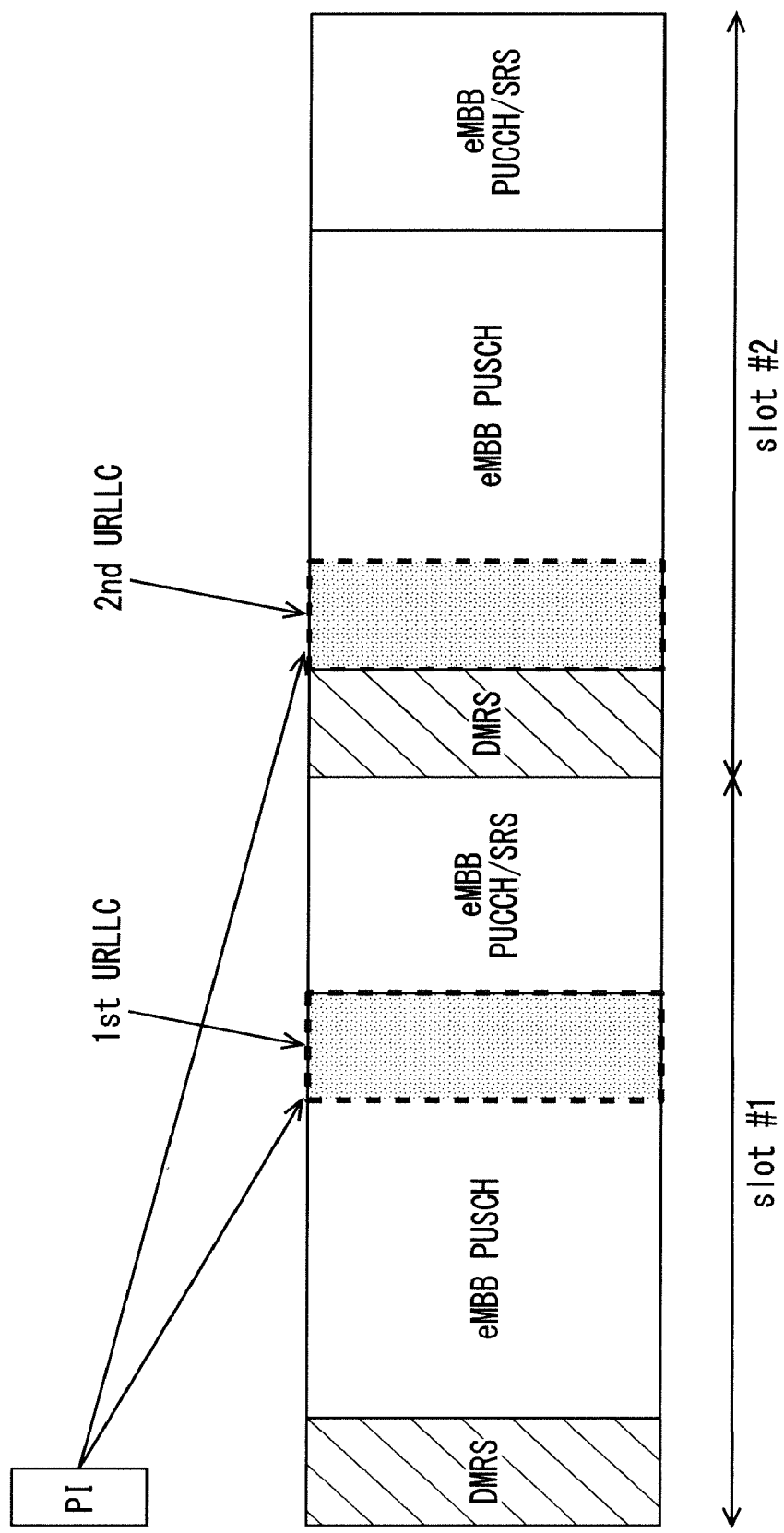
F I G. 6 2

F I G. 6 4
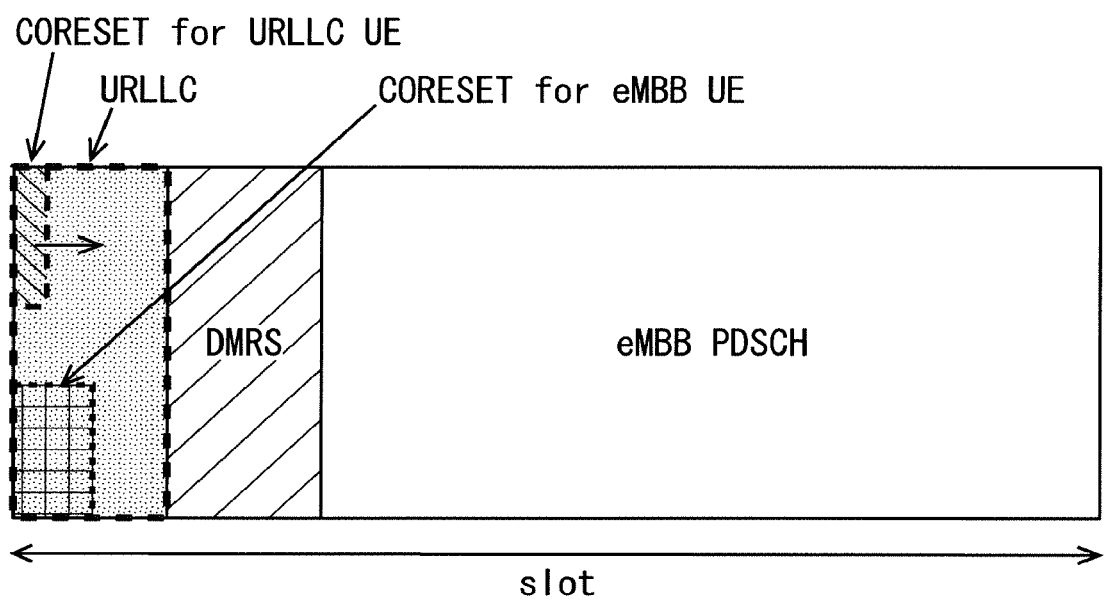

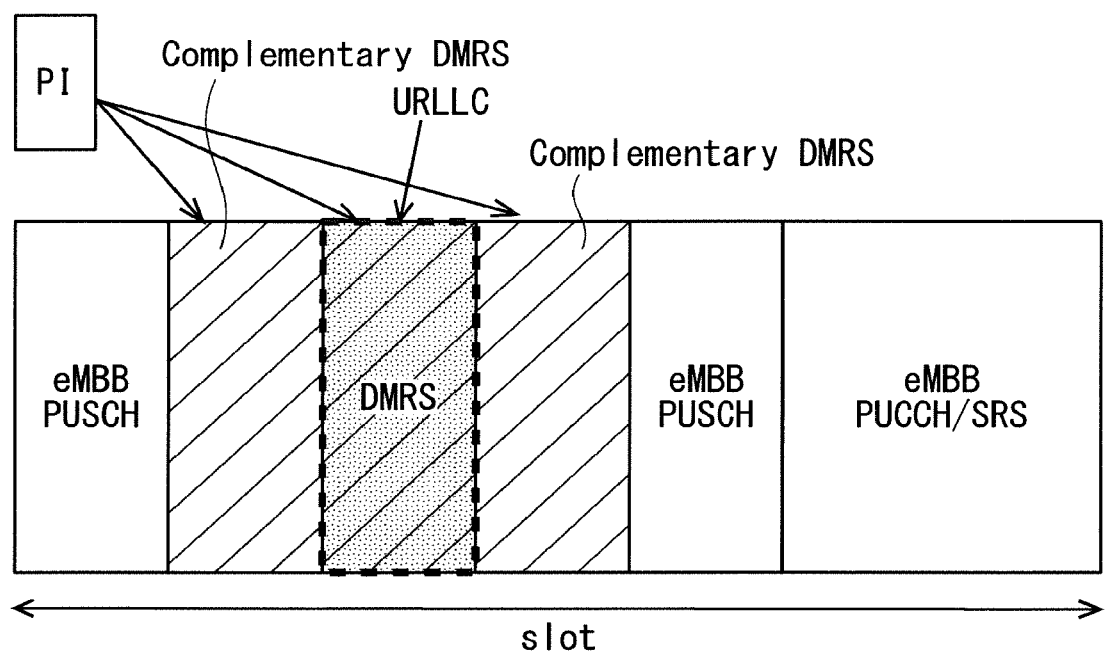
F I G. 6 8

COMMUNICATION SYSTEM, COMMUNICATION TERMINAL DEVICE, AND COMMUNICATION NODE

TECHNICAL FIELD

The present invention relates to a communication system, etc., in which radio communication is performed between a communication terminal device such as a user equipment device and a base station device.

BACKGROUND ART

The 3rd generation partnership project (3GPP), the standard organization regarding the mobile communication system, is studying communication systems referred to as long term evolution (LTE) regarding radio sections and system architecture evolution (SAE) regarding the overall system configuration including a core network and a radio access network which is hereinafter collectively referred to as a network as well (for example, see Non-Patent Documents 1 to 5). This communication system is also referred to as 3.9 generation (3.9 G) system.

As the access scheme of the LTE, orthogonal frequency division multiplexing (OFDM) is used in a downlink direction and single carrier frequency division multiple access (SC-FDMA) is used in an uplink direction. Further, differently from the wideband code division multiple access (W-CDMA), circuit switching is not provided but a packet communication system is only provided in LTE.

The decisions taken in 3GPP regarding the frame configuration in LTE system described in Non-Patent Document 1 (Chapter 5) are described with reference to FIG. 1. FIG. 1 is a diagram illustrating the configuration of a radio frame used in LTE communication system. With reference to FIG. 1, one radio frame is 10 ms. The radio frame is divided into ten equally sized subframes. The subframe is divided into two equally sized slots. The first and sixth subframes contain a downlink synchronization signal per radio frame. The synchronization signals are classified into a primary synchronization signal (P-SS) and a secondary synchronization signal (S-SS).

Non-Patent Document 1 (Chapter 5) describes the decisions by 3GPP regarding the channel configuration in LTE system. It is assumed that the same channel configuration is used in a closed subscriber group (CSG) cell as that of a non-CSG cell.

A physical broadcast channel (PBCH) is a channel for downlink transmission from a base station device (hereinafter may be simply referred to as a "base station") to a communication terminal device (hereinafter may be simply referred to as a "communication terminal") such as a user equipment device (hereinafter may be simply referred to as a "user equipment"). A BCH transport block is mapped to four subframes within a 40 ms interval. There is no explicit signaling indicating 40 ms timing.

A physical control format indicator channel (PCFICH) is a channel for downlink transmission from a base station to a communication terminal. The PCFICH notifies the number of orthogonal frequency division multiplexing (OFDM) symbols used for PDCCHs from the base station to the communication terminal. The PCFICH is transmitted per subframe.

A physical downlink control channel (PDCCH) is a channel for downlink transmission from a base station to a communication terminal. The PDCCH notifies of the resource allocation information for downlink shared channel (DL-SCH) being one of the transport channels described below, resource allocation information for a paging channel (PCH) being one of the transport channels described below, and hybrid automatic repeat request (HARD) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) is a channel for downlink transmission from a base station to a communication terminal. A downlink shared channel (DL-SCH) that is a transport channel and a PCH that is a transport channel are mapped to the PDSCH.

A physical multicast channel (PMCH) is a channel for downlink transmission from a base station to a communication terminal. A multicast channel (MCH) that is a transport channel is mapped to the PMCH.

A physical uplink control channel (PUCCH) is a channel for uplink transmission from a communication terminal to a base station. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) is a channel for uplink transmission from a communication terminal to a base station. An uplink shared channel (UL-SCH) that is one of the transport channels is mapped to the PUSCH.

A physical hybrid ARQ indicator channel (PHICH) is a channel for downlink transmission from a base station to a communication terminal. The PHICH carries Ack/Nack that is a response signal to uplink transmission. A physical random access channel (PRACH) is a channel for uplink transmission from the communication terminal to the base station. The PRACH carries a random access preamble.

A downlink reference signal (RS) is a known symbol in LTE communication system. The following five types of downlink reference signals are defined as: a cell-specific reference signal (CRS), an MBSFN reference signal, a data demodulation reference signal (DM-RS) being a UE-specific reference signal, a positioning reference signal (PRS), and a channel state information reference signal (CSI-RS). The physical layer measurement objects of a communication terminal include reference signal received powers (RSRPs).

The transport channels described in Non-Patent Document 1 (Chapter 5) are described. A broadcast channel (BCH) among the downlink transport channels is broadcast to the entire coverage of a base station (cell). The BCH is mapped to the physical broadcast channel (PBCH).

Retransmission control according to a hybrid ARQ (HARM) is applied to a downlink shared channel (DL-SCH). The DL-SCH can be broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a communication terminal for enabling the communication terminal to save power. The DL-SCH is mapped to the physical downlink shared channel (PDSCH).

The paging channel (PCH) supports DRX of the communication terminal for enabling the communication terminal to save power. The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcasting the entire coverage of the base station (cell). The MCH supports SFN combining of multimedia broadcast multicast service (MBMS) services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels. The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ is described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method is described. If the receiver fails to successfully decode the received data, in other words, if a cyclic redundancy check (CRC) error occurs (CRC=NG), the receiver transmits "Nack" to the transmitter. The transmitter that has received "Nack" retransmits the data. If the receiver successfully decodes the received data, in other words, if a CRC error does not occur (CRC=OK), the receiver transmits "AcK" to the transmitter. The transmitter that has received "Ack" transmits the next data.

The logical channels described in Non-Patent Document 1 (Chapter 6) are described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a communication terminal. The PCCH that is a logical channel is mapped to the paging channel (PCH) that is a transport channel.

A common control channel (CCCH) is a channel for transmission control information between communication terminals and a base station. The CCCH is used in a case where the communication terminals have no RRC connection with the network. In the downlink direction, the CCCH is mapped to the downlink shared channel (DL-SCH) that is a transport channel. In the uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a communication terminal. The MCCH is used only by a communication terminal during reception of the MBMS. The MCCH is mapped to the multicast channel (MCH) that is a transport channel.

A dedicated control channel (DCCH) is a channel that transmits dedicated control information between a communication terminal and a network on a point-to-point basis. The DCCH is used when the communication terminal has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated communication terminal. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a communication terminal. The MTCH is a channel used only by a communication terminal during reception of the MBMS. The MTCH is mapped to the multicast channel (MCH).

CGI represents a cell global identifier. ECGI represents an E-UTRAN cell global identifier. A closed subscriber group (CSG) cell is introduced into the LTE, and the long term evolution advanced (LTE-A) and universal mobile telecommunication system (UMTS) described below.

The closed subscriber group (CSG) cell is a cell in which subscribers who are allowed to use are specified by an operator (hereinafter, also referred to as a "cell for specific subscribers"). The specified subscribers are allowed to access one or more cells of a public land mobile network (PLMN). One or more cells to which the specified subscribers are allowed access are referred to as "CSG cell(s)". Note that access is limited in the PLMN.

The CSG cell is part of the PLMN that broadcasts a specific CSG identity (CSG ID) and broadcasts "TRUE" in a CSG indication. The authorized members of the subscriber group who have registered in advance access the CSG cells using the CSG ID that is the access permission information.

The CSG ID is broadcast by the CSG cell or cells. A plurality of CSG IDs exist in LTE communication system. The CSG IDs are used by communication terminals (UEs) for making access from CSG-related members easier.

The locations of communication terminals are tracked based on an area composed of one or more cells. The locations are tracked for enabling tracking the locations of communication terminals and calling communication terminals, in other words, incoming calling to communication terminals even in an idle state. An area for tracking locations of communication terminals is referred to as a tracking area.

In 3GPP, base stations referred to as Home-NodeB (Home-NB; HNB) and Home-eNodeB (Home-eNB; HeNB) are studied. HNB/HeNB is a base station for, for example, household, corporation, or commercial access service in UTRAN/E-UTRAN. Non-Patent Document 2 discloses three different modes of the access to the HeNB and HNB. Specifically, an open access mode, a closed access mode, and a hybrid access mode are disclosed.

Further, specifications of long term evolution advanced (LTE-A) are pursed as Release 10 in 3GPP (see Non-Patent Documents 3 and 4). The LTE-A is based on the LTE radio communication system and is configured by adding several new techniques to the system.

Carrier aggregation (CA) is studied for the LTE-A system in which two or more component carriers (CCs) are aggregated to support wider transmission bandwidths up to 100 MHz. Non-Patent Document 1 describes the CA.

In a case where CA is configured, a UE has a single RRC connection with a network (NW). In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a serving cell group with a PCell, in accordance with the UE capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCells is configured for one UE.

The new techniques in LTE-A include the technique of supporting wider bands (wider bandwidth extension) and the coordinated multiple point transmission and reception (CoMP) technique. The CoMP studied for LTE-A in 3GPP is described in Non-Patent Document 1.

Furthermore, the use of small eNBs (hereinafter also referred to as "small-scale base station devices") configuring small cells is studied in 3GPP to satisfy tremendous traffic in the future. In an example technique under study, a large number of small eNBs is installed to configure a large number of small cells, which increases spectral efficiency and communication capacity. The specific techniques include dual connectivity (abbreviated as DC) with which a UE communicates with two eNBs through connection thereto. Non-Patent Document 1 describes the DC.

For eNBs that perform dual connectivity (DC), one may be referred to as a master eNB (abbreviated as MeNB), and the other may be referred to as a secondary eNB (abbreviated as SeNB).

The traffic flow of a mobile network is on the rise, and the communication rate is also increasing. It is expected that the communication rate is further increased when the operations of the LTE and the LTE-A are fully initiated.

For increasingly enhanced mobile communications, the fifth generation (hereinafter also referred to as "5G") radio access system is studied whose service is aimed to be launched in 2020 and afterward. For example, in the Europe, an organization named METIS summarizes the requirements for 5G (see Non-Patent Document 5).

The requirements in the 5G radio access system show that a system capacity shall be 1000 times as high as, a data transmission rate shall be 100 times as high as, a data latency shall be one tenth (1/10) as low as, and simultaneously connected communication terminals 100 times as many as those of the LTE system, to further reduce the power consumption and device cost.

To satisfy such requirements, the study of 5G standards is pursued as Release 15 in 3GPP (see Non-Patent Documents 6 to 10). The techniques on 5G radio sections are referred to as "New Radio Access Technology" ("New Radio" is abbreviated as NR), and the several new techniques are being studied (see Non-Patent Documents 11, 15, and 16). Examples of such studies include the DC using LTE and NR and sharing frequency resources between LTE and NR (see Non-Patent Documents 12 and 13).

Prior-Art Documents Non-Patent Documents
Non-Patent Document 1: 3GPP TS36.300 V14.3.0
Non-Patent Document 2: 3GPP S1-083461
Non-Patent Document 3: 3GPP TR 36.814 V9.2.0
Non-Patent Document 4: 3GPP TR 36.912 V14.0.0
Non-Patent Document 5: "Scenarios, requirements and KPIs for 5G mobile and wireless system", ICT-317669-METIS/D1.1
Non-Patent Document 6: 3GPP TR 23.799 V14.0.0
Non-Patent Document 7: 3GPP TR 38.801 V14.0.0
Non-Patent Document 8: 3GPP TR 38.802 V14.1.0
Non-Patent Document 9: 3GPP TR 38.804 V14.0.0
Non-Patent Document 10: 3GPP TR 38.912 V14.0.0
Non-Patent Document 11: 3GPP RP-172115
Non-Patent Document 12: 3GPP TS37.340 V1.0.2
Non-Patent Document 13: 3GPP R1-1701527
Non-Patent Document 14: 3GPP R1-1712747
Non-Patent Document 15: 3GPP TS 38.211 V1.0.0
Non-Patent Document 16: 3GPP TS 38.300 V1.1.1
Non-Patent Document 17: 3GPP TS 36.304 V14.4.0
Non-Patent Document 18: 3GPP TS 36.331 V14.4.0

SUMMARY

Problems to be Solved by the Invention

In NR, the DC using the eNB and the gNB has been discussed. NR requires the communication with low latency and high reliability. Since a transmission destination of the uplink transmission data from the UE is determined according to the buffer capacity of the uplink data in configuring the DC, the UE cannot always transmit the uplink data to a base station with low latency in the communication requiring the low latency. Thus, the latency in transmitting the uplink data is increased.

The control technology for sharing the same frequencies between LTE and NR has been discussed. The UE communicates with the eNB and/or the gNB by switching transmitters and/or receivers between NR and LTE. Since the timings of synchronization signals in LTE and NR overlap for sharing the frequencies between LTE and NR, the UE has problems of failing to receive the synchronization signal from the eNB and/or the gNB and communicate in LTE and NR.

In view of the problems, one of the objects of the present invention is to provide a communication system, etc. with low latency and high reliability, under NR.

Means to Solve the Problems

The present invention provides, for example, a communication system including: a communication terminal device; and a plurality of nodes configured to be connected to the communication terminal device for radio communication and to provide a split bearer for the communication terminal device, wherein the communication terminal device is configured to perform uplink transmission to an uplink transmission node among the plurality of nodes, and the uplink transmission node is determined by an uplink transmission node determination process in which a node that provides the uplink transmission from the communication terminal device with lower latency among the plurality of nodes is determined as the uplink transmission node.

The present invention provides, for example, a communication terminal device configured to perform radio communication with a plurality of nodes that provide a split bearer, wherein the communication terminal device is configured to perform uplink transmission to an uplink transmission node selected by an uplink transmission node determination process, and the uplink transmission node determination process is a process for determining, as the uplink transmission node, a node that provides the uplink transmission from the communication terminal device with lower latency among the plurality of nodes.

The present invention provides, for example, a communication node configured to provide a split bearer for a communication terminal device together with another communication node, wherein the communication node is configured to operate as an uplink transmission node to be used by the communication terminal device for uplink transmission, by being selected by an uplink transmission node determination process, and the uplink transmission node determination process is a process for determining, as the uplink transmission node, a node that provides the uplink transmission from the communication terminal device with lower latency among the plurality of nodes.

Effects of the Invention

The present invention can provide a communication system, etc. with low latency and high reliability, under NR.

The objects, features, aspects and advantages of the present invention become more apparent from the following detailed description of the present invention when taken in conjunction with the accompanying drawings.

BRIEF DESCRIPTION OF DRAWINGS

FIG. 1 is a diagram illustrating the configuration of a radio frame for use in an LTE communication system.

FIG. 2 is a block diagram showing the overall configuration of an LTE communication system 200 under discussion of 3GPP.

FIG. 7 shows the concept of a cell configuration when macro eNBs and small eNBs coexist.

FIG. 10 illustrates an example sequence for the UE to determine the uplink transmission node using a threshold according to the first embodiment.

FIG. 28 illustrates the example sequence for configuring the packet duplication in the uplink communication in which the transmission without grant has been configured according to the second embodiment.

FIG. 30 illustrates an example sequence for notifying activation of the packet duplication and activation of the configuration for transmission without grant via the same signaling, and performing the packet duplication and configuring the transmission without grant according to the second embodiment.

FIG. 42 is a sequence diagram for the UE to determine the path loss in the SUL with a downlink measurement signal from an NR base station according to the sixth embodiment.

FIG. 53 illustrates example preemption when the FL-DMRS, the add-DMRS, and the PUCCH and/or the SRS are configured for the eMBB UE according to the second modification of the seventh embodiment.

FIG. 54 illustrates example preemption when the FL-DMRS, the add-DMRS, and the PUCCH and/or the SRS are configured for the eMBB UE according to the second modification of the seventh embodiment.

FIG. 57 illustrates an example preemption method when a complementary SRS is configured according to the second modification of the seventh embodiment.

FIG. 59 illustrates an example of configuring the preemption for the SR according to the third modification of the seventh embodiment.

FIG. 61 illustrates an example method for preempting the repeated transmission of data for the URLLC UE across the slots for the eMBB UE according to the fourth modification of the seventh embodiment.

FIG. 62 illustrates an example method for preempting the repeated transmission of data for the URLLC UE across the slots for the eMBB UE according to the fourth modification of the seventh embodiment.

FIG. 64 illustrates a method for multiplexing the PDCCH for the eMBB UE with a slot for the URLLC UE according to the fifth modification of the seventh embodiment.

FIG. 68 illustrates an example of configuring a plurality of complementary DMRSs in the UL according to the sixth modification of the seventh embodiment.

DESCRIPTION OF EMBODIMENTS

First Embodiment

Figure 3:
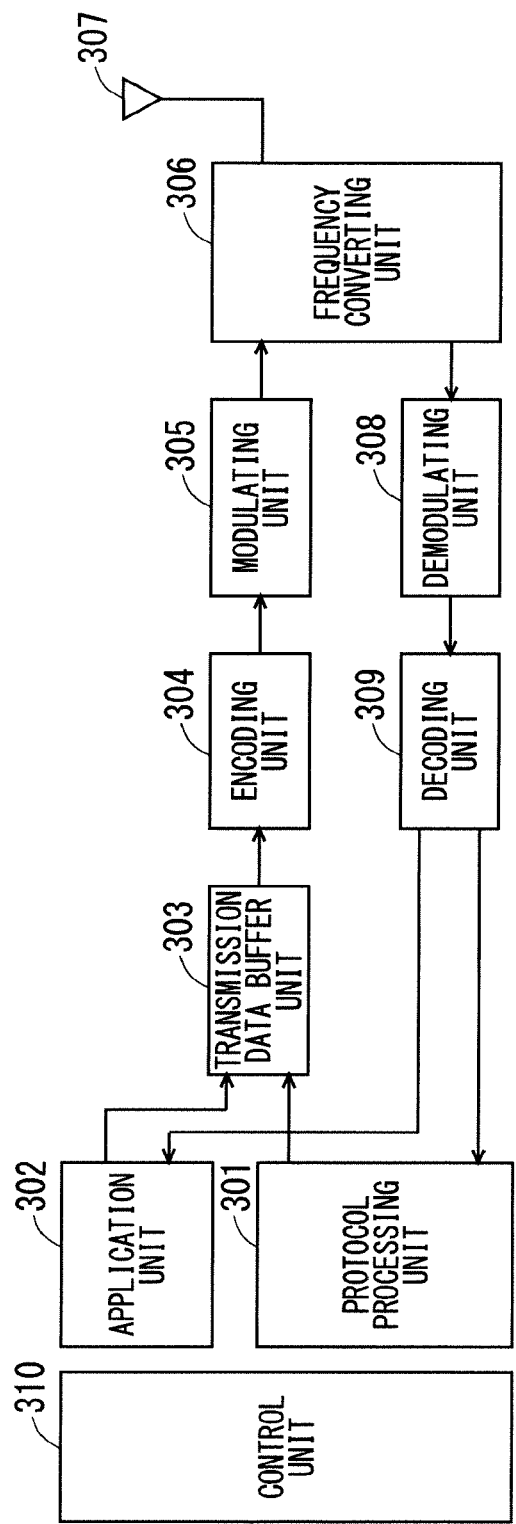
FIG. 3 is a block diagram showing the configuration of a user equipment 202 shown in FIG. 2, which is a communication terminal according to the present invention.

FIG. 2 is a block diagram showing an overall configuration of an LTE communication system 200 which is under discussion of 3GPP. FIG. 2 is described here. A radio access network is referred to as an evolved universal terrestrial radio access network (E-UTRAN) 201. A user equipment device (hereinafter, referred to as a "user equipment (UE)") 202 that is a communication terminal device is capable of radio communication with a base station device (hereinafter, referred to as a "base station (E-UTRAN Node B: eNB)") 203 and transmits and receives signals through radio communication.

Here, the "communication terminal device" covers not only a user equipment device such as a mobile phone terminal device, but also an unmovable device such as a sensor. In the following description, the "communication terminal device" may be simply referred to as a "communication terminal".

The E-UTRAN is composed of one or a plurality of base stations 203, provided that a control protocol for the user equipment 202 such as a radio resource control (RRC), and user planes (hereinafter also referred to as "U-planes") such as a packet data convergence protocol (PDCP), radio link control (RLC), medium access control (MAC), or physical layer (PHY) are terminated in the base station 203.

The control protocol radio resource control (RRC) between the user equipment 202 and the base station 203 performs, for example, broadcast, paging, and RRC connection management. The states of the base station 203 and the user equipment 202 in RRC are classified into RRC_IDLE and RRC_CONNECTED.

In RRC_IDLE, public land mobile network (PLMN) selection, system information (SI) broadcast, paging, cell re-selection, mobility, and the like are performed. In RRC_CONNECTED, the user equipment has RRC connection and is capable of transmitting and receiving data to and from a network. In RRC_CONNECTED, for example, handover (HO) and measurement of a neighbor cell are performed.

The base stations 203 are classified into eNBs 207 and Home-eNBs 206. The communication system 200 is equipped with an eNB group 203-1 including a plurality of eNBs 207 and a Home-eNB group 203-2 including a plurality of Home-eNBs 206. A system, composed of an evolved packet core (EPC) being a core network and an E-UTRAN 201 being a radio access network, is referred to as an evolved packet system (EPS). The EPC being a core network and the E-UTRAN 201 being a radio access network may be collectively referred to as a "network".

The eNB 207 is connected to an MME/S-GW unit (hereinafter, also referred to as an "MME unit") 204 including a mobility management entity (MME), a serving gateway (S-GW) or an MME and an S-GW by means of an S1 interface, and control information is communicated between the eNB 207 and the MME unit 204. A plurality of MME units 204 may be connected to one eNB 207. The eNBs 207 are connected to each other by means of an X2 interface, and control information is communicated between the eNBs 207.

The Home-eNB 206 is connected to the MME unit 204 by means of an S1 interface, and control information is communicated between the Home-eNB 206 and the MME unit 204. A plurality of Home-eNBs 206 are connected to one MME unit 204. Alternatively, the Home-eNBs 206 are connected to the MME units 204 through a Home-eNB gateway (HeNBGW) 205. The Home-eNB 206 is connected to the HeNBGW 205 by means of an S1 interface, and the HeNBGW 205 is connected to the MME unit 204 by means of an S1 interface.

One or a plurality of Home-eNBs 206 are connected to one HeNBGW 205, and information is communicated therebetween through an S1 interface. The HeNBGW 205 is connected to one or a plurality of MME units 204, and information is communicated therebetween through an S1 interface.

The MME units 204 and HeNBGW 205 are entities of higher layer, specifically, higher nodes, and control the connections between the user equipment (UE) 202 and the eNB 207 and the Home-eNB 206 being base stations. The MME units 204 configure an EPC being a core network. The base station 203 and the HeNBGW 205 configure the E-UTRAN 201.

Further, the configuration below is studied in 3GPP. The X2 interface between the Home-eNBs 206 is supported. In other words, the Home-eNBs 206 are connected to each other by means of an X2 interface, and control information is communicated between the Home-eNBs 206. The HeNBGW 205 appears to the MME unit 204 as the Home-eNB 206. The HeNBGW 205 appears to the Home-eNB 206 as the MME unit 204.

The interfaces between the Home-eNBs 206 and the MME units 204 are the same, which are the S1 interfaces, in both cases where the Home-eNB 206 is connected to the MME unit 204 through the HeNBGW 205 and it is directly connected to the MME unit 204.

The base station device 203 may configure a single cell or a plurality of cells. Each cell has a range predetermined as a coverage in which the cell can communicate with the user equipment 202 and performs radio communication with the user equipment 202 within the coverage. In a case where one base station device 203 configures a plurality of cells, every cell is configured so as to communicate with the user equipment 202.

FIG. 3 is a block diagram showing the configuration of the user equipment 202 of FIG. 2. The transmission process of the user equipment 202 shown in FIG. 3 is described. First, a transmission data buffer unit 303 stores the control data from a protocol processing unit 301 and the user data from an application unit 302. The data stored in the transmission data buffer unit 303 is passed to an encoding unit 304, and is subjected to an encoding process such as error correction. There may exist the data output from the transmission data buffer unit 303 directly to a modulating unit 305 without the encoding process. The data encoded by the encoding unit 304 is modulated by the modulating unit 305. The modulated data is converted into a baseband signal, and the baseband signal is output to a frequency converting unit 306 and is then converted into a radio transmission frequency. After that, a transmission signal is transmitted from an antenna 307 to the base station 203.

The user equipment 202 executes the reception process as follows. The radio signal from the base station 203 is received through the antenna 307. The received signal is converted from a radio reception frequency into a baseband signal by the frequency converting unit 306 and is then demodulated by a demodulating unit 308. The demodulated data is passed to a decoding unit 309, and is subjected to a decoding process such as error correction. Among the pieces of decoded data, the control data is passed to the protocol processing unit 301, and the user data is passed to the application unit 302. A series of processes by the user equipment 202 is controlled by a control unit 310. This means that, though not shown in FIG. 3, the control unit 310 is connected to the individual units 301 to 309.

Figure 4:
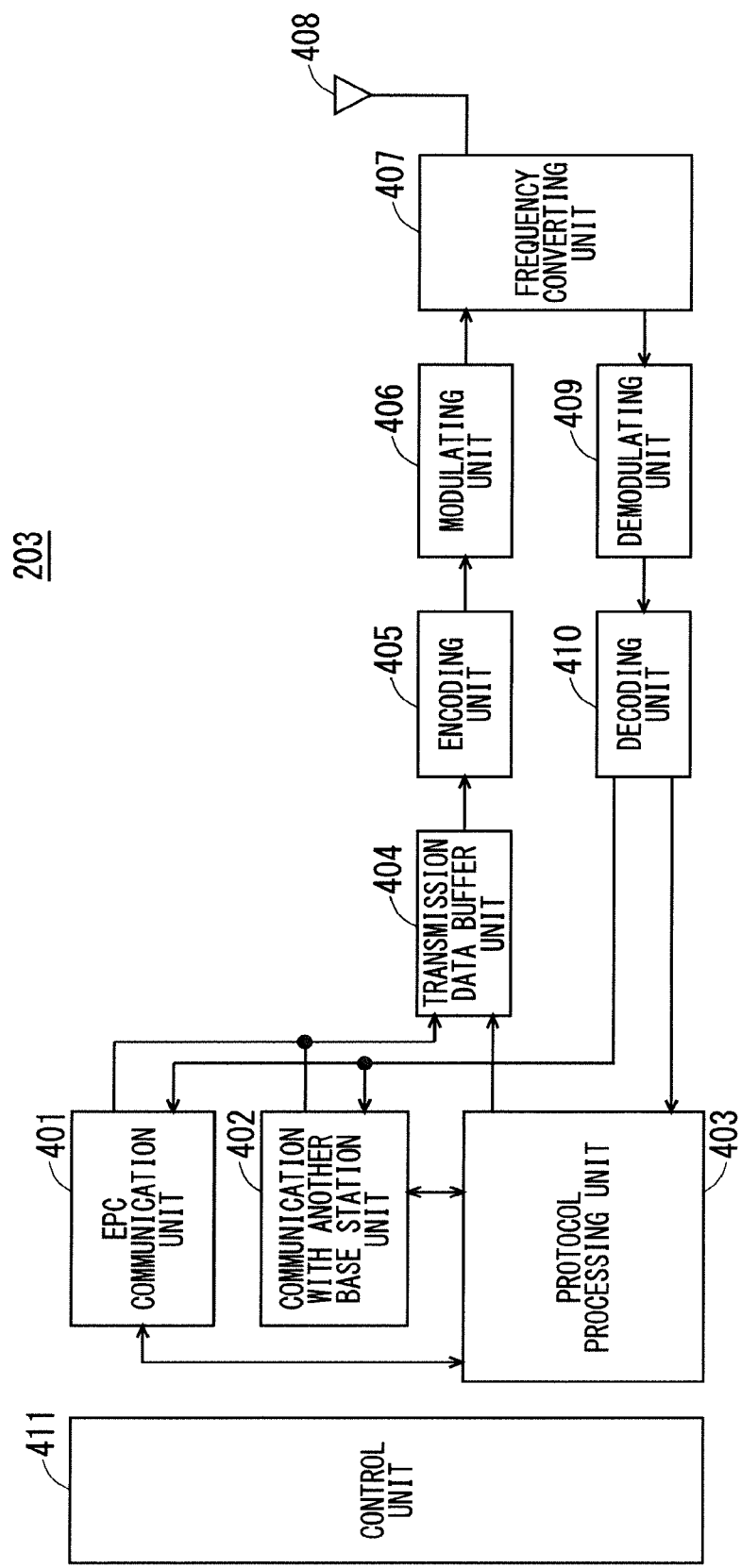
FIG. 4 is a block diagram showing the configuration of a base station 203 shown in FIG. 2, which is a base station according to the present invention.

FIG. 4 is a block diagram showing the configuration of the base station 203 of FIG. 2. The transmission process of the base station 203 shown in FIG. 4 is described. An EPC communication unit 401 performs data transmission and reception between the base station 203 and the EPC (such as the MME unit 204), HeNBGW 205, and the like. A communication with another base station unit 402 performs data transmission and reception to and from another base station. The EPC communication unit 401 and the communication with another base station unit 402 each transmit and receive information to and from a protocol processing unit 403. The control data from the protocol processing unit 403, and the user data and the control data from the EPC communication unit 401 and the communication with another base station unit 402 are stored in a transmission data buffer unit 404.

The data stored in the transmission data buffer unit 404 is passed to an encoding unit 405, and then an encoding process such as error correction is performed for the data. There may exist the data output from the transmission data buffer unit 404 directly to a modulating unit 406 without the encoding process. The encoded data is modulated by the modulating unit 406. The modulated data is converted into a baseband signal, and the baseband signal is output to a frequency converting unit 407 and is then converted into a radio transmission frequency. After that, a transmission signal is transmitted from an antenna 408 to one or a plurality of user equipments 202.

The reception process of the base station 203 is executed as follows. A radio signal from one or a plurality of user equipments 202 is received through the antenna 408. The received signal is converted from a radio reception frequency into a baseband signal by the frequency converting unit 407, and is then demodulated by a demodulating unit 409. The demodulated data is passed to a decoding unit 410 and then subject to a decoding process such as error correction. Among the pieces of decoded data, the control data is passed to the protocol processing unit 403, the EPC communication unit 401, or the communication with another base station unit 402, and the user data is passed to the EPC communication unit 401 and the communication with another base station unit 402. A series of processes by the base station 203 is controlled by a control unit 411. This means that, though not shown in FIG. 4, the control unit 411 is connected to the individual units 401 to 410.

Figure 5:
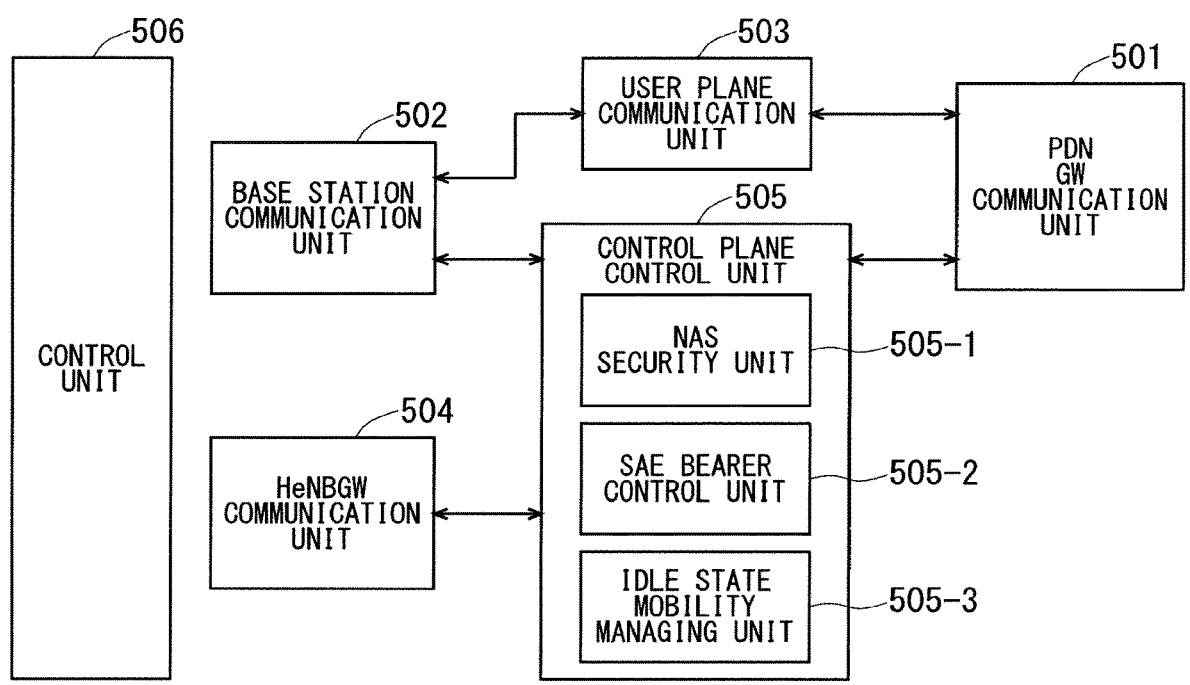
FIG. 5 is a block diagram showing the configuration of an MME according to the present invention.

FIG. 5 is a block diagram showing the configuration of the MME. FIG. 5 shows the configuration of an MME 204*a* included in the MME unit 204 shown in FIG. 2 described above. A PDN GW communication unit 501 performs data transmission and reception between the MME 204*a* and the PDN GW. A base station communication unit 502 performs data transmission and reception between the MME 204*a* and the base station 203 by means of the S1 interface. In a case where the data received from the PDN GW is user data, the user data is passed from the PDN GW communication unit 501 to the base station communication unit 502 via a user plane communication unit 503 and is then transmitted to one or a plurality of base stations 203. In a case where the data received from the base station 203 is user data, the user data is passed from the base station communication unit 502 to the PDN GW communication unit 501 via the user plane communication unit 503 and is then transmitted to the PDN GW.

In a case where the data received from the PDN GW is control data, the control data is passed from the PDN GW communication unit 501 to a control plane control unit 505. In a case where the data received from the base station 203 is control data, the control data is passed from the base station communication unit 502 to the control plane control unit 505.

A HeNBGW communication unit 504 is provided in a case where the HeNBGW 205 is provided, which performs data transmission and reception between the MME 204*a* and the HeNBGW 205 by means of the interface (IF) according to an information type. The control data received from the HeNBGW communication unit 504 is passed from the HeNBGW communication unit 504 to the control plane control unit 505. The processing results of the control plane control unit 505 are transmitted to the PDN GW via the PDN GW communication unit 501. The processing results of the control plane control unit 505 are transmitted to one or a plurality of base stations 203 by means of the S1 interface via the base station communication unit 502, and are transmitted to one or a plurality of HeNBGWs 205 via the HeNBGW communication unit 504.

The control plane control unit 505 includes a NAS security unit 505-1, an SAE bearer control unit 505-2, and an idle state mobility managing unit 505-3, and performs an overall process for the control plane (hereinafter also referred to as a "C-plane"). The NAS security unit 505-1 provides, for example, security of a non-access stratum (NAS) message. The SAE bearer control unit 505-2 manages, for example, a system architecture evolution (SAE) bearer. The idle state mobility managing unit 505-3 performs, for example, mobility management of an idle state (LTE-IDLE state which is merely referred to as idle as well), generation and control of a paging signal in the idle state, addition, deletion, update, and search of a tracking area of one or a plurality of user equipments 202 being served thereby, and tracking area list management.

The MME 204*a* distributes a paging signal to one or a plurality of base stations 203. In addition, the MME 204*a* performs mobility control of an idle state. When the user equipment is in the idle state and an active state, the MME 204*a* manages a list of tracking areas. The MME 204*a* begins a paging protocol by transmitting a paging message to the cell belonging to a tracking area in which the UE is registered. The idle state mobility managing unit 505-3 may manage the CSG of the Home-eNBs 206 to be connected to the MME 204*a*, CSG IDs, and a whitelist.

Figure 6:
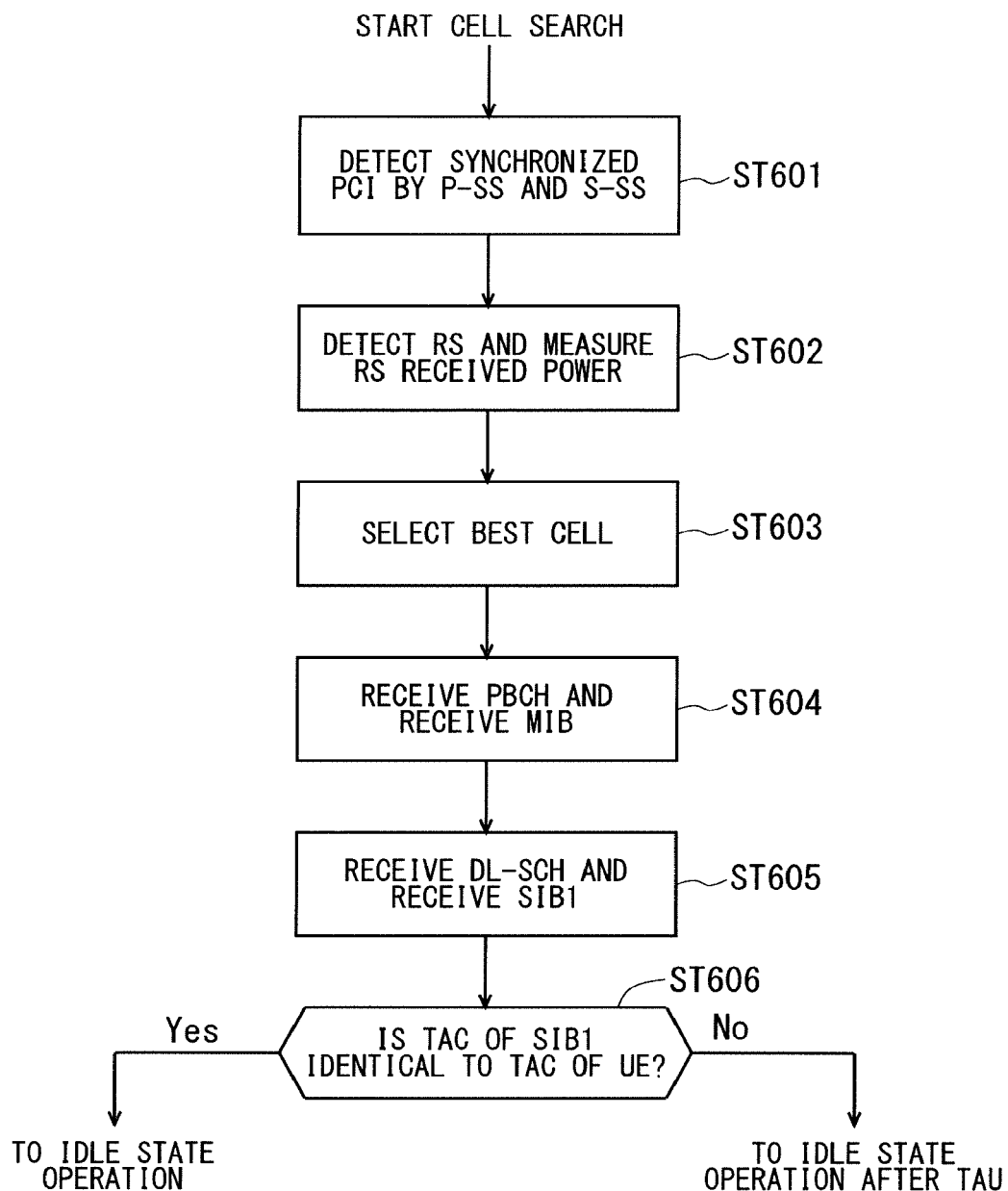
FIG. 6 is a flowchart showing an outline from a cell search to an idle state operation performed by a communication terminal (UE) in LTE communication system.

An example of a cell search method in a mobile communication system is described next. FIG. 6 is a flowchart showing an outline from a cell search to an idle state operation performed by a communication terminal (UE) in the LTE communication system. When starting a cell search, in Step ST601, the communication terminal synchronizes slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which correspond one-to-one to PCIs assigned per cell, are assigned to the synchronization signals (SSs). The number of PCIs is currently studied in 504 ways. The 504 ways of PCIs are used for synchronization, and the PCIs of the synchronized cells are detected (specified).

In Step ST602, next, the user equipment detects a cell-specific reference signal (CRS) being a reference signal (RS) transmitted from the base station per cell and measures the reference signal received power (RSRP). The codes corresponding one-to-one to the PCIs are used for the reference signal RS. Separation from another cell is enabled by correlation using the code. The code for RS of the cell is calculated from the PCI specified in Step ST601, so that the RS can be detected and the RS received power can be measured.

In Step ST603, next, the user equipment selects the cell having the best RS received quality, for example, the cell having the highest RS received power, that is, the best cell, from one or more cells that have been detected up to Step ST602.

In Step ST604, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as a transmission bandwidth configuration (dl-bandwidth)), the number of transmission antennas, and a system frame number (SFN).

In Step ST605, next, the user equipment receives the DL-SCH of the cell based on the cell configuration information of the MIB, to thereby obtain a system information block (SIB) 1 of the broadcast information BCCH. The SIB1 contains the information about the access to the cell, information about cell selection, and scheduling information on another SIB (SIBk; k is an integer equal to or greater than two). In addition, the SIB1 contains a tracking area code (TAC).

In Step ST606, next, the communication terminal compares the TAC of the SIB1 received in Step ST605 with the TAC portion of a tracking area identity (TAI) in the tracking area list that has already been possessed by the communication terminal. The tracking area list is also referred to as a TAI list. TAI is the identification information for identifying tracking areas and is composed of a mobile country code (MCC), a mobile network code (MNC), and a tracking area code (TAC). MCC is a country code. MNC is a network code. TAC is the code number of a tracking area.

If the result of the comparison of Step ST606 shows that the TAC received in Step ST605 is identical to the TAC included in the tracking area list, the user equipment enters an idle state operation in the cell. If the comparison shows that the TAC received in Step ST605 is not included in the tracking area list, the communication terminal requires a core network (EPC) including MME to change a tracking area through the cell for performing tracking area update (TAU).

The device configuring a core network (hereinafter, also referred to as a "core-network-side device") updates the tracking area list based on an identification number (such as UE-ID) of a communication terminal transmitted from the communication terminal together with a TAU request signal. The core-network-side device transmits the updated tracking area list to the communication terminal. The communication terminal rewrites (updates) the TAC list of the communication terminal based on the received tracking area list. After that, the communication terminal enters the idle state operation in the cell.

Widespread use of smartphones and tablet terminal devices explosively increases traffic in cellular radio communications, causing a fear of insufficient radio resources all over the world. To increase spectral efficiency, thus, it is studied to downsize cells for further spatial separation.

In the conventional configuration of cells, the cell configured by an eNB has a relatively-wide-range coverage. Conventionally, cells are configured such that relatively-wide-range coverages of a plurality of cells configured by a plurality of macro eNBs cover a certain area.

When cells are downsized, the cell configured by an eNB has a narrow-range coverage compared with the coverage of a cell configured by a conventional eNB. Thus, in order to cover a certain area as in the conventional case, a larger number of downsized eNBs than the conventional eNBs are required.

In the description below, a "macro cell" refers to a cell having a relatively wide coverage, such as a cell configured by a conventional eNB, and a "macro eNB" refers to an eNB configuring a macro cell. A "small cell" refers to a cell having a relatively narrow coverage, such as a downsized cell, and a "small eNB" refers to an eNB configuring a small cell.

The macro eNB may be, for example, a "wide area base station" described in Non-Patent Document 7.

The small eNB may be, for example, a low power node, local area node, or hotspot. Alternatively, the small eNB may be a pico eNB configuring a pico cell, a femto eNB configuring a femto cell, HeNB, remote radio head (RRH), remote radio unit (RRU), remote radio equipment (RRE), or relay node (RN). Still alternatively, the small eNB may be a "local area base station" or "home base station" described in Non-Patent Document 7.

FIG. 7 shows the concept of the cell configuration in which macro eNBs and small eNBs coexist. The macro cell configured by a macro eNB has a relatively-wide-range coverage 701. A small cell configured by a small eNB has a coverage 702 whose range is narrower than that of the coverage 701 of a macro eNB (macro cell).

When a plurality of eNBs coexist, the coverage of the cell configured by an eNB may be included in the coverage of the cell configured by another eNB. In the cell configuration shown in FIG. 7, as indicated by a reference "704" or "705", the coverage 702 of the small cell configured by a small eNB may be included in the coverage 701 of the macro cell configured by a macro eNB.

As indicated by the reference "705", the coverages 702 of a plurality of, for example, two small cells may be included in the coverage 701 of one macro cell. A user equipment (UE) 703 is included in, for example, the coverage 702 of the small cell and performs communication via the small cell.

In the cell configuration shown in FIG. 7, as indicated by a reference "706", the coverage 701 of the macro cell configured by a macro eNB may overlap the coverages 702 of the small cells configured by small eNBs in a complicated manner.

As indicated by a reference "707", the coverage 701 of the macro cell configured by a macro eNB need not overlap the coverages 702 of the small cells configured by small eNBs.

Further, as indicated by a reference "708", the coverages 702 of a large number of small cells configured by a large number of small eNBs may be configured in the coverage 701 of one macro cell configured by one macro eNB.

In the uplink transmission with a split bearer using the dual connectivity (DC), whether the uplink data is to be transmitted to a secondary node (SN) (see Non-Patent Document 12) is determined according to the buffer capacity of the uplink data in the UE. A master node (MN) (see Non-Patent Document 12) notifies the UE of a threshold of the buffer capacity of the uplink data. The UE compares the buffer capacity of the uplink data with the threshold. The UE transmits the uplink data to the MN when the buffer capacity of the uplink data is smaller than or equal to the threshold, and transmits the uplink data to the MN and the SN when the buffer capacity of the uplink data is larger than the threshold.

However, for example, upon application of such a method to the uplink data requiring the low latency, the UE performs uplink transmission to the MN when the buffer capacity of the uplink data is smaller than the threshold. For example, even though the SN supports a short symbol length (duration) and the uplink transmission using the SN yields the low-latency characteristics, the UE has to perform the uplink transmission to the MN, and has a problem of failing to obtain the low-latency characteristics.

A solution to the problem is disclosed below.

Which node the UE performs the uplink transmission to is made configurable. The MN notifies the UE of information on nodes for the uplink transmission. The node for the uplink transmission is the MN or the SN. Alternatively, the nodes for the uplink transmission are both the MN and the SN. For example, an identifier of a base station can be used as the information on nodes for the uplink transmission.

The information on nodes for the uplink transmission may be information on a cell group. The information on a cell group may be information on a master cell group (MCG) and/or a secondary cell group (SCG). The information on nodes for the uplink transmission may be information on a cell, and the information on a cell may be a cell identifier. The UE indicates a cell to be used for the uplink transmission.

Although the Description mainly describes a communication destination of the UE as a node or a communication node, the communication destination of the UE may be a cell group, a base station, or a cell unless it is particularly mentioned.

The information on nodes for the uplink transmission should be notified via the RRC signaling. For example, the information on nodes for the uplink transmission may be included in an RRC connection reconfiguration (RRCConnectionReconfiguration) message to be notified. The information on nodes for the uplink transmission may be notified, for example, in a DC setup process.

The SN notifies the MN of information for determining which uplink transmission node from the UE is used (hereinafter may be referred to as uplink transmission node determination information). The uplink transmission node determination information may be information on latency characteristics. The uplink transmission node determination information may be information on a radio configuration to be supported. The uplink transmission node determination information may be information on a communication service to be supported. The uplink transmission node determination information may be information on a load state or a use state of resources. The uplink transmission node determination information may be information on the radio propagation environment. The SN may notify the uplink transmission node determination information via an Xn signaling or an X2 signaling. The SN may notify the uplink transmission node determination information, for example, in the DC setup process.

The SN may notify the uplink transmission node determination information, for example, in an SgNB addition process. For example, the SN may include the uplink transmission node determination information in an SgNB addition request acknowledgement to notify the information. The MN can configure an uplink transmission node for the UE in starting the DC. Further, the SN may notify the uplink transmission node determination information, for example, in an SgNB modification process. For example, the SN may include the uplink transmission node determination information in an SgNB modification request acknowledgement to notify the information. When starting the process in response to a request from the SN, the SN may include the uplink transmission node determination information in an SgNB modification required notification to notify the information. The MN can configure an uplink transmission node for the UE in modifying a configuration of the SN.

Seven examples of the uplink transmission node determination information are described below.

(1) The subcarrier spacing (SCS) to be supported by the SN, which may be a symbol duration.

(2) Information on whether the SN supports uplink transmission without grant.

(3) The QoS of a communication service to be supported by the SN; The QoS of an uplink communication service may be used. Information indicating the QoS, for example, the QoS profile, the QCI, latency, and a packet error loss rate may be used.

(4) The RRC configuration of the SN.

(5) The radio configuration of the SN, for example, the AS configuration, the MAC configuration, and the PHY configuration, etc.

(6) the number of symbols in a slot to be supported by the SN, which may be information on whether the SN supports a slot with less number of symbols than normal.

(7) Combinations of (1) to (6) above.

The MN may determine the uplink transmission node for the UE. The MN can determine which node the UE performs the uplink transmission to, using the uplink transmission node determination information. For example, the MN determines a node with a shorter symbol duration than that of its own node as the uplink transmission node for the UE, using information on a symbol duration to be supported by the SN which is obtained from the SN. When symbol durations coincide with each other, the MN determines both of the NBs as the uplink transmission nodes for the UE. For example, configuring the uplink data requiring the low latency characteristics in such a manner allows the UE to transmit the uplink data to a node that supports a shorter symbol duration and transmit the uplink data with low latency.

For another example, the MN determines a node that supports transmission without grant as the uplink transmission node for the UE, using information on whether to support the transmission without grant which is obtained from the SN. When both of the nodes support the transmission without grant, the MN determines the nodes as the uplink transmission nodes for the UE. For example, configuring the uplink data requiring the low latency characteristics in such a manner allows the UE to perform the transmission without grant which does not require any SR, and transmit the uplink data with low latency.

The MN may request the SN to notify the uplink transmission node determination information. The MN may notify the request via the Xn signaling or the X2 signaling. The MN may notify the request, for example, in the DC setup process. The MN may notify the request, for example, in the SgNB addition process. The MN may include the request in the SgNB addition request to notify the request. The MN can configure an uplink transmission node for the UE in starting the DC. The MN may notify the request, for example, in the SgNB modification process. For example, the MN may include the request in the SgNB modification request to notify the request. The MN can configure an uplink transmission node for the UE.

The UE may notify the MN of the information for determining which uplink transmission node from the UE is used. Examples of the uplink transmission node determination information to be notified from the UE to the MN include the QoS required by a communication service. The uplink transmission node determination information may be the QoS required by an uplink communication service. The uplink transmission node determination information may be information indicating the QoS, for example, the QoS profile, the QCI, desired latency, and a packet error loss rate. The uplink transmission node determination information may include information for identifying the UE. Examples of the information for identifying the UE include an identifier.

The UE may notify the uplink transmission node determination information via the RRC signaling. The UE may include the uplink transmission node determination information in messages such as the RRC connection request (RRCConnectionRequest), the RRC connection setup complete (RRCConnectionSetupComplete) message, the RRC connection reestablishment request (RRCConnectionReestablishmentRequest), the RRC connection reestablishment complete (RRCConnectionReestablishmentComplete) message to notify the information. With application of such RRC messages recited in these examples, the MN can use the information in configuring the DC for the UE.

The MN may request the UE to notify the uplink transmission node determination information. The MN may notify the request via the RRC signaling. The MN may include the request in messages such as the RRC connection setup (RRCConnectionSetup) and the RRC connection reestablishment (RRCConnectionReestablishment) message to notify the request. The MN can configure an uplink transmission node for the UE.

The CN may notify the MN of the information for determining which uplink transmission node from the UE is used. Examples of the uplink transmission node determination information to be notified from the CN to the MN include an identifier of the target UE and the QoS required by an uplink communication service of that UE. The uplink transmission node determination information may be the QoS required by the uplink communication service. The uplink transmission node determination information may be information indicating the QoS, for example, the QoS profile, the QCI, desired latency, and a packet error loss rate. The CN may notify the information via an S1 signaling or an NG-C signaling.

The MN may request the CN to notify the uplink transmission node determination information. The MN may notify the request via the S1 signaling or the NG-C signaling. The MN can configure an uplink transmission node for the UE.

Figure 8:
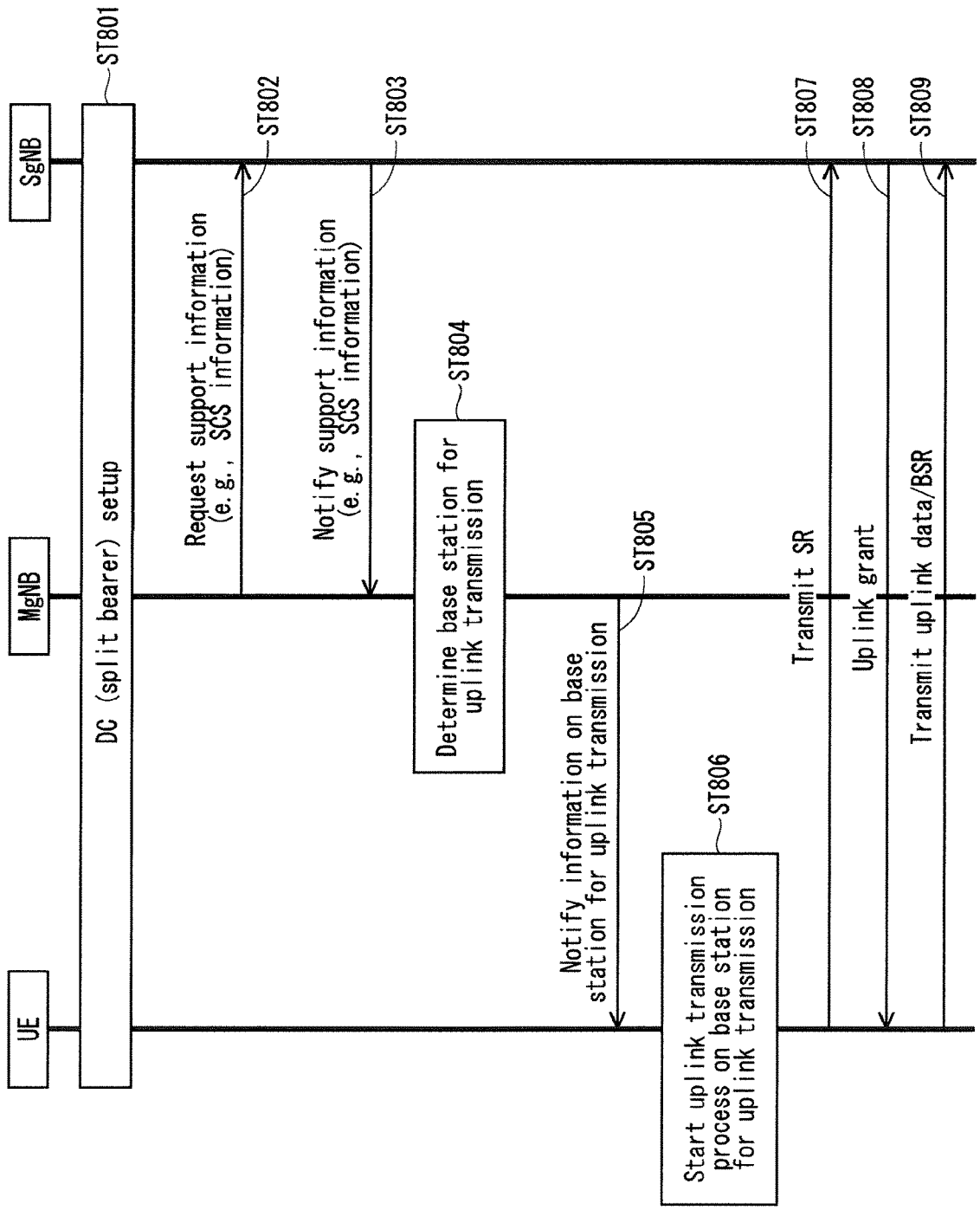
FIG. 8 illustrates an example sequence for the MN to configure, for the UE, which node the uplink transmission is addressed to according to the first embodiment.

FIG. 8 illustrates an example sequence for the MN to configure, for the UE, which node the uplink transmission is addressed to. In the example of FIG. 8, the MgNB represents the MN, and the SgNB represents the SN. In Step ST801, the UE, the MgNB, and the SgNB perform the DC setup process using a split bearer. In the example of FIG. 8, an uplink data transmission node is not configured according to the buffer capacity of the uplink data in the UE. In the DC setup process, the MgNB may notify the UE of information indicating a method for configuring an uplink transmission node. The MgNB may notify the information via the RRC signaling. The MgNB may include the information in the RRC connection reconfiguration message to notify the information. The UE applies the notified configuration method. In the example of FIG. 8, the MgNB determines the uplink transmission node, and notifies the UE of information indicating the method for configuring the uplink transmission node.

The example of FIG. 8 also illustrates a method for determining the uplink transmission node, using SCS information of the SgNB. In Step ST802, the MgNB requests the SCS information of the SgNB from the SgNB. In Step ST803, the SgNB notifies the MgNB of the SCS information to be supported by its own SgNB, in response to the request from the MgNB. The SgNB may notify the support information for each cell. The SgNB may notify the SCS information to be supported for each cell. The SgNB may associate the SCS information with an identifier of the cell to notify them.

In Step ST804, the MgNB compares the SCS to be supported by its own node with the SCS to be supported by the SgNB, and determines the node that supports a smaller SCS as the uplink transmission node. The example of FIG. 8 illustrates a case where the SgNB supports a smaller SCS than that of the MgNB. The MgNB determines the SgNB as the uplink transmission node.

Here, the MgNB may use the QoS information of the communication service of the UE which has been previously obtained. The MgNB may obtain the QoS information of the communication service from the CN or the UE. The CN may notify the MgNB of the QoS information of the communication service in a bearer setup process for the communication service of the UE. The QoS information of the communication service may be included in bearer information for performing the DC setup process.

The MgNB may determine, as the uplink transmission node, a node that supports a smaller SCS so that the QoS is satisfied. For example, when the communication service of the UE requires the low latency characteristics, the MgNB may determine the SgNB that supports a smaller SCS as the uplink transmission node. In Step ST805, the MgNB notifies the UE of information on the SgNB determined as the uplink transmission node.

The information on the SgNB includes information on a node, information on a base station, information on a cell group, and information on a cell. The MgNB associates these pieces of information for identifying the SgNB with information indicating that the SgNB has been determined as the uplink transmission node to notify them to the UE.

In Step ST806, the UE starts an uplink transmission process on the SgNB that is the uplink transmission node which has been notified from the MgNB. When the uplink data occurs in the UE, the UE transmits the SR to the SgNB in Step ST807. The MgNB should notify, in the DC setup process, the UE of the configurations of the SR in the MgNB and the SgNB. The UE may transmit the SR to the cell when the MgNB notifies the cell information for the uplink transmission in Step ST805.

In Step ST808, the SgNB notifies the UE of a grant for the uplink communication (uplink scheduling information). In Step ST809, the UE transmits the uplink data to the SgNB according to the uplink grant. The UE may notify the Buffer Status Report (BSR) together. The UE transmits the uplink data with repetition of the processes of Steps ST808 and ST809 until there is no uplink data.

Consequently, the UE can transmit, in the DC, the uplink data to the SgNB which the MgNB has configured as the uplink transmission node, irrespective of the buffer capacity of the uplink data. For example, in the case where the uplink data requiring the low latency occurs, even when the data is small in amount, the UE can transmit the uplink data to the SgNB that supports a smaller SCS. The lower latency can be pursued in the DC.

The method for the MN to notify the UE of information on the uplink transmission node is previously disclosed. Another method is disclosed. The MN may notify the UE of information for determining the uplink transmission node.

The MN should notify, via the RRC signaling, the information for the UE to determine the uplink transmission node. For example, the MN may include the information in an RRC connection reconfiguration (RRCConnectionReconfiguration) message to notify the information. The MN may notify the information, for example, in the DC setup process.

Seven examples of the information for the UE to determine the uplink transmission node are described below.

(1) The subcarrier spacing (SCS) to be supported by each node, which may be a symbol duration.

(2) Information on whether each node supports uplink transmission without grant.

(3) The QoS of a communication service to be supported by each node; The QoS of an uplink communication service may be used. Information indicating the QoS, for example, the QoS profile, the QCI, latency, and a packet error loss rate may be used.

(4) The RRC configuration of each node.

(5) The radio configuration of each node, for example, the AS configuration, the MAC configuration, and the PHY configuration, etc.

(6) the number of symbols in a slot to be supported by the SN, which may be information on whether the SN supports a slot with less number of symbols than normal.

(7) Combinations of (1) to (6) above.

These pieces of information may be associated with the MN or the SN. Whether these pieces of information are of the MN or the SN can be identified. These pieces of information may be associated with each node. These pieces of information may be associated with, for example, an identifier of a base station. Whether these pieces of information are of which node or which base station can be identified. These pieces of information may be associated with each cell group. These pieces of information may be associated with the MCG or the SCG. Whether these pieces of information are of the MCG or the SCG can be identified. Moreover, these pieces of information may be associated with the cell. These pieces of information may be associated with, for example, an identifier of the cell. Of which cell these pieces of information are can be identified.

The SN may notify the UE of information for the UE to determine the uplink transmission node. The SN may give the notification via the RRC signaling. For example, the SN may include the notification in an RRC connection reconfiguration (RRCConnectionReconfiguration) message to give the notification.

The information to be notified from the SN to the UE may be information of each node for the UE to determine the uplink transmission node. The MN should notify the SN of information of the MN for the UE to determine the uplink transmission node. The SN notifies the UE of information for the MN and the UE at its own node to determine the uplink transmission node. Consequently, even when the radio environment of the MN is inferior, the uplink transmission node is configurable using the SN, which can yield the low latency characteristics.

The information to be notified from the SN to the UE may be information of the SN for the UE to determine the uplink transmission node. The MN should notify the UE of information of the MN for the UE to determine the uplink transmission node. This can eliminate the need for communication between the MN and the SN. A notification of the information from each node to the UE can timely reflect the state of the node on the UE.

The UE may determine the uplink transmission node. The UE can determine which node the uplink transmission is addressed to, using the information for determining the uplink transmission node. For example, the MN notifies the UE of information on a symbol duration to be supported by each of the MN and the SN. The UE determines a node that supports a shorter symbol duration as the uplink transmission node for the UE, using the information on the symbol duration to be supported by each node. When the symbol durations coincide with each other, the UE determines both of the NBs as the uplink transmission nodes for the UE. For example, configuring the uplink data requiring the low latency characteristics in such a manner allows the UE to transmit the uplink data to the node that supports a shorter symbol duration and transmit the uplink data with low latency.

For another example, the UE determines a node that supports the transmission without grant as the uplink transmission node for the UE, using information on whether each node supports the transmission without grant. When both of the nodes support the transmission without grant, the UE determines the nodes as the uplink transmission nodes for the UE. For example, configuring the uplink data requiring the low latency characteristics in such a manner allows the UE to perform the transmission without grant which does not require any SR, and transmit the uplink data with low latency.

The UE determines a node that supports a shorter latency as the uplink transmission node for the UE, using information on the latency to be supported by each node. When the latencies coincide with each other, the UE determines both of the nodes as the uplink transmission nodes for the UE. For example, configuring the uplink data requiring the low latency characteristics in such a manner allows the UE to transmit the uplink data with low latency.

The UE may use the QoS required by a communication service to determine the uplink transmission node. The UE may use the QoS required by an uplink communication service. The UE may use information indicating the QoS, for example, the QoS profile, the QCI, desired latency, and a packet error loss rate. For example, the UE determines a node that supports a latency shorter than a desired latency as the uplink transmission node for the UE, using information on the latency to be supported by each node. For example, configuring the uplink data requiring the low latency characteristics in such a manner allows the UE to transmit the uplink data with low latency.

The UE may determine the method for determining the uplink transmission node, according to the uplink communication service. Alternatively, for example, the method by which the UE determines the uplink transmission node may be statically predetermined in a standard.

Disclosed is that the MN notifies the UE of information for the UE to determine the uplink transmission node. The method for the MN to obtain the example uplink transmission node determination information from the SN should be applied to a method for the MN to obtain information on the SN in the aforementioned information.

Figure 9:
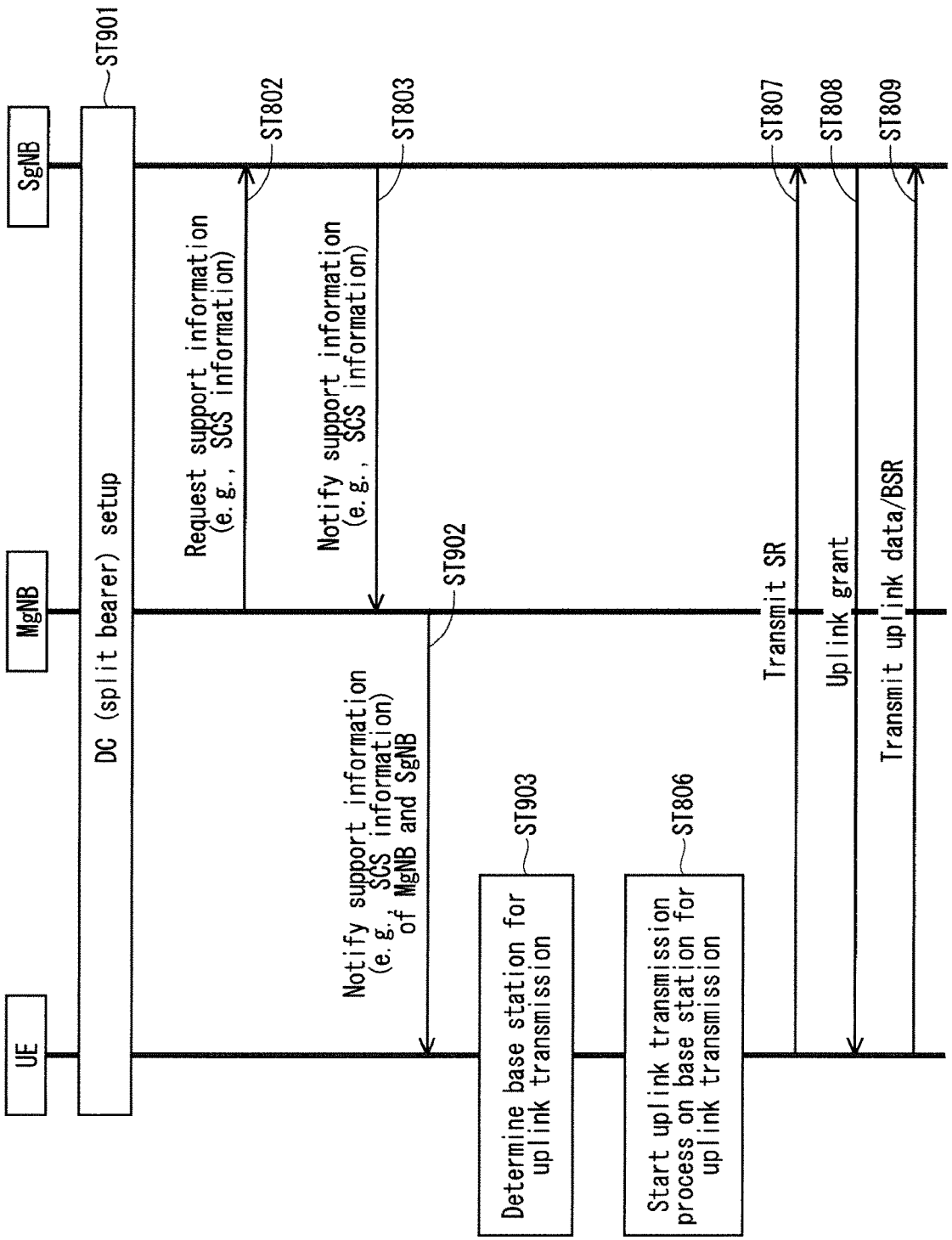
FIG. 9 illustrates an example sequence for the UE to determine an uplink transmission node according to the first embodiment.

FIG. 9 illustrates an example sequence for the UE to determine the uplink transmission node. Since the sequence illustrated in FIG. 9 includes the same steps as those of the sequence illustrated in FIG. 8, the same step numbers are assigned to the same Steps and the common description thereof is omitted. In Step ST901, the DC setup process is performed. In the example of FIG. 9, the UE is notified, in the DC setup process, of information indicating a method for the UE to determine the uplink transmission node. The example of FIG. 9 also illustrates a method for determining the uplink transmission node, using the SCS information of the SgNB similarly as FIG. 8.

In Step ST902, the MgNB notifies the UE of information for determining the uplink transmission node. The MgNB notifies the UE of the SCS information to be supported by its own node and the SCS information to be supported by the SgNB. The MgNB associates information for identifying the SgNB with information indicating a candidate for the uplink transmission node to notify them to the UE. Examples of the information for identifying the SgNB include information on a node, information on a base station, information on a cell group, and information on a cell.

In Step ST903, the UE determines a node that supports a smaller SCS as the uplink transmission node. The example of FIG. 9 illustrates a case where the SgNB supports a smaller SCS than that of the MgNB. The UE determines the SgNB as the uplink transmission node.

Here, the UE may use the QoS information of the communication service in which the DC is configured. The UE may determine, as the uplink transmission node, a node that supports a smaller SCS so that the QoS is satisfied. For example, when the communication service of the UE requires the low latency characteristics, the UE may determine the SgNB that supports a smaller SCS as the uplink transmission node.

In Step ST806, the UE starts the uplink transmission process on the SgNB determined as the uplink transmission node. When the uplink data occurs in the UE, the UE performs transmission of the uplink data with the SgNB in Steps ST807 to ST809.

Consequently, the UE can transmit, in the DC, the uplink data to the SgNB configured as the uplink transmission node, irrespective of the buffer capacity of the uplink data. For example, in the case where the uplink data requiring the low latency occurs, even when the data is small in amount, the UE can transmit the uplink data to the SgNB that supports a smaller SCS. The lower latency can be pursued in the DC.

Disclosed is the method for the MN to notify the UE of information for determining the uplink transmission node. Another method is disclosed. The MN notifies the UE of a threshold for determining the uplink transmission node. The MN notifies a threshold of an indicator different from the buffer capacity of the uplink data in the UE, as the threshold for determining the uplink transmission node. The UE determines the uplink transmission node using the threshold.

The MN should notify the threshold for determining the uplink transmission node via the RRC signaling. For example, the MN may include the threshold in an RRC connection reconfiguration (RRCConnectionReconfiguration) message to notify the threshold. The MN may notify the threshold, for example, in the DC setup process. The MN may notify information on a node to be used for uplink transmission when the indicator is smaller than (or may be smaller than or equal to) the threshold, and information on a node to be used for uplink transmission when the indicator is larger than or equal to (or may be larger than) the threshold. The nodes to be used for uplink transmission are flexibly configurable.

As an alternative method, the node to be used for uplink transmission when the indicator is smaller than the threshold and the node to be used for uplink transmission when the indicator is larger than or equal to the threshold may be statically predetermined, for example, in a standard. The notification requires less amount of information.

The node to be used for uplink transmission when the indicator is smaller than the threshold or when the indicator is larger than or equal to the threshold may be the MN or the SN. Alternatively, such nodes may be both the MN and the SN. The information on the uplink transmission node may be an identifier of a base station. The information on the uplink transmission node may be information on a cell group. The information on a cell group may be information on a master cell group (MCG) or a secondary cell group (SCG). The information on the uplink transmission node may be information on a cell, and the information on a cell may be a cell identifier. The UE indicates a cell to be used for the uplink transmission.

The indicator of the threshold for the UE to determine the uplink transmission node may be, for example, information indicating the QoS of the uplink communication service. The indicator may be, for example, a desired latency of the uplink communication service. The indicator may be, for example, a desired packet error loss rate of the uplink communication service. The MN can configure the uplink transmission node for obtaining the desired QoS for the UE, using the indicator required by the uplink communication service.

For example, the MN notifies the UE of a threshold of a desired latency of the uplink communication service, information indicating use of the SN as the uplink transmission node when the desired latency is lower than the threshold, and information indicating use of the MN as the uplink transmission node when the desired latency is higher than or equal to the threshold. The UE transmits the uplink data to the SN when the desired latency of the uplink data is lower than the threshold, and transmits the uplink data to the MN when the desired latency of the uplink data is higher than or equal to the threshold. For example, configuring the uplink data requiring the low latency characteristics in such a manner allows the UE to transmit the uplink data with low latency.

Figure 11:
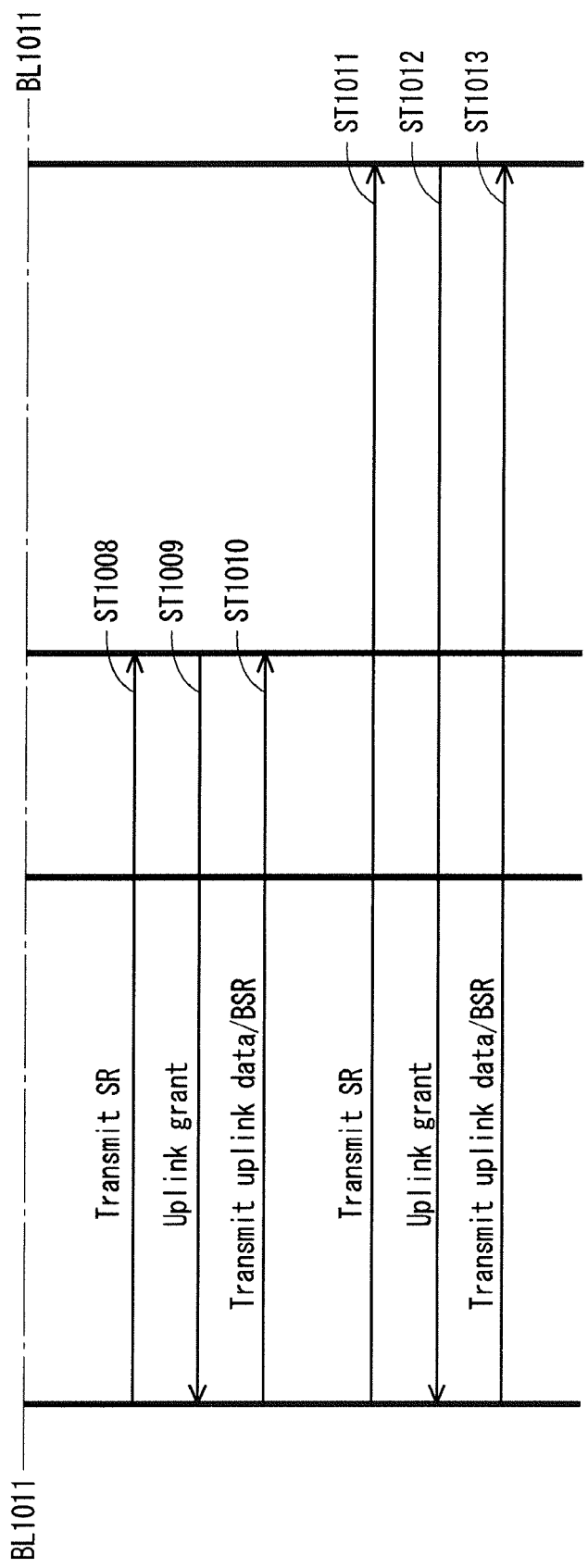
FIG. 11 illustrates the example sequence for the UE to determine the uplink transmission node using a threshold according to the first embodiment.

FIGS. 10 and 11 illustrate an example sequence for the UE to determine the uplink transmission node using a threshold. FIGS. 10 and 11 illustrate an example where the indicator of the threshold is a desired latency. FIGS. 10 and 11 are connected across a location of a border BL1011. Since the sequence illustrated in FIGS. 10 and 11 includes the same steps as those of the sequence illustrated in FIG. 8, the same step numbers are assigned to the same Steps and the common description thereof is omitted. In Step ST1000, the DC setup process is performed. In the example of FIGS. 10 and 11, the UE is notified, in the DC setup process, of information indicating a method for the UE to determine the uplink transmission node using a threshold.

In Step ST1001, the MgNB notifies the UE of a threshold of a desired latency as the threshold for determining the uplink transmission node. The MgNB notifies, together with the notification, the UE of information on the node to be used for uplink transmission when the desired latency is lower than the threshold, and information on the node to be used for uplink transmission when the desired latency is higher than or equal to the threshold. In the example of FIGS. 10 and 11, the SgNB is used for uplink transmission when the desired latency is lower than the threshold, and both the MgNB and the SgNB are used for uplink transmission when the desired latency is higher than or equal to the threshold. The MgNB determines these nodes using the SCS information obtained from the SgNB through Steps ST802 and ST803.

In Step ST1002, the UE determines whether the desired latency of the uplink communication service is lower than the threshold notified from the MgNB. When determining that the desired latency is lower than the threshold, the UE determines in Step ST1003 to transmit the uplink data to the SgNB according to the node information notified from the MgNB in Step ST1001. When the uplink data occurs in the UE, the UE performs transmission of the uplink data with the SgNB in Steps ST1004 to ST1006.

When determining that the desired latency is higher than or equal to the threshold in Step ST1002, the UE determines in Step ST1007 to transmit the uplink data to both the MgNB and the SgNB according to the node information notified from the MgNB in Step ST1001. When the uplink data occurs in the UE, the UE performs transmission of the uplink data with the MgNB in Steps ST1008 to ST1010, and performs transmission of the uplink data with the SgNB in Steps ST1011 to ST1013.

Consequently, the UE can transmit, in the DC, the uplink data to a node configured as the uplink transmission node, irrespective of the buffer capacity of the uplink data. For example, in the case where the uplink data requiring the low latency occurs, even when the data is small in amount, the UE can transmit the uplink data to the SgNB that supports a smaller SCS. The lower latency can be pursued in the DC.

A plurality of thresholds may be used. The MN notifies the UE of a plurality of thresholds for determining the uplink transmission node. The UE determines the uplink transmission node using the plurality of thresholds. For examples, assume that a predetermined indicator has thresholds of T1 and T2. The MN may notify information on a node to be used for uplink transmission when the predetermined indicator of the uplink data is smaller than T1, a node to be used for uplink transmission when the predetermined indicator is larger than or equal to T1 and smaller than T2, and a node to be used for uplink transmission when the predetermined indicator is larger than or equal to T2. The nodes to be used for uplink transmission are flexibly configurable. As previously described, these nodes may be statically predetermined, for example, in a standard. The notification requires less amount of information.

As an alternative method using a plurality of thresholds, one threshold may be configured for each of the indicators. Thresholds for a plurality of indicators may be configured in combination. The plurality of indicators can be used for determining the uplink transmission node.

As an alternative method using a plurality of thresholds, a plurality of indicators for applying a hysteresis may be configured. A state where nodes that perform uplink transmission alternate for a short period of time can be reduced.

Although disclosed is that the MN notifies the UE of the threshold for determining the uplink transmission node, the MN should determine the threshold. This can flexibly configure a threshold according to characteristics required by a load state or a communication service in the MN. As an alternative method, the CN may determine the threshold and notify the threshold to the MN. The MN notifies the UE of the threshold. This can flexibly configure the threshold with consideration given to states of a plurality of nodes being served by the CN. The amount of processing for determining the threshold in the MN can be reduced.

The threshold may be statically determined, for example, in a standard. The signaling for the notification from the MN to the UE can be reduced. When a plurality of thresholds are used, the thresholds may be numbered. A notification of a number from the MN to the UE enables the UE to recognize a threshold corresponding to the number. An indicator may be associated with a threshold. For example, notification of an indicator from the MN to the UE enables the UE to recognize a threshold determined, for example, in a standard.

A method for changing a configuration is disclosed. Although disclosed is the method for the MN to notify the UE of information on the uplink transmission node, the MN may change the uplink transmission node and notify the UE of information on the changed uplink transmission node. The UE transmits the uplink data to the uplink transmission node, using the information on the changed uplink transmission node which has been newly notified.

Although disclosed is the method for the MN to notify the UE of information for determining the uplink transmission node, the MN may change the information for determining the uplink transmission node and notify the UE of the changed information. The UE determines the uplink transmission node, using the changed information for determining the uplink transmission node which has been newly notified.

Although disclosed is the method for the MN to notify the UE of a threshold for determining the uplink transmission node, the MN may change the threshold for determining the uplink transmission node and notify the changed threshold. The UE determines the uplink transmission node, using the changed threshold for determining the uplink transmission node which has been newly notified.

When the CN determines a threshold, the CN should change the threshold and notify the MN of the changed threshold. The MN notifies the UE of the threshold.

Consequently, the configuration is changeable. Changing the configuration according to, for example, change in a state such as a load state or a radio environment in the MN or the SN can configure the uplink transmission node more appropriate for change in the state.

Such a configuration method may be configurable. The MN may determine which configuration method is used, and notify the UE of information indicating the configuration method. The CN may determine which configuration method is used, and notify the MN of information indicating the configuration method. The MN notifies the UE of information indicating the configuration method which has been notified from the CN. The MN should notify the UE of which configuration method is newly used, when intending to change the configuration method. The UE applies the changed configuration method which has been newly notified.

Consequently, the uplink transmission node more appropriate for further change in the state is configurable. Which method is to be configured may be indicated not through a specific notification of the configuration method but through a notification of information to be used for each configuration method. This can reduce the amount of information necessary for the notification.

The aforementioned methods are appropriately applicable to the multi connectivity (MC). Two or more SNs should be used. When the UE is connected to one MN and two or more SNs, an uplink transmission node is configurable among these nodes.

The aforementioned methods are applicable to split bearers. Specifically, the methods are applicable not only to the MCG split bearer but also to the SCG split bearer. The SN may determine a base station for uplink transmission with the SCG split bearer.

A part or all of the methods may be appropriately combined. For example, a notification of the threshold for determining the uplink transmission node may be combined with a notification of the information for determining the uplink transmission node. The UE may determine, using the information for determining the uplink transmission node, an uplink transmission node when a predetermined indicator is smaller than a threshold, and an uplink transmission node when the predetermined indicator is larger than or equal to the threshold. Consequently, the UE can perform uplink transmission not to a node which has been notified or determined in advance, but to a node more suitable for a state in each node.

A part or all of the methods, including a method for determining which node the uplink data is transmitted to, according to the buffer volume of the uplink data in the UE, may be appropriately combined. Examples of the methods include determining a predetermined node as the uplink transmission node when a buffer capacity value is smaller than a threshold, and determining a node that supports a shorter symbol duration as the uplink transmission node when the buffer capacity value is larger than or equal to the threshold. In the case where the uplink data capacity is small, even when the latency is slightly high, increase in an amount of latency until completion of transmission of the uplink data is avoided.

The methods disclosed in the first embodiment can configure a node to be a transmission destination of the uplink data from the UE. The frame structure or functions supported by each node can configure the node to be the transmission destination of the uplink data from the UE. This enables transmission of the uplink data to a node that is more optimal for a state in each node, and obtainment of the QoS required by the communication service.

For example, the UE can transmit data requiring the low latency characteristics to a node with the low latency characteristics, irrespective of whether the data capacity is large or small. Thus, the latency for transmitting the uplink data can be reduced.

In NR, support of the Ultra Reliable Low Latency Communication (URLLC) is required. The split bearers may be supported for the URLLC service. The split bearers may be supported with a DRB for the URLLC service. The use of the split bearers can increase throughput. The methods disclosed in the first embodiment may be applied to the URLLC service. Application of the methods disclosed in the first embodiment to the URLLC service can yield the low latency characteristics even with the split bearers.

As such, the split bearers are configurable for the communication service requiring the low latency characteristics. Consequently, the throughput of communication with low latency can be increased. This can yield lower latency characteristics.

The First Modification of the First Embodiment

When transmitting the uplink data using the SN, the UE needs to receive from the SN an uplink scheduling grant (may be simply referred to as a grant) for transmission of the uplink data. To obtain the uplink grant from the SN, the UE first needs to transmit the SR to the SN. The UE transmits the SR with preset periodic timing. Thus, even when the uplink data occurs, the UE cannot immediately transmit the uplink data, and has to wait for the next timing to transmit the SR.

As such, a plurality of processes have to be performed from occurrence of the uplink data for the SN to transmission of the uplink data with the SN, which results in an increase in latency. Thus, even when transmission of the uplink data using the SN is made configurable with application of the methods disclosed in the first embodiment to the communication service requiring low latency, the latency increases until the uplink data is actually transmitted to the SN.

A solution to the problem is disclosed below.

The SN performs transmission without grant. The transmission without grant in the SN is made configurable. In other words, the SN supports the transmission without grant. One or more cells of the SN may support the transmission without grant. The SN may support the transmission without grant in the DC with the SCG bearer.

The transmission without grant is UL transmission without the SR and the first grant, based only on the RRC configuration as the configuration of the transmission without grant. This transmission without grant may be hereinafter referred to as the first transmission without grant. Examples of the RRC configuration include allocation of time-frequency resources for the UL transmission, the UE-specific DMRS configuration, and the number of repetitions. Alternative methods of the transmission without grant include the UL transmission without grant based on both the RRC configuration and the L1 signaling as the configurations of the transmission without grant. This transmission without grant may be hereinafter referred to as the second transmission without grant. Examples of the RRC configuration include a period of resources for the UL transmission and information related to the power control. Examples of the L1 configuration include the allocation of time-frequency resources for the UL transmission and information for activating/deactivating transmission of the uplink data.

As such, enabling the SN to perform the transmission without grant can eliminate the need for the SN to receive the SR and transmit the uplink grant in response to the SR, and reduce the latency for the SN to transmit the uplink data.

The SN may support the transmission without grant in the DC with a split bearer. This can produce the same advantages.

A method for enabling the SN to perform the transmission without grant is disclosed. The RRC configures the transmission without grant. This requires the RRC signaling. However, the MN needs to notify the UE of the RRC signaling in the DC. The SN has a problem of failing to notify the UE of the RRC configuration of the SN for transmission without grant.

A solution to the problem is disclosed below.

The SN determines whether to perform the transmission without grant. The SN performs the RRC configuration for transmission without grant. The SN notifies the MN of the RRC configuration of its own node for transmission without grant. The SN may notify information for identifying its own node. The SN may associate the RRC configuration of the SN for transmission without grant with the information for identifying its own node to notify them. Examples of the information for identifying its own node include an identifier. The SN may notify the MN of information for identifying the UE that configures transmission without grant. The SN may associate the RRC configuration of the SN for transmission without grant with the information for identifying the UE to notify them. Examples of the information for identifying the UE include an identifier. The SN may notify the MN via the X2 or Xn signaling.

The MN notifies the UE of the RRC configuration of the SN which has been received from the SN. The MN may notify information for identifying the SN. By once notifying the MN of the RRC configuration made by the SN for transmission without grant, the SN can notify the UE of the RRC configuration for transmission without grant in the DC. The UE can receive the RRC configuration of the SN for transmission without grant. The UE can perform the transmission without grant to the SN, with the RRC configuration of the SN for transmission without grant.

Figure 12:
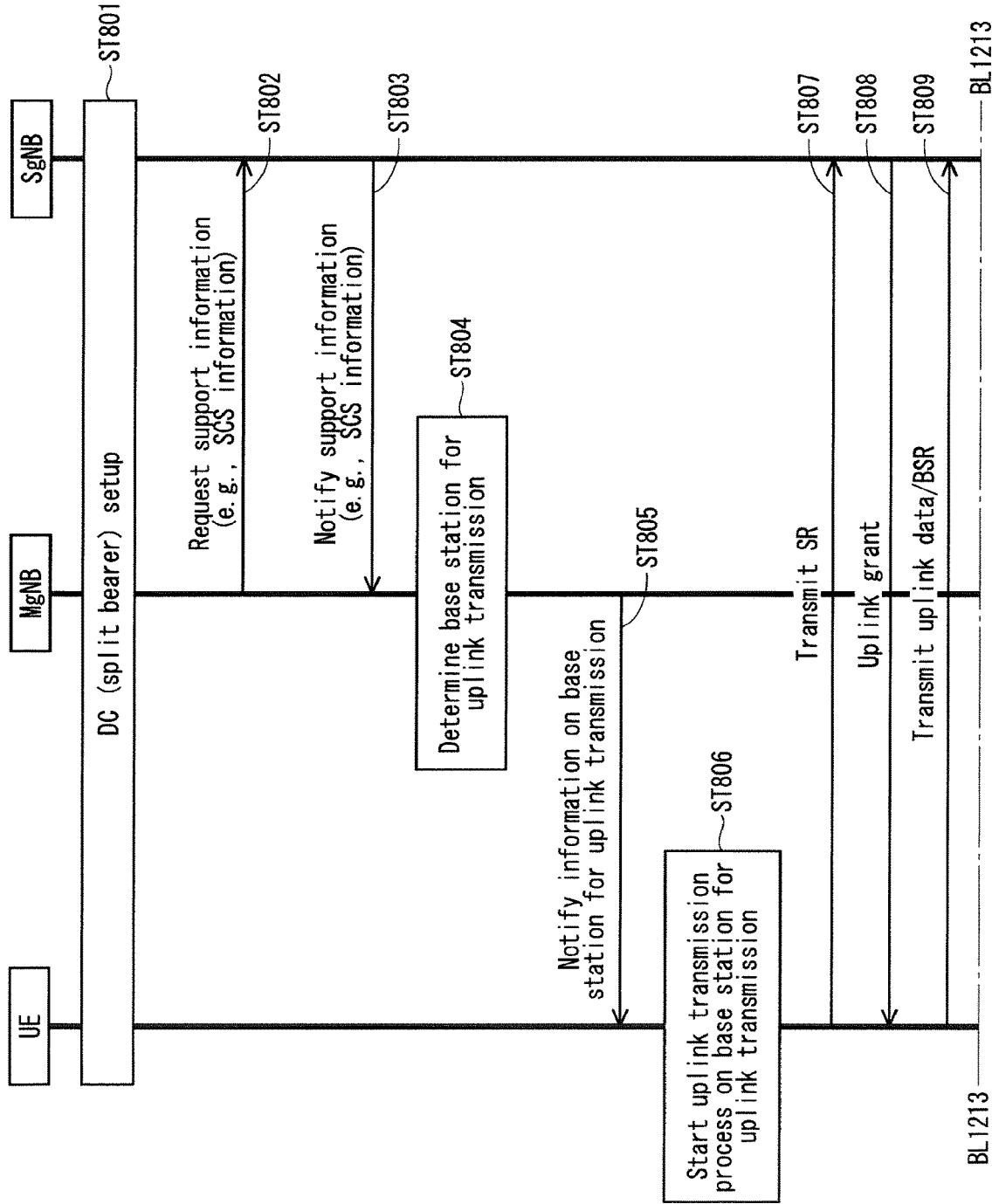
FIG. 12 illustrates an example sequence for the SN to perform transmission without grant with a split bearer according to the first modification of the first embodiment.
Figure 13:
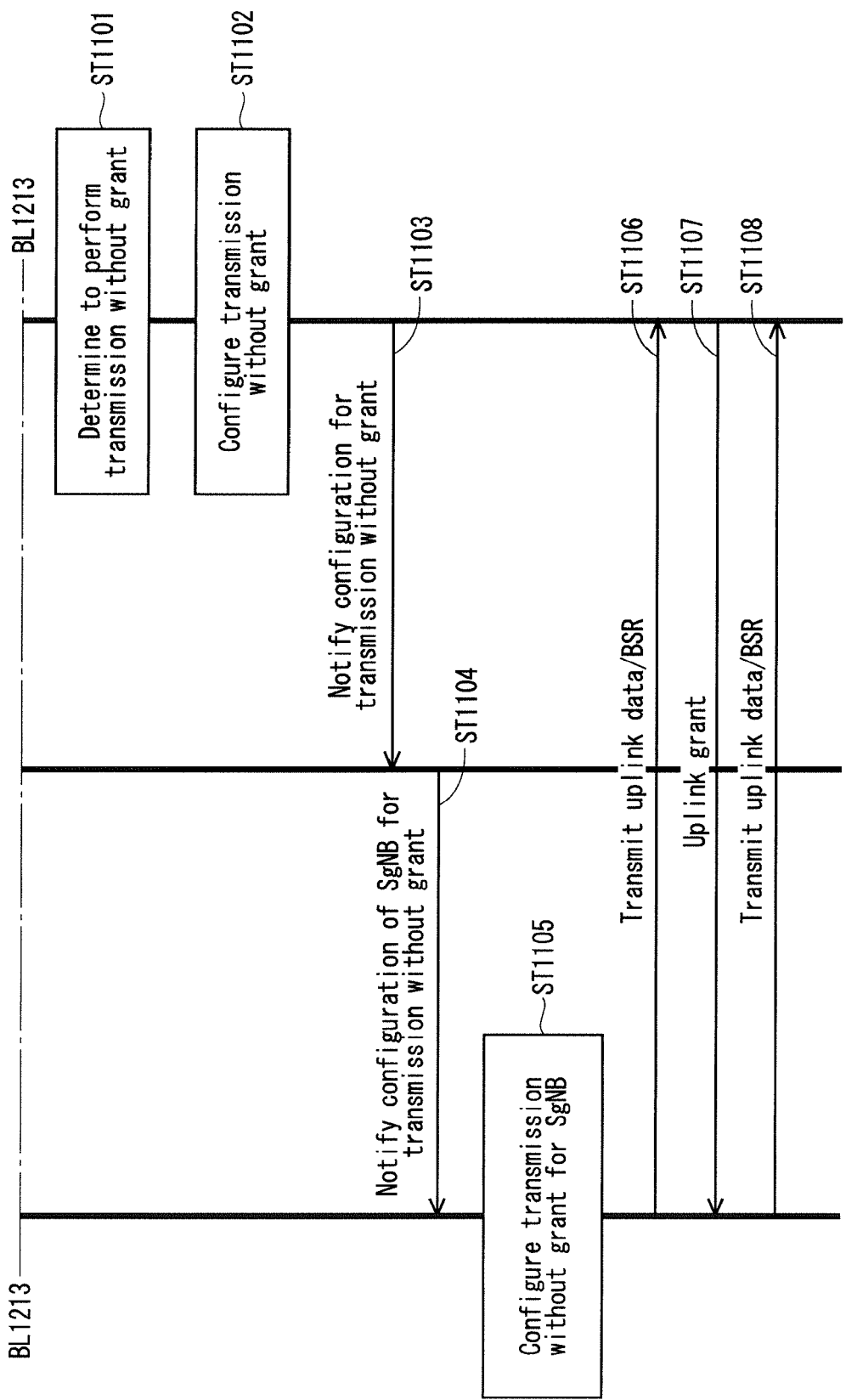
FIG. 13 illustrates the example sequence for the SN to perform the transmission without grant with a split bearer according to the first modification of the first embodiment.

FIGS. 12 and 13 illustrate an example sequence for the SN to perform transmission without grant with a split bearer. FIGS. 12 and 13 are connected across a location of a border BL1213. FIGS. 12 and 13 illustrate the first transmission without grant. Since the sequence illustrated in FIGS. 12 and 13 includes the same steps as those of the sequence illustrated in FIG. 8, the same step numbers are assigned to the same Steps and the common description thereof is omitted.

In Steps ST801 to ST809, the UE performs transmission of the uplink data with the SgNB in the DC. In Step ST1101, the SgNB determines to perform transmission without grant to the UE. The SgNB may determine to perform transmission without grant with consideration given to, for example, information on a bearer notified from the MgNB in the DC setup process or a load state or a use state of radio resources in the SgNB. For example, when requirements on throughput in the uplink data communication with the bearer of the UE are not satisfied and the SgNB has sufficient radio resources, the SgNB determines to perform transmission without grant to the UE.

The SgNB, which has determined to perform transmission without grant to the UE in Step ST1101, configures the transmission without grant for the UE in Step ST1102. In Step ST1103, the SgNB notifies the MgNB of the configuration for transmission without grant. The SgNB associates the configuration for transmission without grant with information for identifying the UE that configures the transmission without grant, for example, an identifier of the UE to notify them to the MgNB. In Step ST1104, the MgNB notifies the UE of the configuration of the SgNB for transmission without grant.

In Step ST1105, the UE configures the transmission without grant for the SgNB. When the uplink data occurs in the UE, the UE transmits, in Step ST1106, the uplink data to the SgNB with the configuration of the SgNB for transmission without grant which has been received in Step ST1104, without transmitting the SR to the SgNB. The UE may transmit the BSR as well.

Upon receipt of the BSR, the SgNB transmits the uplink grant to the UE in Step ST1107. In Step ST1108, the UE transmits the uplink data to the SgNB according to the received uplink grant. The UE may transmit the BSR as well. As such, the UE and the SgNB perform transmission of the uplink data.

This enables the UE to receive the configuration of the SgNB for transmission without grant in the DC. The UE can perform transmission without grant to the SgNB, with the configuration of the SgNB for transmission without grant. Since this eliminates transmission of the SR and the first uplink grant in response to the SR, lower latency can be pursued in the uplink communication.

The following discloses a case where a part of the configuration for transmission without grant is performed in RRC and the rest of the configuration is performed in L1, similarly as the second transmission without grant. The MN should notify the UE of the RRC configuration and the L1 configuration of the SN for transmission without grant. The MN should notify the UE of the RRC configuration of the SN via the RRC signaling, and the L1 configuration via the L1 signaling. The MN may include the L1 signaling in the DCI addressed from the MN to the UE to notify the L1 signaling.

The SN should notify the MN of the RRC configuration and the L1 configuration of the SN for transmission without grant, before the MN notifies the UE of these configurations. The SN may notify information for identifying its own node. The SN may notify the MN of information for identifying the UE that configures transmission without grant. The SN may associate the RRC configuration and the L1 configuration of the SN for transmission without grant with the information for identifying the UE to notify them. The SN may notify the MN via the X2 or Xn signaling.

Consequently, the SN can notify the UE of the RRC configuration and the L1 configuration for transmission without grant in the DC, for the second transmission without grant. The UE can receive the RRC configuration and the L1 configuration of the SN for transmission without grant. The UE can perform transmission without grant to the SN, with the RRC configuration and the L1 configuration of the SN for transmission without grant.

An alternative method on the second transmission without grant is disclosed. The SN may notify the UE of the L1 configuration of the SN for transmission without grant. The MN should notify the UE of the RRC configuration of the SN for transmission without grant via the RRC signaling, whereas the SN should notify the UE of the L1 configuration of the SN for transmission without grant via the L1 signaling. The SN may include the L1 signaling in the DCI addressed from the SN to the UE to notify the L1 signaling.

The SN should notify the MN of the RRC configuration of the SN for transmission without grant before the MN notifies the UE of the RRC configuration. The SN should notify the MN via the X2 or Xn signaling.

This eliminates the need for notifying the L1 configuration of the SN for transmission without grant through the MN. Thus, the latency required for the Xn or X2 signaling from the SN to the MN and the processing latency when the load of the MN is high can be reduced. The L1 configuration from the SN to the UE can be performed with low latency. For example, the SN can timely cause the UE to activate/deactivate the transmission without grant with low latency.

Figure 14:
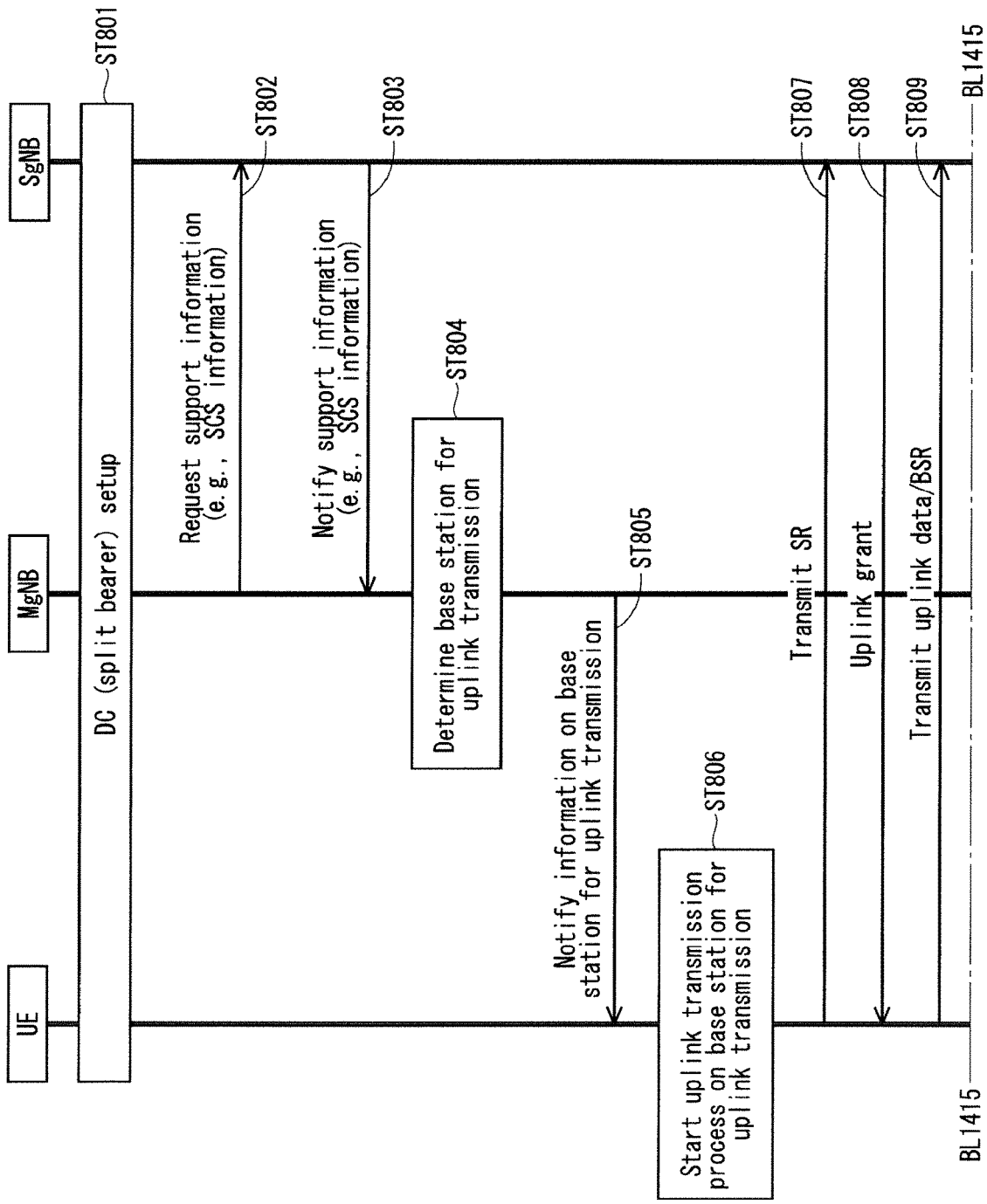
FIG. 14 illustrates another example sequence for the SN to perform the transmission without grant with a split bearer according to the first modification of the first embodiment.
Figure 15:
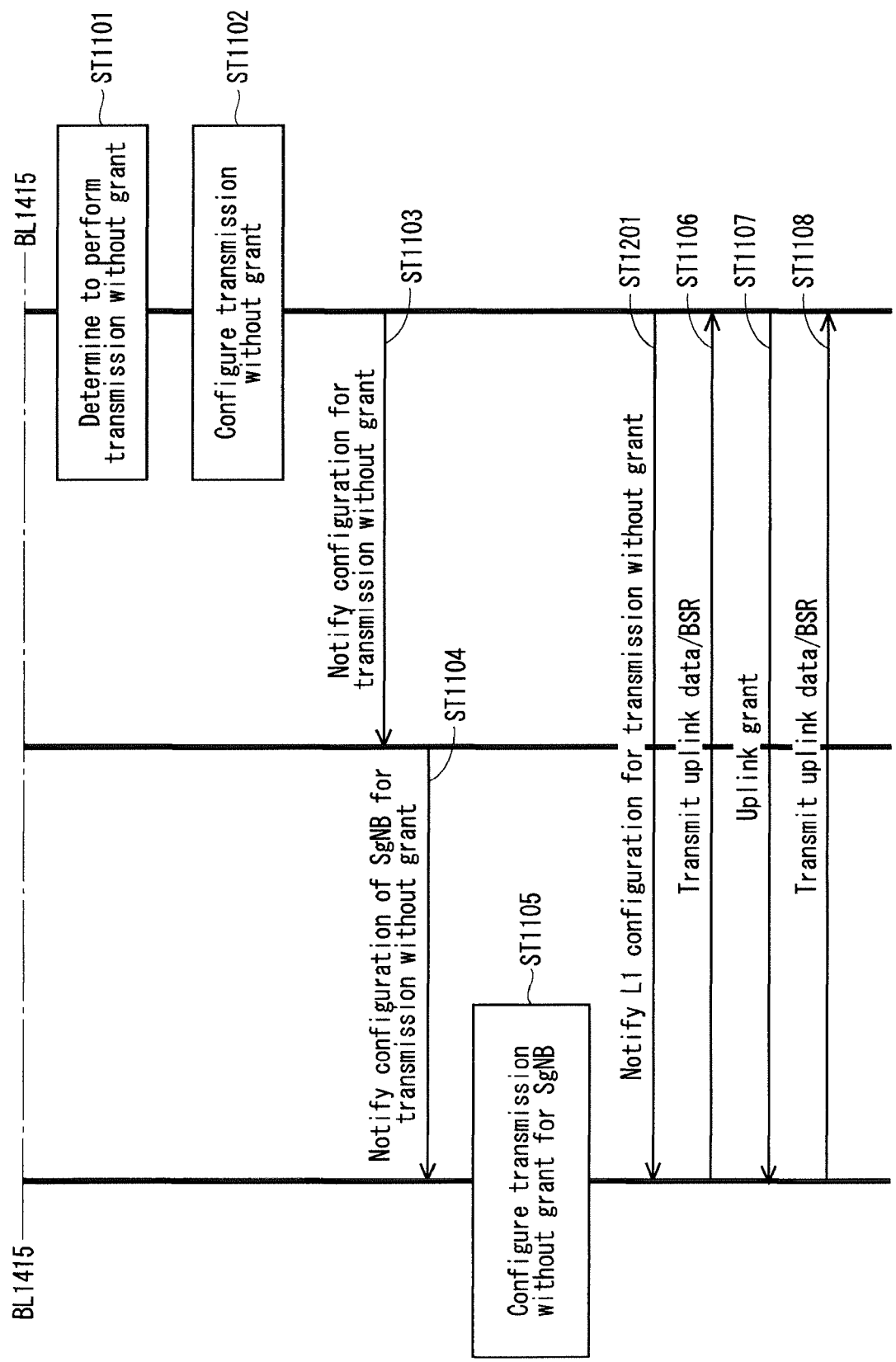
FIG. 15 illustrates another example sequence for the SN to perform the transmission without grant with a split bearer according to the first modification of the first embodiment.

FIGS. 14 and 15 illustrate an example sequence for the SN to perform transmission without grant with a split bearer. FIGS. 14 and 15 are connected across a location of a border BL1415. FIGS. 14 and 15 illustrate the second transmission without grant. Since the sequence illustrated in FIGS. 14 and 15 includes the same steps as those of the sequence illustrated in FIGS. 12 and 13, the same step numbers are assigned to the same Steps and the common description thereof is omitted.

The UE, which has configured the transmission without grant for the SgNB in Step ST1105, receives the L1 signaling from the SgNB. In Step ST1201, the SgNB notifies the UE of the L1 configuration for transmission without grant via the L1 signaling. A physical dedicated control channel obtained by including the L1 configuration in the DCI may be used as the L1 signaling. When the uplink data occurs in the UE, the UE transmits, without transmitting the SR to the SgNB, the uplink data to the SgNB in Step ST1106 with the configuration of the SgNB for transmission without grant which has been received in Step ST1104 and the configuration of the SgNB for transmission without grant which has been received in Step ST1201. The UE may transmit the BSR as well.

Upon receipt of the BSR, the SgNB transmits the uplink grant to the UE in Step ST1107. In Step ST1108, the UE transmits the uplink data to the SgNB according to the received uplink grant. The UE may transmit the BSR as well. As such, the UE and the SgNB perform transmission of the uplink data.

This enables the UE to receive both of the RRC configuration and the L1 configuration of the SgNB for transmission without grant in the DC. The UE can perform the transmission without grant to the SgNB with these configurations of the SgNB for transmission without grant. Since this eliminates transmission of the SR and the first uplink grant in response to the SR, lower latency can be pursued in the uplink communication.

In the aforementioned method, the RRC configuration of the SN for transmission without grant is notified to the UE through the MN. Another method is disclosed. The SN may notify the UE of the RRC configuration of the SN for transmission without grant. This can reduce the latency required for the Xn or X2 signaling from the SN to the MN and the processing latency when the load of the MN is high. The UE can perform transmission without grant to the SN earlier.

The SN may notify both the UE and the MN of the RRC configuration of the SN for transmission without grant. This enables the MN to recognize the RRC configuration of the SN for transmission without grant.

The SN may notify the UE of a part or the entirety of the RRC configuration of the SN for transmission without grant. For example, the SN notifies the UE through the MN of a parameter requiring an adjustment between the MN and the SN, and notifies the UE of a parameter that does not require any adjustment between the MN and the SN.

For example, the SN may notify the MN of the power configuration information for transmitting the uplink data in the transmission without grant, and then the MN may notify the UE of such information. For example, since the MN can recognize, with the split bearer, the uplink data transmission power configuration information of the SN, the MN can adjust the transmission power for the MN and the transmission power for the SN. For example, the MN can configure the transmission power for the MN, according to the power that can be transmitted by the UE.

The MN may make an adjustment with the SN. The MN may notify the SN of a request for changing the RRC configuration received from the SN. The MN may include, in the notification, the RRC configuration required by the MN. The SN changes the configuration and notifies the MN of the result. For example, the MN notifies the SN of a desired transmission power configuration to reserve the power necessary for transmission from the UE to the MN. The SN configures the uplink transmission power for transmission without grant, according to the desired transmission power, and notifies the MN of the configuration.

The MN notifies the UE of the RRC configuration resulting from the adjustment with the SN. This enables the MN to make the adjustment between the MN and the SN.

A method for changing the configuration is disclosed. The SN notifies the MN of the changed RRC configuration of the SN for transmission without grant. The SN may notify the RRC configuration and the L1 configuration. The SN may notify information for identifying its own node. The SN may notify information on the UE that changes the configuration for transmission without grant. The SN may associate the changed configuration with the information on the UE that changes the configuration for transmission without grant to notify them. The MN notifies the UE of the changed RRC configuration of the SN for transmission without grant. The MN notifies the RRC configuration and the L1 configuration. The RRC configuration and the L1 configuration may be changed with the same timing or different timings. This makes the configurations flexible. The SN may notify the MN of only the changed configuration or the changed configuration parameter.

The UE changes only the notified configuration or the notified configuration parameter. This can reduce the amount of signaling or the amount of information necessary for the notification. The UE can perform transmission without grant to the SN, with the changed RRC configuration and/or the changed L1 configuration of the SN for transmission without grant which has been newly notified.

The SN may notify the UE of the changed L1 configuration of the SN for transmission without grant. The SN may notify the RRC configuration and the L1 configuration. The RRC configuration and the L1 configuration may be changed with the same timing or different timings. This makes the configurations flexible. The SN may notify the UE of only the changed configuration or the changed configuration parameter. The UE changes only the notified configuration or the notified configuration parameter. This can reduce the amount of signaling or the amount of information necessary for the notification.

The UE can perform transmission without grant to the SN, with the changed RRC configuration and/or the changed L1 configuration of the SN for transmission without grant which has been newly notified.

A method for canceling the configuration is disclosed. The SN notifies the MN to cancel the configuration of the SN for transmission without grant. The SN may notify information for identifying its own node. The SN may notify information on the UE that cancels the configuration for transmission without grant. The SN may associate cancelation of the configuration of the SN for transmission without grant with the information on the UE that cancels the configuration for transmission without grant to notify them. The MN notifies the UE to cancel the configuration of the SN for transmission without grant. Upon receipt of the notification for cancelation, the UE cancels the configuration of the SN for transmission without grant. The SN may notify the UE to cancel the configuration of the SN for transmission without grant. Upon receipt of the notification for cancelation, the UE cancels the configuration of the SN for transmission without grant.

The MN may request the SN to configure the transmission without grant in the SN. Furthermore, the MN may notify the SN of configuration information for transmission without grant which the MN requests from the SN. The MN may notify information for identifying its own node. The MN may notify the SN of information for identifying the UE that configures transmission without grant. The MN may associate the request for configuring the transmission without grant with the information for identifying the UE that configures transmission without grant to notify them. The MN may notify the request via the Xn signaling or the X2 signaling.

The configuration information for transmission without grant may be an RRC configuration parameter, an L1 configuration parameter, or a combination of the RRC configuration parameter and the L1 configuration parameter. The configuration information for transmission without grant may be a part or the entirety of the configuration parameter for transmission without grant. The configuration information for transmission without grant may be information indicating either the first transmission without grant or the second transmission without grant. The configuration information for transmission without grant which the MN requests from the SN may be the configuration for transmission without grant which the MN has made at its own node.

This can flexibly configure the details which the MN requests from the SN. The MN can request a more appropriate configuration according to, for example, a load state of the MN or a radio propagation environment between the MN and the UE.

The SN determines the configuration for transmission without grant for the target UE at its own node, in response to a configuring request for transmission without grant which has been notified from the MN. The SN may configure the transmission without grant. Alternatively, the SN may use the configuration information for transmission without grant which has been notified from the MN. Application of the configuration information for transmission without grant which is requested by the MN can derive the configuration with consideration given to, for example, a load state of the MN or a radio propagation environment between the MN and the UE.

The SN should configure the configuration information for transmission without grant which is not notified from the MN. This enables the configuration necessary for transmission without grant. Thus, the SN can perform the transmission without grant to the UE.

The UE may notify the SN of information indicating the QoS required by a communication service. The UE may notify information indicating the QoS required by an uplink communication service. The UE may notify information for identifying its own UE. The UE may notify the MN of the information, and then the MN may notify the SN of the information.

As an alternative method, the SN may derive, using information indicating the QoS required by a downlink communication service, the information indicating the QoS required by the uplink communication service. For example, assume information indicating a QoS required by a downlink communication service as information indicating a QoS required by an uplink communication service corresponding to the downlink communication service. Consequently, the signaling for notifying information indicating the QoS from the UE to the SN can be reduced.

The SN can determine, with the information, whether to configure transmission without grant at its own node. For example, the SN determines whether to configure the transmission without grant for the UE, with a desired latency required by the uplink communication service of the UE and a load state of its own node, for example, the amount of unused resources.

For example, when the amount of unused resources is greater than a predetermined value, the SN configures transmission without grant for the UE. When the amount of unused resources is less than the predetermined value and the desired latency is less than a predetermined time, the SN configures transmission without grant for the UE. When the amount of unused resources is less than the predetermined value and the desired latency is greater than the predetermined time, the SN does not configure transmission without grant for the UE. As such, the SN can determine whether to configure transmission without grant, using information on the QoS required by a communication service of the UE.

Upon receipt of the request for configuring the transmission without grant from the MN, the SN may notify the MN of whether to have configured the transmission without grant for the target UE. The SN may notify acknowledgement (Ack) or rejection (reject) as a response to the request for configuring the transmission without grant. The SN may notify information for identifying its own node. The SN may notify information for identifying the target UE. The SN may associate the response to the request for configuring the transmission without grant with the information for identifying the UE to notify them.

When the SN configures transmission without grant for the UE, the SN notifies the MN of Ack. The MN can recognize that the SN has configured the transmission without grant for the target UE. The aforementioned method may be applied to a method for the SN to notify the MN or the UE of a configuration for transmission without grant. The UE can perform transmission without grant to the SN, with the configuration of the SN for transmission without grant. When the SN notifies the MN of the configuration of the SN for transmission without grant, the notification may mean Ack. This can reduce the signaling.

When the SN notifies the MN of the rejection, the notification may include cause information. Examples of the cause information include impossibility of transmission without grant, no permission of the transmission without grant, an overload, and a shortage of the resources. This enables the MN to recognize the cause why the SN cannot configure the transmission without grant for the target UE. For example, the MN can switch the DC configuration to another SN. For another example, the MN can perform a process of switching, into another SN, the UE with higher desired latency among the UEs in which the DC using the SN has been configured.

When the SN notifies the MN of the rejection, the notification may include a waiting time (a waiting timer). This enables the MN to perform a process of requesting again the SN to configure the transmission without grant after a lapse of the waiting time. Consequently, the flexible process can be performed as a system.

Figure 16:
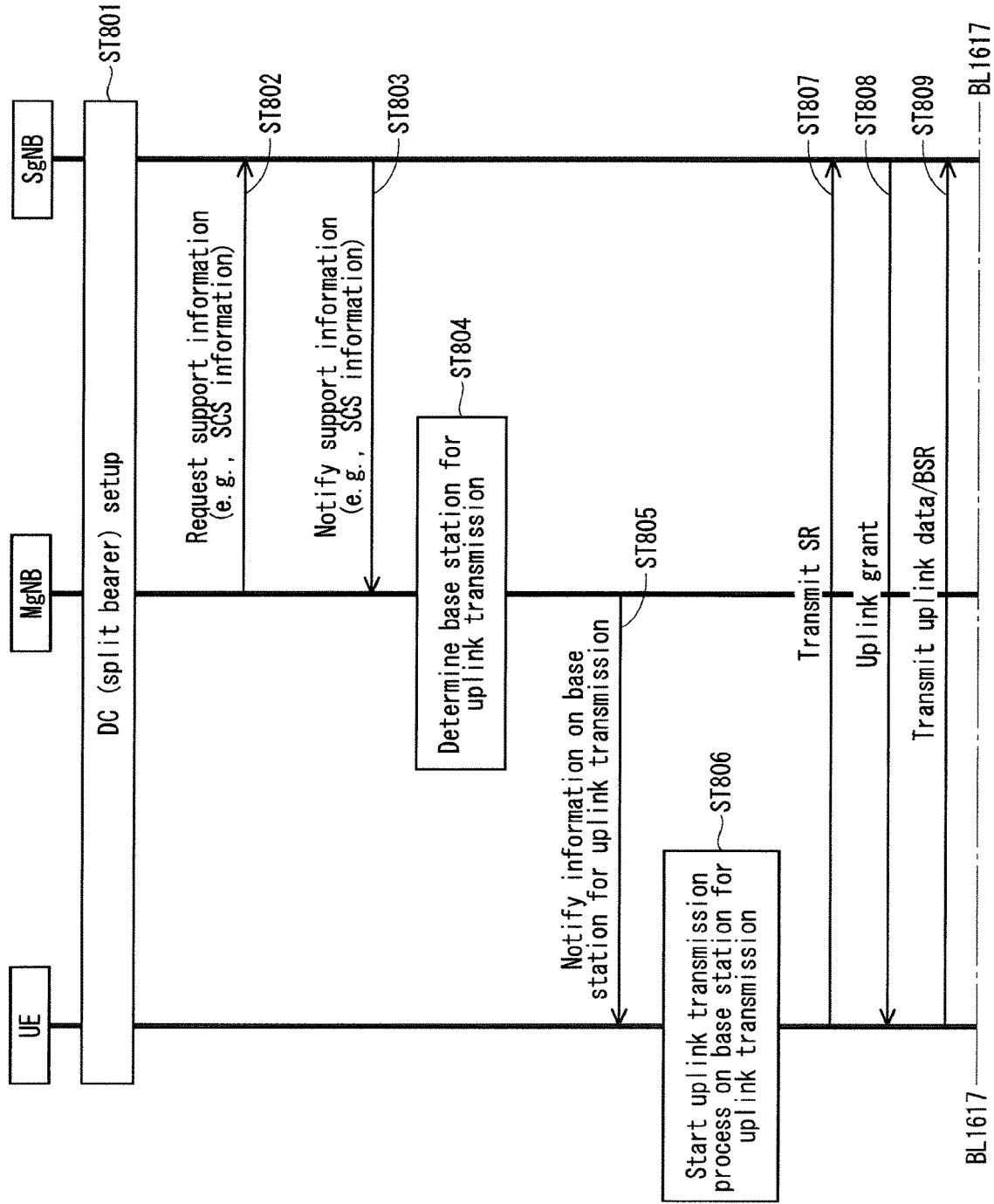
FIG. 16 illustrates another example sequence for the SN to perform the transmission without grant with a split bearer according to the first modification of the first embodiment.
Figure 17:
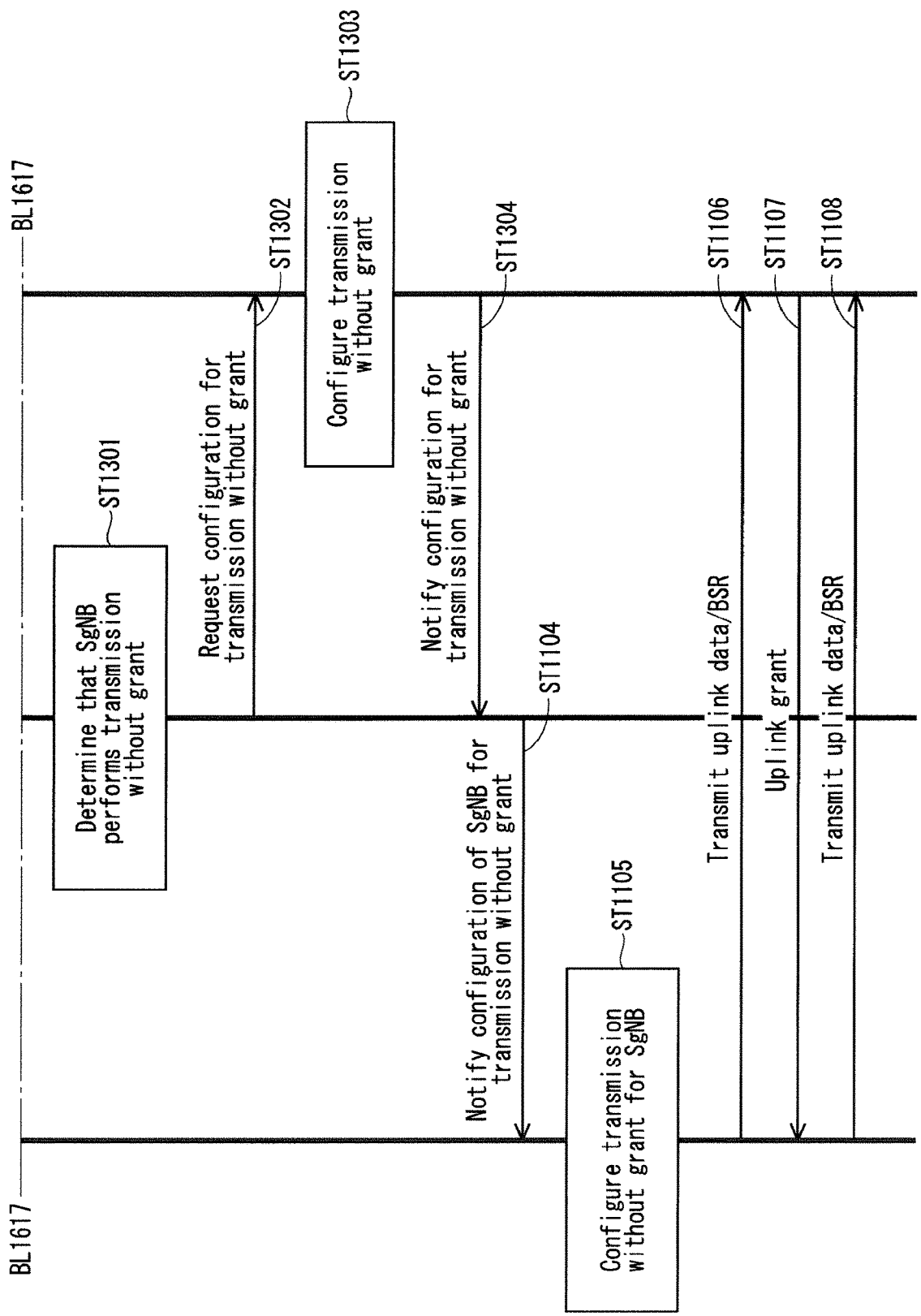
FIG. 17 illustrates another example sequence for the SN to perform the transmission without grant with a split bearer according to the first modification of the first embodiment.

FIGS. 16 and 17 illustrate an example sequence for the SN to perform transmission without grant with a split bearer. FIGS. 16 and 17 are connected across a location of a border BL1617. FIGS. 16 and 17 illustrate a case where the MN requests the SN to configure the transmission without grant. Since the sequence illustrated in FIGS. 16 and 17 includes the same steps as those of the sequence illustrated in FIGS. 12 and 13, the same step numbers are assigned to the same Steps and the common description thereof is omitted.

In Steps ST801 to ST809, the UE performs transmission of the uplink data with the SgNB in the DC. In Step ST1301, the MgNB determines that the SgNB performs transmission without grant to the UE. The MgNB determines to request the SgNB to configure the transmission without grant, based on, for example, QoS information for uplink communication of the UE, a load state of the SgNB, or a use state of radio resources in the SgNB.

For example, the MgNB determines to request the SgNB to configure the transmission without grant, based on the QoS information for uplink communication of the UE and the load state of the SgNB. The MgNB should appropriately obtain, from the UE and the SgNB, the QoS information for uplink communication of the UE and the load state of the SgNB. The MgNB may obtain the QoS information for uplink communication of the UE, for example, in the method disclosed in FIG. 8. The MgNB should obtain the load state of the SgNB from the SgNB. For example, the MgNB requests the load state from the SgNB, and the SgNB notifies the MgNB of the load state of its own node. The MgNB can obtain the load state of the SgNB by appropriately performing this process.

For example, in the case where the desired latency in the uplink communication of the UE is less than a predetermined value, while the load state of the SgNB is higher than a predetermined value, the MgNB does not request the configuration for transmission without grant. However, when the load state of the SgNB is lower than the predetermined value, the MgNB requests the configuration for transmission without grant. As such, the MgNB should determine to request the SgNB to configure the transmission without grant in the SgNB.

The MgNB, which has determined that the SgNB performs transmission without grant to the UE in Step ST1301, requests the SgNB to configure the transmission without grant in Step ST1302. The MgNB may notify information for identifying the target UE and information indicating the request for configuring the transmission without grant. In Step ST1303, the SgNB configures the transmission without grant for the UE. In Step ST1304, the SgNB notifies the MgNB of a response to the request for configuring the transmission without grant. The SgNB may notify the information for identifying the target UE and the response to the request for configuring the transmission without grant. FIGS. 16 and 17 illustrate the case with acknowledgement (Ack).

The SgNB includes the configuration information of the SgNB for transmission without grant in a response message notified in Step ST1304 (a response message to the request for configuring the transmission without grant). Consequently, the MgNB can obtain the configuration of the SgNB for transmission without grant to the UE. In Step ST1104, the MgNB notifies the UE of the configuration information of the SgNB for transmission without grant. In Steps ST1105 to ST1108, the UE configures the transmission without grant for the SgNB. When the uplink data occurs in the UE, the transmission without grant is performed between the UE and the SgNB.

Consequently, the lower latency can be pursued in the DC. The MgNB can request the SgNB to configure the transmission without grant. The MgNB to be a C-Plane node for the UE can control the configuration for transmission without grant. This can avoid complexity in the control.

The transmission without grant may be configured for the MN and the SN. The transmission without grant may be differently configured between the MN and the SN.

Figure 18:
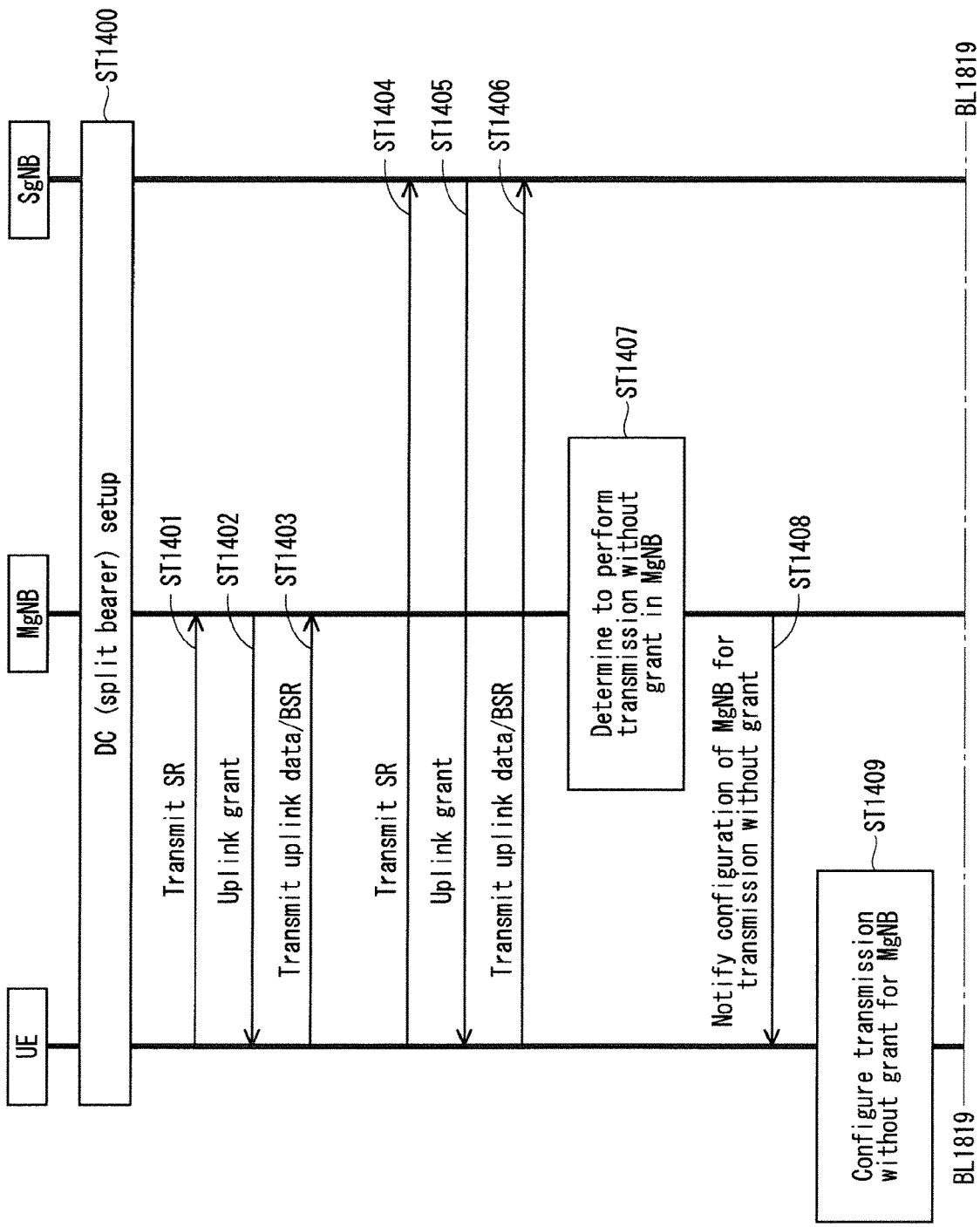
FIG. 18 illustrates an example sequence for the MN and the SN to perform the transmission without grant with a split bearer according to the first modification of the first embodiment.
Figure 19:
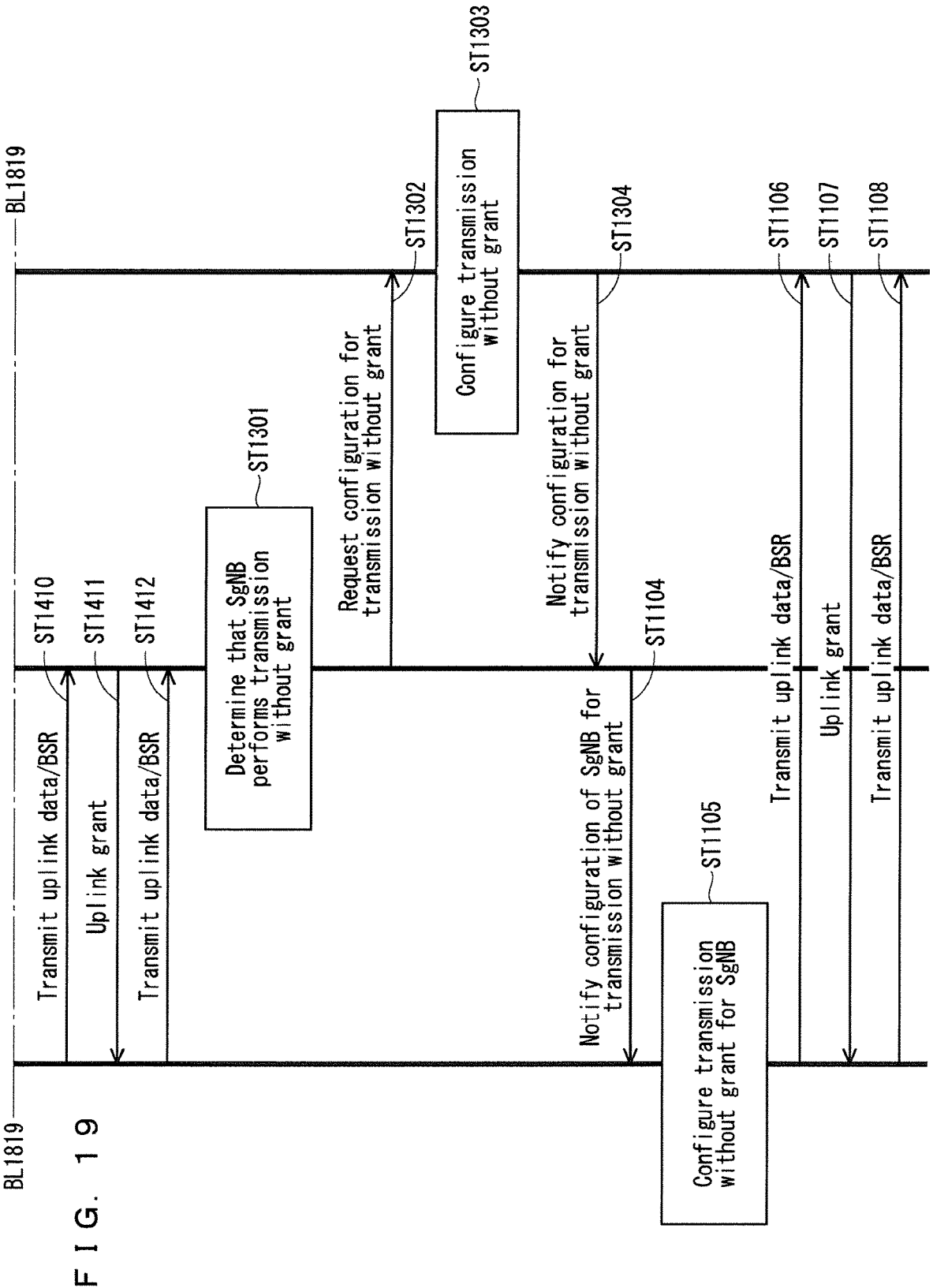
FIG. 19 illustrates the example sequence for the MN and the SN to perform the transmission without grant with a split bearer according to the first modification of the first embodiment.

FIGS. 18 and 19 illustrate an example sequence for the MN and the SN to perform transmission without grant with a split bearer. FIGS. 18 and 19 are connected across a location of a border BL1819. Since the sequence illustrated in FIGS. 18 and 19 includes the same steps as those of the sequence illustrated in FIGS. 16 and 17, the same step numbers are assigned to the same Steps and the common description thereof is omitted.

In Step ST1400, the UE, the MgNB, and the SgNB perform the DC setup process. In FIGS. 18 and 19, the UE performs uplink communication with both of the MgNB, and the SgNB. In Steps ST1401 to ST1403, the UE performs uplink communication with the MgNB. In Steps ST1404 to ST1406, the UE performs uplink communication with the SgNB.

In Step ST1407, the MgNB determines to perform transmission without grant to the UE at its own node. For example, the SgNB should be replaced with the MgNB in the determination method disclosed in FIGS. 16 and 17 to be applied as the determination method. The MgNB determines to request a configuration for transmission without grant based on, for example, the QoS information for uplink communication of the UE, a load state of the MgNB, or a use state of radio resources in the MgNB. In Step ST1408, the MgNB notifies the UE of the configuration for transmission without grant at its own node. In Step ST1409, the UE configures the transmission without grant for the MgNB. In Steps ST1410 to ST1412, the UE and the MgNB perform the transmission without grant.

In Step ST1301, the MgNB determines to request the SgNB to perform transmission without grant to the UE. For example, the determination method disclosed in FIGS. 16 and 17 should be applied to this determination method. The MgNB, which has determined that the SgNB performs transmission without grant to the UE in Step ST1301, requests the SgNB to configure the transmission without grant in Step ST1302. When the uplink data occurs in the UE, the UE and the SgNB perform the transmission without grant in Steps ST1106 to ST1108.

The determination of the MgNB to configure the transmission without grant may be reversed in order from the determination of the SgNB to configure the transmission without grant. A series of processes from determining to configure each transmission without grant may be performed in a reverse order. The MgNB and the SgNB may simultaneously determine to configure transmission without grant. The MgNB and the SgNB may perform, in parallel, a series of processes from determining to configure the respective transmissions without grant.

Consequently, both of the MgNB and the SgNB can perform transmission without grant in the DC. The use of both of the nodes can increase throughput. Since the use of transmission without grant at both of the nodes can pursue lower latency, the throughput can be further increased.

Although disclosed is that the MN requests the SN to configure the transmission without grant in the SN, the MN may instruct the SN to configure the transmission without grant in the SN as an alternative method. Similarly as the method for requesting the configuration, the MN may notify the SN of the configuration information for transmission without grant which the MN requests from the SN. The MN may notify information for identifying its own node. The MN may notify the SN of information for identifying the UE that configures transmission without grant. The MN may associate the instruction for configuring the transmission without grant with the information for identifying the UE to notify them. The MN may notify the instruction via the Xn signaling or the X2 signaling.

The SN may notify the MN of, for example, load information of the SN or a use state of uplink resources. The SN may notify information for identifying its own node. For example, the MN determines, using these pieces of information, whether to configure the transmission without grant in the SN for a communication service of the target UE, and instructs the SN to configure the transmission without grant when determining to configure the transmission without grant. When the UE notifies the MN of the QoS of the communication service of the UE, the MN may determine, additionally using the QoS information, whether to configure the transmission without grant in the SN.

Upon receipt of the instruction for configuring the transmission without grant from the MN, the SN configures the transmission without grant for the target UE. When the MN has notified the SN of the configuration information for transmission without grant, the SN may use the configuration received from the MN as the configuration for transmission without grant. Consequently, the MN can control whether the SN configures the transmission without grant for the UE in which the DC is configured.

A method for requesting change in the configuration is disclosed. The MN notifies the SN of a request for changing the configuration of the SN for transmission without grant. For example, when the uplink communication of the UE does not satisfy the desired QoS, the MgNB determines to request the SgNB to configure transmission without grant for a shorter period. The MN may notify the SN of information on the UE that requests change in the configuration for transmission without grant. The MN may associate the request for changing the configuration with the information on the UE to notify them. The SN may change the configuration for transmission without grant for the target UE, with consideration given to the request for changing the configuration. The SN notifies the MN of the changed configuration for transmission without grant. The MN notifies the UE of the changed configuration of the SN for transmission without grant.

The UE changes only the notified configuration or the notified configuration parameter. This can reduce the amount of signaling or the amount of information necessary for the notification. The UE can perform transmission without grant to the SN, using the changed configuration of the SN for transmission without grant which has been newly notified. The SN may notify the UE of the changed configuration for transmission without grant. The UE can perform transmission without grant to the SN, using the changed configuration of the SN for transmission without grant which has been newly notified.

A method for requesting cancelation of the configuration is disclosed. The MN notifies the SN to cancel the configuration for transmission without grant. For example, when the uplink communication of the UE satisfies the desired QoS, the MgNB determines to request the SgNB to cancel the configuration for transmission without grant. The MN may notify information on the UE that requests cancelation of the configuration for transmission without grant. The MN may associate the cancelation of the configuration for transmission without grant with the information on the UE that requests cancelation of the configuration for transmission without grant to notify them. The SN may cancel the configuration for transmission without grant for the target UE, with consideration given to the request for canceling the configuration. The SN notifies the MN to cancel the configuration for transmission without grant. The MN notifies the UE to cancel the configuration of the SN for transmission without grant. The SN may notify the UE to cancel the configuration of the SN for transmission without grant. Upon receipt of the notification for cancelation, the UE cancels the configuration of the SN for transmission without grant.

The UE may request the MN to configure the transmission without grant for the MN and/or the SN. The UE may request the SN to configure the transmission without grant for the SN and/or the MN. The UE may provide information indicating a request for configuring the transmission without grant to notify the information. The UE may include an identifier of its own UE in the request for configuring the transmission without grant. The UE may include an identifier of a node that requests configuring the transmission without grant, in the request for configuring the transmission without grant to notify the identifier. The UE may associate an identifier of a node with the request for configuring the transmission without grant to notify them. The UE should make the request via the RRC signaling. Alternatively, the UE may make the request via the MAC signaling. The UE can notify the request at a low error rate early. Alternatively, the UE may make the request via the L1/L2 signaling. The UE can notify the request earlier.

When a node that has received a request for configuring the transmission without grant from the UE is different from a node that configures the transmission without grant, its own node requests the node that configures the transmission without grant to configure the transmission without grant. The notification between the nodes should be given via the X2 or Xn signaling.

For example, when the UE performs uplink communication with the SN, the UE determines whether the QoS (e.g., a desired latency) required by the communication is satisfied. For example, the UE should measure the QoS (e.g., a latency) of the communication. When the required QoS is not satisfied, the UE requests the configuration of the transmission without grant. Consequently, the UE can request a corresponding node to configure the transmission without grant, according to a communication state in the UE. This enables the UE to flexibly accommodate a changing communication state and satisfy the required QoS.

Figure 20:
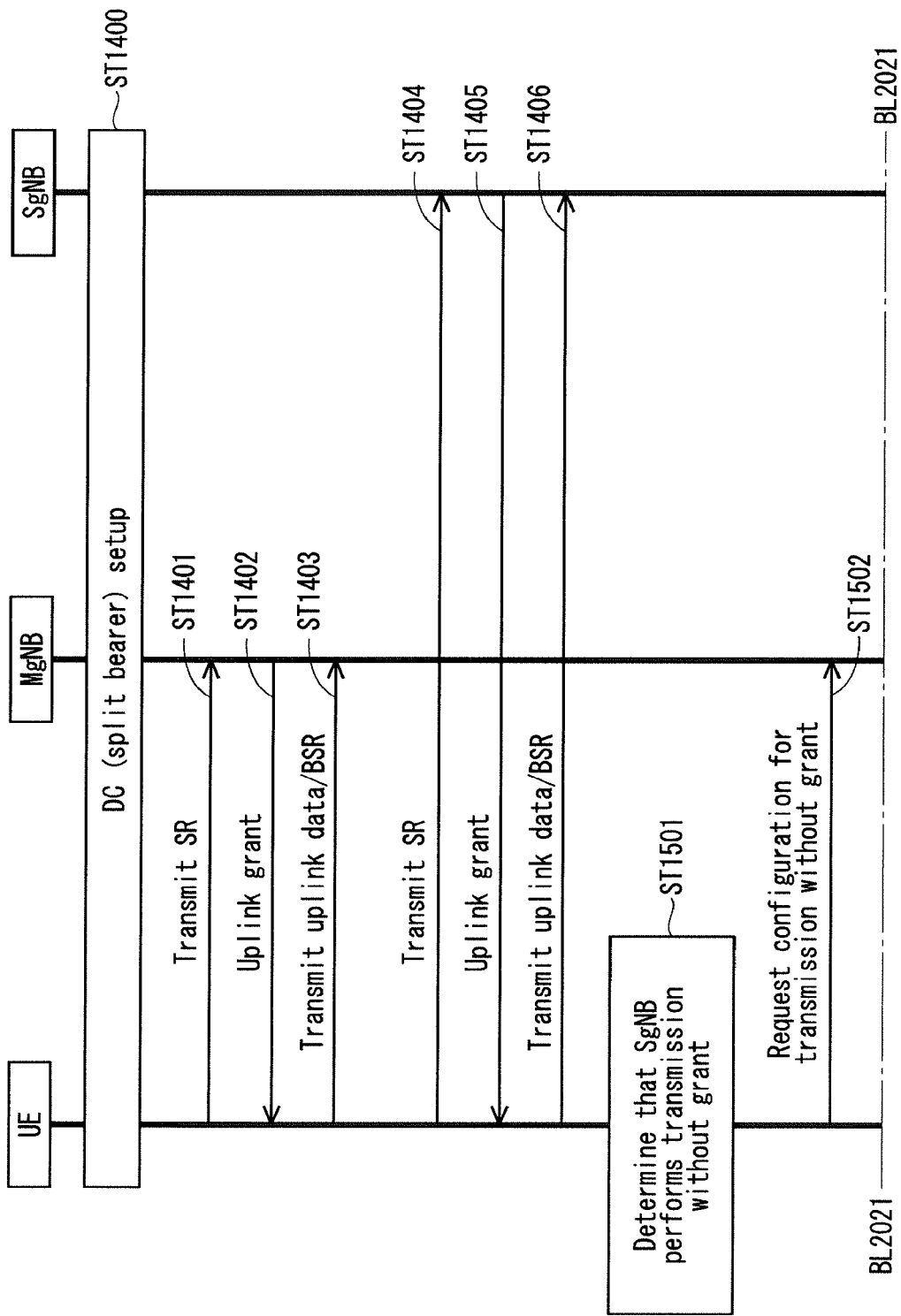
FIG. 20 illustrates another example sequence for the SN to perform the transmission without grant with a split bearer according to the first modification of the first embodiment.
Figure 21:
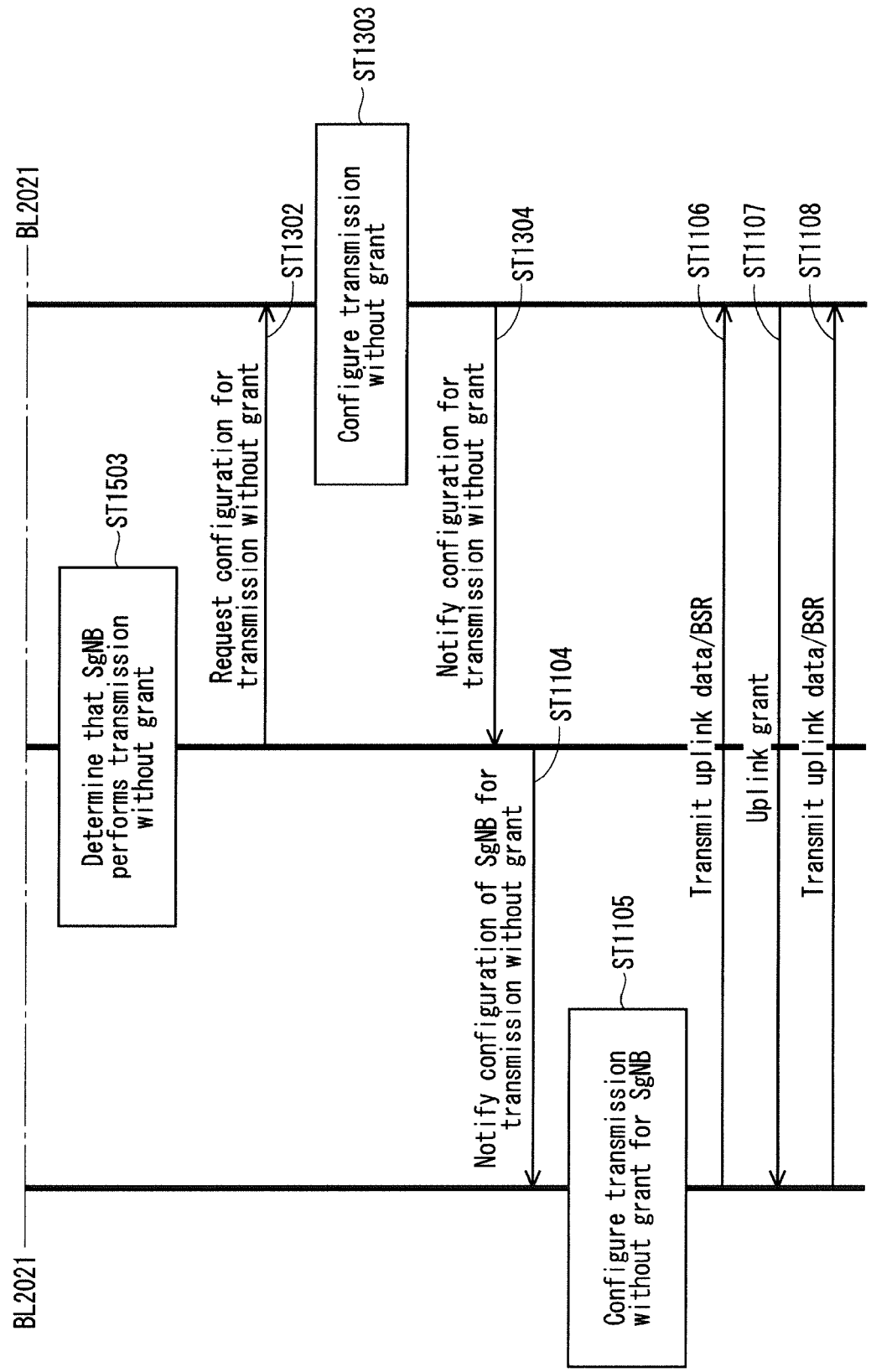
FIG. 21 illustrates another example sequence for the SN to perform the transmission without grant with a split bearer according to the first modification of the first embodiment.

FIGS. 20 and 21 illustrate an example sequence for the SN to perform transmission without grant with a split bearer. FIGS. 20 and 21 are connected across a location of a border BL2021. FIGS. 20 and 21 illustrate a case where the UE requests the MN to configure the transmission without grant. Since the sequence illustrated in FIGS. 20 and 21 includes the same steps as those of the sequence illustrated in FIGS. 18 and 19, the same step numbers are assigned to the same Steps and the common description thereof is omitted.

In Step ST1501, the UE determines to request the SgNB to configure the transmission without grant. The UE determines the request using, for example, the QoS information for uplink communication of the UE and a QoS value in the actual communication. The UE may determine the request using support information of the MgNB and the SgNB, for example, the SCS information to be supported.

When the QoS value in the actual communication is used, the UE should measure the QoS value in the actual communication. The UE should measure, for example, the latency of the uplink packet data, a packet loss, or a bit rate in the actual communication. The UE compares the QoS value actually measured with the desired QoS information, and determines to request the SgNB to configure the transmission without grant when the QoS value actually measured is less than the desired QoS information. The UE may determine which node is requested to configure the transmission without grant, using the support information of the MgNB and the SgNB. The method disclosed in the first embodiment, that is, the method for the MgNB to notify the UE of information for determining the uplink transmission node should be applied to a method for the UE to obtain the support information of the MgNB and the SgNB.

FIGS. 20 and 21 illustrate determining to request the SgNB to configure the transmission without grant. In Step ST1502, the UE notifies the MgNB of a request for configuring the transmission without grant in the SgNB. The UE should notify the MgNB of information for identifying its own UE and information for identifying the SgNB. The MgNB can recognize which SgNB is requested to configure the transmission without grant for which UE.

Upon receipt of the request for configuring the transmission without grant in the SgNB in Step ST1502, the MgNB determines to request the SgNB to configure the transmission without grant in Step ST1503. In Step ST1302, the MgNB notifies the SgNB of a request for configuring the transmission without grant. The MgNB, which has determined that the SgNB performs transmission without grant to the UE in Step ST1503, requests the SgNB to configure the transmission without grant in Step ST1302. When the uplink data occurs in the UE, the UE and the SgNB perform the transmission without grant in Steps ST1106 to ST1108.

Consequently, the lower latency can be pursued in the DC. A state in the UE, for example, the QoS value actually measured can be used for determining the request for configuring the transmission without grant. This timely makes the transmission without grant configurable according to a state in the UE, and makes a transmission method configurable according to the state in the UE.

The CN may request the MN to configure the transmission without grant for the MN and/or the SN. The CN may request the SN to configure the transmission without grant for the SN and/or the MN. The CN may provide information indicating a request for configuring the transmission without grant to notify the information. The CN may notify information for identifying the SN and/or the MN. The CN may include an identifier of the UE that configures the transmission without grant, in the request for configuring the transmission without grant. The CN may also include, in the request, an identifier of a node that requests configuring the transmission without grant to notify the identifier. The CN may associate an identifier of a node with a request for configuring the transmission without grant to notify them. The CN may include, in the request, information on a PDU session and/or information on a QoS flow for configuring the transmission without grant to notify such information. The CN should make the request via the S1 or NG-C signaling.

When a node that has received a request for configuring the transmission without grant from the CN is different from a node that configures the transmission without grant, its own node requests the node that configures the transmission without grant to configure the transmission without grant. The notification between the nodes should be given via the X2 or Xn signaling.

For example, when the UE performs uplink communication with the SN, the CN determines whether the QoS (e.g., a desired latency) required by the communication is satisfied. For example, the CN should measure the QoS (e.g., a latency) of the communication. When the required QoS is not satisfied, the CN requests the configuration of the transmission without grant. Consequently, the CN can request a corresponding node to configure the transmission without grant, according to a communication state in the UE. This enables the CN to flexibly accommodate a changing communication state and satisfy the required QoS.

Figure 22:
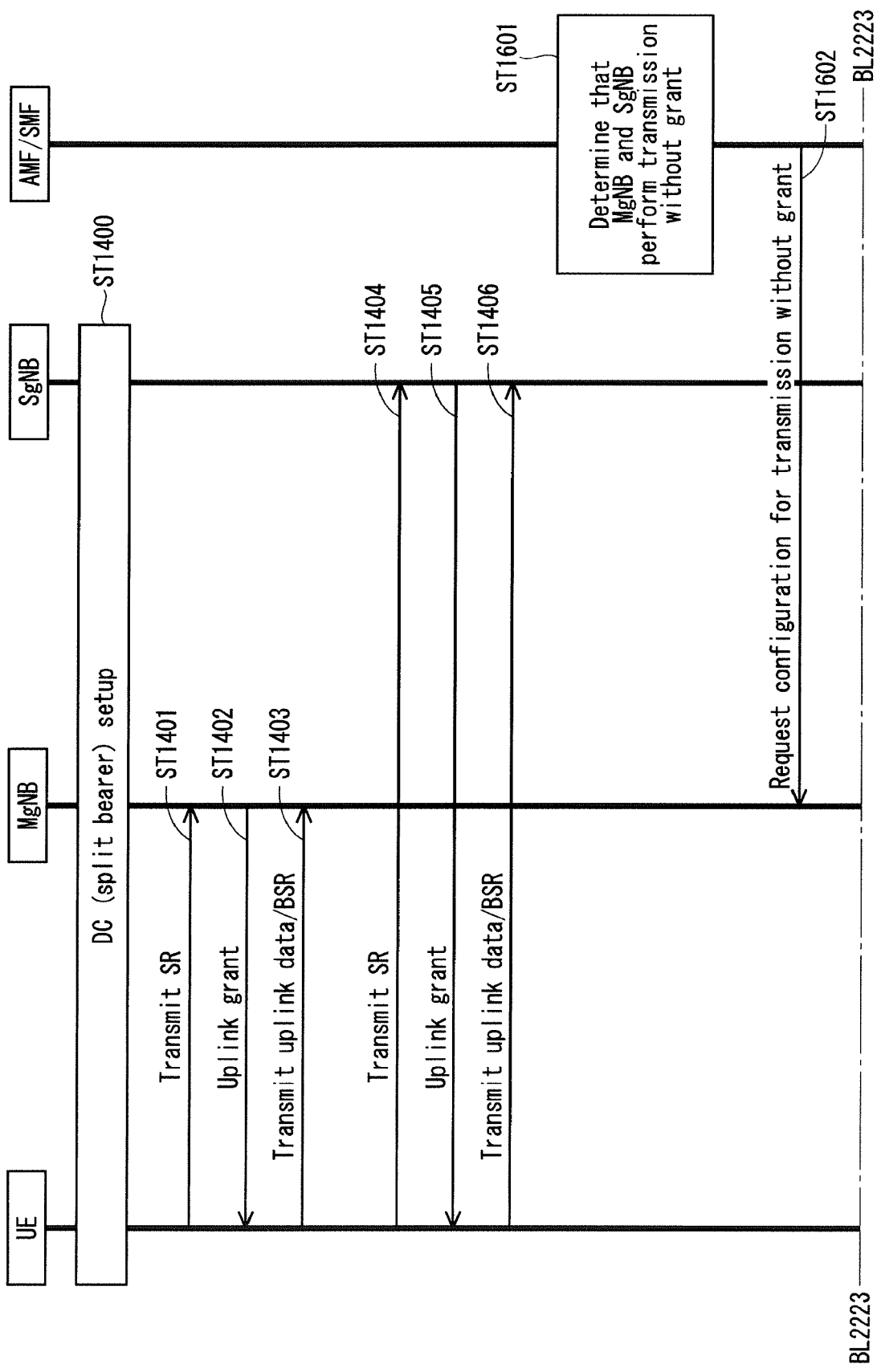
FIG. 22 illustrates another example sequence for the SN to perform the transmission without grant with a split bearer according to the first modification of the first embodiment.
Figure 23:
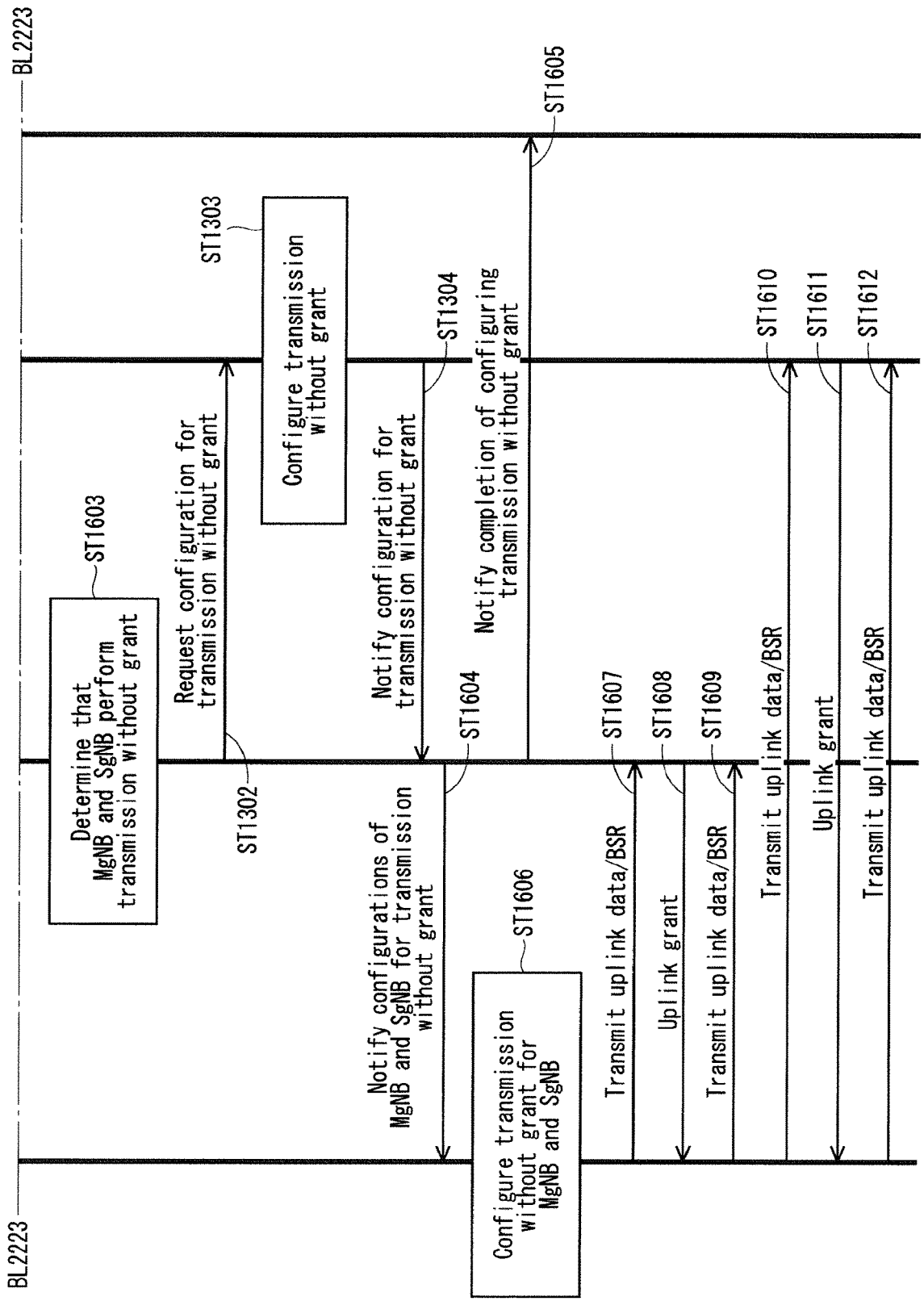
FIG. 23 illustrates another example sequence for the SN to perform the transmission without grant with a split bearer according to the first modification of the first embodiment.

FIGS. 22 and 23 illustrate an example sequence for the SN to perform transmission without grant with a split bearer. FIGS. 22 and 23 are connected across a location of a border BL2223. FIGS. 22 and 23 illustrate a case where the CN requests the MN to configure the transmission without grant. Since the sequence illustrated in FIGS. 22 and 23 includes the same steps as those of the sequence illustrated in FIGS. 20 and 21, the same step numbers are assigned to the same Steps and the common description thereof is omitted.

In Step ST1601, the CN determines to request the MgNB and the SgNB to configure the transmission without grant. The CN measures, for example, throughput in the actual uplink communication with the target UE, and determines the request using the measurement result. The CN may determine the request using the support information of the MgNB and the SgNB, for example, the SCS information to be supported.

For example, when the throughput in the actual uplink communication is less than a desired value, the CN determines to request the MgNB and the SgNB to configure the transmission without grant. The CN may determine which node is requested to configure the transmission without grant, using the support information of the MgNB and the SgNB. The method for the MgNB to notify, in advance, the CN of information for determining the uplink transmission node may be applied to a method for the CN to obtain the support information of the MgNB and the SgNB. The notification should be given via the S1 or NG-C signaling.

FIGS. 22 and 23 illustrate determining to request the MgNB and the SgNB to configure the transmission without grant. In Step ST1602, the CN notifies the MgNB of a request for configuring the transmission without grant in the MgNB and the SgNB. The CN should notify the MgNB of information for identifying the target UE and information for identifying the SgNB. The MgNB can recognize which SgNB is requested to configure the transmission without grant to which UE.

In Step ST1602, the CN may notify a part or the entirety of the configuration information for transmission without grant of the MgNB and the SgNB. For example, the CN configures the same period and the same offset of resources for transmission without grant for both of the MgNB and the SgNB, and notifies the configuration. This can make the timing for the MgNB to perform the transmission without grant coincide with that of the SgNB, and reduce an increase in the amount of latency caused by the different timings.

Upon receipt of the request for configuring the transmission without grant in the MgNB and the SgNB in Step ST1602, the MgNB configures the transmission without grant in the MgNB. In Step ST1603, the MgNB determines to request the SgNB to configure the transmission without grant. In Step ST1302, the MgNB notifies the SgNB of a request for configuring the transmission without grant.

In Step ST1304, the MgNB receives the information for identifying the target UE and information indicating Ack from the SgNB. The MgNB also receives the configuration information for transmission without grant of the SgNB. In Step ST1604, the MgNB notifies the UE of the configuration information for transmission without grant of its own node and the configuration information for transmission without grant of the SgNB.

The MgNB, which has acknowledged the successful notification in Step ST1604, notifies the CN of completion of configuring the transmission without grant in Step ST1605. The MgNB may include, in the completion notification, the information for identifying the target UE and information for identifying the node for which the transmission without grant has been configured. Consequently, the CN recognizes that the transmission without grant has been configured in the MgNB and the SgNB.

Upon receipt of the configurations of the MgNB and the SgNB for the transmission without grant in Step ST1604, the UE configures the transmission without grant for the MgNB and the SgNB in Step ST1606. When the uplink data occurs in the UE, the UE and the MgNB perform the transmission without grant in Steps ST1607 to ST1609. Then, the UE and the SgNB perform the transmission without grant in Steps ST1610 to ST1612.

Consequently, the lower latency can be pursued in the DC. The CN requests each node to configure the transmission without grant and configures a part or the entirety of the configuration for transmission without grant, so that the latency in the uplink communication can be reduced as a system.

The CN may notify the MN or the SN of the configuration for transmission without grant at each node. The CN may notify a node which is requested to configure the transmission without grant of the configuration for transmission without grant together with a request for configuring the transmission without grant which is notified from the CN to the MN or the SN, or include the configuration for transmission without grant in the request to notify the node of the configuration. When a node that has received a request for configuring the transmission without grant from the CN is different from a node that configures the transmission without grant, its own node may notify the node that configures the transmission without grant of the configuration for the transmission without grant.

The CN may notify a part or the entirety of the configuration for transmission without grant. When notifying a plurality of nodes of the configuration for transmission without grant, the CN may configure a part or the entirety of the configuration for transmission without grant consistently among the plurality of nodes to notify the configuration. The node to which the CN has notified the configuration for transmission without grant configures the transmission without grant of its own node with consideration given to the configuration.

For example, the CN requests the MN and the SN to configure the transmission without grant. Here, the same period of the transmission without grant is configured in the MN and the SN. Consequently, the latency in the MN for transmitting the uplink data can be substantially equal to that in the SN. The CN can perform unified control over RAN nodes being served thereby.

The MN or the SN may notify the UE or the CN of a response to the request for configuring the transmission without grant which the UE or the CN notifies to the MN or the SN. The MN or the SN may include, in the response, an identifier of a node that is requested to configure the transmission without grant to notify the response. The MN or the SN may associate the node that is requested to configure the transmission without grant with the response to the request for configuring the transmission without grant at the node to notify them.

In response to the request for configuring the transmission without grant, the MN or the SN may notify the target UE of whether to have configured the transmission without grant. The MN or the SN may notify acknowledgement (Ack) or rejection (reject). The MN or the SN may notify information for identifying the target UE. The MN or the SN may associate the response to the request for configuring the transmission without grant with the information for identifying the UE to notify them.

The aforementioned method may be applied to the response to the request for configuring the transmission without grant between the MN and the SN. Upon receipt of the response to the request for configuring the transmission without grant, the node should notify the UE or the CN of the response to the request for configuring the transmission without grant according to the response. This can produce the same advantages.

The methods disclosed in the first modification of the first embodiment are applicable to a bearer type using the SCG. In other words, the methods disclosed in the first modification of the first embodiment are applicable not only to the MCG split bearer and the SCG split bearer but also to the SCG bearer. The SN can perform the transmission without grant with the SCG bearer. The methods disclosed in the first modification of the first embodiment are appropriately applicable to the multi connectivity (MC). Two or more SNs should be used. When the UE is connected to one MN and two or more SNs, the transmission without grant may be configured using one or two or more SNs within the SNs to be connected.

The methods disclosed in the first modification of the first embodiment enable the SN to perform the transmission without grant when the DC or the MC is configured. Enabling the SN to perform the transmission without grant can eliminate the need for the SN to receive the SR and transmit the uplink grant in response to the SR, and reduce the latency for the SN to transmit the uplink data.

The transmission without grant is performed in the carrier aggregation (CA). The transmission without grant is configurable with the CA. In other words, the transmission without grant is supported with the CA. The transmission without grant may be supported in one or more cells (CC) of the CA.

The SR is transmitted with the CA in a predetermined cell. For example, the SR is transmitted in the PCell, the PUCCH SCell, or the SPCell. The cell in which the transmission without grant is configured need not be a cell to which the SR can be transmitted. The cell to which the uplink data is transmitted should be configured for the transmission without grant. Since the cell in which the transmission without grant is configured is not limited to the cell to which the SR can be transmitted, for example, the transmission without grant is configurable in a cell with a favorable radio environment for the UE. The UE can perform transmission without grant in the cell with the favorable radio environment, which can yield the low latency characteristics and higher throughput in the uplink communication.

The MN notifies the UE of the configuration of the transmission without grant for one or more cells. The MN should notify the configuration of the transmission without grant on each node (the MN and the SN) for each cell. The MN should notify information for identifying the cell and the configuration information for transmission without grant. The MN should obtain, in advance, the configuration information for transmission without grant on the SN for each cell. The method disclosed as the method for configuring the transmission without grant in the DC should be applied to the obtaining method.

Each node may notify the UE of the configuration of the transmission without grant for one or more cells. The MN should notify the configuration of the transmission without grant on its own node for each cell. The SN should notify the configuration of the transmission without grant on its own node for each cell.

The MN or each node should notify the UE of the RRC configuration of the transmission without grant of each cell via the RRC signaling. Each cell should notify the UE of the L1 configuration of the transmission without grant of the cell via the L1 signaling. The cell should include the L1 configuration in the DCI to notify the configuration.

The cell may notify the UE of the L1 configuration for the transmission without grant for different one or more cells. The cell should include, in the DCI, information for identifying the cell in which the transmission without grant is configured and the L1 configuration for the transmission without grant to notify the information and the configuration. Consequently, the UE need not always receive control channels of all the cells, but has only to receive a control channel of a specific cell. The power consumption of the UE can be reduced.

Regarding the CA, the MAC at each node schedules a cell that performs the CA. Thus, even when the cell notifies the L1 configuration of another cell, the configuration of radio resources for the transmission without grant of the other cell or activating/deactivating the transmission without grant can be timely reflected. This can increase the use efficiency of radio resources.

The UE may determine which cell among the cells in which the transmission without grant has been configured data is to be transmitted in. When the L1 configuration is used, the UE may select a cell in which data is to be transmitted from among the activated cells. For example, the UE may measure a downlink path loss of each cell, and determine that the uplink data is to be transmitted in the cell with the smallest path loss.

The node may determine which cell among the cells in which the transmission without grant has been configured data is to be transmitted in. Each node may determine which cell data is to be transmitted in. Only the determined cell notifies the UE of activation with the L1 configuration. The determined cell notifies the other cells of deactivation with the L1 configuration. This enables a node to determine which cell the UE transmits the uplink data in. For example, the node may receive, from the UE, an uplink sounding signal addressed to each cell, measure the uplink communication quality of the cell, and determine to transmit the uplink data in the cell with the best uplink communication quality.

Information for identifying the cell in which the uplink data is transmitted may be provided. The node may include the information in the RRC configuration to notify the information via the RRC signaling. Alternatively, the node may include the information in the MAC CE to notify the information via the MAC signaling. The transmission without grant is dynamically configurable. Moreover, application of the HARQ can reduce reception errors. Alternatively, the node may include, in the L1 configuration, the information for identifying the cell in which the uplink data is transmitted to notify the information via the L1 signaling. The transmission without grant is dynamically configurable. The transmission without grant is immediately configurable for the UE that does not perform the HARQ.

A plurality of cells may share a part or the entirety of the transmission without grant. All the cells may have the configuration of the transmission without grant as a common configuration. For example, the timings of resources for transmission without grant are made different among the plurality of cells. Consequently, the uplink data communication can be started in the cell where the resources for transmission without grant are available in the shortest period of time from the timing with which the uplink data occurs in the UE. The latency in the uplink communication can be further reduced.

Consequently, the transmission without grant is possible with the CA in one or more cells. For example, the UE can start the data communication in the cell with a favorable radio propagation environment. Moreover, the uplink communication can be started not only in a cell to which the SR can be transmitted but also in the other cells.

The Second Embodiment

Configuring the transmission without grant in the uplink communication of a communication service requiring the low latency can yield the low latency characteristics. However, merely configuring the transmission without grant cannot satisfy requirements of a communication service requiring not only the low latency characteristics but also the high reliability characteristics, for example, the URLLC service.

A solution to the problem is disclosed below.

The transmission without grant is configurable in the packet duplication where a packet is duplicated and the identical packets are transmitted with the DC. The transmission without grant is configurable in the MN during the packet duplication setup. The transmission without grant is also configurable in the SN during the packet duplication setup. Alternatively, the transmission without grant is configurable in one of the MN and the SN during the packet duplication setup. "during the packet duplication setup" may include the time during which the packet duplication setup is being processed.

The packet duplication may be configurable in the uplink communication in which the transmission without grant has been configured. When the packet duplication is performed in the uplink communication in which the transmission without grant has been configured, the transmission without grant is also configurable in the SN. As such, configuring both of the packet duplication and the transmission without grant can enhance not only the low latency characteristics but also the reliability.

In the packet duplication with the DC, the packet duplication is configured between the MN and the UE. Here, the SN need not recognize the configuration of the packet duplication. The SN has only to perform the same processes as the normal processes for transmitting and receiving the packet data. As previously described, the RRC configuration is necessary for configuring the transmission without grant. Thus, when attempting to configure the transmission without grant in the packet duplication using the DC, the SN cannot recognize whether it is necessary to configure the transmission without grant, and has a problem of failing to configure the transmission without grant.

A solution to the problem is disclosed below.

The MN requests the SN to configure the transmission without grant. The MN requests the SN to configure the transmission without grant during the packet duplication setup. The SN notifies the MN of a configuration for transmission without grant. The MN notifies the UE of a configuration for transmission without grant that has been configured at its own node, and the configuration of the SN for transmission without grant. The methods disclosed in the first modification of the first embodiment should be appropriately applied to the method for the MN to request the SN to configure the transmission without grant and the method for configuring the transmission without grant between the MN, the SN, and the UE.

For example, the method for the MN to instruct the SN to configure the transmission without grant may be applied, instead of the request from the MN to the SN to configure the transmission without grant.

This enables the SN to recognize whether it is necessary to configure the transmission without grant, and configure the transmission without grant. Thus, the transmission without grant is configurable in the packet duplication with the DC. This yields the low latency characteristics and the high reliability characteristics.

The MN may request the SN to make the timings of resources for transmission without grant coincide with each other. The timings of resources for transmission without grant may be indicated by a period and an offset of the resources for the transmission without grant. The MN may notify the SN of these parameters among parameters for configuring the transmission without grant at its own node. The SN can configure the parameters.

Since this can make the transmission timings from the UE to both of the nodes coincide with each other, increase in the latency caused by the different transmission timings to the nodes can be reduced.

The MN may request the SN to make the timings of resources for transmission without grant different from each other. The MN may configure, with different values, parameters on the timings among the parameters for configuring the transmission without grant at its own node, and notify the configured values to the SN. The SN can configure the parameters.

When the transmission timings to the nodes are the same, the transmission power of the UE has to be allocated to the nodes, and the transmission power to the nodes may decrease. Thus, making the transmission timings to the nodes different from one another can prevent decrease in the uplink transmission power from the UE to the nodes.

The MN may request the SN to make the timings of resources for transmission without grant different from one another within a predetermined scope. The MN may configure, with different values within a predetermined scope, parameters on the timings among the parameters for configuring the transmission without grant at its own node, and notify the configured values to the SN. The SN can configure the parameters.

This can prevent decrease in the uplink transmission power to the nodes, and reduce the latency by maintaining the transmission timings to the nodes within a predetermined scope.

When the MN attempts to configure the packet duplication in the uplink communication in which the transmission without grant has been configured, the SN cannot recognize whether it is necessary to configure the transmission without grant, and has a problem of failing to configure the transmission without grant.

A solution to the problem is disclosed below.

The MN notifies the UE of configuring the packet duplication with the DC in the uplink communication in which the transmission without grant has been configured. Furthermore, the MN requests the SN to configure the transmission without grant. The MN may notify the SN of an instruction for configuring the transmission without grant. The SN notifies the MN of the configuration for transmission without grant. The MN notifies the UE of the configuration for transmission without grant that has been configured at its own node, and the configuration of the SN for transmission without grant. The methods disclosed in the first modification of the first embodiment should be appropriately applied to the method for configuring the transmission without grant between the MN, the SN, and the UE such as the request of configuring the transmission without grant from the MN to the SN.

Consequently, the SN can recognize whether it is necessary to configure the transmission without grant, and configure the transmission without grant. Thus, the packet duplication is configurable in the uplink communication in which the transmission without grant has been configured in the MN. This yields the low latency characteristics and the high reliability characteristics.

Figure 24:
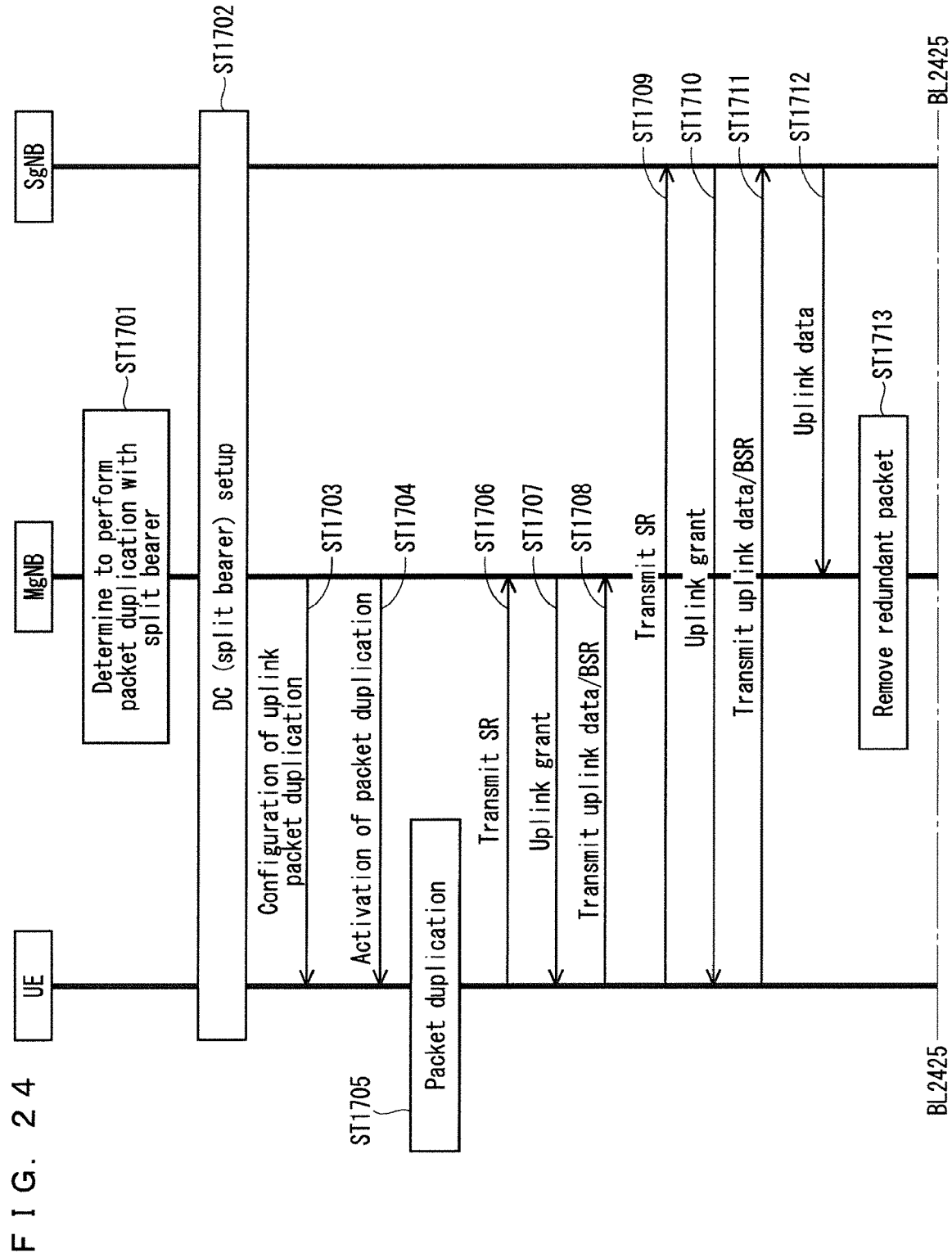
FIG. 24 illustrates an example sequence for configuring the transmission without grant in the packet duplication according to the second embodiment.
Figure 25:
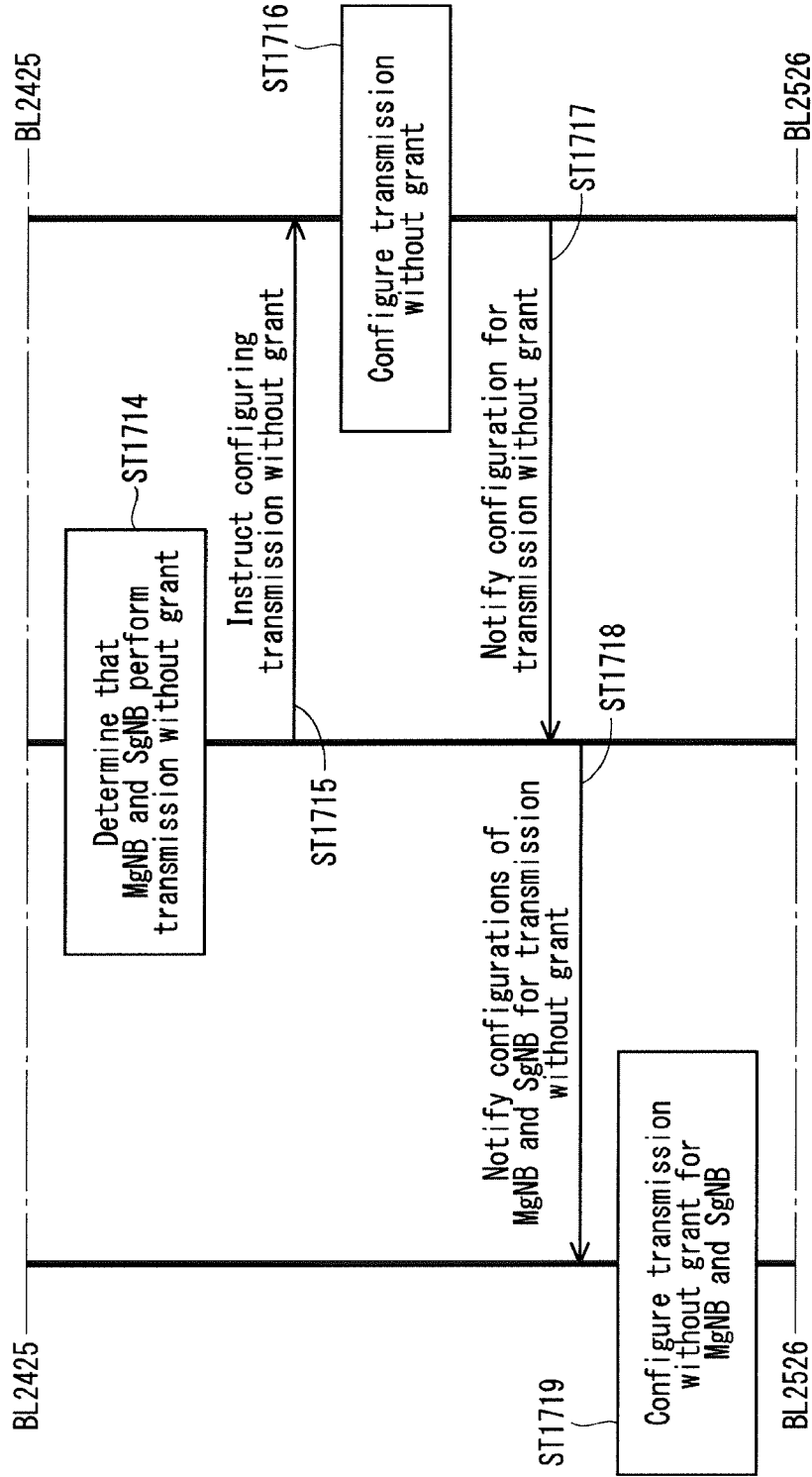
FIG. 25 illustrates the example sequence for configuring the transmission without grant in the packet duplication according to the second embodiment.
Figure 26:
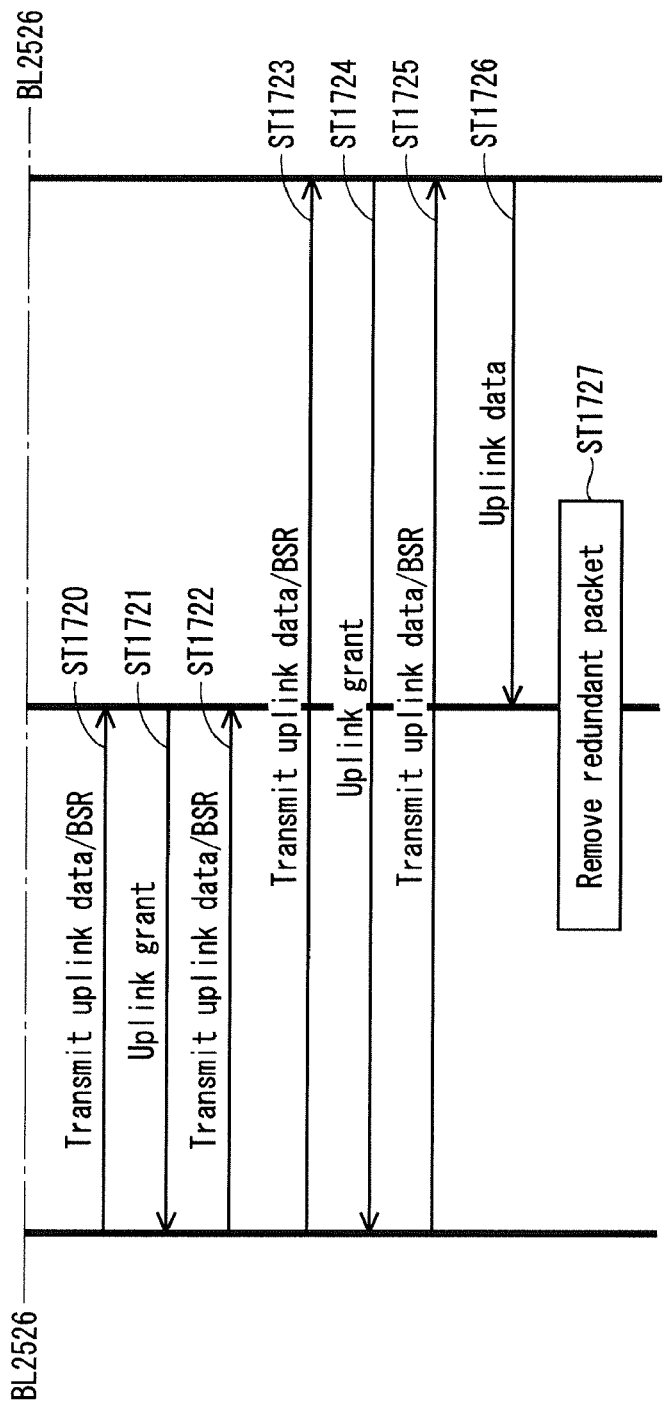
FIG. 26 illustrates the example sequence for configuring the transmission without grant in the packet duplication according to the second embodiment.

FIGS. 24 to 26 illustrate an example sequence for configuring the transmission without grant in the packet duplication. FIGS. 24 to 26 are connected across locations of borders BL2425 and BL2526. In Step ST1701, the MgNB determines to perform the uplink packet duplication with a split bearer for the UE. In Step ST1702, the MgNB performs the DC setup process using the split bearer with the UE and the SgNB. In Step ST1703, the MgNB notifies the UE of a configuration of the uplink packet duplication. The MgNB should give the notification via the RRC signaling. In Step ST1704, the MgNB notifies the UE of activation of the packet duplication. The MgNB should give the notification via the MAC signaling.

Upon receipt of the activation of the packet duplication in Step ST1704, the UE starts the packet duplication in Step ST1705. The UE which has started the packet duplication duplicates the uplink data, and transmits the uplink data to the MgNB and the SgNB. The UE transmits the uplink data to the MgNB in Steps ST1706 to ST1708, and transmits the uplink data to the SgNB in Steps ST1709 to ST1711.

In Step ST1712, the SgNB transmits, to the MgNB, the uplink data received from the UE. The SgNB may transmit the uplink data through the S1 interface or the Xn interface.

In Step ST1713, the MgNB compares the uplink data received by the MgNB with the uplink data received from the SgNB, and removes the redundant uplink data. The uplink packet duplication with a split bearer of the MgNB and the SgNB is performed in such a manner.

In Step ST1714, the MgNB determines configurations of the MgNB and the SgNB for the transmission without grant. The determination method disclosed in FIGS. 16 and 17 should be applied to this determination method. When the transmission without grant is configured for the uplink data on which the packet duplication has been performed, the MgNB may determine the configurations of both of the MgNB and the SgNB for the transmission without grant. In Step ST1715, the MgNB notifies the SgNB of an instruction for configuring the transmission without grant. The MgNB may notify the SgNB of information for identifying the target UE. The MgNB may notify the SgNB of a part or the entirety of the configuration for transmission without grant.

The MgNB may notify the SgNB of the period and the offset of the resources for the transmission without grant as the configuration information for transmission without grant. Combination of the periods and the offsets of the resources for the transmission without grant of the SgNB and the MgNB can reduce an increase in the amount of latency caused by the different resource timings of the SgNB and the MgNB.

Upon receipt of the instruction for configuring the transmission without grant from the MgNB, the SgNB configures the transmission without grant in Step ST1716. Upon receipt of the instruction from the MgNB, the SgNB should configure the transmission without grant for the target UE which is prioritized over the other UEs, though the configuration for transmission without grant involves maintaining of the radio resources. In Step ST1717, the SgNB notifies a response to the instruction for configuring the transmission without grant from the MgNB. Here, the SgNB notifies Ack. The SgNB notifies both the information for identifying the target UE and the configuration for transmission without grant in the SgNB. In Step ST1718, the MgNB notifies the UE of the configuration for transmission without grant at its own node and the configuration for transmission without grant in the SgNB.

In Step ST1719, the UE configures the transmission without grant for the MgNB and the SgNB. In Steps ST1720 to ST1722, the UE performs the transmission without grant to the MgNB. In Steps ST1723 to ST1725, the UE performs the transmission without grant to the SgNB. In Step ST1726, the SgNB transmits, to the MgNB, the uplink data received from the UE. In Step ST1727, the MgNB removes the redundant uplink data.

Although the MgNB notifies the SgNB of the instruction for configuring the transmission without grant, the MgNB may notify the SgNB of a request for configuring the transmission without grant. Although the SgNB notifies Ack to the MgNB, the SgNB may notify rejection to the MgNB. For example, upon receipt of the request for configuring the transmission without grant, when the SgNB cannot configure the transmission without grant due to the shortage of the resources at its own node, the SgNB notifies the MgNB of the rejection. The SgNB may notify the shortage of the resources as the cause information together.

Upon receipt of the notification of the rejection, the MgNB may, for example, determine to configure the transmission without grant at only its own node, and notify the UE of the configuration of only the MgNB for the transmission without grant.

The MgNB may determine to request again the SgNB to configure the transmission without grant, and notify the SgNB of the request for configuring the transmission without grant. When the shortage of the resources is resolved, the SgNB includes the configuration for the transmission without grant in Ack to notify the MgNB of the configuration. The MgNB may notify the UE of the configurations of the MgNB and the SgNB for the transmission without grant. When there is no change in the configuration of the MgNB for the transmission without grant, the MgNB may notify only the configuration of the SgNB for the transmission without grant.

Consequently, the transmission without grant can be performed in the uplink packet duplication with a split bearer of the MgNB and the SgNB. Thus, lower latency can be pursued also during execution of the packet duplication. This can yield high reliability and the low latency characteristics.

The uplink packet duplication may be configured in the DC setup process. For example, the MN may include the uplink packet duplication configuration information in the RRC connection reconfiguration message to be notified from the MN to the UE to notify the information. Upon receipt of the RRC connection reconfiguration message in the DC setup process, the UE configures the uplink packet duplication together with the DC setup. This can reduce the amount of the RRC signaling.

Figure 27:
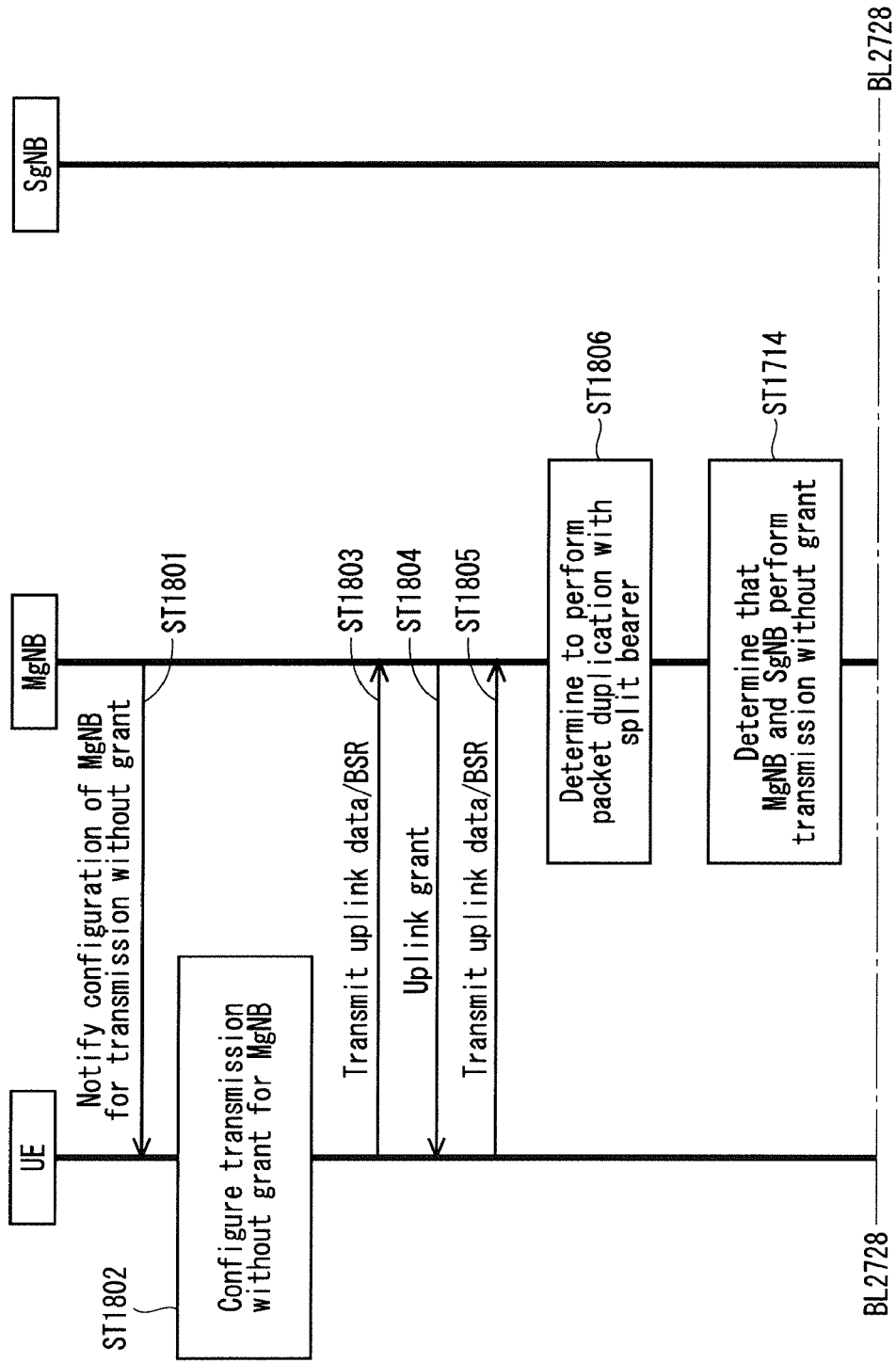
FIG. 27 illustrates an example sequence for configuring the packet duplication in the uplink communication in which the transmission without grant has been configured according to the second embodiment.
Figure 29:
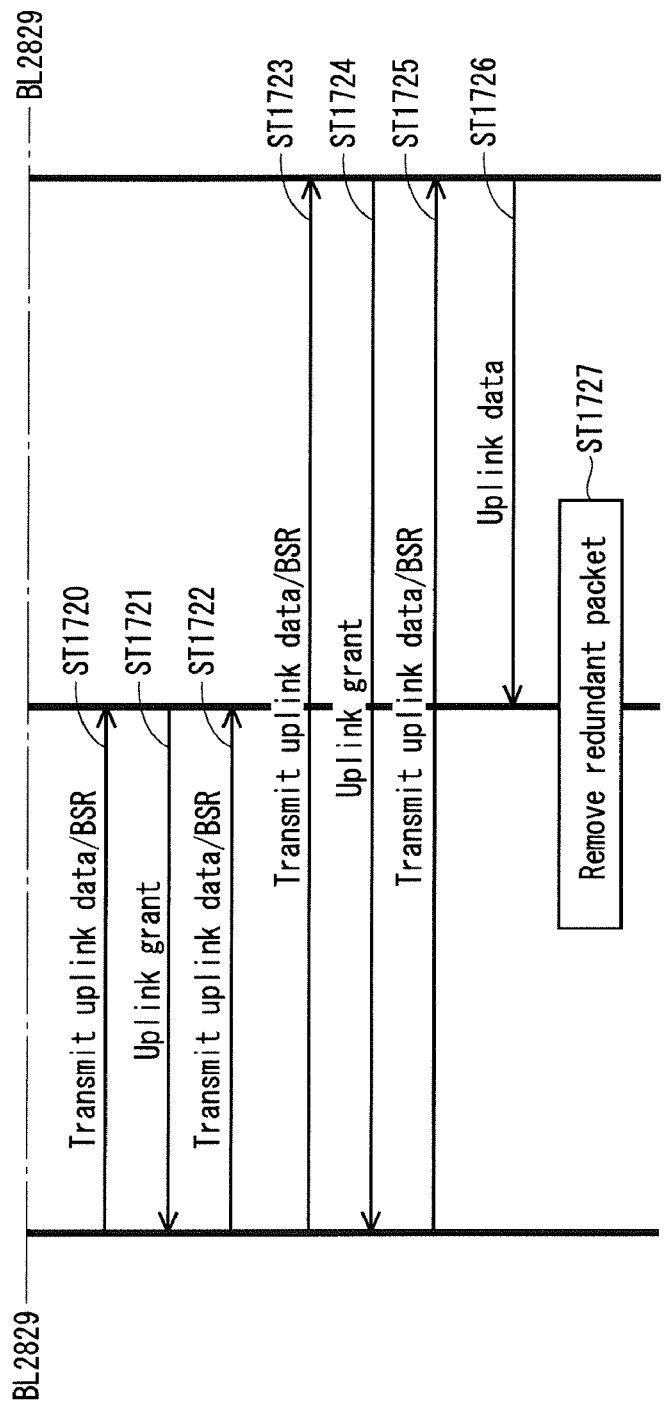
FIG. 29 illustrates the example sequence for configuring the packet duplication in the uplink communication in which the transmission without grant has been configured according to the second embodiment.

FIGS. 27 to 29 illustrate an example sequence for configuring the packet duplication in the uplink communication in which the transmission without grant has been configured. FIGS. 27 to 29 are connected across locations of borders BL2728 and BL2829. Since the sequence illustrated in FIGS. 27 to 29 includes the same steps as those of the sequence illustrated in FIGS. 24 to 26, the same step numbers are assigned to the same Steps and the common description thereof is omitted.

In Step ST1801, the MgNB notifies the UE of the configuration of the MgNB for transmission without grant. In Step ST1802, the UE configures the transmission without grant for the MgNB. When the uplink data occurs in the UE, the UE and the MgNB perform the transmission without grant in Steps ST1803 to ST1805.

In Step ST1806, the MgNB determines to perform the packet duplication with a split bearer. In Step ST1714, the MgNB determines the configurations of the MgNB and the SgNB for the transmission without grant. The MgNB, which has determined to perform the packet duplication with a split bearer in Step ST1806, performs the DC setup process with the UE and the SgNB in Step ST1807. After performing the DC setup process in Step ST1807, the MgNB notifies the SgNB of an instruction for configuring the transmission without grant in the SgNB in Step ST1715.

In Steps ST1716 to ST1719, the MgNB and the SgNB configure the transmission without grant for the UE. The MgNB may change the configuration of the transmission without grant, and notify the UE of the changed configuration for transmission without grant in Step ST1718. The MgNB, which has notified the configurations of the MgNB and the SgNB for the transmission without grant in Step ST1718, notifies the UE of the configuration of the uplink packet duplication in Step ST1808. The MgNB should give the notification via the RRC signaling. In Step ST1809, the MgNB notifies the UE of activation of the packet duplication. The MgNB should give the notification via the MAC signaling.

Upon receipt of the activation of the packet duplication from the MgNB in Step ST1809, the UE starts to duplicate the uplink data in Step ST1810. When the uplink data occurs in the UE, the UE performs the packet duplication on the uplink data. The UE and the MgNB perform the transmission without grant in Steps ST1720 to ST1722, and the UE and the SgNB perform the transmission without grant in Steps ST1723 to ST1725.

This can configure the packet duplication in the uplink communication in which the transmission without grant has been configured. Thus, in the uplink communication yielding the low latency characteristics from the transmission without grant, execution of the packet duplication can yield the higher reliability. This can yield the low latency characteristics and high reliability.

The transmission without grant may be configured in the DC setup process. For example, the MN may include the request for configuring the transmission without grant or the instruction for configuring the transmission without grant in the Xn/X2 message to be notified from the MN to the SN, e.g., the SgNB modification request message to notify the request or the instruction. For example, the SN may include the configuration information for transmission without grant in the Xn/X2 message to be notified from the SN to the MN, e.g., the SgNB modification request acknowledgement message to notify the information. This method may be applied to the method disclosed in the first modification of the first embodiment. This can reduce the amount of the Xn/X2 signaling.

For example, the MN may include the configuration information for transmission without grant in the RRC connection reconfiguration message to be notified from the MN to the UE to notify the information. Upon receipt of the RRC connection reconfiguration message in the DC setup process, the UE configures the transmission without grant together with the DC setup. This method may be applied to the method disclosed in the first modification of the first embodiment. This can reduce the amount of the RRC signaling.

The uplink packet duplication may be configured in the DC setup process. For example, the MN may include the uplink packet duplication configuration information in the RRC connection reconfiguration message to be notified from the MN to the UE to notify the information. Upon receipt of the RRC connection reconfiguration message in the DC setup process, the UE configures the uplink packet duplication together with the DC setup. This can reduce the amount of the RRC signaling.

The uplink packet duplication may be configured in a process for configuring the transmission without grant. For example, the MN may include the uplink packet duplication configuration information in the RRC signaling for configuring the transmission without grant which is to be notified from the MN to the UE to notify the information. Upon receipt of the RRC signaling for configuring the transmission without grant, the UE configures the uplink packet duplication together with configuring the transmission without grant. This can reduce the amount of the RRC signaling.

Whether to activate or deactivate the configuration for transmission without grant in configuring the transmission without grant may be performed via the MAC signaling. Activating/deactivating information of each node for configuring the transmission without grant may be provided. The information may be included in the MAC CE. The MN notifies the UE of whether to activate or deactivate the configuration for transmission without grant with the MAC CE. The SN may notify the UE of whether to activate or deactivate the configuration for transmission without grant with the MAC CE.

Upon receipt of the activating/deactivating information of each node for configuring the transmission without grant, the UE configures the transmission without grant for the node. Provision of the activating/deactivating information of each node for configuring the transmission without grant in the MAC signaling can dynamically and timely configure the transmission without grant for the UE. This can reduce wasteful use of the radio resources.

The activation/deactivation of the packet duplication is configured via the MAC signaling. With inclusion of the MAC CE indicating the activating/deactivating information for configuring the transmission without grant at each node, in the MAC signaling including the MAC CE for configuring the activation/deactivation of the packet duplication, the information may be notified. The notification via the same MAC signaling can reduce the amount of signaling.

Figure 31:
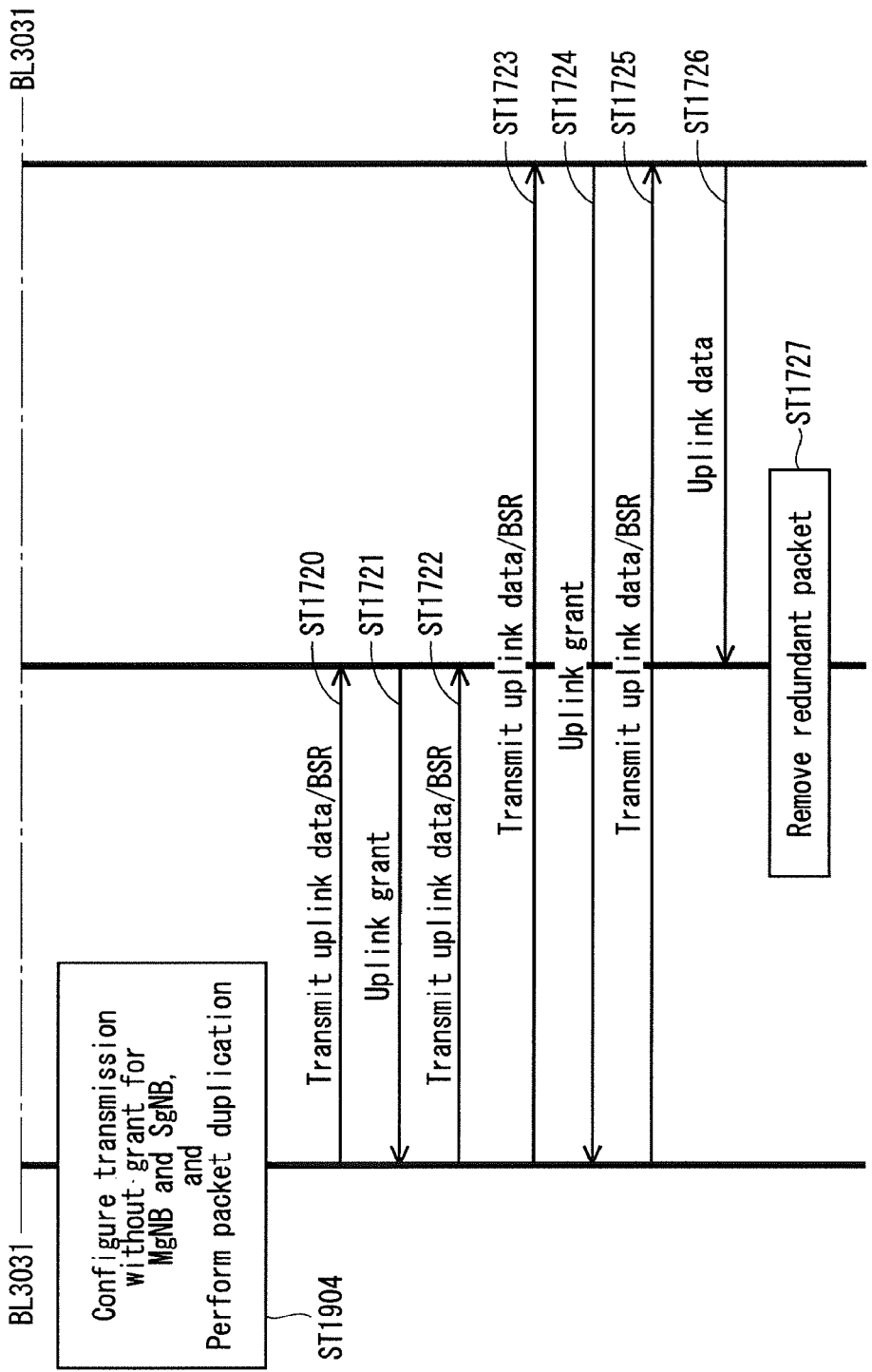
FIG. 31 illustrates the example sequence for notifying activation of the packet duplication and activation of the configuration for transmission without grant via the same signaling, and performing the packet duplication and configuring the transmission without grant according to the second embodiment.

FIGS. 30 and 31 illustrate an example sequence for notifying activation of the packet duplication and activation of the configuration for transmission without grant via the same signaling, and performing the packet duplication and configuring the transmission without grant. FIGS. 30 and 31 are connected across a location of a border BL3031. Since the sequence illustrated in FIGS. 30 and 31 includes the same steps as those of the sequence illustrated in FIGS. 27 to 29, the same step numbers are assigned to the same Steps and the common description thereof is omitted.

In Step ST1901, the MgNB determines to perform the packet duplication with a split bearer for the UE, and then determines the configurations of the MgNB and the SgNB for the transmission without grant. In Step ST1902, the MgNB performs the DC setup process with the UE and the SgNB. After performing the DC setup process in Step ST1902, the MgNB notifies the SgNB of an instruction for configuring the transmission without grant in the SgNB in Step ST1715.

In Steps ST1716 to ST1718, the MgNB and the SgNB configure the transmission without grant for the UE. The MgNB, which has notified the configurations of the MgNB and the SgNB for the transmission without grant in Step ST1718, notifies the UE of the configuration of the uplink packet duplication in Step ST1808. In Step ST1903, the MgNB notifies the UE of activation of the packet duplication and activation of the configurations of the MgNB and the SgNB for the transmission without grant via the same signaling. The MgNB should give the notification via the MAC signaling.

For example, the MgNB includes, in the same MAC PDU, the MAC CE including the activation of the packet duplication and the MAC CE including the activation of the configurations of the MgNB and the SgNB for the transmission without grant to notify the MAC CEs. Upon receipt of the activation of the packet duplication and the activation of the configurations of the MgNB and the SgNB for the transmission without grant in Step ST1903, the UE configures the transmission without grant for the MgNB and the SgNB and starts the packet duplication in Step ST1904.

When the uplink data occurs in the UE, the UE performs the packet duplication on the uplink data. The UE and the MgNB perform the transmission without grant in Steps ST1720 to ST1722, and the UE and the SgNB perform the transmission without grant in Steps ST1723 to ST1725.

This can yield the low latency characteristics and high reliability. When the MgNB intends to start or stop the transmission without grant for the UE, activation/deactivation of the configuration for transmission without grant with the MAC CE enables dynamic control. This can increase the use efficiency of the radio resources. The notification of the activation/deactivation of the packet duplication and the activation/deactivation of the configuration for transmission without grant via the same MAC signaling can reduce the amount of signaling.

The transmission without grant is configurable in the packet duplication where a packet is duplicated and the identical packets are transmitted with the CA. The transmission without grant is configurable in the cell where the packet duplication is to be performed during the packet duplication setup. "during the packet duplication setup" may include the time during which the packet duplication setup is being processed.

The packet duplication (CA) may be configurable in the uplink communication in which the transmission without grant has been configured. When the packet duplication is performed in the uplink communication in which the transmission without grant has been configured, the transmission without grant is configurable in the cell where the packet duplication is to be performed.

A node notifies the UE of the configuration of the transmission without grant which has been configured in the cell where the packet duplication is to be performed. The disclosed method for making the transmission without grant configurable in the packet duplication with the DC should be appropriately applied to this notification method.

Consequently, the transmission without grant in the packet duplication (CA) is configurable. The packet duplication (CA) is configurable in the uplink communication in which the transmission without grant has been configured. This can yield the low latency characteristics and high reliability. Moreover, the low latency characteristics and high reliability can be yielded using one node.

The Third Embodiment

In the uplink preempted transmission (See Non-Patent Document 14 (R1-1712747)), the UE that performs the preempted transmission transmits the SR to the gNB. The UE that performs the preempted transmission may be, for example, the UE that performs the URLLC communication. The gNB notifies the UE to be preempted of information indicating that preempted communication will occur. The notification information may include information on frequency resources to be used for the preempted transmission. The notification information may include information on time resources. The notification information may include information on power resources. The UE to be preempted may be, for example, the UE that performs the eMBB communication.

The gNB may configure the reception of information indicating that preempted communication will occur for all or a part of the UEs being served thereby. The UE may start receiving the information indicating that preempted communication will occur, with the configuration. The UE to be preempted may be the configured UE. The same may hold true for the following description.

In response to the notification, the UE to be preempted may reduce the uplink transmission power with the frequency and/or time resources for performing the preempted transmission. Alternatively, the UE to be preempted may stop the uplink transmission power with the resources. This can enhance the reliability in the preempted communication.

The UE to be preempted need not transmit the uplink data that is scheduled to be transmitted with the frequency and/or time resources for performing the preempted transmission. This can reduce the amount of processing in that UE and the gNB. As an alternative example, the UE may transmit the uplink data with resources other than the aforementioned resources. For example, the UE may delay the uplink data behind the time resources for performing the preempted transmission to transmit the uplink data. The UE may abort transmission of the uplink data that cannot completely be transmitted in response to the scheduling grant instructed by the gNB. Whether the UE does not transmit the uplink data and/or transmits the uplink data with the resources other than the resources may be determined according to the decoding characteristics of the gNB. Increase in the HARQ decoding characteristics in the uplink transmission can enhance the reliability in the uplink communication of the UE to be preempted.

As an alternative example, the UE to be preempted may redo coding and modulating processes. The redo may be applied, for example, to the uplink data to be transmitted with the time resources after the preempted transmission. For example, a coding rate may be increased in the redo. A method for redoing the coding and modulating processes with the preempted transmission (for example, a coding rate or data to be recoded) may be predefined in a standard. The UE to be preempted may notify the base station of information on the method. The UE may give the notification via, for example, the uplink L1/L2 signaling or the MAC signaling. This can, for example, prevent a transmission loss of the uplink data from the UE to be preempted due to the preempted transmission.

The gNB notifies the UE that performs preempted transmission (may be hereinafter referred to as a preempting UE) of the uplink grant. The UE that performs the preempted transmission performs uplink preempted transmission with the grant.

Application of the method creates the following problem. Specifically, since the UE that performs the preempted transmission needs to transmit the SR to the gNB after occurrence of data subject to uplink transmission, it takes some time to actually perform the preempted transmission. This causes a problem of failing to ensure the low latency in the uplink preempted transmission.

As a solution to the problem, the UE that performs the preempted transmission may notify the UE to be preempted (may be hereinafter referred to as a preempted UE) of information indicating that the preempted communication will be performed. The notification information may include information on frequency resources to be used for the preempted transmission. The notification information may include information on time resources. The notification information may include information on power resources. The UE to be preempted need not transmit the uplink data that is scheduled to be transmitted with the frequency and/or time resources for performing the preempted transmission. This enables the UE that performs the preempted transmission to promptly perform the preempted transmission.

Application of the method creates the following problem. Specifically, when the UE that performs the preempted transmission is distant from the UE to be preempted, the UE to be preempted may not be able to accurately receive the notification of the information. As a result, the UE to be preempted transmits the uplink data with the timing of the preempted transmission, which interferes with the preempted transmission. Moreover, the gNB cannot understand the timing of the preempted transmission, and may not be able to accurately receive a signal indicating the preempted transmission. This causes a problem of decrease in the reliability in the preempted communication.

A solution to the problem is disclosed below.

The gNB performs the preemption indication to the UE to be preempted. The notification may indicate the timing with which the preempted transmission may occur. In other words, the preempted transmission may actually occur or need not occur with the timing. The number of timings indicated by one of the notifications may be one or more.

The frequency resources to be used for transmitting the preemption indication from the gNB may be in a region different from that to be used for receiving the downlink user data of the UE to be preempted. For example, frequency resources for the preemption indication may be provided. This enables, for example, the UE to be preempted to easily understand the occurrence of the preemption.

The gNB may broadcast, to the UEs being served thereby, the information on the frequency resources to be used for transmitting the preemption indication. The UEs being served by the gNB may include the UE to be preempted. As an alternative example, the gNB may dedicatedly notify the UEs being served thereby of the information on the frequency resources. The gNB may give the dedicated notifications via the RRC dedicated signaling. For example, the information on the frequency resources may be included in the signaling for the RRC connection reconfiguration (RRC-ConnectionReconfiguration) from the gNB to the UEs being served thereby.

As an alternative example of the frequency resources, the frequency resources may be in the same region as that to be used for receiving the downlink user data of the UE to be preempted. For example, the PDCCH may be used. The gNB may include, in the PDCCH, information on a plurality of timings with which the preempted communication may occur. This can save the frequency resources in the communication system. The PDCCH may be a UE-dedicated PDCCH. This enables flexible control over the resources for each UE. The PDCCH common to a plurality of UEs, for example, a group common PDCCH may be used. This can reduce the amount of signaling required for the preemption indication.

The gNB may code and/or modulate the preemption indication with information on the UE to be preempted. For example, the gNB may code and/or modulate the preemption indication with the C-RNTI of the UE to be preempted. The UE to be preempted may obtain the preemption indication with the information. This can, for example, prevent the other UEs from erroneously obtain the preemption indication, which can consequently prevent decrease in the efficiency of the communication system.

Scrambling the CRC code, for example, scrambling the CRC code with the entirety or a part of the C-RNTI may be used, as an example of coding and/or modulating the preemption indication. The scrambling may be, for example, an operation of an exclusive OR of bits of the CRC code and the C-RNTI. As an alternative example, scrambling an information bit indicating the preemption indication with the entirety or a part of the C-RNTI may be used. As an alternative example, the CRC code may be derived using a bit string obtained by concatenating the information bit indicating the preemption indication with the entirety or the part of the C-RNTI. The bit string may be used for the other coding processes.

As an alternative example, the information on the UE to be preempted may be used for modulation. For example, information on a sequence for the DMRS associated with the preemption indication may be determined using the information on the UE to be preempted. The information on the sequence may be, for example, a root index in a Zadoff-Chu (ZC) code, an amount of a cyclic shift (may be hereinafter referred to as CS), or a combination of the two. For example, the root index in the ZC code and the amount of the cyclic shift may be determined using the C-RNTI. As an alternative example, the information on the sequence may be a scrambling identifier. This can, for example, reduce the amount of processing in the UEs other than the UE to be preempted.

As an alternative example, a constellation value of each RE after preemption information is modulated may be changed using the information on the UE to be preempted. For example, a predetermined number of bits of the C-RNTI may be extracted from the beginning and converted into constellation values. Then, operations on the obtained constellation values with the constellation value of the first RE after the preemption information is modulated may be performed, and the results may be used for transmission. A predetermined number of bits of the C-RNTI may be extracted from the bit next to the extracted bits and converted into constellation values. Then, operations on the obtained constellation values with the constellation value of the second RE after the preemption information is modulated may be performed. From then on, the operation on the constellation value of each RE after the preemption information is modulated with the C-RNTI may be similarly performed. The operations may be, for example, complex multiplication. In the complex multiplication, a complex conjugate may be used for the constellation value of each RE after the preemption information is modulated and/or the constellation value converted from the C-RNTI. The operations can, for example, reduce the amount of computation in the modulating process.

The following (1) to (6) are disclosed as pieces of information included in the preemption indication to be transmitted from the gNB to the UE to be preempted.

(1) Frequency resources to be used for the preempted transmission (2) Time resources to be used for the preempted transmission (3) The presence or absence of the uplink transmission of the UE to be preempted (4) The uplink transmission power of the UE to be preempted (5) Information on the frequency/time resources to be used for transmitting the uplink data which overlaps that in the preempted transmission; Listed below are three specific examples of (5-1) to (5-3) as the information:

(5-1) no transmission;

(5-2) transmission overlapping the preempted transmission; and (5-3) transmission with the frequency/time resources other than those for the preempted transmission.

(6) Combinations of (1) to (5) above (1) may be configured, for example, per RB. This enables, for example, the UE to be preempted to transmit the uplink data with the frequency resources other than those to be used for the preempted transmission.

(2) may be configured, for example, per symbol. The unit of the symbol may be a unit of a symbol in the UE to be preempted. This enables, for example, the UE to be preempted to transmit the uplink data in a symbol other than those to be used for the preempted transmission.

In (3), for example, the uplink transmission of the UE to be preempted need not be performed. The interference to the preempted communication can be reduced. This can, for example, enhance the reliability in the preempted communication. As an alternative example, the uplink transmission of the UE to be preempted may be performed. This, for example, facilitates the uplink transmission control in the UE to be preempted.

(4) may be, for example, a value of the uplink transmission power per se or a value indicating a difference between uplink transmission powers. Consequently, for example, reduction in the uplink transmission power of the UE to be preempted with the preempted transmission timing can ensure the reliability of the preempted transmission.

In (5-1), the UE to be preempted need not transmit the uplink data which overlaps that in the preempted transmission. For example, that UE may mask the uplink data which overlaps that in the preempted transmission. This can facilitate processes in the gNB and the UE and ensure the reliability of the preempted transmission.

In (5-2), the UE to be preempted may transmit the uplink data which overlaps that in the preempted transmission with the frequency/time resources in the preempted transmission. This further facilitates the processes in the gNB and the UE.

In (5-3), the UE to be preempted may reallocate the uplink data which overlaps that in the preempted transmission, to frequency/time resources different from those in the preempted transmission to transmit the uplink data. Information on the frequency/time resources to be used for the reallocation may be included in (5-3). In the time resources for the preempted transmission, frequency resources different from those in the preempted transmission may be used. Alternatively, frequency/time resources later than the time resources for the preempted transmission may be used. Since this can, for example, ensure the continuity in the uplink transmission data of the UE to be preempted, for example, the HARQ decoding performance in the gNB can be improved.

As an alternative example in (5-3), the UE to be preempted may redo the coding and modulating processes. The redo may be applied, for example, to the uplink data to be transmitted with the time resources after the preempted transmission. For example, a coding rate may be increased in the redo. A method for redoing the coding and modulating processes with the preempted transmission (for example, a coding rate or data to be recoded) may be predefined in a standard. The UE to be preempted may notify the base station of information on the method. The UE may give the notification via, for example, the uplink L1/L2 signaling or the MAC signaling. This can, for example, prevent a transmission loss of the uplink data from the UE to be preempted due to the preempted transmission.

The gNB may include, in the preemption indication, information on activation/deactivation of the preempted transmission. The timing to activate the preempted transmission may be determined, for example, by further selecting whether transmission is possible from among the transmission timings with which the preempted communication may be performed. The preempted UE may determine the presence or absence of the preempted communication, using the information. Only information on the activation may be used instead of the information on activation/deactivation. The preempted UE may determine that the preempted transmission is deactivated, from the absence of the information on the activation. This enables, for example, the preempted UE to reserve many time resources with which the uplink transmission is possible.

The gNB may broadcast and/or notify the preemption indication to the UEs that may be preempted. The UEs that may be preempted may be all or a part of the UEs being served by the cell. In the following third embodiment, a notification from the gNB to the preempted UE may be a broadcast and/or a notification to the UEs that may be preempted.

Broadcast information may be used as the preemption indication to all the UEs being served by the cell. Alternatively, a notification similar to the notification to the preempted UE may be used. The notification may be coded and/or modulated, for example, using the RNTI for system information. Alternatively, the notification may be coded and/or modulated, for example, using a common identifier in a beam of the base station to be used by the UE, e.g., an identifier of the beam. The UE in the cell may obtain the notification using the RNTI. Consequently, for example, the preemption indication can be given to a plurality of UEs with less amount of signaling.

The notification similar to the notification to the preempted UE may be used as the preemption indication for a part of the UEs being served by the cell. The notification may be coded and/or modulated using, instead of the C-RNTI, for example an identifier of a group (e.g., the RNTI of the group) to which the part of the UEs belong. Consequently, for example, the preemption indication can be given to a plurality of UEs with less amount of signaling. The group may be determined, for example, using a service to be used in the communication system (e.g., the eMBB) or by another method. For example, the identifier of the group may be given using an identifier of the service.

As an alternative example, the gNB may notify the UEs in a part of the beams of the preemption indication. The part of the beams may be, for example, a beam to be used by the UE that performs the preempted communication or a beam to be used by the UE to be preempted.

The UEs in the part of the beams may be, for example, all the UEs in the beam. The notification similar to the notification to the preempted UE may be used as the preemption indication to all the UEs in the beam. The notification may be coded and/or modulated, for example, using the RNTI for system information instead of the C-RNTI. Alternatively, the notification may be coded and/or modulated, for example, using a common identifier in the beam, e.g., an identifier of the beam. An identifier of the beam may be newly provided.

The UEs in the part of the beams may be, for example, a part of the UEs in the beam. The notification similar to the notification to the preempted UE may be used as the preemption indication for the part of the UEs in the beam. The notification may be coded and/or modulated using, instead of the C-RNTI, for example an identifier of a group (e.g., the RNTI of the group) to which the part of the UEs belong. The group may be determined, for example, using a service to be used in the communication system (e.g., the eMBB) or by another method. For example, the identifier of the group may be given using an identifier of the service.

The UE to be preempted receives the preemption indication. That UE may stop the uplink transmission as an operation of the uplink transmission which overlaps the preempted transmission. This can, for example, ensure the reliability in the preempted transmission. The UE need not transmit (e.g., may mask) the uplink data that is scheduled to be transmitted in a section where the uplink transmission has been stopped. Alternatively, the UE may reallocate the uplink data that is scheduled to be transmitted in the section where the uplink transmission has been stopped, to the other frequency/time resources to transmit the uplink data. The example described in (5-3) that is disclosed as the piece of information included in the preemption indication to be transmitted from the gNB to the UE to be preempted may be applied to the reallocation method.

As an alternative example, the UE may perform the uplink transmission which overlaps the preempted transmission. The following (1) to (4) are disclosed as examples of the uplink transmission which overlaps the preempted transmission:

(1) transmission with low power;
(2) transmission with the frequency resources thinned out;
(3) transmission with the time resources thinned out; and
(4) combinations of (1) to (3) above.

Reduction in the uplink transmission power which overlaps that in the preempted transmission in (1) can, for example, ensure the reliability in the preempted transmission.

In (2), the UE may thin out the frequency resources per RB or per RE to transmit the frequency resources. This produces the same advantages as those in, for example, (1).

In (3), the UE may thin out the time resources, for example, per symbol to transmit the time resources. This produces the same advantages as those in, for example, (1).

In (2) to (4), the UE to be preempted may redo the coding and modulating processes similarly as the example described in (5-3) that is disclosed as the piece of information included in the preemption indication to be transmitted from the gNB to the UE to be preempted. The example described in (5-3) that is disclosed as the piece of information included in the preemption indication to be transmitted from the gNB to the UE to be preempted may be applied to the redoing method. This can, for example, prevent a transmission loss of the uplink data from the UE to be preempted due to the preempted transmission.

One or more setup patterns may be provided in advance for the operations of the uplink transmission which overlaps the preempted transmission in the UE. The patterns may be defined in a standard or determined by the gNB. The gNB may broadcast or dedicatedly notify the determined setup patterns to the UE. The gNB may give the notification via the RRC dedicated signaling.

The gNB may include, in the preemption indication to be transmitted to the UE, identifiers indicating the setup patterns. Consequently, for example, reduction in transmission size of the preemption indication can reduce the frequency resources to be used for transmitting the preemption indication.

As an alternative example, the gNB need not include, in the preemption indication, the identifiers indicating the setup patterns. For example, when the number of the setup patterns is one, the gNB need not include, in the preemption indication, the identifier indicating the setup pattern. This can, for example, further reduce the frequency resources to be used for transmitting the preemption indication.

The gNB may notify the preempting UE of the uplink grant. The gNB may transmit the uplink grant to that UE even in the absence of the SR from the UE.

The UE may perform the preempted transmission with the uplink grant. Alternatively, the UE need not perform the preempted transmission. The UE need not perform the preempted transmission in the absence of the uplink data to be preemptively transmitted.

The preemption indication from the gNB to the preempted UE and the uplink grant from the gNB to the preempting UE may be given via the same signaling. For example, the PDCCH common to a plurality of UEs may be used as the signaling. This can, for example, reduce the amount of signaling from the gNB to each UE.

As an alternative example, the preemption indication from the gNB to the preempted UE and the uplink grant from the gNB to the preempting UE may be given via different signalings. For example, the gNB may transmit the uplink grant earlier than the preemption indication. This enables, for example, the preempting UE to keep the time for the coding and modulating processes after receiving the uplink grant.

The symbol lengths to be used in the preemption indication and the uplink grant may be different from each other. Alternatively, different TTIs may be used for the preemption indication and the uplink grant. Consequently, for example, even when the preempted UE and the preempting UE use different symbol lengths and/or TTIs, the methods described in the third embodiment are applicable.

The gNB may periodically transmit the preempted notification to the preempted UE. The period may be defined in a standard, or determined by the gNB to be broadcast to the UEs being served thereby or dedicatedly notified to each UE. The gNB may give the notification via the RRC dedicated signaling. The uplink grant from the gNB to the preempting UE may be handled in the same manner as the preempted notification.

The preempted notification may be the preemption indication.

The gNB may change the period. The gNB may change the period, for example, via the RRC dedicated signaling. The changed period may be, for example, a radio frame, a slot, a mini-slot, a symbol, or another time unit. Consequently, for example, when the gNB prolongs the period, the frequency of receiving the preemption indication in the preempted UE is reduced. As a result, the power consumption in the preempted UE can be reduced.

The gNB may aperiodically perform the preemption indication to the preempted UE. The preempted UE may always perform an operation of receiving the preemption indication with the frequency resources with which the preemption indication is transmitted, or may perform the receiving operation with the preemption indication transmission timing notified in advance from the gNB. The gNB may notify the preemption indication transmission timing to the preempted UE, for example, via the RRC signaling.

The preempted UE may monitor the PDCCH for the preempting UE as an alternative example where the gNB aperiodically performs the preemption indication to the preempted UE. The gNB may code the PDCCH for the preempting UE, using an identifier of a group of the UEs including the preempting UE and the preempted UE. The identifier of the group may be, for example, an identifier of a beam, the RNTI for system information, or another identifier.

As an alternative example, the gNB may notify in advance the preempted UE of an identifier of the preempting UE, for example, the C-RNTI. An identifier of a group of the UEs that may perform the preempted communication may be used instead of the identifier of the preempting UE. The preempting UE should belong to the group.

The preempted UE may obtain information on the PDCCH for the preempting UE, using the identifier of the group of the UEs including the preempting UE and the preempted UE, the identifier of the preempting UE, for example, the C-RNTI of the preempting UE, or the identifier of the group of the UEs that may perform the preempted communication. The preempted UE may determine, using the information, the presence or absence of the preempted transmission and the frequency/time resources to be used for the preempted transmission. This, for example, eliminates the need for new frequency resources for the preemption indication, which consequently enables the communication system to be efficiently used.

The gNB may semi-persistently perform the preemption indication to the preempted UE. This can, for example, reduce the number of transmissions of the preemption indication from the gNB, which can consequently reduce the power consumption in the gNB. The semi-persistent notification may include a part or the entirety of the information disclosed in the third embodiment as the information included in the preemption indication for the preempted UE. The semi-persistent notification may include a validity period of the notification, that is, information indicating by which period the notification includes information on the preempted transmission.

The gNB may give the semi-persistent notification with predefined frequency/time resources. The gNB may give the semi-persistent notification, for example, using the broadcast information, via the RRC dedicated signaling, via the MAC signaling, or via the L1/L2 signaling. Alternatively, the frequency/time resources may be newly provided for transmitting the semi-persistent notification. The gNB may notify the preempted UE of information on the resources in advance.

The gNB may semi-statically perform the preemption indication to the preempted UE. This can, for example, reduce the amount of signaling from the gNB to the preempted UE. The semi-static notification may include a part or all of the pieces of information (1) to (6) disclosed as the information included in the preemption indication to be transmitted from the gNB to the UE to be preempted, as the information included in the preemption indication for the preempted UE. The gNB may give the semi-static notification, for example, with the broadcast information or via the RRC dedicated signaling.

A plurality of the methods may be combined. For example, the gNB may combine a semi-static preemption indication with a preemption indication with the PDCCH to notify the preempted UE of the combined preemption indication. For example, the gNB may include, in the semi-static preemption indication, information on the preempted transmission timing and the frequency resources or information on operations of the preempted UE upon occurrence of the preempted transmission. The gNB may include, in the preemption indication with the PDCCH, the information on activation/deactivation of the preempted transmission. The preempted UE may stop the uplink transmission using the semi-static preemption indication and the preemption indication with the PDCCH, for example, with the transmission timing to activate the preempted transmission. Consequently, for example, the gNB can perform the preemption indication to the preempted UE with less amount of signaling.

As an alternative example, the gNB may include, in the semi-static preemption indication, the information on operations of the preempted UE upon occurrence of the preempted transmission. The gNB may include, in the preemption indication with the PDCCH, the information on the preempted transmission timing and the frequency resources. The preempted UE may stop the uplink transmission using the semi-static preemption indication and the preemption indication with the PDCCH, for example, with the preempted transmission timing. This enables, for example, flexible control over the frequency/time resources in the preempted communication in addition to the aforementioned advantages.

As an alternative example of the combinations of the plurality of methods, the gNB may use a semi-persistent preemption indication and the preemption indication with the PDCCH. Information included in the semi-persistent preemption indication may be identical to that on the semi-static preemption indication, or include information on the validity period of the notification. This produces the same advantages as previously described.

Figure 32:
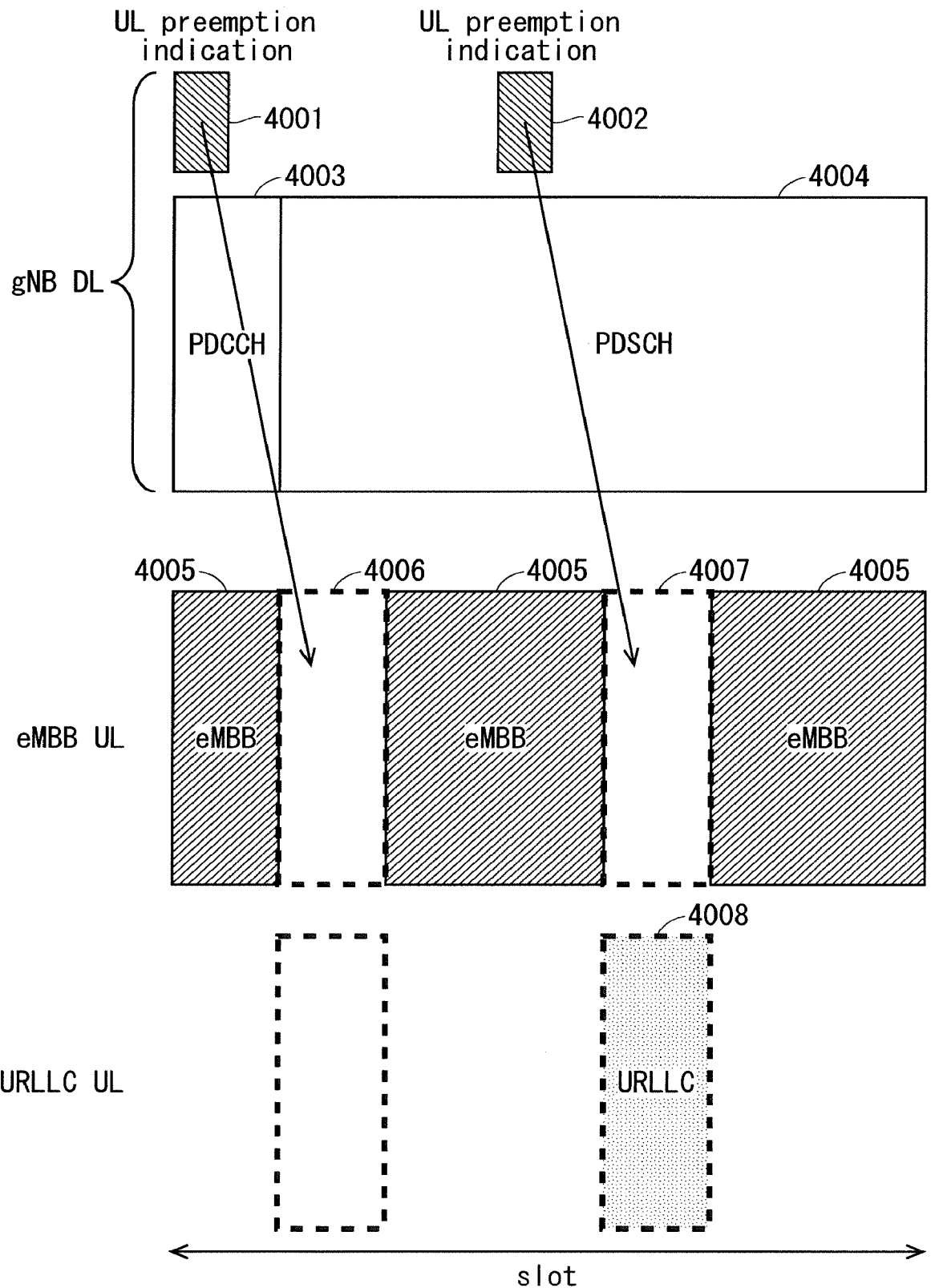
FIG. 32 illustrates an example where an uplink preemption indication is performed with a region in the frequency resources different from that to be used for transmitting and receiving downlink user data according to the third embodiment.

FIG. 32 illustrates an example where the gNB performs an uplink (UL) preemption indication to the preempted UE with a region in the frequency resources different from that to be used for transmitting and receiving the downlink user data to and from the pre-empted UE. FIG. 32 illustrates an example of the FDM. FIG. 32 illustrates an example where the preempted UE performs the eMBB communication whereas the preempting UE performs the URLLC communication. FIG. 32 illustrates an example where the timing with which the preempted transmission is possible appears twice per slot.

In FIG. 32, the gNB transmits uplink preemption indications 4001 and 4002 to the preempted UE. The gNB may transmit the uplink preemption indications with frequency resources different from those of a PDCCH 4003 and a PDSCH 4004. The preempted UE stops eMBB uplink communication 4005 with a timing 4006 indicated by the uplink preemption indication 4001. The preempted UE stops the eMBB uplink communication 4005 also with a timing 4007 indicated by the preemption indication 4002. The preempting UE does not perform the URLLC communication with the timing 4006, and transmits URLLC communication 4008 with a timing 4007.

Figure 33:
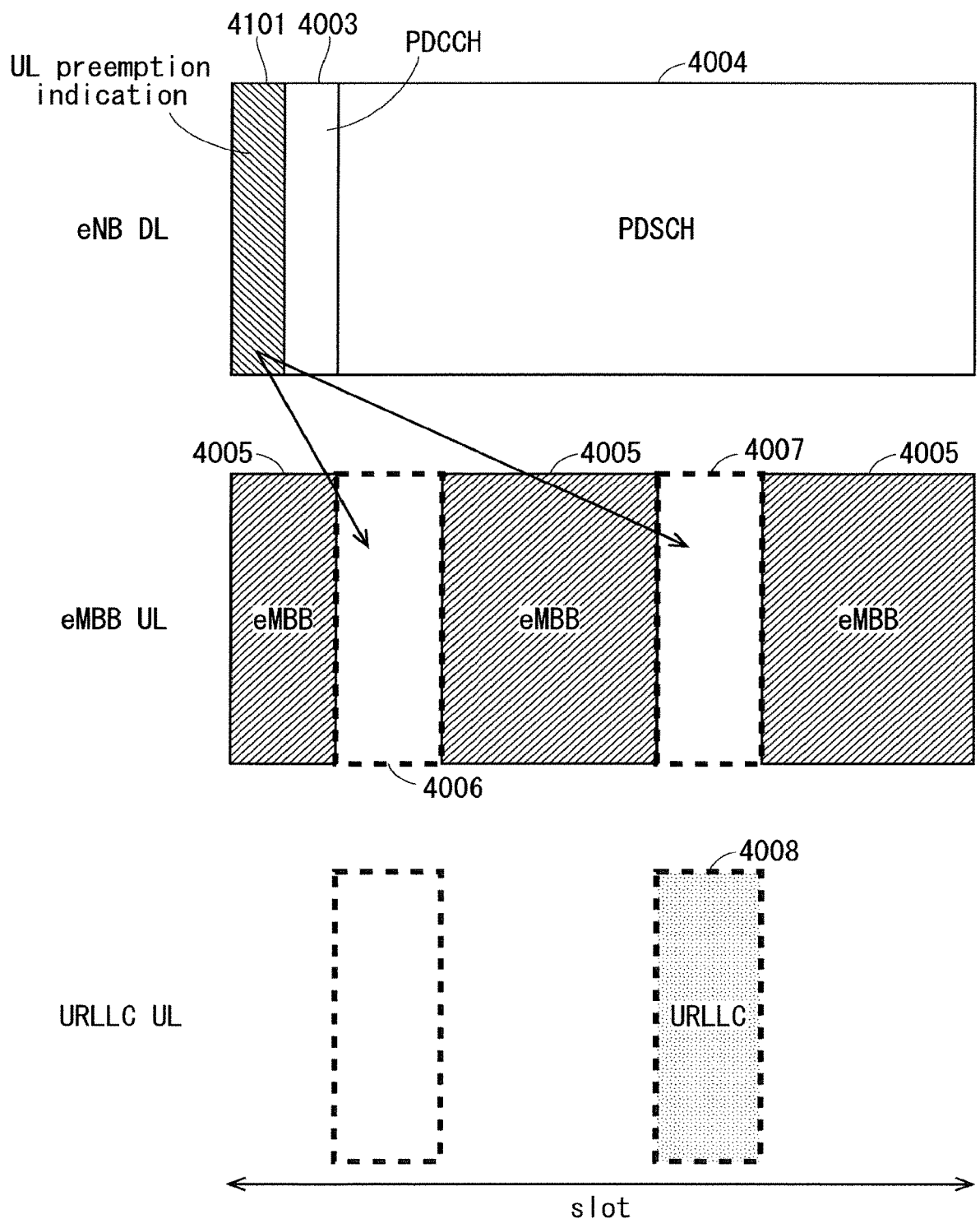
FIG. 33 illustrates an example where the uplink preemption indication is performed with the PDCCH according to the third embodiment.

FIG. 33 illustrates an example where the eNB performs the uplink preemption indication to the preempted UE with the PDCCH. FIG. 33 illustrates an example of the FDM. FIG. 33 illustrates an example where the preempted UE performs the eMBB communication whereas the preempting UE performs the URLLC communication. FIG. 33 illustrates an example where the timing with which the preempted transmission is possible appears twice per slot. In FIG. 33, the same numbers are assigned to the signals overlapping those in FIG. 32, and the common description thereof is omitted.

An uplink preemption indication 4101 is transmitted to the preempted UE with a first symbol of the PDCCH 4003 in FIG. 33. The uplink preemption indication 4101 includes information on the preempted communication timings 4006 and 4007. The preempted UE receives the uplink preemption indication 4101 to obtain the information on the timings 4006 and 4007. The preempted UE stops eMBB uplink transmission with the timings 4006 and 4007.

Since FIG. 33 is identical in the other respects to FIG. 32, the description thereof is omitted.

Although the uplink preemption indication 4101 is transmitted with the first symbol of the PDCCH 4003 in FIG. 33, the first symbol need not be used. For example, the last symbol or a halfway symbol may be used. The uplink preemption indication 4101 may occupy a part of the frequency resources of the PDCCH 4003.

Although FIG. 33 illustrates the example of the FDM, it may be applied to the TDM. For example, the uplink preemption indication 4101 may be included in the PDCCH 4003 to be transmitted in the TDM. The preempted communication timing indicated by the uplink preemption indication 4101 may be included in the UL transmission timing in the TDM. This also enables, for example, transmission of the uplink preemption indication from the base station to the preempted UE in the TDM.

The gNB may provide the timing with which the preempted transmission is possible once or a plurality of times per slot. The gNB may concentrate on one or more timings to be allocated to a plurality of UEs that can perform the preempted transmission. This can, for example, reserve the uplink transmission resources in the preempted UE even when there are many UEs that can perform the preempted transmission. Alternatively, the gNB may disperse, into a plurality of timings, the timing to be allocated to a plurality of UEs that can perform the preempted transmission. This can, for example, reduce the possibility of contention in the preempted transmission timing among the plurality of UEs that can perform the preempted transmission.

The gNB may receive contention-based preempted transmissions from a plurality of preempting UEs. The gNB and the preempting UEs may perform a process of retransmitting the preemption using the HARQ feedback. This enables the gNB to sequentially receive the contention-based preemptions.

Another solution is disclosed. The gNB notifies, in advance, the preempted UE of the time resources and/or the frequency resources with which the preempted communication may occur. The notification may include information on a period of the preempted communication. The notification may include information on operations which overlap the preempted transmission, in the operations of the uplink transmission in that UE. The information on operations may be, for example, information indicating stopping the uplink transmission or the pieces of information of (1) to (4) disclosed as the examples of the uplink transmission which overlaps the preempted transmission. The gNB may broadcast the notification to the UEs being served by the gNB, or dedicatedly give the notification to the preempted UE. The gNB may give the dedicated notification via the RRC dedicated signaling, for example, the signaling for the RRC connection reconfiguration. In response to the notification, the preempted UE may stop the uplink transmission or perform the operations indicated by (1) to (4) disclosed as the examples of the uplink transmission which overlaps the preempted transmission. This, for example, eliminates the need for a dynamic preemption indication to the preempted UE, which can result in efficient use of the frequency/time resources.

This solution is different from the solution using the preemption indication by semi-statically notifying the information on the preempted transmission to the preempted UE.

The gNB may give the notification to the preempting UE. In other words, the gNB may notify, in advance, the preempting UE of the time resources and/or the frequency resources with which the preempted communication may be performed. This facilitates the scheduling in the preempting UE.

The gNB may notify the preempting UE of the uplink grant. Information included in the uplink grant and operations of the preempting UE after receiving the uplink grant may be identical to those for the solution using the preemption indication. Since this enables, for example, dynamic scheduling of the preempting UE according to a radio channel state, the reliability of the preempted communication can be ensured.

Another solution is disclosed. The gNB applies the transmission without grant to the preempting UE. In other words, the gNB notifies the preempting UE of the time resources and/or the frequency resources with which the preempted communication may be performed. The notification may include information on a period of the preempted communication. The notification may include information on the uplink grant for the preempting UE. The gNB may broadcast the notification to the UEs being served by the gNB, or dedicatedly give the notification to the preempting UE. The dedicated notification may be given via the RRC dedicated signaling, for example, the signaling for the RRC connection reconfiguration.

The method for notifying the time resources and/or the frequency resources with which the preempted communication may occur, which is indicated as the solution, may be applied to the notification from the gNB to the preempted UE and operations of that UE. This can reduce the amount of signaling for the notification from the gNB to the preempted UE.

The notification from the gNB to the preempted UE and the broadcast and/or notification from the gNB to the preempting UE may be performed via different signalings. As an alternative example, the same signaling may include both of the pieces of information. This can reduce the amount of signaling from the gNB to each UE.

As an alternative example of applying the transmission without grant, the gNB may broadcast or notify, in advance to the preempting UE, information on the transmission timing with which the preempted communication may be performed and/or information on the transmission power. The transmission timing may be information on a transmission period. The information on the transmission timing may be broadcast or notified per mini-slot or per symbol. The broadcast or the notification may be given via the RRC signaling.

The gNB may notify the preempting UE of information on activation/deactivation of the preempted transmission. The timing to activate the preempted transmission may be determined, for example, by further selecting whether transmission is possible from among the transmission timings with which the preempted communication may be performed. Only information on the activation may be used instead of the information on activation/deactivation. The preempting UE may determine that the preempted transmission is deactivated, from the absence of the information on the activation.

The gNB may include, in the information on activation/deactivation of the preempted transmission, information on resources to be used for the preempted transmission. The resources may be information on time resources or information on frequency resources. The gNB may include, in the information on activation/deactivation of the preempted transmission, information necessary for modulating and/or coding the preempted transmission. The information necessary for modulating and/or coding may be, for example, information on a modulation scheme, information on a coding rate, or information on a HARQ process number.

The gNB may transmit the information on activation/deactivation of the preempted transmission with the PDCCH for the preempting UE. Alternatively, the frequency/time resources may be newly provided for transmitting the information. The gNB may notify, in advance, the preempting UE of information on the new frequency/time resources.

The gNB may notify the preempted UE of information on the preempted transmission. The information may be identical to that on the preemption indication which is disclosed in the third embodiment. The information may include, for example, information on the transmission timing. The information on the transmission timing may be, for example, information on the timing with which the preempted transmission is activated. The information may include a part or the entirety of the information on activation/deactivation which is notified from the gNB to the preempting UE. The preempted UE may determine the timing with which the preempted transmission may occur, using the information.

The gNB may transmit the information on the preempted transmission to the preempted UE with the PDCCH for the preempted UE. Alternatively, the frequency/time resources may be newly provided for transmitting the information. The gNB may notify, in advance, the preempted UE of information on the new frequency/time resources.

The third embodiment can reduce the latency in the preempted communication. Furthermore, the third embodiment can ensure the reliability in the preempted communication.

The First Modification of the Third Embodiment

The following problem occurs in the uplink preempted transmission. Specifically, when the gNB notifies the preempted UE of information on the timing with which the preempted transmission may occur, the preempted UE performs operations such as stopping the uplink transmission or transmission with low power, even in the presence of the frequency/time resources with which the preempted transmission does not actually occur. Thus, a problem of decrease in the uplink transmission efficiency in the preempted UE occurs.

A solution to the problem is disclosed below.

The preempting UE notifies the gNB of information requesting the preempted transmission. The information may be, for example, a predetermined code. The predetermined code may be generated by a sequence that does not require or facilitates a coding process and a decoding process. The predetermined code may be, for example, a Zadoff-Chu (ZC) code, an M-sequence, or the Hadamard code. The preempting UE may notify the gNB of the information immediately after preempted transmission data occurs.

The following (1) to (8) are disclosed as examples of information on the predetermined code:

(1) a sequence in the ZC code (for example, a value q);
(2) a cyclic shift;
(3) the number of symbols;
(4) the number of transmissions;
(5) information on the frequency hopping;
(6) information on the sequence hopping;
(7) information on the transmission timing; and
(8) combinations of (1) to (7) above.

(1) may be, for example, a root index in the ZC code.

The number of symbols in (3) may be, for example, one or more. For example, the use of one symbol enables a prompt notification of the code. For example, since the use of a plurality of symbols can increase the sequence length of the code, the reliability can be enhanced.

In (4), the reliability in the notification of the code can be enhanced, for example, with a plurality of transmissions.

In (5), the reliability in the notification of the code can be enhanced, for example, with frequency diversity.

Avoiding, with (6), the interference occurred when the same code is transmitted from the other UEs and/or the other base stations can enhance the reliability in the notification of the code.

Information of (7) may be, for example, information on the temporal resolution with which the UE can transmit the code. The temporal resolution may be configured, for example, for each symbol, for each mini-slot, or for each slot. Consequently, when the temporal resolution is configured for each symbol, the code can be promptly notified.

The pieces of information on the predetermined code may be determined in a standard. The pieces of information may be, for example, common to the UEs being served by the gNB. The pieces of information may be determined dedicatedly for each UE. The pieces of information may be determined using an identifier of the UE (for example, a UE-ID). Since this eliminates the need for, for example, a process of assigning a code to the UE, the amount of the process of assigning the code can be reduced.

As an alternative example, the gNB may determine the pieces of information on the predetermined code, and notify them to the UE. The pieces of information may be common to the UEs being served by the gNB. The pieces of information may be determined using an identifier indicating a base station (for example, a gNB-ID) or using an identifier indicating a cell (for example, a cell-ID). Alternatively, the gNB may allocate the pieces of information dedicatedly to the respective UEs. The gNB may broadcast the pieces of information to the respective UEs, or semi-statically notify each of the UEs of the pieces of information via the RRC dedicated signaling. This can, for example, reduce the amount of signaling for notifying the pieces of information. Alternatively, the gNB may dynamically notify the pieces of information via the MAC signaling. This can, for example, ensure the reliability with the retransmission control, and flexibly allocate the pieces of information according to states of the surrounding cells or the UEs being served thereby, etc. Alternatively, the gNB may give the notification via the L1/L2 signaling. This enables, for example, a prompt notification.

The number of the pieces of information on the predetermined code may be one or more for each UE. When a plurality of codes are used, for example, the codes may be separately used with information on the amount of data in the uplink preempted transmission. This enables, for example, the gNB to perform flexible scheduling with the amount of data in the uplink preempted transmission.

The bands at which the preempting UE transmits the predetermined code may be all or a part of the bands available for the preempting UE. The bands at which the preempting UE transmits the predetermined code may be non-consecutive bands per RB or per RBs. The bands at which the preempting UE transmits the predetermined code may be non-consecutive bands per RE or per REs. The bands at which the preempting UE transmits the predetermined code may be a combination of these two. In other words, the predetermined code may be allocated to the non-consecutive bands per RE or per REs in the non-consecutive bands per RB or per RBs. This enables, for example, flexible allocation of the bands.

The bands at which the preempting UE transmits the predetermined code may be bands different from those available for the preempted UE. In other words, transmission of the uplink signal from the preempted UE and transmission of the predetermined code from the preempting UE may be performed at different frequency bands. This can, for example, reduce the interference power when the gNB receives the predetermined code. This can result in enhancement of the reliability in transmission of the predetermined code from the preempting UE.

As an alternative example, the bands at which the preempting UE transmits the predetermined code may include a part or all the bands available for the preempted UE. In other words, transmission of the uplink signal from the preempted UE and transmission of the predetermined code from the preempting UE may be performed at frequency bands which at least partly overlap. The gNB may simultaneously receive the predetermined code and the uplink signal. The gNB may separate the predetermined code from the uplink signal. In the separation, the gNB may extract the predetermined code from the signals simultaneously received, using the same pattern as that of the predetermined code. The gNB may process the remaining extracted signal as the uplink signal from the preempted UE. This can result in, for example, efficient use of the frequency resources in the communication system.

The bands at which the preempting UE transmits the predetermined code may be determined in a standard, or determined by the gNB to be notified to that UE. The same method as that for notifying the pieces of information on the predetermined code may be applied to the notification method.

The timing with which the preempting UE transmits the predetermined code may be predetermined in a standard. The preempting UE may transmit the code, for example, in a symbol earlier by a predetermined duration from the start of the preempted transmission. As an alternative example, the preempting UE may transmit the code in a predetermined symbol in a mini-slot preceding one or more mini-slots in which the preempted transmission is performed.

The number of the symbols earlier by the predetermined duration may be plural. The preempting UE may transmit the predetermined code using a part or all the plural symbols. For example, when a part of the plural symbols include the timing with which the preempted transmission is impossible, the preempting UE may transmit the predetermined code using symbols obtained by excluding the timing with which the preempted transmission is impossible from the plural symbols. This can, for example, increase the flexibility in configuring the preempted transmission. As an alternative example, the preempting UE may repeatedly transmit the predetermined signal using all the plural symbols. This can, for example, enhance the reliability when the preempting UE transmits the predetermined code.

As an alternative example, the gNB may determine the timing with which the preempting UE transmits the predetermined code. The gNB may broadcast or dedicatedly notify the timing to the UEs being served thereby. The gNB may give the notification via the RRC dedicated signaling. When determining the timing, the gNB may use the processing capability on reception of the code in its own gNB, the processing capability on transmission of the code in the UE, or the processing capability on transmitting, in its own gNB, and/or the processing capability on receiving, in the UE, the predetermined code to be transmitted from the gNB to the preempted UE, which is described later. The processing capability on transmission of the code in the UE and/or the processing capability on receiving the predetermined code to be transmitted from the gNB to the preempted UE, in that UE may be, for example, included in the UE capability. This enables, for example, the gNB to determine the timing so as not to be late for the processing times of the gNB and the UE with the code.

The preempting UE may transmit the predetermined code with the timing different from the transmission timings of the DMRS and/or the PUCCH and/or the SRS from the preempted UE. The transmissions with the different timings may be applied when, for example, the predetermined code and the DMRS, the PUCCH, or the SRS are transmitted with the same frequency resources. The preempting UE may change the transmission timing of the predetermined code. The transmission timing of the predetermined code may be changed, for example, within a range of a plurality of symbols in which the predetermined code can be transmitted from the preempting UE. This enables, for example, the preempting UE to promptly notify the gNB of the predetermined code. The gNB may notify, in advance, the preempting UE of information on the transmission timings of the DMRS and/or the PUCCH and/or the SRS from the preempted UE. Alternatively, the information on the timings may be predefined in a standard. This enables, for example, the preempting UE to recognize the timing with which the predetermined code can be transmitted.

The preempting UE may prevent transmission of the predetermined code when the range in which the predetermined code can be transmitted does not include, for example, the timing different from the transmission timings of the DMRS and/or the PUCCH and/or the SRS from the preempted UE. The preempting UE may transmit the predetermined code in the next range in which the predetermined code can be transmitted. This can, for example, avoid the complexity of control over the preempted transmission in the communication system.

The method for changing the transmission timing of the predetermined code may be predefined in a standard. Examples of the changing method may include a method for shifting the transmission timing of the predetermined code forward by one symbol within a range of a plurality of symbols in which the predetermined code can be transmitted, a method for shifting the transmission timing of the predetermined code backward by one symbol within the range, and a combined method of the two.

As an alternative example on the method for changing the transmission timing of the predetermined code, the gNB may dedicatedly notify the preempting UE of the changing method. The gNB may give the notification, for example, via the RRC dedicated signaling, the MAC signaling, or the L1/L2 signaling.

As an alternative example, the transmission timing of the predetermined code in a slot may be predefined in a standard, or broadcast or notified from the gNB to the preempting UE. The transmission timings of the DMRS and/or the PUCCH and/or the SRS from the preempted UE may be configured with the timing except for the transmission timing of the predetermined code. This can, for example, avoid the complexity of control over the preempted transmission in the communication system.

As an alternative example, the preempting UE may transmit the predetermined code with the same timing as the transmission timing of the DMRS from a preempted base station. The transmission with the same timing may be applied, for example, when the predetermined code and the DMRS are transmitted with different frequency resources.

The gNB may allocate different sequences to the predetermined code and the DMRS. This allocation may be applied, for example, when the predetermined code and the DMRS are transmitted with the same frequency resources. The gNB may notify the allocation to the preempted UE and/or the preempting UE. The gNB may give the notification, for example, via the RRC dedicated signaling, the MAC signaling, or the L1/L2 signaling. This enables, for example, the gNB to simultaneously receive both of the predetermined code and the DMRS.

As an alternative example, the predetermined code may be frequency-multiplexed with the DMRS. The frequency-multiplexing may be performed, for example, per subcarrier, per plurality of subcarriers, for each resource element group (REG), or in another method. The gNB may notify the preempted UE and/or the preempting UE of a method of the frequency-multiplexing. The gNB may give the notification, for example, via the RRC dedicated signaling, the MAC signaling, or the L1/L2 signaling. This enables, for example, the gNB to simultaneously receive both of the predetermined code and the DMRS.

The gNB receives the predetermined code transmitted from the preempting UE. Upon receipt of the code, the gNB recognizes a request for the preempted transmission.

The gNB notifies the preempted UE of information indicating the preempted transmission. The information may be, for example, a predetermined code. The predetermined code may be identical to a code to be transmitted from the preempting UE to the gNB as information indicating the request for the preempted transmission. The code to be used as the information to be transmitted from the gNB to the preempted UE may be identical to or different from the code to be used as the information to be transmitted from the preempting UE to the gNB. The gNB may transmit the information to the preempted UE immediately after recognizing the request for the preempted transmission.

Information identical to the information on the code to be transmitted from the preempting UE to the gNB may be applied to the information on the predetermined code. The same may hold true for a method for determining information on the predetermined code and a method for broadcasting and/or notifying the information from the gNB to the UEs being served thereby.

The number of the pieces of information on the predetermined code may be one or more for each UE. When a plurality of codes are used, for example, the codes may be separately used with information on the frequency resources to be used for the preempted transmission. This enables, for example, the gNB to perform flexible scheduling with the amount of data in the uplink preempted transmission.

The same method as that on the timing with which the preempting UE transmits the predetermined code may be applied to the transmission timing of the predetermined code.

The bands identical to those at which the preempting UE transmits the predetermined code may be applied to the bands at which the gNB transmits the predetermined code. For example, the bands at which the gNB transmits the predetermined code may be all or a part of the bands available for the preempted UE. As an alternative example, the vicinity of the center of the bands which the gNB uses may be used as the bands at which the gNB transmits the predetermined code. For example, the use of the bands identical to those for a synchronization signal or a broadcast channel enables the UEs being served by the gNB to receive the common code.

The preempted UE receives the predetermined code to be transmitted from the gNB. Upon receipt of the code, the gNB recognizes occurrence of the preempted transmission.

Upon receipt of the code, the preempted UE may stop the uplink transmission which overlaps the preempted transmission, or perform the operations indicated by (1) to (4) disclosed in the third embodiment as the examples of the uplink transmission which overlaps the preempted transmission. The operations in the preempted UE on the uplink transmission which overlaps the preempted transmission may be defined in a standard, or broadcast in advance or notified dedicatedly from the gNB to the preempted UE. The methods described in the third embodiment may be applied to the determination in a standard, the broadcast, or the dedicated notification.

The gNB notifies the preempting UE of information on the uplink grant for the preempted transmission. The information may be, for example, the uplink grant with the PDCCH for the preempting UE. As an alternative example, the information may be, for example, a predetermined code. The predetermined code may be identical to a code to be transmitted from the preempting UE to the gNB as the information indicating the request for the preempted transmission. The code to be used as the information to be transmitted from the gNB to the preempting UE may be identical to or different from the code to be used as the information to be transmitted from the preempting UE to the gNB.

Information identical to the information on the code to be transmitted from the preempting UE to the gNB may be applied to the information on the predetermined code to be notified from the gNB to the preempting UE. The same may hold true for a method for determining the information on the predetermined code and a method for broadcasting and/or notifying the information from the gNB to the UEs being served thereby.

The number of the pieces of information on the predetermined code to be notified from the gNB to the preempting UE may be one or more for each UE. When a plurality of codes are used, for example, the codes may be separately used with the information on the frequency resources to be used for the preempted transmission. As an alternative example, the codes may be separately used with information on the transmission power in the preempted communication. This enables, for example, the gNB to perform flexible scheduling in the uplink preempted transmission. The gNB may notify the preempting UE of the plurality of pieces of information in advance.

The same method as that on the timing with which the preempting UE transmits the predetermined code may be applied to the transmission timing of the predetermined code to be notified from the gNB to the preempting UE.

The bands identical to those at which the preempting UE transmits the predetermined code may be applied to the bands at which the gNB transmits the predetermined code to the preempting UE. The bands may be, for example, all or a part of the bands available for the preempting UE. As an alternative example, the bands may be the vicinity of the center of the bands which the gNB uses. For example, the use of the bands identical to those for a synchronization signal or a broadcast channel enables the UEs being served by the gNB to receive the common code.

The preempting UE performs the preempted transmission with information on the uplink grant.

In the absence of receipt of the information on the uplink grant, the preempting UE may determine a failure in a preemption request. The preempting UE may make the determination, for example, when the preempting UE cannot receive the information on the uplink grant until the predefined timing.

The preempting UE may retransmit the preemption request. The preempting UE may retransmit the preemption request, for example, when determining a failure in a preemption request. The preempting UE may retransmit the preemption request with the timing with which the preemption request can be transmitted, immediately after making the determination. Consequently, for example, the preempting UE can promptly make the preemption request.

The preempting UE may have a retransmission prohibition timer in the preemption request. The preempting UE need not transmit or retransmit the preemption request until the expiration of the retransmission prohibition timer. This can, for example, prevent exhaustion of the frequency/time resources with repetition of the retransmission of the preemption request.

The retransmission prohibition timer for the preemption request may be started, for example, upon transmission of the preemption request. The timer may be stopped, for example, upon receipt of the uplink grant from the gNB.

The value of the timer may be predefined in a standard, or determined and broadcast or dedicatedly notified to the preempting UE. The gNB may give the notification, for example, via the RRC signaling, the MAC signaling, or the L1/L2 signaling. The determination of the value of the timer by the gNB enables, for example, flexible control according to a use state of the frequency/time resources.

Figure 34:
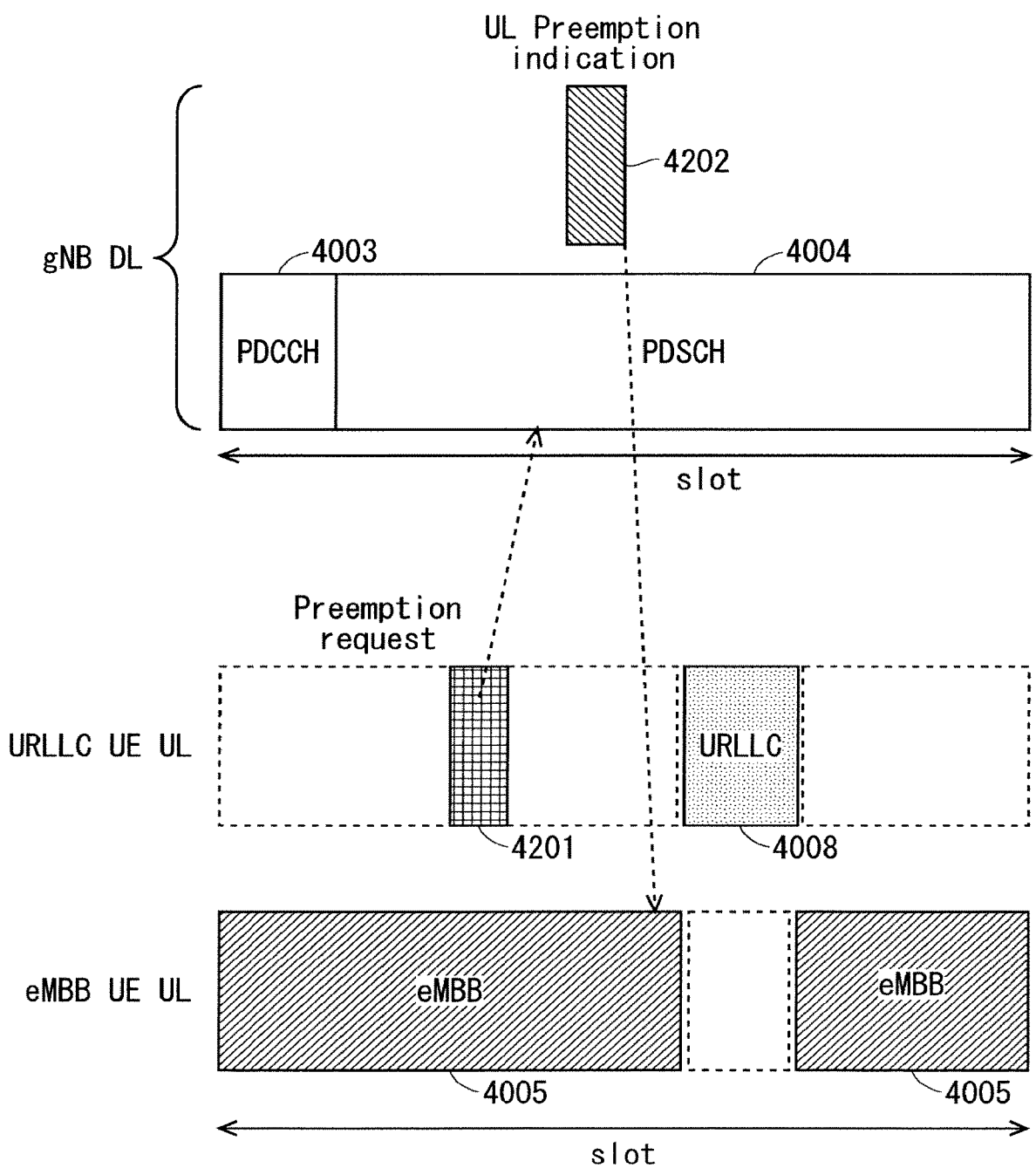
FIG. 34 illustrates an example where a predetermined code is used as information indicating the occurrence of preemption according to the first modification of the third embodiment.

FIG. 34 illustrates an example where a predetermined code is used as information indicating the preemption request. FIG. 34 illustrates an example of the FDM. FIG. 34 illustrates an example where the preempted UE performs the eMBB communication whereas the preempting UE performs the URLLC communication. In FIG. 34, the same numbers are assigned to the signals common to those in FIG. 32, and the common description thereof is omitted.

In FIG. 34, the preempting UE transmits a code 4201 indicating a preemption request to the gNB. The preempting UE may transmit the code 4201 at the bands to be used for the preempted communication or at bands different from such bands. Upon receipt of the code 4201, the gNB recognizes the preemption request. The gNB transmits an uplink preemption indication 4202 to the preempted UE. The uplink preemption indication 4202 may be identical to the code 4201 or identical to that in the third embodiment. The gNB may transmit the uplink preemption indication 4202 at the bands to be used for the PDCCH 4003 and the PDSCH 4004 or at bands different from such bands.

The first modification may be combined with the third embodiment for use. For example, the base station and the gNB notify, in advance, the preempted UE of the time resources and/or the frequency resources with which the preempted communication may occur. The notification may include information on operations which overlap the preempted transmission, in the operations of the uplink transmission in the UE. The preempting UE may transmit the predetermined code described in the first modification to the base station, and the base station may transmit the predetermined code described in the first modification to the preempted UE. Upon receipt of the predetermined code, the preempted UE may stop the uplink transmission or perform the operations indicated by (1) to (4) disclosed as the examples of the uplink transmission which overlaps the preempted transmission. In the absence of receipt of the predetermined code, the preempted UE may continue the uplink transmission. Since this enables, for example, the preempted UE to perform the uplink transmission with the frequency/time resources with which the preempted transmission does not actually occur, the uplink transmission efficiency in the preempted UE can be ensured.

Since the first modification does not require or facilitates processes of decoding the SR in the gNB and coding the uplink grant and the uplink preemption indication, the prompt notification is possible. Since the preempted UE can perform the uplink transmission with the frequency/time resources with which the preempted transmission does not actually occur, the uplink transmission efficiency in the preempted UE can be ensured.

The Fourth Embodiment

In the LTE-NR coexistence with the same downlink carriers, the gNB transmits an NR signal with the MBFSN subframe in LTE. The gNB transmits the NR signal with the MBFSN subframe. The gNB may transmit the NR signal with a non-MBFSN subframe. The gNB may use mini-slots to transmit the NR signal.

The gNB and the LTE base station (eNB) may be or need not be base stations that configure the DC in a UE. For example, the gNB and the eNB may be adjacent base stations. This can, for example, reduce interference from the gNB in the UE supporting only LTE.

The NR signal may be an SS signal, a PBCH, or include these two. The gNB may transmit the SS and the PBCH via each beam in one block (may be hereinafter referred to as an SS block).

The gNB may suddenly transmit the SS signal and the PBCH signal (may be hereinafter referred to as an SS burst). The gNB may transmit the SS signal and/or the PBCH signal, for example, in a predefined time. The gNB may transmit, per another predefined period, the SS signal and/or the PBCH signal in the predefined time. The gNB may transmit, in the SS block, the SS signal and/or the PBCH signal in the predefined time.

Application of the aforementioned methods creates the following problem. Specifically, an SS burst signal in NR contends with signals in the non-MBFSN in LTE, for example, a synchronization signal, broadcast information, and paging information. Consequently, the UE has a problem of failing to establish synchronization with the eNB and/or the gNB in the LTE-NR coexistence.

A solution to the problem is disclosed below.

Priorities are assigned to a signal in a non-MBFSN subframe in LTE and an SS burst signal in NR. For example, only one of the signals is transmitted in a section with a contention between the two signals. The signal in the non-MBFSN subframe in LTE may be, for example, a synchronization signal in LTE, a broadcast channel in LTE, or a paging signal in LTE. The SS burst signal in NR may be, for example, a synchronization signal in NR or a broadcast channel in NR.

For example, the signal in the non-MBFSN subframe in LTE may be prioritized. This can, for example, reduce interference in the non-MBFSN subframe in LTE. The gNB may prevent transmission of all or a part of the SS burst signals in a subframe overlapping the non-MBFSN subframe in LTE. The overlapping subframe may be replaced with an overlapping slot, an overlapping mini-slot, or an overlapping symbol. As an alternative example, the gNB may prevent transmission of only the SS burst signals in NR which overlap the signals in the non-MBFSN subframe. This can prevent unnecessary stop of the SS burst.

The gNB may transmit the SS burst signal in NR which overlaps the signal in the non-MBFSN subframe in LTE. Both of the signals may be mutually separable signals. For example, one of the signals may be a signal with a predetermined pattern. The mutually separable signals may be, for example, a combination of the SS in LTE and the PBCH in NR, a combination of the PBCH in LTE and the SS in NR, or a combination of a paging signal in LTE and the SS in NR. The UE may receive the overlapping signals, and separate the signals. For example, the UE may extract a signal with a predetermined pattern, and obtain a difference between the original reception signal and the extracted signal as another signal. This enables, for example, the UE to receive both of the signals in LTE and NR.

The eNB may change the paging transmission timings for the UEs being served thereby. The eNB may, for example, integrate the paging transmission timings for the UEs being served thereby into one or more. This can, for example, reduce an overlap between the SS burst signal in NR and the paging transmission timings in LTE. Thus, the gNB need not stop the SS burst transmission, and the SS burst transmission in NR which interferes with the signal of the eNB can be reduced.

As an example of changing the paging transmission timings, the POs of the UEs being served thereby may be integrated into one PO. This can, for example, avoid the overlap between the SS burst transmission in NR and the paging transmission timings in LTE. As an example method for integrating the POs into one PO, a value of a parameter Ns indicating the number of subframes to which the paging signal is allocated in one radio frame may be 1 as described in Non-Patent Document 17 (3GPP TS 36.304 V14.4.0). The eNB may define the value of the parameter Ns as 1 by limiting the value of the parameter nB described in Non-Patent Document 17 (3GPP TS 36.304 V14.4.0) to less than or equal to T multiplied by 1. The eNB may broadcast the value of the changed parameter nB to the UEs being served thereby. For example, SIB2 may be used for the broadcasting (see Non-Patent Document 18 (3GPP TS 36.331)). This enables, for example, the eNB to integrate the POs of the UEs being served thereby into one PO with less amount of signaling.

Change in the paging transmission timing may be, for example, change in a paging frame (PF), change in a paging occasion (PO), or change in a paging transmission period. Change in the paging transmission timing may be a combination of at least two of these.

When changing the paging transmission timing, the eNB may change a parameter to be used for determining the paging transmission timing. The parameter may be, for example, a UE-ID. The eNB may notify the UE of information on change in the parameter.

The eNB may increase the number of the UEs to which the paging can be transmitted with one paging transmission timing. The number to be increased may be, for example, predetermined in a standard. This enables, for example, the eNB to transmit the pagings to many UEs with less paging transmission timings.

The eNB may notify the information to the surrounding eNBs. The surrounding eNBs may be, for example, a plurality of eNBs that belong to the same tracking area as that of the eNB. The plurality of eNBs may perform paging to the UEs with the information. This enables, for example, smooth paging operations upon occurrence of the mobility in the UE.

The eNB may notify the information to the high-level NW device. The eNB may give the notification via an interface between the high-level NW device and the base station. The high-level NW device may be the AMF or the SMF. The high-level NW device may transmit, to the eNB, a notification indicating whether to accept or reject change in the parameter.

The high-level NW device may notify the information to the eNBs being served thereby. The eNBs being served thereby may be, for example, a plurality of eNBs that belong to the same tracking area as that of the eNB. The plurality of eNBs may perform paging to the UEs with the information. This enables, for example, smooth paging operations upon occurrence of the mobility in the UE.

The gNB may obtain information on the non-MBSFN subframe in LTE. The following (1) to (5) are disclosed as pieces of the information on the non-MBSFN subframe in LTE:

(1) the frame timing in LTE;
(2) information on the SS in LTE;
(3) information on the communication systems in LTE;
(4) information on the paging timing; and
(5) combinations of (1) to (4) above.

The gNB may obtain the frame timing in LTE in (1), through the cell search described in the first embodiment. The gNB may have a function of performing the cell search. The gNB may have the timing to perform the cell search. As an alternative example, the gNB may request, from the eNB, information on a difference in frame timing between LTE and NR. The eNB may notify the gNB of the information. The request and/or the notification may be made via the interface between the base stations, for example, the Xn interface. The eNB may obtain the frame timing in NR. The eNB may obtain the frame timing in NR, for example, through the cell search. This enables, for example, the gNB to obtain the information on the non-MBSFN subframe in LTE.

The gNB may request the information in (2) from the eNB. The eNB may notify the gNB of the information in (2). The request and/or the notification may be made via the interface between the base stations, for example, the Xn interface. The information in (2) may be, for example, information on the code sequence and the circular shift of the PSS in LTE or information on the code sequence and the circular shift of the SSS in LTE. The gNB may perform the cell search with the information in (2). This enables, for example, the gNB to promptly perform cell search processes. This also can, for example, prevent the misdetection of an LTE cell in the gNB.

As an alternative example, the gNB may obtain the information in (2) through the cell search. This can, for example, reduce the amount of signaling between the base stations.

The information in (3) may include information on the duplex system (e.g., TDD or FDD) or the half-duplex system in LTE, or information on the cyclic prefix (e.g., the length of the cyclic prefix duration). The gNB may request the information in (3) from the eNB. The eNB may notify the gNB of the information. The request and/or the notification may be made via the interface between the base stations, for example, the Xn interface. The gNB may derive a position of a signal in the non-MBSFN subframe in LTE with the information. This enables, for example, the gNB to promptly obtain the information on the non-MBSFN subframe in LTE.

As an alternative example in (3), the gNB may obtain the information in (3) from the broadcast information in LTE. This can, for example, reduce the amount of signaling between the base stations.

The information in (4) may include information on, for example, the paging frame (PF), the paging occasion (PO), and the paging period that are used in the eNB. The gNB may request the information from the eNB. The eNB may notify the gNB of the information. The eNB may notify the information after the gNB issues the request or when the information is changed. The gNB may transmit the SS burst signal in the non-MBSFN subframe with the information. The gNB may transmit the SS burst signal, for example, in a subframe to which the eNB does not allocate the paging information. This enables the gNB to maintain the timing to transmit the SS burst signal.

The information in (4) may include information on, for example, a subframe which the eNB does not actually use for the paging transmission. The information in (4) may be information on, for example, a subframe which the eNB actually uses for the paging transmission. The gNB may transmit, with the information, the SS burst signal in the subframe that is not actually used for the paging transmission. This enables, for example, the gNB to maintain the timing to transmit the SS burst signal.

The high-level NW device may notify the gNB of information on the paging from the eNB to the UE. The high-level NW device may notify the information upon occurrence of the paging to the UE. The high-level NW device may notify the eNB and the gNB of the information simultaneously or with different timings. The gNB may derive, from the notification, a subframe in which the eNB actually transmits the paging signal to the UE. The gNB may transmit the SS burst signal in a subframe other than the derived subframe. This enables, for example, the gNB to maintain the timing to transmit the SS burst signal.

The gNB may prevent transmission of a part of the signals in the SS burst. The gNB may, for example, reduce the number of SS blocks to be transmitted as the SS burst. This can, for example, reduce interference with the non-MBSFN subframe in LTE.

The gNB may reorder the SS blocks composing the SS burst. The gNB may semi-statically or periodically reorder the SS blocks. This enables, for example, the gNB to transmit all the SS blocks to the UE even upon occurrence of a contention with a signal in the non-MBSFN subframe in LTE.

The gNB may reorder the SS blocks per subframe. For example, when transmitting SS blocks #0 and #1 in a subframe #0 and SS blocks #2 and #3 in a subframe #1, the gNB may reorder the SS blocks so as to transmit the SS blocks #2 and #3 in the subframe #0 and the SS blocks #0 and #1 in the subframe #1. This, for example, facilitates the control over the reordering.

As an alternative example, the gNB may reorder the SS blocks per slot. This enables the reordering of the SS blocks, for example, even when the symbol lengths in LTE and NR are different.

As an alternative example, the gNB may reorder the SS blocks per SS block. This enables, for example, flexible control in the gNB.

Figure 35:
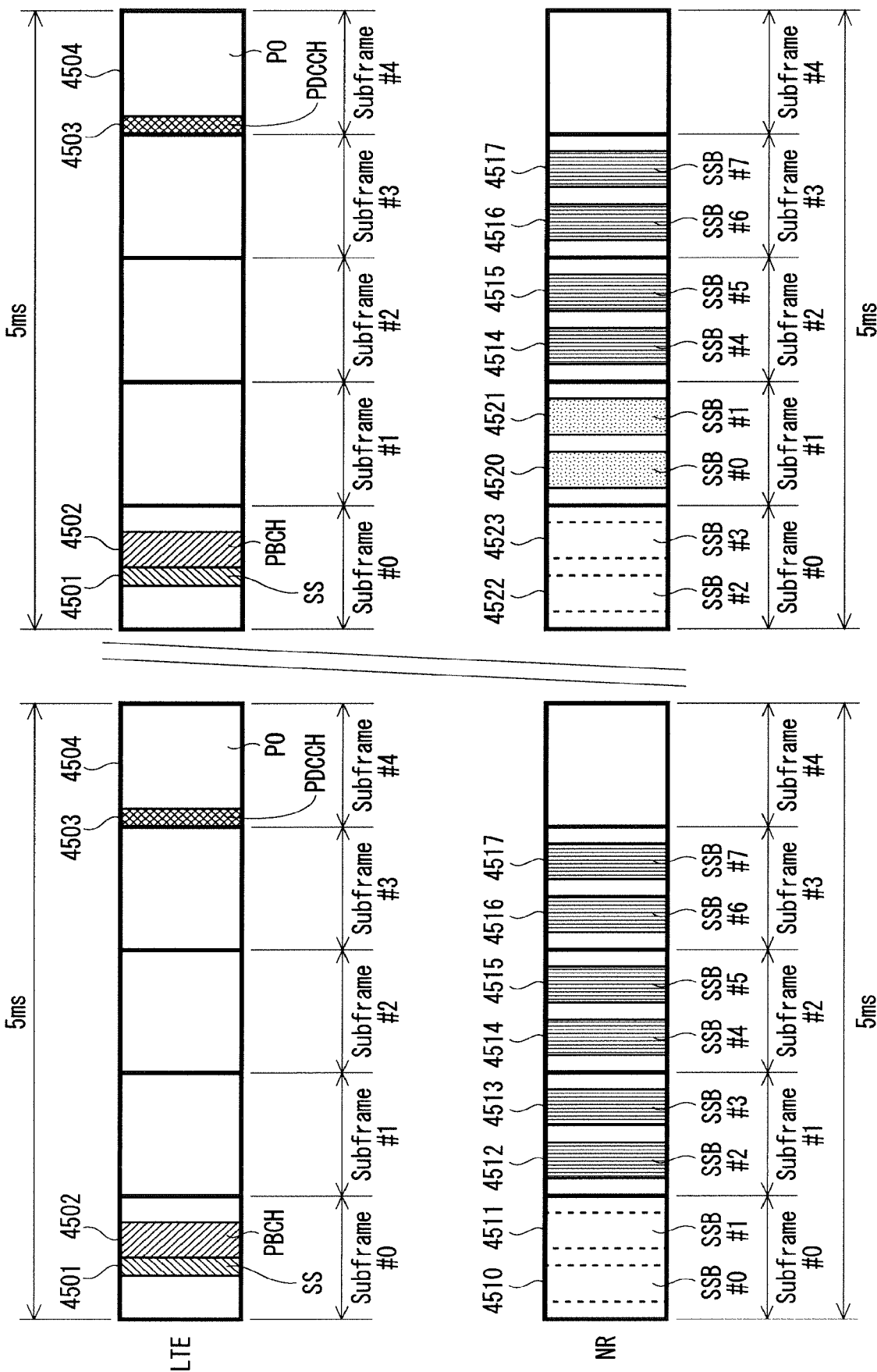
FIG. 35 illustrates an example of reordering SS blocks in the SS burst in NR according to the fourth embodiment.

FIG. 35 illustrates an example of reordering the SS blocks in the SS burst in NR. In FIG. 35, the upper tier illustrates the signals in LTE, and the lower tier illustrates the signals in NR. In both of the upper and lower tiers, the left diagrams illustrate 5 milliseconds before the SS blocks are reordered, and the right diagrams illustrate 5 milliseconds after the SS blocks are reordered. FIG. 35 illustrates a case where the symbol lengths in NR and in LTE are the same and the number of the SS blocks in NR is eight.

In FIG. 35, an SS 4501, a PBCH 4502, a PDCCH 4503 in a paging signal, and a paging signal 4504 are transmitted as signals in the non-MBSFN subframes from the eNB.

An SS block #0 (an SS block 4510) and an SS block #1 (an SS block 4511) in a subframe #0 are not transmitted before the SS blocks are reordered in FIG. 35, because they overlap the SS 4501 and the PBCH 4502. An SS block #2 (an SS block 4512) to an SS block #7 (an SS block 4517) in subframes #1 to #3 are transmitted.

In the illustration of FIG. 35 after the SS blocks are reordered, the SS blocks in the subframes #0 and #1 are reordered. As a result, the SS block #2 (an SS block 4522) and the SS block #3 (an SS block 4523) in the subframe #0 are not transmitted, and the SS block #0 (an SS block 4520), the SS block #1 (an SS block 4521), and the SS block #4 (the SS block 4514) to the SS block #7 (the SS block 4517) in the subframes #1 to #3 are transmitted.

After a lapse of the reordering period after the SS blocks are reordered in FIG. 35, the arrangement of the SS blocks may be restored to that before the SS blocks are reordered. This can, for example, prevent a continued state of stopping the transmission in any one of the SS blocks #0 to #3.

Figure 36:
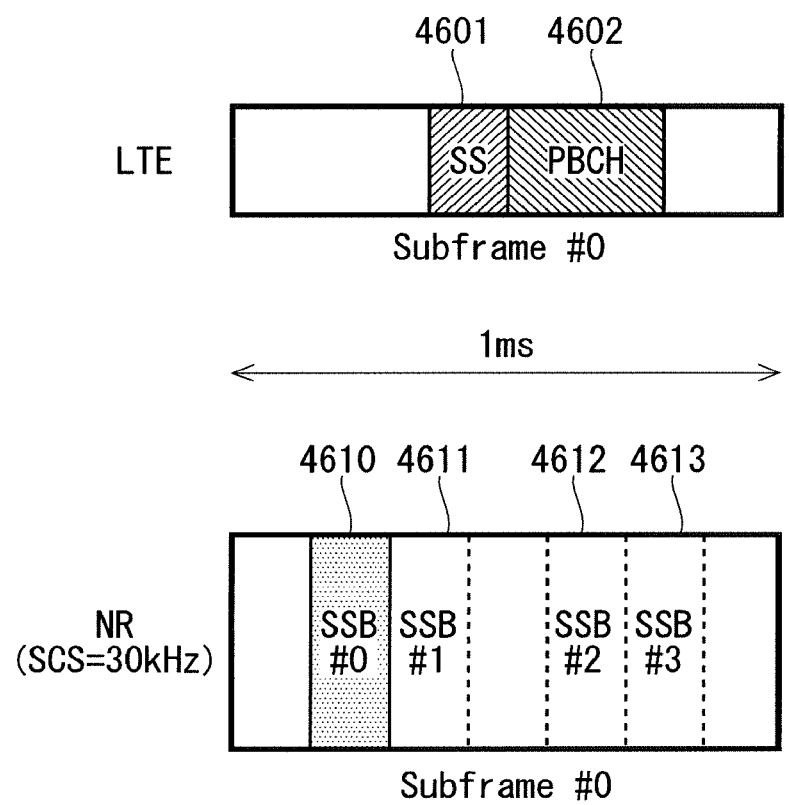
FIG. 36 is a timing diagram illustrating transmission of the SS blocks in NR which do not overlap non-MBSFN signals in LTE according to the fourth embodiment.

FIG. 36 is a timing diagram illustrating transmission of the SS blocks in NR which do not overlap non-MBSFN signals in LTE. FIG. 36 illustrates an overlap between the non-MBSFN subframe in LTE and the SS burst in NR when the symbol lengths in LTE and NR are different. FIG. 36 illustrates a case where the symbol length in NR is half that in LTE, that is, a subcarrier interval in NR is 30 kHz that is double that in LTE.

In FIG. 36, the SS block #0 (an SS block 4610) in NR is transmitted because it does not overlap either an SS 4601 or a PBCH 4602 in LTE. The SS block #1 (an SS block 4611) in NR is not transmitted because it overlaps the SS 4601 in LTE. The SS block #2 (an SS block 4612) and the SS block #3 (an SS block 4613) in NR are not transmitted because they overlap the PBCH 4602 in LTE.

A method for cycling the SS blocks may be used as the method for reordering the SS blocks. For example, a predetermined number of repetitions of an SS burst in which the SS blocks #0 to #7 are arranged in this order may be followed by a predetermined number of repetitions of an SS burst in which the SS blocks #6, #7, #0, #1, #2, #3, #4, and #5 are arranged in this order. Then, an SS burst in which the SS blocks #4, #5, #6, #7, #0, #1, #2, and #3 are arranged in this order may be transmitted. Since this can, for example, equalize the opportunities of capturing the SS blocks via each beam, the maximum value of the time required for synchronizing terminals can be reduced.

In the method for cycling the SS blocks, the SS blocks may be cycled per SS block, per slot, or per subframe. The cycling direction may be a forward or backward direction with respect to the time direction.

The gNB may notify the UE of information on reordering of the SS blocks in NR. This enables, for example, the UE to continue to capture the SS blocks in NR even after the SS blocks are reordered.

The information may be included in, for example, the system information. The information may be included in the minimum SI. The gNB may broadcast the information to the UEs being served thereby, or notify the information as the remaining minimum system information (RMSI). Alternatively, the gNB may broadcast or dedicatedly notify the information to the UEs being served thereby as the other SI.

A carrier different from the carrier in NR in which the SS blocks are reordered may be used for broadcasting or notifying the information. This enables, for example, the UE to promptly understand the information. Alternatively, the carrier in NR in which the SS blocks are reordered may be used. Since this eliminates the need for, for example, a plurality of other carriers in NR to broadcast or notify the information on reordering of the SS blocks, the amount of signaling can be reduced.

For example, the eNB may broadcast or notify the information. The eNB may broadcast or notify the information in the same method as that when the gNB broadcasts or notifies the information. This enables, for example, the UE to promptly understand the information.

Alternatively, the gNB and the eNB need not notify the information. The UE may automatically recapture SS blocks after the SS blocks in NR are reordered. This can reduce the amount of signaling.

The following (1) to (4) are disclosed as examples of pieces of information included in the information:
(1) information on a period of reordering the SS blocks;
(2) information on the SS blocks to be reordered;
(3) information on the reordering method; and
(4) combinations of (1) to (3) above.

In (1), the period may be, for example, a subframe. As an alternative example, the period may be a value corresponding to the maximum duration of the SS burst (e.g., 5 milliseconds). As an alternative example, the period may be a radio frame (e.g., 10 milliseconds) or a value corresponding to a transmission period of the SS burst.

In (2), the information may be, for example, the numbers of the SS blocks to be reordered. The information may be, for example, the SS blocks #0 and #1 and the SS blocks #2 and #3 in the example of FIG. 35. This can, for example, flexibly reorder the SS blocks. As an alternative example, the slot numbers may be used. This enables the reordering, for example, even when the symbol lengths in LTE and NR are different. As an alternative example, the subframe numbers may be used. This can, for example, reduce the amount of reordering processes.

As an alternative example in (2), the information may be information on a unit of reordering. The information on the unit of reordering may be applied to, for example, cyclical reordering. The unit of reordering may be, for example, an SS block, a slot, or a subframe.

In (3), the information may be, for example, information indicating shuffling of the SS blocks or information indicating cyclical reordering of the SS blocks. The information may include information indicating whether the SS blocks are cycled forward or backward in the time direction.

When reordering SS blocks corresponding to a beam, the gNB may automatically change the paging transmission timing in the beam. The UE may automatically change the paging reception timing to follow the reordering of the SS blocks. The association between the orders of the SS blocks and the paging transmission timings may be determined in a standard. Since this can, for example, bring consistency in the relationship between the SS blocks and the paging transmission/reception timings, the control on the paging in the gNB is facilitated.

The UE may obtain information on the paging reception timing. The UE may obtain the information after the SS blocks are reordered. The information on the paging reception timing may be, for example, a control channel resource set (CORESET) including the paging information.

As an alternative example, the gNB may fix the paging transmission timing in the beam. Since this, for example, fixes the paging reception timing in the UE, the amount of processing on the paging in the UE can be reduced.

The timing to transmit the PRACH from the UE via the beam as the SS blocks are reordered may be identical to the paging transmission/reception timings.

As an alternative example on assigning the priorities to the signal in the non-MBFSN subframe in LTE and the SS burst signal in NR, the SS burst signal in NR may be prioritized over the signal in the non-MBFSN subframe in LTE. This can, for example, reduce interference received by the SS burst in NR. The eNB may prevent transmitting, in a subframe overlapping the SS burst in NR, all or a part of the signals in the non-MBFSN subframe in LTE. The overlapping subframe may be replaced with an overlapping slot or an overlapping mini-slot. As an alternative example, the eNB may prevent transmission of only the signals in the non-MBFSN subframe in LTE which overlap the SS burst signals in NR. This can prevent unnecessary stop of the non-MBFSN subframe in LTE.

The eNB may transmit the signal in the non-MBFSN subframe in LTE which overlaps the SS burst signal in NR. Both of the signals may be mutually separable signals. For example, one of the signals may be a signal with a predetermined pattern. The separable signals may be identical to those when the signal in the non-MBFSN subframe in LTE is prioritized. This enables, for example, the UE to receive both of the signals in LTE and NR.

The eNB may change the paging transmission timings for the UEs being served thereby. The eNB may, for example, integrate the paging transmission timings for the UEs being served thereby into one or more. This can, for example, reduce an overlap between the SS burst signal in NR and the paging transmission timings in LTE. Thus, the eNB need not stop transmitting the paging, and the interference with the SS burst signals in NR can be reduced.

As an example of changing the paging transmission timings, the POs of the UEs being served thereby may be integrated into one PO. This can, for example, avoid the overlap between the SS burst transmission in NR and the paging transmission timings in LTE. As an example method for integrating the POs into one PO, a value of a parameter Ns indicating the number of subframes to which the paging signal is allocated in one radio frame may be 1 as described in Non-Patent Document 17 (3GPP TS 36.304 V14.4.0). The eNB may define the value of the parameter Ns as 1 by limiting the value of the parameter nB described in Non-Patent Document 17 (3GPP TS 36.304 V14.4.0) to less than or equal to T multiplied by 1. The eNB may broadcast the value of the changed parameter nB to the UEs being served thereby. For example, SIB2 may be used for the broadcasting (see Non-Patent Document 18 (3GPP TS 36.311)). This enables, for example, the eNB to integrate the POs of the UEs being served thereby into one PO with less amount of signaling.

Change in the paging transmission timing may be, for example, change in a paging frame (PF), change in a paging occasion (PO), or change in a paging transmission period. Change in the paging transmission timing may be a combination of at least two of these.

When changing the paging transmission timing, the eNB may change a parameter to be used for determining the paging transmission timing. The parameter may be, for example, a UE-ID. The eNB may notify the UE of information on change in the parameter.

The eNB may notify the information to the surrounding eNBs. The surrounding eNBs may be, for example, a plurality of eNBs that belong to the same tracking area as that of the eNB. The plurality of eNBs may perform paging to the UEs with the information. This enables, for example, smooth paging operations upon occurrence of the mobility in the UE.

The eNB may notify the information to the high-level NW device. The eNB may give the notification via an interface between the high-level NW device and the base station. The high-level NW device may be the AMF or the SMF. The high-level NW device may transmit, to the eNB, a notification indicating whether to accept or reject change in the parameter.

The high-level NW device may notify the information to the eNBs being served thereby. The eNBs being served thereby may be, for example, a plurality of eNBs that belong to the same tracking area as that of the eNB. The plurality of eNBs may perform paging to the UEs with the information. This enables, for example, smooth paging operations upon occurrence of the mobility in the UE.

The eNB may obtain information on the SS burst in NR. The following (1) to (4) are disclosed as pieces of the information on the SS burst in NR:

(1) the frame timing in NR;
(2) information on the SS in NR;
(3) information on the communication systems in NR; and
(4) combinations of (1) to (3) above.

The eNB may obtain the frame timing in NR in (1), through the cell search described in the first embodiment. The P-SS and the S-SS may be obtained through the cell search. The eNB may have a function of performing the cell search. The eNB may have the timing to perform the cell search. As an alternative example, the eNB may request, from the gNB, information on a difference in frame timing between LTE and NR. The gNB may notify the eNB of the information. The request and/or the notification may be made via the interface between the base stations, for example, the Xn interface. The gNB may obtain the frame timing in LTE. The gNB may obtain the frame timing in LTE, for example, through the cell search. This enables, for example, the eNB to obtain the information on the SS burst in NR.

The eNB may request the information in (2) from the gNB. The gNB may notify the eNB of the information in (2). The request and/or the notification may be made via the interface between the base stations, for example, the Xn interface. The information in (2) may be, for example, information on the code sequence and the circular shift of the P-SS in NR or information on the code sequence and the circular shift of the S-SS in NR. The information in (2) may include information on the duration of the SS burst in NR. The information in (2) may include information on the period of the SS burst in NR. The eNB may perform the cell search with the information in (2). This enables, for example, the eNB to promptly perform the cell search processes. This can, for example, prevent the misdetection of an NR cell in the eNB.

As an alternative example, the eNB may obtain the information in (2) through the cell search. This can, for example, reduce the amount of signaling between the base stations.

The information in (3) may include information on the multiplexing system (e.g., TDM or FDM) in NR or information on the cyclic prefix (e.g., the length of the cyclic prefix duration). The information in (3) may include information on the symbol length in NR. The eNB may request the information in (3) from the gNB. The gNB may notify the eNB of the information. The request and/or the notification may be made via the interface between the base stations, for example, the Xn interface. The eNB may derive a position of a signal in the SS burst in NR with the information. This enables, for example, the eNB to promptly obtain the information on the SS burst in NR.

As an alternative example of (3), the eNB may obtain the information in (3) from the broadcast information in NR. This can, for example, reduce the amount of signaling between the base stations.

Another solution is disclosed. The signal in the non-MBFSN subframe in LTE and the SS burst signal in NR may be simultaneously transmitted. Both of the signals may be mutually separable signals. For example, one of the signals may be a signal with a predetermined pattern. The separable signals may be, for example, a combination of the SS in LTE and the PBCH in NR, a combination of the PBCH in LTE and the SS in NR, or a combination of a paging signal in LTE and the SS in NR. The UE may receive the overlapping signals, and separate the signals. For example, the UE may extract a signal with a predetermined pattern, and obtain a difference between the original reception signal and the extracted signal as another signal. This enables, for example, the UE to receive both of the signals in LTE and NR.

Another solution is disclosed. An offset may be provided in a frame boundary between LTE and NR. The offset may be provided, for example, per subframe, per slot, or per symbol. The offset may be a unit less than a symbol, for example, a unit of the minimum time in the system (e.g., Ts).

The gNB and the eNB may transmit the SS burst signals in NR which overlap the signals in the non-MBFSN subframe in LTE. The gNB and the eNB may transmit the separable signals disclosed as the solution when transmitting the signals. This enables, for example, the coexistence between the signal in the non-MBFSN subframe in LTE and the SS burst signal in NR.

Figure 37:
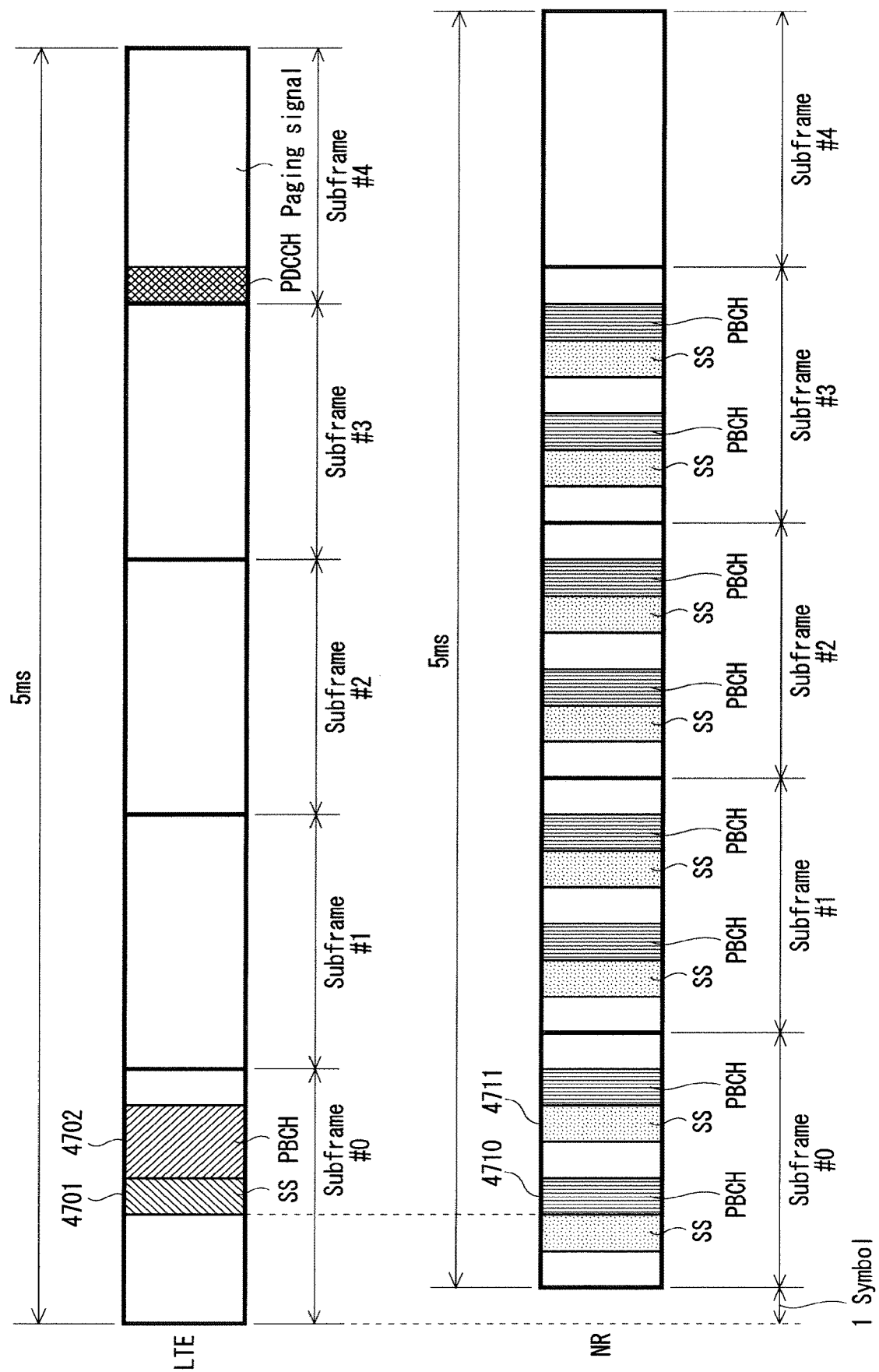
FIG. 37 illustrates an example where an offset is provided in a frame boundary between LTE and NR according to the fourth embodiment.

FIG. 37 illustrates an example where an offset is provided in a frame boundary between LTE and NR. FIG. 37 illustrates a case where the frame boundary in NR is later than that in LTE by one symbol. FIG. 37 illustrates the case where the symbol lengths in LTE and in NR are the same and the number of the SS blocks in the SS burst in NR is eight.

In FIG. 37, delaying the frame boundary in NR from that in LTE by one symbol causes a first PBCH 4710 in the subframe #0 in NR to overlap an SS 4701 in LTE. Moreover, a second SS 4711 in the subframe #0 in NR overlaps the PBCH 4702 in LTE. Since the PBCH 4710 and the SS 4701 are mutually separable, the gNB may transmit the PBCH 4710. The same holds true for the SS 4711 in NR.

In the example of FIG. 37, the non-MBFSN subframe in LTE and the SS burst in NR can coexist by allowing the simultaneous transmission of the SS in LTE and the PBCH in the first SS block in NR. This enables, for example, prompt and synchronous capturing of the UE in NR.

The gNB may change the frame timing in NR. The gNB may notify or broadcast the change to the UEs being served thereby. The gNB may notify the high-level NW device of change in the frame timing. The gNB may give the notification via an interface between the high-level NW device and the base station. The high-level NW device may be the AMF or the SMF. The high-level NW device may transmit, to the gNB, a notification indicating whether to accept or reject change in the frame timing. The high-level NW device may instruct the gNBs being served thereby to change the frame timing. The high-level NW device may instruct neighboring gNBs of the gNB. This enables, for example, the neighboring gNBs including the gNB to coincide with the frame timings in NR.

The eNB may change the frame timing in LTE. The same method as that for the gNB to change the frame timing in NR may be applied to this change.

Information on change in the frame timing in NR and/or LTE may be included in, for example, the system information. The information on the change may be included in the minimum SI. The eNB may broadcast the information on the change to the UEs being served thereby, or notify the information as the remaining minimum system information (RMSI). Alternatively, the eNB may broadcast or dedicatedly notify the information on the change to the UEs being served thereby as the other SI.

A carrier different from the carrier in NR which coexists with that in LTE may be used for broadcasting or notifying the information on the change. This enables, for example, the UE to promptly understand the information. Alternatively, the carrier in NR which coexists with that in LTE may be used for broadcasting or notifying the information on the change. Since this eliminates the need for, for example, a plurality of other carriers in NR to broadcast or notify the information on the change, the amount of signaling can be reduced.

For example, the eNB may broadcast or notify the information on the change. The eNB may broadcast or notify the information in the same method as that when the gNB broadcasts or notifies the information. This enables, for example, the UE to promptly understand the information on the change.

Alternatively, the gNB and the eNB need not notify the information on the change. The UE may automatically follow change in the frame timing in LTE and NR. This can reduce the amount of signaling.

Another solution is disclosed. The arrangement of the SS blocks in the SS burst in NR may be changed. For example, signals in the SS blocks in NR may be arranged in mini-slots. One SS block may be arranged in different mini-slots. For example, two symbols out of four symbols in one SS block may be arranged in one mini-slot, and the remaining two symbols may be arranged in the next mini-slot. The changed arrangement may be, for example, an arrangement that avoids the CRS in LTE. This can, for example, prevent mutual interference between the SS blocks in NR and the CRS in LTE.

A plurality of patterns of the arrangement of the SS blocks in the SS burst in NR may be predetermined in a standard. A plurality of patterns may be determined for one symbol length. The UE may synchronously capture the SS blocks using information on the patterns. Consequently, the UE can automatically capture the SS blocks which are arranged in the plurality of patterns.

The gNB may notify the UE of information on change in the arrangement of the SS blocks in NR. The information may be, for example, information indicating which pattern the SS blocks are arranged in. This enables, for example, the UE to continue to capture the SS blocks in NR even after the arrangement of the SS blocks in NR is changed.

The information may be included in, for example, the system information. The information may be included in the minimum SI. The gNB may broadcast the information to the UEs being served thereby, or notify the information as the remaining minimum system information (RMSI). Alternatively, the gNB may broadcast or dedicatedly notify the information to the UEs being served thereby as the other SI.

A carrier different from the carrier in NR in which the arrangement of the SS blocks is changed may be used for broadcasting or notifying the information. This enables, for example, the UE to promptly understand the information. Alternatively, the carrier in NR in which the arrangement of the SS blocks is changed may be used for broadcasting or notifying the information. Since this eliminates the need for, for example, a plurality of other carriers in NR to broadcast or notify the information on change in the arrangement of the SS blocks, the amount of signaling can be reduced.

For example, the eNB may broadcast or notify the information. The eNB may broadcast or notify the information in the same method as that when the gNB broadcasts or notifies the information. This enables, for example, the UE to promptly understand the information.

Alternatively, the gNB and the eNB need not notify the information. The UE may automatically recapture the SS blocks in NR whose arrangement has been changed. This can reduce the amount of signaling.

A plurality of the solutions disclosed in the fourth embodiment may be combined. For example, the signal in the non-MBFSN subframe in LTE and the SS burst signal in NR can be simultaneously transmitted, and an offset may be provided in a frame boundary between LTE and NR. This enables, for example, the signal in the non-MBFSN subframe in LTE and the SS burst signal in NR to coexist. Even when the symbol lengths in LTE and NR are different, the signal in the non-MBFSN subframe in LTE and the SS burst signal in NR can coexist.

Figure 38:
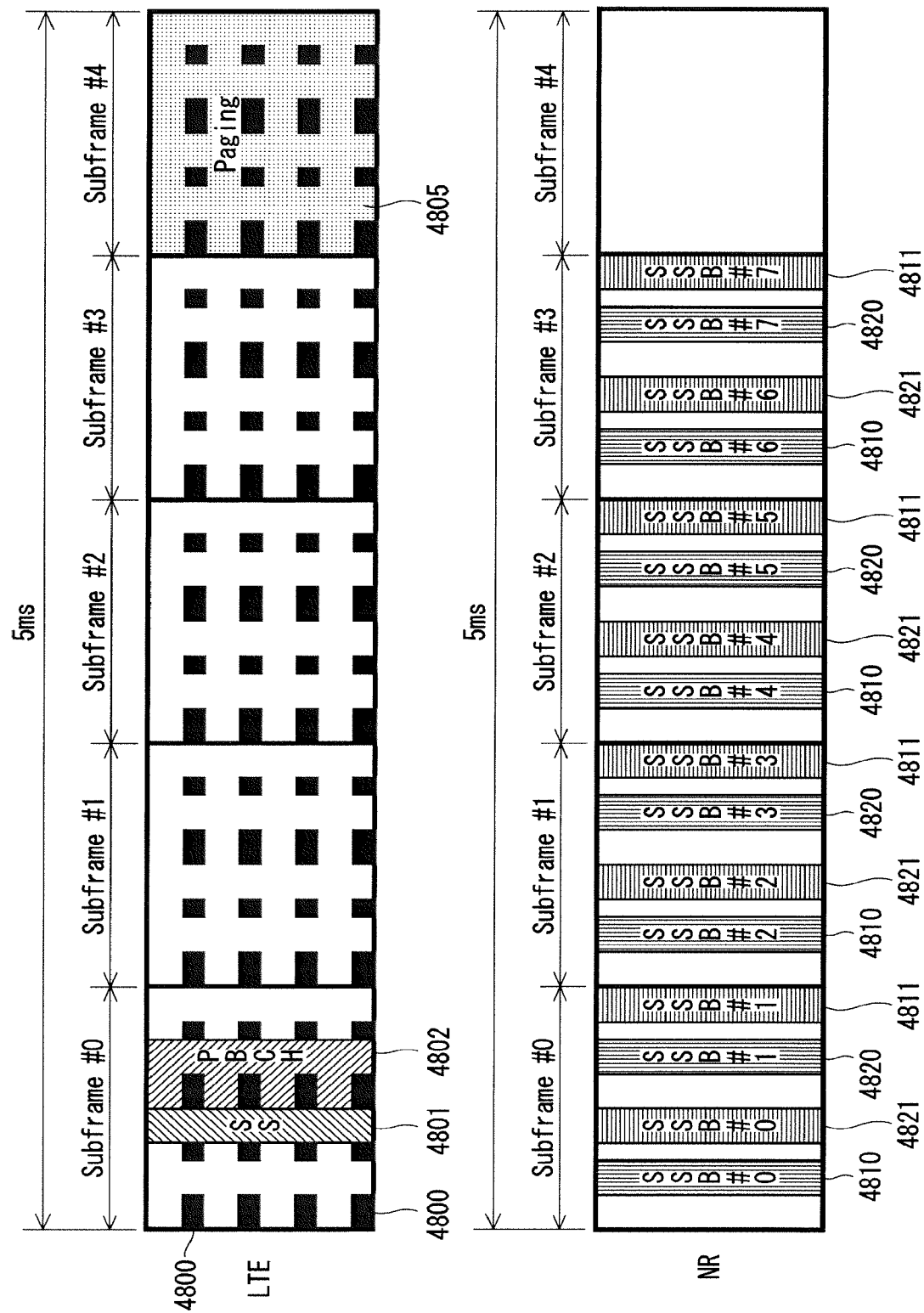
FIG. 38 illustrates an example of change in the arrangement of SS burst signals in NR according to the fourth embodiment.

FIG. 38 illustrates an example of change in the arrangement of the SS burst signals in NR. FIG. 38 illustrates an example arrangement of dividing four symbols of SS blocks by two symbols. FIG. 38 also illustrates an example where the SSs in NR are arranged in the first two symbols and the PBCHs in NR are arranged in the last two symbols. In FIG. 38, the SS block with vertical stripes represents an SS, and the SS block with horizontal stripes represents a PBCH.

In FIG. 38, an SS 4810 and a PBCH 4811 in NR are arranged to avoid a CRS 4800, an SS 4801, a PBCH 4802, and a paging signal 4805 in LTE. An SS 4820 in NR is arranged in a region overlapping the PBCH 4802 in LTE to avoid the CRS 4800. The PBCH 4821 in NR is arranged to overlap the SS 4801 in LTE. The SS 4801 in LTE and the PBCH 4821 in NR in FIG. 38 may be mutually separable signals. The PBCH 4802 in LTE and the SS 4820 in NR in FIG. 38 may be mutually separable signals.

With the arrangement illustrated in FIG. 38, the signal in the SS block in NR avoids the CRS, and the SS in LTE and the PBCH are mutually separable. Thus, the coexistence between the signal in the SS block in NR and the signal in the non-MBFSN subframe in LTE is possible.

The fourth embodiment enables, in the LTE-NR coexistence, the coexistence between the signal in the non-MBFSN subframe in LTE and the SS burst signal in NR, and can make the communication using LTE compatible with the communication using NR. Consequently, the use efficiency of the communication system is increased.

The First Modification of the Fourth Embodiment

The preempted communication may be applied in the LTE-NR coexistence. The preempted communication may be performed in the uplink or in the downlink. For example, the UE may perform the uplink communication with the gNB as an interrupt during the uplink transmission to the eNB in the uplink preemption. As an alternative example, the gNB may perform the downlink transmission to the UE as an interrupt during the downlink transmission from the eNB to the UE in the downlink preemption. Although these examples show that the gNB transmits and receives the preempted communication to and from the UE, the eNB may transmit and receive the preempted communication to and from the UE.

The preempted communication in the LTE-NR coexistence may be, for example, an uplink preempted communication in the uplink LTE-NR coexistence where the eNB uses the same frequency band as that of the gNB in the uplink communication from the UE. Alternatively, the preempted communication in the LTE-NR coexistence may be, for example, a downlink preempted communication in the downlink LTE-NR coexistence where the eNB uses the same frequency band as that of the gNB in the downlink communication to the UE.

Application of the aforementioned methods creates the following problem. Specifically, a method for the preempted communication in the LTE-NR coexistence has not been disclosed. This causes problems of failing to execute an appropriate procedure for the preempted communication in the LTE-NR coexistence and maintain the communication with low latency and high reliability.

A solution to the problems is disclosed below.

The UE performs uplink preempted transmission to a base station that performs preempted communication (may be hereinafter referred to as a preempting base station). The preempting base station may notify information indicating the occurrence of preemption to a base station that is interrupted by the preempted communication (may be hereinafter referred to as a preempted base station). Since this enables, for example, the preempted base station to perform a decoding process on data excluding data received with the timing corresponding to the preempted communication, the reliability in the communication between the preempted base station and the UE can be enhanced.

The information indicating the occurrence of preemption may include information on resources with which the preemption has occurred. The information may be information on the timing, for example, a subframe number, a slot number, a mini-slot number, or a symbol number. The information may include information on the number of mini-slots or information on the number of symbols. The information may include information on frequencies, for example, information on the frequency resources used in the preempted transmission. The information may include, for example, information on the power. The preempted base station may separate the preempted communication from the interrupted communication with the information on the power. The separation may be performed, for example, when the preempted communication and the interrupted communication greatly differ in power. This enables, for example, the preempted base station to receive both of the preempted communication and the interrupted communication.

The preempting base station may notify the UE with the LTE-NR coexistence of the uplink grant. The preempting base station may give the notification, for example, while the UE receives the downlink signal from the preempting base station. Since this, for example, eliminates the need for the UE to switch the downlink reception circuit between LTE and NR upon receipt of the uplink grant, the latency in the uplink preempted transmission can be reduced.

As an alternative method, the preempting base station may notify the preempted base station of information on the uplink grant to the UE. The preempted base station may stop the uplink reception from the UE with the information on the uplink grant. This produces, for example, the same advantages as previously described.

As an alternative method, the preempting base station may notify, through the preempted base station, the UE of the information on the uplink grant to the UE. The preempting base station may give the notification through the preempted base station, for example, while the UE receives the downlink signal from the preempted base station. The uplink grant may include information indicating the preempting base station as the uplink transmission destination. The information may be, for example, an identifier indicating a master base station or a secondary base station, an ID of a base station, or a cell ID of a transmission destination. The notification from the preempting base station to the preempted base station may be given via the interface between the base stations (e.g., the Xn interface). The preempted base station may stop the uplink reception from the UE with the information on the uplink grant. The preempted base station notifies the UE of the information on the uplink grant. Since this, for example, eliminates the need for the UE to switch the downlink reception circuit between LTE and NR upon receipt of the uplink grant, the latency in the uplink preempted transmission can be reduced.

The preempted base station may stop the uplink reception from the UE with the timing of occurrence of the preempted transmission indicated by the uplink grant.

The UE may transmit, to the preempting base station, the SR for the preempting base station through the preempted base station. The SR may include information indicating that a scheduling request is made to the preempting base station.

The information may be, for example, an identifier indicating a master base station or a secondary base station, an ID of a base station, or a cell ID of a transmission destination. The preempted base station may notify the preempting base station of information indicating reception of the SR for the preempting base station. The notification from the preempted base station to the preempting base station may be given via the interface between the base stations (e.g., the Xn interface). Since this, for example, eliminates the need for the UE to switch the uplink transmission circuit between LTE and NR according to the transmission of the SR, the latency in the uplink preempted transmission can be reduced.

As an alternative example of including, in the SR to be transmitted from the UE to the preempted base station, the information indicating that the scheduling request is made to the preempting base station, the sequence of the SR may be made different depending on where the scheduling request is made to. For example, a root index of the sequence, an amount of a cyclic shift, or these two may be made different. The preempted base station may determine where the scheduling request is made to, with the sequence of the SR. This can, for example, reduce the amount of information of the SR.

As an alternative example, the sequence for the DMRS associated with the PUCCH including the SR may be made different depending on where the scheduling request is made to. The preempted base station may determine where the scheduling request is made to, with the sequence for the DMRS. This can, for example, reduce the amount of information of the SR as previously described.

The preempting base station may configure the SR to be transmitted to its own base station for the UE. The preempting base station may make the configuration for the UE directly or through the preempted base station.

The preempted base station may configure, for the UE, the SR to be transmitted to the preempting base station through its own base station. The configuration of the SR may include, for example, a configuration on a transmission period and an offset of the SR, a configuration on the maximum number of retransmissions of the SR, or a configuration on the frequency resources of the SR. The configuration of the SR may include a configuration on a sequence to be used for transmitting the SR. The configuration on the sequence may be, for example, a configuration on the root index or a configuration on the cyclic shift. The configuration of the SR may include the information on the sequence for the DMRS associated with the PUCCH including the SR.

The configuration on the SR which the UE transmits to the preempting base station may be identical to or different from the configuration on the SR which the UE transmits to the preempting base station through the preempted base station. The configurations may be partly the same.

The configuration on the SR which the UE transmits to the preempting base station through the preempted base station should be at least partly made different from the configuration on the SR which the UE transmits to the preempted base station. For example, the cyclic shifts of the sequences to be used for transmitting the SRs may be made different. As an alternative example, the sequences to be used for the DMRS associated with the PUCCH including the SR may be made different. This enables, for example, the preempted base station to determine whether the SR is the SR addressed to its own base station or the SR addressed to the preempting base station through its own base station. As a result, the malfunctions in the preempted UE can be prevented.

The preempting base station may request the preempted base station to configure the SR which the UE transmits to the preempting base station through the preempted base station. The request may include, for example, information on the configuration on the SR. The preempted base station may configure the SR for the UE with the information.

The request for configuring the SR may be, for example, included in the signaling in the interface between the base stations (e.g., the Xn interface). The signaling may be, for example, a secondary base station modification request (SN Modification Request), a secondary base station addition request (SN Addition Request), or a secondary base station modification confirmation (SN Modification Confirm) signaling. The three signalings may be used, for example, when the preempting base station is a master base station. As an alternative example, the signaling may be a secondary base station modification request acknowledgement (SN Modification Request Acknowledge), a secondary base station addition request acknowledgement (SN Addition Request Acknowledge), or a secondary base station modification required (SN Modification Required) notification. The three signalings may be used, for example, when the preempting base station is a secondary base station. The signaling may be another signaling, or a signaling may be newly provided.

The preempting base station may configure, for the UE, the SR to be transmitted to its own base station through the preempted base station. Information included in the configuration of the SR may be the one previously described. The preempting base station may request, from the preempted base station, information on the configuration of the SR to be transmitted to its own base station through the preempted base station. The preempted base station may notify the preempting base station of the information. The information may be, for example, the information on the configuration of the SR. As an alternative example, the information may include information on the SR which has already been assigned to the preempted base station. The information notified from the preempted base station may be used for configuring the SR to be transmitted from the preempting base station to the UE. This can, for example, prevent an overlap between the configuration of the SR and the configuration of the SR which has already been assigned to the preempted base station. Consequently, the interference in the preempted base station can be reduced, and the malfunctions can be prevented.

The preempting base station may configure, via the RRC signaling for the UE, the SR to be transmitted to its own base station through the preempted base station. For example, the signaling for the RRC connection reconfiguration from the preempting base station to the UE may include the information on the configuration of the SR. This can, for example, reduce the amount of signaling from the preempting base station to the UE. As an alternative example, the signaling may be the MAC signaling or the L1/L2 signaling. This enables, for example, the preempting base station to promptly configure the SR for the UE.

The preempting base station may request, from the preempted base station, the information on the configuration of the SR to be transmitted to its own base station through the preempted base station via the interface between the base stations, for example, using the signaling of the Xn interface. The signaling may be signaling identical to that via which the preempting base station requests the preempted base station to configure the SR which the UE transmits to the preempting base station through the preempted base station.

The preempted base station may notify the preempting base station of the information on the configuration of the SR via the interface between the base stations, for example, using the signaling of the Xn interface. The signaling may be, for example, a secondary base station modification request acknowledgement (SN Modification Request Acknowledge), a secondary base station addition request acknowledgement (SN Addition Request Acknowledge), or a secondary base station modification required (SN Modification Required) notification. The three signalings may be used, for example, when the preempting base station is a master base station. As an alternative example, the signaling may be a secondary base station modification confirmation (SN Modification Confirm). The signalings may be used, for example, when the preempting base station is a secondary base station. The signaling may be another signaling, or a signaling may be newly provided.

Combinations of the configurations of the SR may be used. For example, the preempting base station may configure, for the UE, both of the SR to be directly transmitted to its own base station and the SR to be transmitted to its own base station through the preempted base station. The preempting base station may make the configuration via the same signaling or via different signalings. As an alternative example, the preempting base station may configure, for the UE, the SR to be directly transmitted to its own base station, whereas the preempted base station may configure, for the UE, the SR to be transmitted to the preempting base station through its own base station.

The UE may transmit the SR to one of the preempting base station and the preempted base station. The UE may transmit the SR to, for example, a base station with an earlier transmission possible timing in the UE. This enables, for example, the UE to promptly transmit the SR with less amount of processing. As an alternative example, the UE may transmit the SR to a base station at which the SR addressed to the preempting base station is arrived earlier. The UE may transmit the SR to a base station at which the SR addressed to the preempting base station is arrived earlier based on, for example, the latency in the interface between the base stations as a judgment criterion. The latency may be notified to the UE in advance. Consequently, the preempting base station can promptly receive the SR.

The UE may transmit the SRs to both of the preempting base station and the preempted base station. This can, for example, enhance the reliability in transmission of the SR. For example, SR retransmission prohibition timers may be dedicatedly provided for directly transmitting the SR to the preempting base station and for transmitting the SR through the preempted base station. This can, for example, avoid the complexity of control over the SR. As an alternative example, the SR retransmission prohibition timer may be common to direct transmission of the SR to the preempting base station and transmission of the SR through the preempted base station. The UE may be able to transmit the SR only once to a base station for which the SR retransmission prohibition timer has been started and to which the SR is not transmitted.

Information on allocating, between the base stations, the timings to receive the uplink signal from the UE need not be used in configuring the SR, for example, configuring the transmission timing of the SR. The UE need not transmit the SR to the preempting base station and/or the preempted base station with the transmission timing of the SR. In other words, the UE may transmit the SR to each of the base stations with the timing corresponding to the transmission timing of the SR if the timings to receive the uplink signal from the UE are allocated to the base stations. For example, when the timings to receive the uplink signal from the UE are allocated to the preempting base station, the UE need not transmit the SR to the preempted base station with the transmission timing of the SR. This can, for example, avoid the complexity in configuring the SR in the LTE-NR coexistence.

As an alternative example, the information on allocating, between the base stations, the timings to receive the uplink signal from the UE may be used in configuring the SR. For example, the transmission timing of the SR in the UE may be configured among the timings obtained by allocating the timings to receive the uplink signal from the UE to the base stations to which the SR is to be transmitted. As an alternative example, the timings to receive the uplink signal from the UE in the base stations to which the SR is to be transmitted may be configured using the configuration of the transmission timing of the SR in the UE. For example, since the timings to receive the uplink signal from the UE are allocated to the base stations to which the SR is to be transmitted, with the transmission timing of the SR, the UE can promptly transmit the SR.

A plurality of configurations of the SR to be transmitted from the UE to each base station may be provided. For example, both of a configuration of a subframe offset 0 with a period of 5 milliseconds and a configuration of a subframe offset 2 with the period of 5 milliseconds may be used for the SR addressed from the UE to the preempting base station. This can, for example, increase the flexibility in configuring the SR.

The configuration on the SR may be applied to a configuration on another UCI. For example, the method for configuring the SR may be applied to the CSI configuration. Consequently, for example, transmission of the other UCI can produce the same advantages as those in transmission of the SR.

The preemption may be applied to the SR to be transmitted from the UE to the preempting base station. For example, the UE may abort the uplink transmission to the preempted base station, and transmit the SR to the preempting base station. The UE may or need not resume the uplink transmission to the preempted base station after transmitting the SR. This enables, for example, the UE to promptly notify the SR.

The UE may transmit the SR with the configuration on the SR to be transmitted to the preempting base station. In other words, the UE may transmit the SR with information on the transmission timing of the SR which is included in the configuration (e.g., an SR transmission period or an SR transmission offset).

The preempted base station need not allocate the uplink transmission from the UE to its own base station with the transmission timing of the SR to be transmitted from the UE to the preempting base station. The uplink transmission may be transmission of, for example, the PUSCH, the DMRS, the PUCCH, the SRS, or the other uplink signals. The preempting base station may notify the preempted base station of information on the configuration of the SR to be transmitted from the UE to its own base station. The preempted base station may determine or change, with the notification, the allocation of the uplink transmission timing from the UE to its own base station.

As an alternative example, the preempting base station may exclude the timing with which the SR may be transmitted from the UE to its own base station from the timing with which the UE performs the uplink transmission to the preempted base station to configure the timing. The uplink transmission may be transmission of, for example, the DMRS, the SRS, or the other uplink signals. The preempting base station may inquire about information on the timing with which the uplink transmission occurs, from the preempted base station. The preempted base station may notify the preempting base station of the information. In response to the notification, the preempting base station may notify information on the configuration of the SR to be transmitted from the UE to its own base station. The timing with which the SR may be transmitted from the UE to its own base station may be excluded from the timing with which the UE performs the uplink transmission to the preempted base station for configuring the timing.

The preempting base station may notify the preempted base station of information on the timing with which the uplink preempted transmission may occur. The information may be identical to, for example, the information described in the third embodiment. The preempted base station may stop the uplink reception from the UE with the timing. This can, for example, reduce the latency in the uplink preempted transmission.

The UE may notify the preempting base station of information indicating that the preempted transmission data has occurred. The information may be, for example, a predetermined code. The code may be identical to that described in the first modification of the third embodiment. The UE may notify the preempting base station of the information immediately after the preempted transmission data has occurred. This can, for example, reduce the latency in the uplink preempted transmission.

The UE may notify the preempting base station of the information through the preempted base station. The UE may give the notification through the preempted base station, for example, while the UE transmits the uplink signal to the preempted base station. The notification from the preempted base station to the preempting base station may be given via the interface between the base stations (e.g., the Xn interface). Since this, for example, eliminates the need for the UE to switch the uplink transmission circuit between LTE and NR according to the transmission of the SR, the latency in the uplink preempted transmission can be reduced.

Another solution is disclosed. In the downlink preempted communication, the preempting base station may notify the preempted base station of information indicating that the preempted transmission will occur. The information may include, for example, information on the timing with which the downlink preemption will occur, or information on the scheduling of the downlink preempted communication. The preempted base station may stop the downlink transmission with the preempted transmission timing. This can, for example, reduce the interference in the downlink preempted communication.

The preempted base station may notify the UE of information indicating that the preempted transmission will occur. The preempted base station may give the notification before or after the preempting base station gives the notification to the preempted base station. In response to the notification, the UE may switch the downlink reception circuit between LTE and NR. This can, for example, reduce the latency in the downlink preempted communication.

For example, a predetermined code may be used in the notification to the UE. The code may be identical to that described in the first modification of the third embodiment. Upon receipt of the code, the UE may switch the downlink reception circuit between LTE and NR. This can, for example, further reduce the latency in the downlink preempted communication.

The preempting base station may inquire in advance about a preemptable timing or a non-preemptable timing, from the preempted base station.

The preempted base station may notify, in advance, the preempting base station of information on the timing with which the preempted communication is possible. The preempted base station may give the notification, for example, after or in the absence of the aforementioned inquiry. The information may be information on the timing with which the preempted communication is impossible. The timing with which the preempted communication is impossible may be the timing with which the preempted base station transmits, for example, a synchronization signal, broadcast information, or the PDCCH. The preempting base station may or need not perform the preempted communication with the information. For example, the preempting base station may perform the preempted transmission with the timing with which the preemption is possible.

Information on the timing with which the preempted communication is possible or impossible may include, for example, information on a preemptable subframe or a non-preemptable subframe, information on a period with which the subframe is repeated, or information on a duration of the preemptable timing or the non-preemptable timing. The non-preemptable subframe may be, for example, a subframe in which SS (a synchronization signal) burst in NR is to be transmitted, or another subframe. The subframe may be a radio frame, a slot, a mini-slot, or a symbol. The information may be a combination of a plurality of pieces of information. As an alternative example, the information may be notified as a bitmap indicating preemptable symbols or non-preemptable symbols. The symbols may be subframes, slots, mini-slots, or of another time unit. The information may be notified periodically or aperiodically. The information may include information on a duration subject to the information. This can, for example, increase the flexibility in configuring the preemptable timing or the non-preemptable timing.

Another solution is disclosed. In the downlink preempted communication, the preempting base station may notify the UE of information indicating the occurrence of the preempted transmission. The information may include, for example, information on the timing with which the downlink preemption has occurred or information on the scheduling of the occurred downlink preempted communication. The preempting base station may give this notification to the UE through the preempted base station. In response to the notification, the UE may extract data for the preempted communication from the received downlink signal. For example, a method for correcting an offset of the DC component between LTE and NR may be used as the extraction method. This can, for example, reduce the amount of signaling between the base station and the UE before the preempted communication.

A plurality of the solutions disclosed in the first modification may be combined. For example, the preempting base station may notify the preempted base station of information indicating that the preempted transmission will occur. In response to the information, the preempted base station may stop the downlink transmission with the timing of the preempted communication. The preempting base station may notify the UE of information indicating the occurrence of the preempted transmission. In response to the notification, the UE may extract data for the preempted communication from the received downlink signal. This can, for example, reduce the amount of signaling between the base station and the UE before the preempted communication, and the interference with the downlink preempted communication.

The first modification enables the preempted communication in the LTE-NR coexistence. This enables the communication with low latency and high reliability in the LTE-NR coexistence.

The Second Modification of the Fourth Embodiment

The LTE-NR coexistence has the following problem. Specifically, when the transmission timing of the PUCCH and/or the SRS from the UE to an NR base station contends with the transmission timing of the PUCCH and/or the SRS from the UE to an LTE base station, processing for resolving the contention is not defined in the communication system. Thus, the communication system may malfunction.

The method to be described later in the first modification of the fifth embodiment may be applied as a solution to the problem.

For instance, the example to be described later in FIG. 41 may be applied. The UE can transmit, in the same subframe, the PUCCHs to be transmitted to the LTE base station and the NR base station.

The second modification can prevent the malfunctions caused by the contention of the PUCCH and/or the SRS between LTE and NR.

The Fifth Embodiment

In the DC for LTE and NR, the UE may switch between the single TX in which one transmitter is switched between LTE and NR to perform transmission and the dual TX that in which the respective transmitters of LTE and NR are used. The single TX and the dual TX may be switched, for example, when the DC is configured and/or in the handover.

The master base station may determine to switch between the single TX and the dual TX and notify it to the UE. The master base station may make the determination, using the maximum sensitivity degradation (MSD) representing the maximum amount of decrease in the sensitivity which is caused by the influence of the uplink transmission of one of the carriers upon the downlink reception of the other carrier.

An example sequence for switching between the single TX and the dual TX in the DC for LTE and NR is disclosed below.

The UE notifies the master base station of information on combinations of compatible carriers. The combinations may be included in the UE capability. The combinations may be, for example, combinations of carriers that satisfy the conditions of the MSD that are defined in a standard. The master base station derives, using information on the combinations of the carriers, the MSD in the combinations.

The UE notifies the base station of a measurement result of a carrier signal. The master base station determines carriers to be used in the CA and/or the DC. The master base station also determines whether the UE uses the single TX or the dual TX.

The master base station makes the determination using a value of the MSD. For example, the master base station may determine, as carriers to be used in the CA and/or the DC, a combination of carriers with high reception sensitivity with consideration given to the MSD. As an alternative example, the master base station may determine the use of the single TX when the value of the MSD in the combination of carriers to be used is larger than or equal to a predetermined threshold or larger than the threshold. In the determination, the master base station may derive the MSD in the combination of carriers from a standard.

The master base station notifies the UE of information on the carriers to be used and/or information indicating whether the UE uses the single TX or the dual TX. The master base station may give the notification via the RRC dedicated signaling, for example, the signaling for the RRC connection reconfiguration.

Application of the aforementioned method creates the following problem. Specifically, information indicating whether two transmitters in the UE are permitted to perform simultaneous transmission does not reflect the performance of the actual UE. This results in a problem of inefficient communication in the communication system.

A solution to the problem is disclosed. The sensitivity degradation (SD) of the UE is used when carriers to be used in the CA and/or the DC are determined and/or switching between the single TX and the dual TX is determined. The master base station may switch between the single TX and the dual TX with information on the SD. The switching may be, for example, semi-static switching. The semi-static switching may be, for example, switching via the RRC signaling.

The SD may be a value measured in advance. For example, the SD may be an SD measured on shipment or an SD measured during operations. The SD measured during operations may be, for example, an SD measured in calibration.

The following (1) to (8) are disclosed as examples of pieces of information to be used when the master base station determines to switch between the single TX and the dual TX:

(1) information on the SD;
(2) information on whether the dual TX is allowed;
(3) information on the MSD;
(4) information on whether the single TX is allowed;
(5) information on the transmission power of the UE;
(6) information indicating that a part of the frequency bands of the carrier of the gNB are used;
(7) information on the frame timing; and
(8) combinations of (1) to (7) above.

The information in (1) may be provided per combination of carriers. This enables, for example, the base station to select a combination of use carriers with less sensitivity degradation. Alternatively, the information on the SD may be provided per combination of bands. This can, for example, reduce the amount of information on the SD.

The information in (1) may be, for example, a value of the SD per se. As an alternative example, the information on the SD may be information obtained by classifying values of the SD. The classified information may be values classified by the same width, for example, the 1-dB width, or pieces of information classified by different widths.

The information in (2) may include information on the combinations of carriers that do not allow the dual TX. The information may include information on the cause why the dual TX is not allowed. The cause may be, for example, the amount of decrease in the sensitivity beyond the MSD, or physical constraints of the UE (e.g., the number of transmitters is only one).

The information in (3) may include, for example, information on the combinations of carriers with the SD beyond the MSD in the UE. This enables, for example, the master base station to select a combination of carriers in starting the DC when there is no combination of carriers whose SD of the UE is lower than or equal to the MSD despite the requirements of the large capacity communication using the dual TX.

The information in (4) may include information on the cause why the single TX is not allowed. Examples of the cause may include the fact that the UE cannot switch between LTE and NR within a defined time. This can, for example, prompt the operations of the base station and the UE when the single TX cannot be allowed. For example, the master base station can promptly determine to cancel the DC when there is no combination of carriers which can be supported by the master base station and the secondary base station and whose SD falls below the MSD.

The information in (5) may be the transmission power per carrier. The information may include information on the maximum transmission power of the UE. With the information, the master base station may determine use carriers and/or determine to switch between the single TX and the dual TX. This enables, for example, the master base station to select the optimal combination of carriers in the communication system with consideration given to reduction in the sensitivity degradation at the receiver when the transmission power of the UE is low.

The information in (6) may include, for example, information on the bandwidth part (BWP). The master base station may, for example, derive the MSD and/or the SD in the BWP with the information. The master base station may determine use carriers and/or determine to switch between the single TX and the dual TX with the derived MSD and/or SD. This enables, for example, the master base station to select the optimal combination of carriers in the communication system with consideration given to the band which the UE actually uses for transmission and reception.

The information in (7) may include information on a difference in frame timing between the master base station and the secondary base station. The master base station may determine whether to switch to the single TX with the information. This enables, for example, the UE to prevent reduction in the communication efficiency due to the contention between the signals in LTE and NR when the master base station switches to the single TX.

The pieces of information in (1) to (8) may be included in the UE capability. For example, this eliminates the need for the base station to newly provide a signaling in obtaining the information, which consequently facilitates the control in the base station. As an alternative example, the pieces of information in (1) to (8) need not be included in the UE capability. Two of the combinations may be used. For example, (1) to (5) may be included in the UE capability, and (6) and (7) need not be included in the UE capability. For example, the UE may notify the master base station of the information in (7) as a notification of a measurement result. This enables, for example, flexible operations that accommodate time-varying information in the communication system.

The base station may request, from the UE, a part or all of the pieces of information in (1) to (8). The UE may notify the base station of the part or all of the pieces of information in (1) to (8). The request and/or the notification may be made via the RRC signaling. The request may be made via, for example, the signaling for the UE capability enquiry (UECapabilityEnquiry) or another RRC signaling. The notification may be given via, for example, the signaling for the UE capability information (UECapabilityInformation) or another RRC signaling.

The base station may request, from the high-level NW device, a part or all of the pieces of information in (1) to (8). The high-level NW device may obtain the information from the UE in advance or from another base station. The other base station may be, for example, a base station to which the UE has been connected before a handover. The high-level NW device may be the AMF, the SMF, or the MME. The high-level NW device may notify the base station of the part or all of the pieces of information in (1) to (8). The request and/or the notification may be made, for example, upon occurrence of the mobility in the UE. The request and/or the notification may be made via the interface between the high-level NW device and the base station. This can, for example, reduce the amount of signaling via a radio interface in a handover of the UE, e.g., the Uu interface.

The base station may obtain, at one time, the part or all of the pieces of information in (1) to (8) for all the combinations of carriers which the UE can use. This can, for example, reduce the amount of signaling via a radio interface when the UE starts the DC.

As an alternative example, the base station may obtain the part or all of the pieces of information in (1) to (8) for a part of the combinations of carriers which the UE can use. For example, the base station may obtain the part or all of the pieces of information in (1) to (8) for the combinations of carriers whose measurement results the UE obtains from the surrounding base stations. The base station may obtain the information, for example, in a sequence for starting the DC. This can, for example, reduce the amount of signaling when the UE is attached to the base station, which consequently enables the UE to be promptly attached to the base station.

The high-level NW device may request, from the base station, the part or all of the pieces of information in (1) to (8). The request may be made as, for example, a request for the UE capability. The request may be made, for example, in a sequence when the UE is attached to the base station. The request may be made via the interface between the high-level NW device and the base station. The request may be made via the signaling in the interface, for example, using a UE radio capability match request.

The base station may request, from the UE, the part or all of the pieces of information in (1) to (8). The base station may make the request after the request from the high-level NW device to the base station or upon start of the DC.

The UE may notify the base station of the part or all of the pieces of information in (1) to (8). The UE may give the notification after the request from the base station to the UE. The notification may be given as a notification of the UE capability.

The UE may notify, at one time, the part or all of the pieces of information in (1) to (8) for all the combinations of carriers which its own UE can use. This can, for example, reduce the amount of signaling via a radio interface when the UE starts the DC. As an alternative example, the UE may notify information on its own UE for a part of the combinations of carriers which its own UE can use. The part of the combinations may be, for example, combinations requested by the base station. This can, for example, reduce the amount of signaling when the UE is attached to the base station, which consequently enables the UE to be promptly attached to the base station.

The base station may notify the high-level NW device of the part or all of the pieces of information in (1) to (8). The notification may be given as a notification of the UE capability. The notification may be given as a response to the request from the high-level NW device to the base station. The response may be given via the interface between the high-level NW device and the base station. The response may be given via the signaling in the interface, for example, using a UE radio capability match response (UE Radio Capability Match Response) or a UE capability information notification (UE Capability Info Indication).

The base station determines combinations of carriers to be used in the CA and/or the DC. The base station may determine whether the UE uses the single TX or the dual TX. The base station may make the determination using a result measured by the UE and received by the base station from the UE. A part or all of the pieces of information in (1) to (8) may be used. The base station may be a master base station in the DC. The base station may determine a plurality of carriers which its own base station can use. The base station may determine a plurality of carriers which the secondary base station can use.

The base station may notify the secondary base station of the configuration on the use carrier in the communication with the UE. The notification may include the configuration indicating which one of the single TX and the dual TX is used in the communication with the UE. The base station may give the notification via the interface between the base stations. The notification may be included in, for example, a secondary base station addition request (SN Addition Request), a secondary base station modification request (SN Modification Request), or a secondary base station reconfiguration complete (SN Reconfiguration Complete) notification. A signaling for the interface between the base stations may be newly provided for the notification.

The notification may include the part or all of the pieces of information in (1) to (8), for example, information on the SD of the UE. The information on the SD may be SDs for all the combinations of carriers that can be supported by the UE. The secondary base station may hold information on the SDs. For example, merely a one-time notification of the information from the base station to the secondary base station will suffice. Thus, the amount of signaling can be reduced. Alternatively, the information on the SDs may be on an SD for a part of the combinations of carriers that can be supported by the UE. The part of the combinations may be, for example, a combination of carriers to be used in the DC configuration. This can reduce the amount of signaling in configuring the DC.

The secondary base station may notify the base station of a response to the configuration. The response may be included in, for example, a notification of the response to the secondary base station addition request (SN Addition Request) or a notification of the response to the secondary base station modification request (SN Modification Request). A signaling for the interface between the base stations may be newly provided for the notification of the response.

The base station may notify the UE of the configuration on the use carrier in the communication with the base station and/or the secondary base station. The notification may include the configuration indicating which one of the single TX and the dual TX the UE uses. The base station may notify the configuration via the RRC signaling. The base station may give the notification, for example, via the RRC signaling for the RRC connection reconfiguration. The base station may notify the configuration, for example, as a sequence for starting the DC.

The base station may notify the UE of the configuration via the MAC signaling. This can, for example, prompt the switching between the single TX and the dual TX.

As an example where the base station notifies the UE of the configuration via the MAC signaling, the base station may switch to the single TX with the notification when its own base station and/or the secondary base station activates the SCell. Such switching may be applied, for example, when the value of the SD and/or the MSD is higher in a combination of the SCell and a cell which is being operated between the base station and the UE. The base station may transmit the notification of the configuration simultaneously with the MAC signaling for instructing the activation/deactivation of the SCell or as the same signaling as the MAC signaling. This enables, for example, the base station to select a cell with superior quality under the SCell control.

Alternatively, the base station may notify the UE of the configuration via the L1/L2 signaling. This enables a more prompt notification.

The UE may configure the single TX/dual TX. The switching may be performed after the base station makes the configuration.

Figure 39:
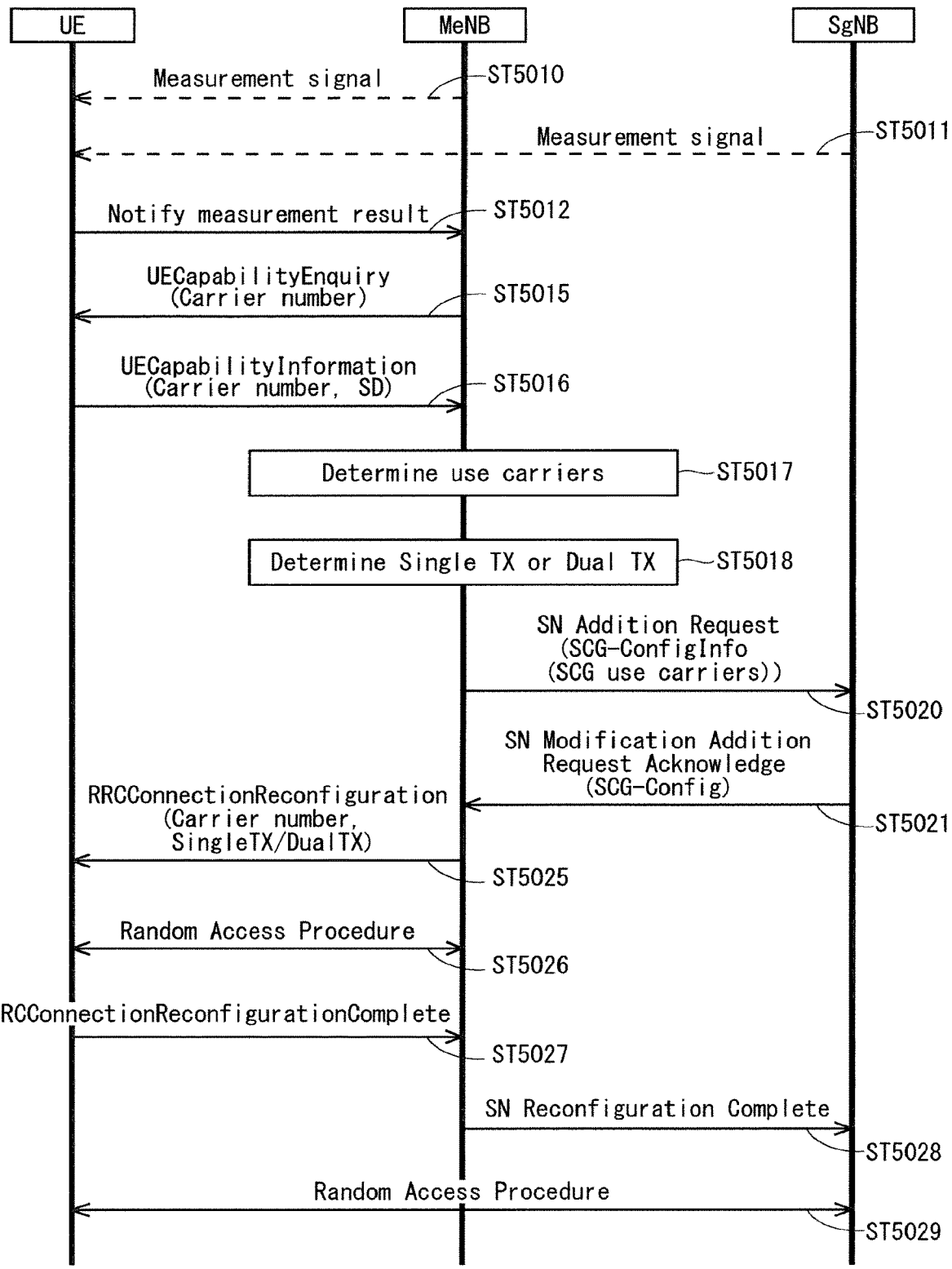
FIG. 39 is a sequence diagram illustrating a procedure when a master base station instructs the UE of the single TX/dual TX according to the fifth embodiment.

FIG. 39 is an example sequence diagram illustrating the procedure when the master base station instructs the UE of the single TX/dual TX. FIG. 39 illustrates the example when the DC is started. The example of FIG. 39 illustrates a case where the master base station is the MeNB and the secondary base station is the SgNB. The example of FIG. 39 illustrates a case where the master base station determines the single TX/dual TX with the information on the SD.

In Step ST5010 of FIG. 39, the MeNB transmits a downlink measurement signal to the UE. In Step ST5011, the SgNB transmits a downlink measurement signal to the UE. The UE receives the signal of Step ST5010 and/or ST5011 and measures the downlink signal. In Step ST5012, the UE notifies the MeNB of a downlink measurement result.

In Step ST5015 of FIG. 39, the MeNB requests the UE capability from the UE. The request may include information on a combination of carriers measured by the UE. In Step ST5016, the UE notifies the MeNB of the UE capability. The notification may include information on the SD in the combination of carriers.

In Step ST5017 of FIG. 39, the MeNB assesses and determines the use carriers in the DC. The use carriers may be a combination of carriers which the MeNB can use, a combination of carriers which the SgNB can use, or both of these. In Step ST5018, the MeNB assesses and determines which one of the single TX and the dual TX the UE uses.

In Step ST5020 of FIG. 39, the MeNB issues a secondary base station addition request to the SgNB. The request may include information on the use carriers determined in Step ST5017. The request may include information indicating which one of the single TX and the dual TX is used, which is determined in Step ST5018. In Step ST5021, the SgNB notifies the MeNB of a response to Step ST5020. FIG. 39 illustrates an example of providing acknowledgement to Step ST5020.

In Step ST5025 of FIG. 39, the MeNB configures the DC for the UE. The configuration may be made, for example, via the signaling for the RRC connection reconfiguration. The configuration includes information on the use carriers determined in Step ST5017. The configuration also includes the information indicating which one of the single TX and the dual TX is used, which is determined in Step ST5018. The UE starts the DC configuration in Step ST5025.

In Step ST5026 of FIG. 39, the UE performs a random access procedure with the MeNB. Step ST5026 may be performed, for example, when the use carriers in the MeNB are changed.

In Step ST5027 of FIG. 39, the UE notifies the MeNB of completion of the DC configuration. In Step ST5028, the MeNB notifies the SgNB of completion of the secondary base station reconfiguration. In Step ST5029, the UE performs the random access procedure with the SgNB.

Although FIG. 39 illustrates the example where Step ST5017 is performed before Step ST5020, Step ST5017 may be performed after Step ST5021. The same may hold true for Step ST5018. Since this enables, for example, the SgNB to determine the use carriers by avoiding combinations of carriers which the SgNB cannot use, the MeNB need not re-determine the use carriers.

In FIG. 39, the MeNB may notify the SgNB of the information on the SD of the UE. Since this enables, for example, the SgNB to select a cell with superior quality in selecting the SCell to be used in the CA, the communication quality in the SgNB can be increased.

The master base station may notify the secondary base station of information on the SCell which its own master base station has activated or deactivated. The notification may include the information on the SD of the UE. The notification may be given via the interface between the base stations (e.g., the Xn interface). The secondary base station may control the SCell to be used by its own secondary base station, with the information. Consequently for example, the secondary base station can use the SCell with high quality even after the SCell to be used by the master base station is changed. This can increase the communication capacity and ensure the reliability.

The method may be applied when the master base station and the secondary base station change places. In other words, the secondary base station may notify the master base station of information on the SCell activated or deactivated by its own secondary base station. The notification may include the information on the SD of the UE. This produces the same advantages as those performed by the master base station.

Figure 40:
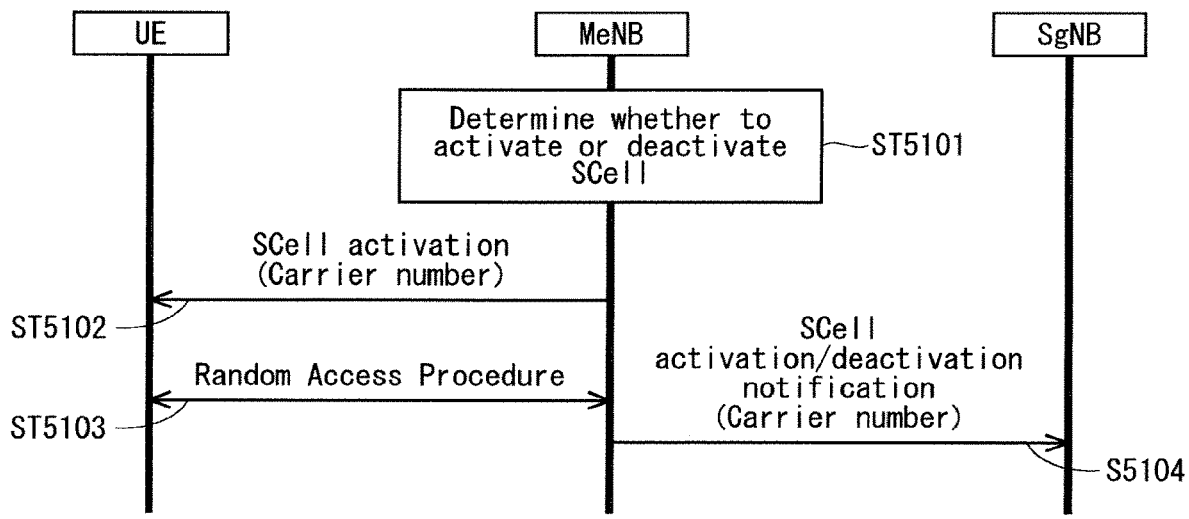
FIG. 40 is a sequence diagram illustrating a notification of information on the SCell when the SCell is activated/deactivated according to the fifth embodiment.

FIG. 40 is a sequence diagram illustrating a notification of information on the SCell when the SCell is activated/deactivated. FIG. 40 illustrates an example where the MeNB activates/deactivates the SCell of its own eNB.

In Step ST5101 of FIG. 40, the MeNB determines whether to activate or deactivate the SCell. The MeNB may make the determination, for example, using a measurement result of the SCell which is notified in advance from the UE.

In Step ST5102 of FIG. 40, the MeNB notifies the UE of activation of the SCell. The MeNB may notify deactivation. The MeNB may give the notification via the MAC signaling. In Step ST5103, the UE may perform the random access procedure with the MeNB using the SCell.

In Step ST5104 of FIG. 40, the MeNB notifies the SgNB of information on the activated/deactivated SCell. The information may be, for example, a carrier number of the SCell. In Step ST5104, the SgNB may control the SCell in its own gNB.

Although FIG. 40 illustrates a case where the MeNB determines to activate/deactivate the SCell, the same may hold true for the SgNB. In other words, the SgNB may perform Step ST5101, perform Step ST5102 on the UE, perform Step ST5103 on the MeNB, and perform Step ST5104 with the UE. This produces the same advantages as those performed by the MeNB.

Although FIG. 40 illustrates the example where Step ST5104 is performed after Step ST5103, Step ST5104 may be performed before Step ST5103. This enables, for example, the SgNB to promptly control the SCell.

The fifth embodiment increases the efficiency of the communication system in the DC.

The First Modification of the Fifth Embodiment

When the UE uses the single TX in the DC using the LTE base station and the NR base station, the following problem occurs. In other words, when an instruction for transmitting the PUCCH and/or the SRS from the NR base station contends with an instruction for transmitting the PUCCH and/or the SRS from the LTE base station, the processing for resolving the contention is not defined in the communication system. Thus, the communication system may malfunction.

A solution to the problem is disclosed below.

A short PUCCH using resources short in the time direction and long in the frequency direction is used as the PUCCH in NR. The short PUCCH in NR is multiplexed with the PUCCH in LTE. The PUCCH in LTE may be punctured in the multiplexing. The symbols to be punctured in the PUCCH in LTE may be symbols occupied by the short PUCCH in NR. The symbols equivalent to the time required for the UE to switch between LTE and NR may be punctured.

The UE may include information indicating occurrence of the PUCCHs in LTE and NR in the same subframe, in the PUCCH in NR or the PUCCH in LTE. The information may be included as, for example, the UCI. The gNB may understand the occurrence of the PUCCHs in the same subframe from the information. The same may hold true for the eNB. This enables, for example, the eNB and/or the gNB to smoothly schedule the uplink PUCCH transmission.

Figure 41:
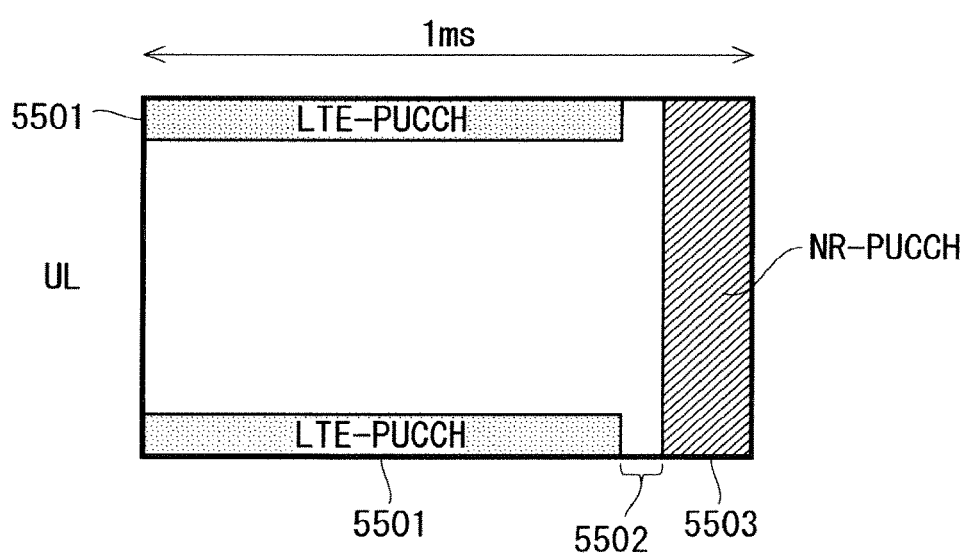
FIG. 41 illustrates example transmission of the PUCCHs in LTE and NR in the same subframe with the single TX according to the first modification of the fifth embodiment.

FIG. 41 illustrates example transmission of the PUCCHs in LTE and NR in the same subframe with the single TX. In FIG. 41, the horizontal axis represents one subframe, and the vertical axis represents frequency resources with which the UE can perform uplink transmission.

In FIG. 41, the UE transmits the PUCCH in LTE to the eNB with frequency/time resources 5501. The UE switches the transmitter between LTE and NR in a time gap 5502. The UE transmits a short PUCCH in NR to the gNB with frequency/time resources 5503.

Although FIG. 41 exemplifies the use of the same frequencies in NR and LTE, the frequencies may differ between NR and LTE.

The UE may transmit the PUSCH in LTE. The UE may transmit the PUSCH in LTE in a symbol for transmitting the PUCCH in LTE. For example, the UE may transmit the PUSCH in LTE with the same timing as that of the PUCCH in LTE, using a subcarrier different from that of the PUCCH in LTE. This can increase the transmission rate in the single TX.

The aforementioned description may be applied to the contention between the PUCCH in LTE and the SRS in NR. For example, the short PUCCH in NR may be read as the SRS in NR. This enables, for example, increase in efficiency of the communication system.

Priorities may be assigned to the SRS in LTE and the PUCCH in NR. The UE may transmit a signal with high priority in the subframe. The priorities may be assigned, for example, when the short PUCCH in NR is used. For example, the PUCCH in NR may be prioritized. The SRS in LTE may be prioritized.

Alternatively, the UE may transmit the SRS in LTE and the PUCCH in NR in a time division manner. For example, the UE may transmit the SRS in LTE in a symbol prior to that of the PUCCH in NR. As an alternative example, the UE may transmit the PUCCH in NR in a symbol prior to that of the SRS in LTE.

A long PUCCH in NR may be used for the contention between the SRS in LTE and the PUCCH in NR. For example, the UE may transmit the PUCCH in NR to the gNB with the frequency/time resources 5501 in FIG. 41. The UE switches the transmitter between LTE and NR in the time gap 5502. The UE may transmit the SRS in LTE to the eNB with the frequency/time resources 5503.

The assignment of the priorities and/or the time division transmission may be applied to the SRS in LTE and the SRS in NR.

Information on the orders and/or priorities of transmitting the PUCCHs and/or the SRSs in LTE and NR may be predefined in a standard, according to the first modification. Alternatively, the master base station may broadcast or dedicatedly notify the information to the UEs being served thereby. The master base station may give the notification via the RRC dedicated signaling. The master base station may give the notification. This enables, for example, flexible control in the LTE-NR coexistence.

According to the first modification, subframes in which transmission is possible in LTE and subframes in which transmission is possible in NR may be allocated in a time division manner. For example, subframes with odd subframe numbers may be allocated to LTE, and subframes with even subframe numbers may be allocated to NR. The subframes may be replaced with slots or mini-slots. Consequently, for example, even when the symbol lengths in LTE and NR are different, the multiplexing in LTE and NR is possible.

According to the first modification, symbols in which transmission is possible in LTE and symbols in which transmission is possible in NR may be allocated in a time division manner. For example, the first half of symbols in a subframe may be allocated to LTE, and the latter half of symbols in the subframe may be allocated to NR. This produces, for example, the same advantages as previously described.

The first modification can prevent the malfunctions caused by the contention of the PUCCH and/or the SRS between LTE and NR.

The Second Modification of the Fifth Embodiment

The uplink preempted communication may be applied to the single TX. For example, upon occurrence of uplink communication with high priority from the UE to the gNB during uplink communication from the UE to the eNB, the UE may perform the uplink communication with the gNB by switching the transmitter between LTE and NR.

The uplink preempted communication method in the LTE-NR coexistence which is disclosed in the first modification of the fourth embodiment may be applied to the uplink preempted communication method with the single TX. This can, for example, avoid the design complexity in the communication system.

The second modification of the fifth embodiment enables prompt execution of the uplink preempted communication with the single TX. Consequently, the low latency communication is possible with the single TX.

The Sixth Embodiment

Supplementary Uplink (may be hereinafter referred to as SUL) for NR may be used for compensating for a difference in cell coverage between the uplink and the downlink at a high frequency in NR (e.g., several tens of GHz). A frequency lower than that in NR may be used as the SUL. The frequency may be, for example, equal to that in LTE. In the SUL transmission from the UE, a path loss may be measured with a downlink signal from the base station in LTE. This enables, for example, measurement of the path loss in the SUL using a signal in the same band as that of the SUL or at a frequency closer to that of the SUL.

Application of the aforementioned method creates the following problem. Specifically, even when the path loss in the SUL is measured with the downlink signal in the same band as that of the SUL, the obtained path loss is inaccurate because the base station of the downlink signal is different from the transmission destination in the SUL. Moreover, the path loss greatly differs between the high frequency band used in NR (e.g., several tens of GHz) and the band used in the SUL (e.g., several GHz). Even when both of the path losses are corrected, the corrected path losses may be inaccurate due to, for example, a difference in the presence or absence of an obstacle or a difference in a propagation mode. Thus, a problem of failing to establish a link in the SUL due to the shortage of the uplink power, and a problem of increase in the interference with the other base stations due to excessive uplink power are created in the SUL.

A solution to the problems is disclosed. The gNB transmits the downlink signal for measuring the path loss. The UE measures the path loss of the downlink signal. The UE derives a path loss in the SUL from the path loss.

A carrier may be newly provided for the downlink signal for measuring the path loss. The band of the downlink signal may be the same as that in the SUL. The band of the downlink signal may be, for example, a band to be used for the UE to communicate with the eNB. The frequency of the downlink signal may be made different from that in the SUL. For example, when the band in the FDD is used, the frequency of the downlink signal may be made different from that in the SUL. Alternatively, the frequency of the downlink signal may be identical to that in the SUL. For example, when the band in the TDD is used, the frequency of the downlink signal may be identical to that in the SUL. This can, for example, avoid the complexity of control over the base station and the UE in measurement of the path loss.

Alternatively, a band different from that in the SUL may be used for the downlink signal for measuring the path loss. For example, a band including the same frequency as that in the SUL may be used in the downlink. Consequently, for example, the path loss in the SUL can be more accurately obtained. As an alternative example, a band including a frequency different from that in the SUL may be used in the downlink. As an alternative example, the frequency being used by the gNB in the CA may be used. As an alternative example, the frequency may be the one that is not used for transmitting and receiving the user data to and from the gNB. This can, for example, prevent exhaustion of the resources for transmitting and receiving the user data to and from the gNB due to the transmission of the downlink signal.

The gNB may use the SS as the downlink signal. For example, the gNB may transmit the downlink signal as an SS block. The SS block may correspond to a part of the beams covered by the gNB. The part of the beams may be, for example, beams directed to the UEs being served by the gNB. This can, for example, reduce the transmission power of the gNB and the interference with the other UEs, e.g., the UEs connected only to the eNB.

The gNB need not transmit the PBCH in the downlink signal. This can, for example, reduce the interference with the other UEs. Alternatively, the gNB may transmit the PBCH in the downlink signal. The UE may obtain, using the PBCH, the frame number (e.g., SFN) to be used in the SUL. The UE may obtain, using the PBCH, the transmission power of the downlink signal. The UE may derive the path loss of the downlink signal from the transmission power of the downlink signal obtained from the PBCH. Since this eliminates the need for, for example, providing another signaling on the downlink signal from the gNB to the UE, the amount of signaling via the radio interface can be reduced.

The gNB may transmit the downlink signal in accordance with a format of the SS burst. The change in the arrangement of the signals in the SS burst which is described in the fourth embodiment may be used. This enables, for example, multiplexing of a non-MBSFN signal to be transmitted from the eNB with the downlink signal to be transmitted from the gNB.

As an alternative example, the gNB may consecutively transmit the SSs for the respective beams. For example, the gNB may transmit the SS for the beam #2 immediately after transmitting the SS for the beam #1. The gNB may intermittently transmit the SSs. The transmission method may be, for example, consecutively transmitting the SSs for all the beams and then consecutively retransmitting the SSs for all the beams after a predetermined interval.

As an alternative example, the CSI-RS may be used as the downlink signal. For example, the gNB may transmit an aperiodic CSI-RS to the UE. The UE may measure a path loss with the CSI-RS. Since this eliminates the need for, for example, the gNB to always reserve the frequency resources for transmitting the downlink signal, the frequency resources can be saved.

The frame timing of the downlink signal may be adjusted to, for example, those of the carriers in the NR band. This, for example, facilitates the control in the base station. As an alternative example, the frame timing of the downlink signal may be adjusted to those of the carriers in the band used by the eNB in LTE. The UE, the gNB, and the eNB may apply the method described in, for example, the fourth embodiment to adjust the frame timing of the downlink signal to those of the carriers in the band used by the eNB. This can, for example, reduce the interference between the downlink signal and the non-MBSFN signals of the eNB. As an alternative example, the gNB may arbitrarily determine the frame timing of the downlink signal. The method may be applied, for example, when the band of the downlink signal is different from that in LTE. This can increase the flexibility of the control by the gNB using the downlink signal.

The frame timing in the SUL may be adjusted to, for example, those of the carriers in the NR band. This, for example, facilitates the control in the base station. As an alternative example, the frame timing in the SUL may be adjusted to those of the carriers in the band used by the UE to communicate with the eNB in LTE. The UE, the gNB, and the eNB may apply the methods described in, for example, the first modification of the fourth embodiment and/or the first modification of the fifth embodiment to adjust the frame timing in the SUL to those of the carriers in the band used by the eNB. This produces the same advantages as those of, for example, the first modification of the fourth embodiment and/or the first modification of the fifth embodiment. As an alternative example, the frame timing in the SUL may be adjusted to that of the downlink signal. This can, for example, increase the flexibility of the control of the SUL in the UE and/or the gNB.

The symbol length in the SUL may be identical to that used in the NR band. This, for example, facilitates the scheduling in the gNB and/or the UE. As an alternative example, the symbol length in the SUL may be made different from that used in the NR band. This enables, for example, flexible operations in the SUL. As an alternative example, the symbol length in the SUL may be identical to those in the carriers in the band used by the UE to communicate with the eNB in LTE. This, for example, facilitates the switching control over the uplink transmission between LTE and NR in the UE.

The gNB may notify the UE of information on the symbol length in the SUL. The gNB may give the notification, for example, via the RRC dedicated signaling. The gNB may include the information on the symbol length in the SUL, in the signaling for notifying the UE to configure the use of the SUL. As an alternative example, the gNB may broadcast, to the UEs being served thereby, the information on the symbol length in the SUL.

The gNB may instruct the UE to measure the path loss of the downlink signal. The gNB may issue the instruction via the RRC signaling, for example, using the RRC connection reconfiguration. The gNB may instruct the UE to measure the path loss of the downlink signal, for example, via the signaling for changing the PSCell or the PCell of the UE. The PSCell or the PCell may be changed, for example, upon start of the use of the SUL. The gNB may instruct the UE to start using the SUL. The gNB may issue the instruction, for example, when the downlink path loss in the NR use band exceeds a predetermined threshold. The UE may notify the gNB of information indicating that the downlink path loss in the NR use band exceeds the predetermined threshold. The threshold may be defined in a standard, or notified from the gNB or the eNB to the UE in advance. The notification may be given, for example, via the signaling for the RRC connection reconfiguration. As an alternative example, the gNB may issue the instruction, for example, when the uplink path loss in the NR use band exceeds a predetermined threshold. The threshold may be determined similarly as the threshold for the downlink path loss in the NR band.

As an alternative example, the gNB may issue the instruction via the MAC signaling. For example, upon sudden change in the radio communication environment in the NR use band, the gNB can promptly instruct the UE to measure the path loss of the downlink signal. Consequently, the UE can promptly use the SUL.

As an alternative example, the gNB may issue the instruction via the L1/L2 signaling. Consequently for example, the gNB can promptly instruct the UE to measure the path loss of the downlink signal. As a result, the UE can more promptly use the SUL.

As an alternative example, the gNB may issue the instruction via a combination of at least two of the RRC signaling, the MAC signaling, and the L1/L2 signaling. For example, pieces of information (1) to (4) which are to be described later and included in the instruction for measuring the path loss of the downlink signal may be notified via the RRC signaling, and information (5) may be notified via the MAC signaling. This enables, for example, a prompt notification and reduction in the amount of signaling for instructing to start measuring the downlink signal, in repeated states of starting/stopping using the SUL.

The following (1) to (6) are disclosed as pieces of information included in the instruction for measuring the path loss of the downlink signal:
  (1) the band for the downlink signal;
  (2) an offset of the path loss;
  (3) information on the sequence of the downlink signal;
  (4) the transmission power of the downlink signal;
  (5) information indicating start or stop of measuring the path loss of the downlink signal; and
  (6) combinations of (1) to (5) above.

The information in (1) enables, for example, the UE to promptly measure the downlink signal.

Regarding (2), the UE may, for example, give the offset to the path loss of the downlink signal to derive a path loss in the SUL. This enables, for example, the UE to more accurately derive the path loss in the SUL.

The information in (3) may be, for example, information on a sequence of the SSs. The information in (3) may be information on a cell ID of the downlink signal. This enables, for example, the UE to promptly capture the downlink signal.

The information in (4) enables the UE to calculate a path loss with the received power of the downlink signal. Alternatively, for example, the gNB can reduce the interference with the other UEs by configuring a small transmission power of the downlink signal.

Regarding (5), for example, the gNB may notify the UE of information indicating start of measuring the path loss of the downlink signal when needing the uplink communication using the SUL. As an alternative example, the gNB may notify the UE of information indicating stop of measuring the path loss of the downlink signal when the measurement of the path loss of the downlink signal is unnecessary. This enables the UE to reduce the amount of processing and the power consumption which are required to measure the path loss of the downlink signal.

The information in (5) may be limited to the information indicating start of measuring the path loss of the downlink signal. After deriving the path loss in the SUL, the UE may stop measuring the path loss of the downlink signal. This can, for example, reduce the amount of signaling from the gNB to the UE.

The gNB may dynamically switch between the PSCell and the PCell. For example, the gNB may configure, in advance for the UE, a cell to be a candidate for the PSCell or the PCell. The gNB may make the configuration, for example, via the RRC dedicated signaling. The gNB may change the PSCell or the PCell via the MAC signaling. The gNB may notify the UE of the MAC signaling. The UE may change the PSCell or the PCell via the MAC signaling. The change of the PSCell or the PCell may be applied to communication using the SUL. For example, a cell for the NR band and a cell for the SUL may be candidates for the PSCell or the PCell. This enables, for example, prompt change of the PSCell or the PCell as the path loss varies with the movement of the UE, and reduction in the amount of signaling due to change of the PSCell or the PCell.

The gNB may configure a timing advance group (TAG) in the SUL similarly as the cells in the NR band. For example, the gNB may configure the frame timing in the SUL similarly as the cells in the NR band. The gNB and the UE need not perform the random access procedure using the SUL. This enables, for example, the UE to promptly start using the SUL.

FIG. 42 is a sequence diagram for the UE to determine a path loss in the SUL with a downlink measurement signal from the NR base station. FIG. 42 illustrates an example where the UE configures the DC with the MeNB and the SgNB. FIG. 42 illustrates an example using the same band in the SUL as that of LTE. FIG. 42 illustrates an example where the NR band is switched to the SUL in the uplink transmission of the UE. FIG. 42 illustrates an example of changing the PSCell according to change from the NR band to the SUL. In FIG. 42, the solid lines represent communication via the interface between the base stations, the dotted lines represent communication using the NR band, and the broken lines represent communication using a band for LTE and the SUL.

In Step ST6101 of FIG. 42, the UE transmits and receives uplink/downlink data to and from the SgNB. The NR band is used in the transmission and reception. The NR band may be, for example, a band of frequencies as high as several tens of GHz. In Step ST6102, the UE measures the path loss in the NR band with the downlink signal of Step ST6101.

In Step ST6103 of FIG. 42, the UE determines whether the path loss derived in Step ST6102 is larger than or equal to a predetermined threshold. When the path loss is smaller than the predetermined threshold, the UE continues to transmit and receive the uplink/downlink data of Step ST6101.

When the path loss is larger than or equal to the predetermined threshold in Step ST6103 of FIG. 42, the UE requests the SgNB to switch from the NR band in the uplink to the SUL in Step ST6104. The UE may make the request via, for example, the RRC signaling. The UE may transmit the request of Step ST6104 in the NR band.

In Step ST6104 of FIG. 42, the UE may notify the request to the SgNB through the MeNB. Consequently, for example, the MeNB understands the switching of the UE to the SUL, which enables smooth control over the UE.

In Step ST6105 of FIG. 42, the SgNB transmits a secondary base station modification required (SN Modification Required) notification to the MeNB. The notification may include information on changing the PSCell. The notification may include information on a configuration of the SUL. The information may be included in, for example, the SCG-Config signaling for the notification.

In Step ST6106 of FIG. 42, the MeNB notifies the UE of the signaling for the RRC connection reconfiguration. The signaling may include the information on changing the PSCell. The signaling may include information on the configuration of the SUL. The UE switches from the PSCell to the SUL via the signaling. In Step ST6107, the UE notifies the MeNB of the signaling for the RRC connection reconfiguration completion. In Step ST6108, the MeNB transmits, to the SgNB, a notification of a secondary base station modification confirmation (SN Modification Confirm).

In Step ST6109 of FIG. 42, the SgNB transmits a downlink measurement signal to the UE. The SgNB may transmit the signal, for example, at a frequency as low as that in the SUL. The UE receives the signal of Step ST6109, and derives the path loss in the SUL in Step ST6110.

In Step ST6111 of FIG. 42, the UE may transmit a random access preamble to the SgNB. The UE may transmit the random access preamble with the SUL. The UE may transmit the random access preamble with the path loss in the SUL which has been derived in Step ST6110.

In Step ST6112 of FIG. 42, the SgNB may notify the UE of a random access response. The SgNB may notify the response with the NR band. In Step ST6113, the UE may transmit a message 3 of the random access procedure to the SgNB. The UE may transmit the message 3 with the SUL. In Step ST6114, the SgNB may transmit a message 4 of the random access procedure to the UE. The SgNB may transmit the message 4 with the NR band.

In Steps ST6115 and ST6116 of FIG. 42, the UE transmits and receives the downlink/uplink data to and from the SgNB. In the downlink communication of Step ST6115, the SgNB may use the NR band. In the uplink communication of Step ST6116, the UE may use the SUL.

Although FIG. 42 illustrates a case where the UE measures a path loss in Step ST6102 and determines whether the path loss is larger than or equal to a threshold in Step ST6103, the gNB may measure the path loss and determine whether the path loss is larger than or equal to the threshold.

Here, the gNB may measure the path loss with the uplink signal from the UE. This can, for example, avoid the design complexity in the UE and eliminates the need for the signaling in Step ST6104, which can reduce the amount of signaling through the Uu interface.

The sixth embodiment enables the UE to more accurately measure the path loss in the SUL. Consequently, the SUL transmission from the UE can be performed with appropriate power, and the interference from the UE to the other base stations can be reduced.

The Seventh Embodiment

The reference signals (RS) in the DL include DMRSs, Phase Tracking RSs (PTRSs), Tracking RSs (TRSs), and CSI-RSs. The DMRSs include a front loaded DMRS (FL-DMRSs) and an additional DMRS (add-DMRS). The FL-DMRS is mapped to the beginning symbols in the PDSCH. Upon receipt of the FL-DMRS in the beginning, the UE can demodulate data mapped to the subsequent symbols earlier.

Since the FL-DMRS is necessary for the demodulation, it is preferred not to preempt the FL-DMRS. However, with no preemption of symbols to which the FL-DMRS is mapped for such a purpose, data for the URLLC UE cannot be transmitted with the timing of the symbols to which the FL-DMRS is mapped. For example, when the data for the URLLC UE occurs with the timing, the resources for the URLLC UE cannot be reserved, and thus transmission of the data for the URLLC UE needs to be delayed.

For example, since the FL-DMRS consists of one or two symbols in NR, the transmission is delayed by the number of the symbols. This may increase the amount of latency in the communication of the URLLC UE.

The seventh embodiment discloses a method for solving such a problem.

Only the resources to which the FL-DMRS is not mapped in the symbols to which the FL-DMRS is mapped are configurable as resources for preemption. The DMRS is configured for each UE per RE. The resources for preemption should be REs to which the FL-DMRS is not mapped. The PDSCH is transmitted in the REs excluding the REs to which the FL-DMRS is mapped, in the symbols to which the FL-DMRS is mapped. A transmission region of the PDSCH should be configurable as the resources for preemption.

A preemption indication (PI) is transmitted for the eMBB UE. The gNB includes, in the PI, information on the resources to be preempted for the eMBB UE to notify the PI to the eMBB UE. The resources to be preempted may be information indicated per RE. The resources for preemption are configurable according to the aforementioned method by being indicated per RE. Upon receipt of the PI, the eMBB UE recognizes no transmission with the resources to be preempted. The eMBB UE can receive resources for the other PDSCHs excluding the resources to be preempted.

This can reserve the resources for the URLLC UE also in the symbols to which the FL-DMRS is mapped. Thus, there is no need to delay transmission of data for the URLLC UE by the number of symbols to which the FL-DMRS is mapped. This can reduce an increase in the amount of latency in the communication of the URLLC UE.

Such a method should be applied to the other RSs. Only the resources to which an RS is not mapped in the symbols to which the RS is mapped are configurable as the resources for preemption. This can produce the same advantages.

However, the amount of the resources for the URLLC UE which can be reserved in the symbols to which the FL-DMRS is mapped is reduced according to the aforementioned method. For example, since the number of REs which can be reserved in the symbols and which can be reserved with the timing of one slot for URLLC is less than normal, the amount of data that can be transmitted in the one slot is reduced. For example, upon occurrence of the large capacity communication, the ultra-reliable low latency characteristics of the URLLC communication are not obtained.

A method for solving such a problem is disclosed.

The FL-DMRS is made preemptable. The preemption of the FL-DMRS is made configurable.

Figure 43:
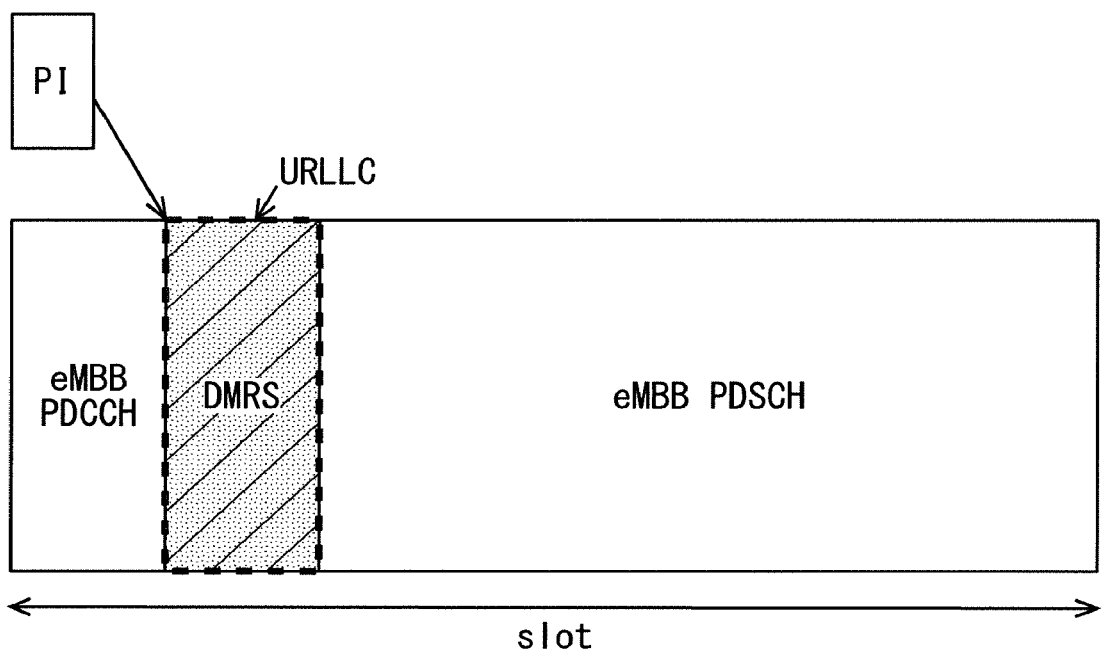
FIG. 43 illustrates an example of preempting the FL-DMRS for the eMBB UE according to the seventh embodiment.

FIG. 43 illustrates an example of preempting the FL-DMRS for the eMBB UE. The resources to which the FL-DMRS configured in a slot for the eMBB UE is mapped are preempted as the resources for the URLLC UE. The gNB does not perform transmission for the eMBB UE with the preempted resources. Here, the gNB does not transmit the FL-DMRS for the eMBB UE. The gNB transmits a slot (may be a mini-slot) for the URLLC UE with the preempted resources. The gNB should transmit DL channels and/or signals for the URLLC UE in the slot.

The DMRS is configured for each UE per RE. The resources for preemption should be REs to which the FL-DMRS is mapped. The PDSCH is transmitted in the REs excluding the REs to which the FL-DMRS is mapped, in the symbols to which the FL-DMRS is mapped. A larger transmission region of the PDSCH for the eMBB UE can be allocated.

The resources for preemption need not be limited to the REs to which the FL-DMRS is mapped. The symbols to which the FL-DMRS is mapped may include the REs to which the FL-DMRS is mapped and the REs to which the other signals or channels are mapped. This can increase the resources for preemption.

The resources for preemption on the frequency axis may be indicated per resource element group (REG). The REG is a group of REs having the same band as the frequency band of the PRB. The resources for preemption may be configured per REG in the symbols to which the FL-DMRS is mapped. The resources for the URLLC UE are configurable per REG or per PRB.

The preemption indication (PI) is transmitted for the eMBB UE. The gNB includes, in the PI, information on the resources to be preempted for the eMBB UE to notify the PI to the eMBB UE. Upon receipt of the PI, the eMBB UE recognizes no transmission with the resources to be preempted. The eMBB UE can receive resources for the other PDSCHs excluding the resources to be preempted.

The DMRS is mapped to a different RE for each UE. The same RE may be configured for the DMRSs of a plurality of UEs. The DMRS for each of the UEs for which the same RE has been configured is multiplexed with, for example, an orthogonal code. Information on the resources for preemption may be notified to each UE or a UE group consisting of one or more UEs. The UE group may be a group of UEs whose DMRSs are configured in the same RE.

The PI may be transmitted for each eMBB UE or for each UE group. The transmission for each UE group can reduce the amount of signaling.

Figure 44:
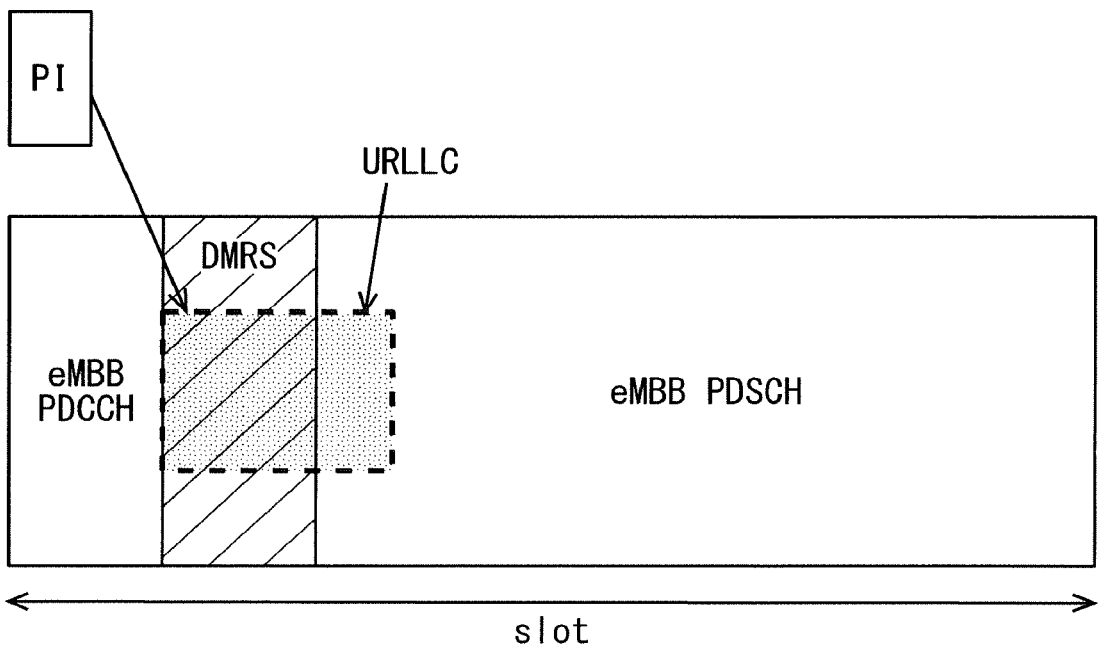
FIG. 44 illustrates an example of preempting the FL-DMRS for the eMBB UE according to the seventh embodiment.

FIG. 44 illustrates an example of preempting the FL-DMRS for the eMBB UE. A part of the symbols to which the PDSCH and the FL-DMRS that are configured in a slot for the eMBB UE are mapped are preempted as the resources for the URLLC UE. The gNB does not perform transmission for the eMBB UE with the preempted resources. The gNB may prevent transmission of only the resources for the FL-DMRS and the PDSCH that are preempted.

The gNB transmits a slot for the URLLC UE with the preempted resources. The gNB should transmit the DL channels and/or signals for the URLLC UE in the slot. This can support a slot configuration for an arbitrary URLLC UE.

The PI is transmitted for the eMBB UE. Since this is identical to that in FIG. 43, the description thereof is omitted.

The gNB does not perform transmission for the eMBB UE with the preempted resources. As an alternative method on the FL-DMRS, the gNB may prevent transmission of the entirety of the FL-DMRS to be mapped to the symbols preempted for the FL-DMRS. Here, information on the resources for preemption to be notified to the eMBB UE with the PI should be resources for the entirety of the FL-DMRS.

However, when the FL-DMRS is made preemptable, the FL-DMRS is not transmitted. Thus, the FL-DMRS cannot be used for demodulating data for the eMBB UE. Thus, the eMBB UE cannot demodulate the data. The seventh embodiment discloses a method for solving such a problem.

When the FL-DMRS and the add-DMRS are configured for the eMBB UE, the FL-DMRS is made preemptable. The FL-DMRS may be configured as the resources for preemption. When the FL-DMRS and the add-DMRS are configured for the eMBB UE, one of the FL-DMRS and the add-DMRS should be configured not to be preempted for the resources for the URLLC UE.

The symbols to which the add-DMRS can be mapped are predetermined in a standard. The gNB notifies the UE of the configuration of the add-DMRS in advance. In the case where the add-DMRS is configured, even when the FL-DMRS is preempted and thus not transmitted, the use of the add-DMRS can improve the performance for demodulating data to be mapped to the PDSCH.

The gNB notifies the eMBB UE of the resources for preemption with the PI. The gNB notifies the UE of the resources for the PI in advance. Upon receipt of the resources, the UE can receive the PI. The resources for the PI may be in a slot identical to or different from that for the resources for preemption.

When the FL-DMRS and the add-DMRS are configured for the eMBB UE, symbols excluding the symbols to which the FL-DMRS is mapped, symbols excluding the symbols to which the add-DMRS is mapped, or symbols excluding the symbols to which the FL-DMRS is mapped and the symbols to which the add-DMRS is mapped may be configured as the resources for preemption.

The resources for preemption may be configured per symbol, in the symbols to which the DMRSs are mapped. For example, when a DMRS consists of a plurality of symbols, configuring the resources for preemption per symbol makes only one of the symbols in the DMRS configurable as the resources for preemption. For example, when one symbol of a DMRS is configured for each UE, the DMRS is configurable as the resources for preemption.

The resources for preemption may be configured not per symbol but per resource element group (REG) or per resource element (RE) to each of which the DMRS is mapped. The resources for preemption should be configured per REG or per RE instead of per symbol.

For example, when the DMRSs are discretely mapped in the frequency axis direction, configuring the resources for preemption per REG or per RE makes only the REG or the RE to which the DMRS is mapped configurable as the resources for preemption. For example, when the DMRSs of a plurality of UEs are configured in one symbol through the FDM, a UE to be preempted is configurable, and the DMRS of the UE is configurable as the resources for preemption.

Information included in the PI may be, for example, information on the resources for preemption. Examples of the information include resource information on the frequency axis and resource information on the time axis. The resource information may be, for example, information per symbol, per REG, or per RE. This enables the eMBB UE to identify the resources for preemption. The resource information may be, for example, a slot number. This is effective when the resources for preemption are in a slot different from that in which the PI is transmitted.

Information indicating relative values with respect to the slot in which the PI has been notified may be used instead of the slot number. The relative values may be numbered by integers larger than or equal to zero. This is effective when the resources for preemption are in a slot prior to the PI.

Figure 45:
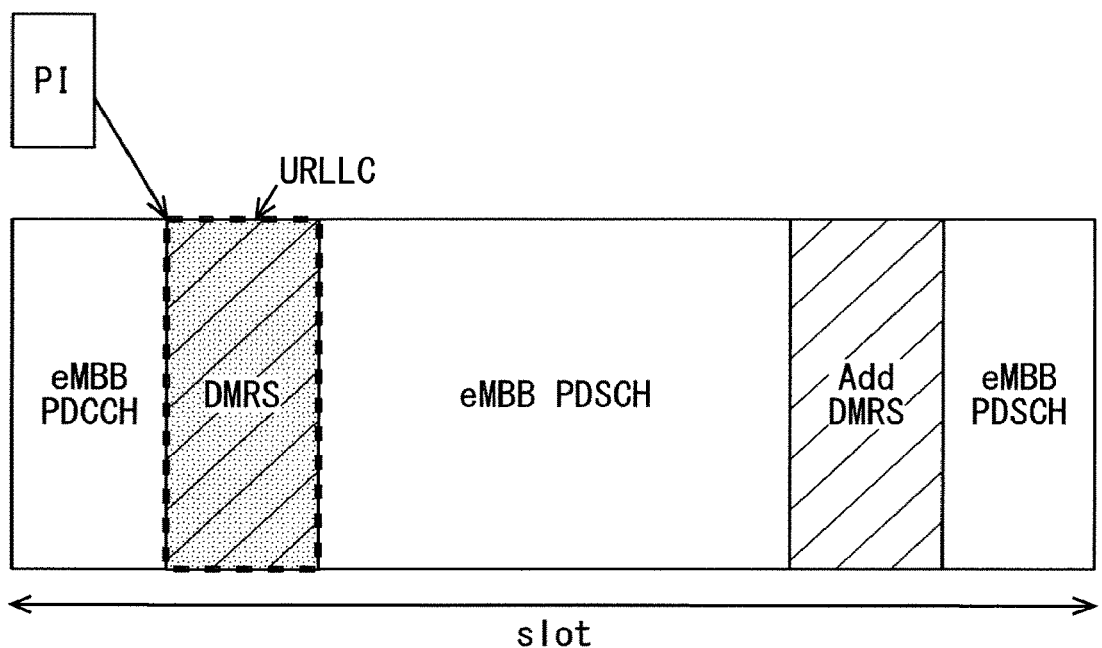
FIG. 45 illustrates an example of preempting the FL-DMRS when the FL-DMRS and the add-DMRS are configured for the eMBB UE according to the seventh embodiment.

FIG. 45 illustrates an example of preempting the FL-DMRS when the FL-DMRS and the add-DMRS are configured for the eMBB UE. The FL-DMRS and the add-DMRS are configured in the same slot for the eMBB UE. The symbols to which the FL-DMRS for the eMBB UE is mapped are preempted as the resources for the URLLC UE. The gNB does not perform transmission for the eMBB UE with the preempted resources. Here, the gNB does not transmit the FL-DMRS for the eMBB UE. The gNB transmits a slot for the URLLC UE with the preempted resources. The gNB should transmit the DL channels and/or signals for the URLLC UE in the slot.

The PI is transmitted for the eMBB UE. The gNB includes, in the PI, information on the resources to be preempted for the eMBB UE to notify the PI to the eMBB UE. Upon receipt of the PI, the eMBB UE recognizes no transmission with the resources to be preempted. The eMBB UE can receive the resources for the other PDSCHs excluding the resources to be preempted. The eMBB UE receives the add-DMRS configured in the same slot. The eMBB UE can demodulate the PDSCH with the add-DMRS.

The gNB may configure the add-DMRS in advance so that the FL-DMRS is made preemptable. The method for configuring the add-DMRS may be applied thereto. Even when the FL-DMRS is preempted and thus not transmitted, the add-DMRS can be used, and the performance for demodulating data to be mapped to the PDSCH can be improved.

When only the FL-DMRS is configured for the eMBB UE (when the add-DMRS is not configured), the FL-DMRS should be non-preemptable. The FL-DMRS should be non-configurable as the resources for preemption. When only the FL-DMRS is configured for the eMBB UE (when the add-DMRS is not configured), the FL-DMRS should be configured not to be preempted for the resources for the URLLC UE.

The resources for preemption may be non-configurable per symbol in the symbols to which the DMRS is mapped. For example, when the DMRS consists of a plurality of symbols, making the resources for preemption non-configurable per symbol can make only one symbol in the DMRS non-configurable as the resources for preemption. For example, when a DMRS consisting of two symbols is configured for each UE, one of the symbols in the DMRS can be made non-configurable as the resources for preemption.

The resources for preemption may be non-configurable per REG or per RE. For example, when a plurality of DMRSs are discretely configured in one symbol, one of the DMRSs can be non-configurable as the resources for preemption.

Consequently, for example, the UE can perform demodulation with the non-configurable DMRS as the resources for preemption.

When the FL-DMRS is configured and the add-DMRS is not configured for the eMBB UE, the FL-DMRS may be preemptable. The FL-DMRS may be configured as the resources for preemption.

Merely making the FL-DMRS preemptable may disable the eMBB UE from demodulating data of the PDSCH. Some ingenuity is necessary. Here, the solution is disclosed.

A complementary DMRS is configured for the eMBB UE. The complementary DMRS is configured in a DL region in the same slot as that of the preempted FL-DMRS, and is used for demodulating the data of the PDSCH. When the FL-DMRS is preempted, the FL-DMRS cannot be used but the complementary DMRS is used for the demodulation.

The gNB does not transmit, to the eMBB UE, data with the resources with which the complementary DMRS has been configured. The gNB transmits the complementary DMRS with the resources with which the complementary DMRS has been configured. This can avoid a contention between transmission of the configured complementary DMRS and transmission of data. The gNB notifies the eMBB UE of information on the complementary DMRS. Examples of the information on the complementary DMRS include a configuration of the complementary DMRS and the resources with which the complementary DMRS is configured.

The complementary DMRS is generated with information on the complementary DMRS, and the generated complementary DMRS is mapped to the DL resources. Another information may be used together in generating and mapping of the complementary DMRS. Examples of the other information include an identifier of the UE.

The gNB configures the FL-DMRS as the resources for preemption for the UE to configure the complementary DMRS. The gNB notifies the UE of the resources for preemption with the PI. A PI for notifying the information on the complementary DMRS may be provided. The gNB should notify the UE of the information on the complementary DMRS with the PI. A notification of the PI enables the dynamic configuration of the complementary DMRS.

The gNB may include the information on the complementary DMRS in the PI to be used for notifying the resources for preemption to notify the information. The resources for control to be notified from the gNB to the UE are reduced through inclusion of the information in the same PI and its notification.

As previously described, the DMRSs of a plurality of UEs may be multiplexed with the same resources on the frequency-time axes. The DMRSs of the plurality of UEs may be multiplexed with the same symbol. Thus, when the FL-DMRS and the add-DMRS are preempted, the resources for preemption may be configured and information on the resources for preemption may be notified, for each UE or for each UE group.

The complementary DMRS may be multiplexed similarly as the FL-DMRS or the add-DMRS. The complementary DMRS may be configured for each UE or for each UE group. For example, when the complementary DMRS is configured for a plurality of UEs with the same resources, configuring the resources for the complementary DMRS for each UE group can reduce the amount of information for the configuration.

The gNB may notify the information on the complementary DMRS for each UE or for each UE group. The UE group may consist of one or more UEs for which the complementary DMRS is configured. This is effective, for example, when the resources for the complementary DMRS are configured for each UE group. The amount of signaling for notifying the configuration can be reduced.

Figure 46:
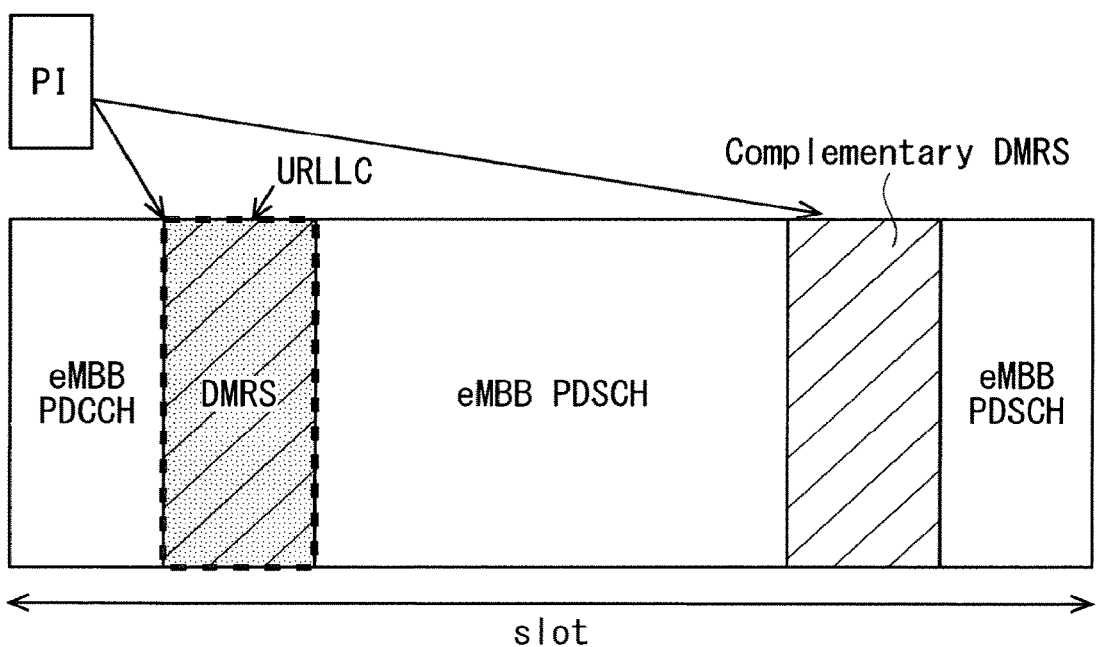
FIG. 46 illustrates an example of preempting the FL-DMRS when only the FL-DMRS is configured in one slot for the eMBB UE according to the seventh embodiment.

FIG. 46 illustrates an example of preempting the FL-DMRS when only the FL-DMRS is configured in one slot for the eMBB UE. The FL-DMRS is configured in the one slot for the eMBB UE. The symbols to which the FL-DMRS for the eMBB UE is mapped are preempted as the resources for the URLLC UE. The gNB does not perform transmission for the eMBB UE with the preempted resources. Here, the gNB does not transmit the FL-DMRS for the eMBB UE. The gNB transmits a slot for the URLLC UE with the preempted resources. The gNB should transmit the DL channels and/or signals for the URLLC UE in the slot.

The gNB configures the complementary DMRS in the same slot. Data is not mapped with the resources with which the complementary DMRS has been configured. The gNB transmits the complementary DMRS and does not transmit the data, with the resources with which the complementary DMRS has been configured.

The PI is transmitted for the eMBB UE. In the example of FIG. 46, the gNB includes, in one PI, information on the resources to be preempted for the eMBB UE and the information on the complementary DMRS to notify the PI to the eMBB UE. Upon receipt of the PI, the eMBB UE recognizes no transmission with the resources to be preempted and recognizes the resources with which the complementary DMRS is configured.

The eMBB UE can receive the resources for the other PDSCHs excluding the resources to be preempted and the resources with which the complementary DMRS is configured. The eMBB UE receives the complementary DMRS configured in the same slot. The eMBB UE can demodulate the PDSCH with the complementary DMRS.

The complementary DMRS is transmitted from a transmission point identical to that of the original FL-DMRS and/or data (the PDSCH).

As an alternative method, the complementary DMRS may have a quasi-co-location relationship with the original FL-DMRS. And/or, the complementary DMRS may have a quasi-co-location relationship with the data (PDSCH). Consequently, even when the complementary DMRS is transmitted from a transmission point different from that of the original FL-DMRS or the data, a demodulation result of the complementary DMRS can be regarded as a demodulation result of the original FL-DMRS, and the complementary DMRS can be used as data for demodulation.

The gNB may notify the UE of information on the quasi-co-location relationship. The flexible configuration is possible. The gNB may notify the information via the RRC signaling. This enables the semi-static configuration, and can reduce the amount of signaling for notification. Alternatively, the gNB may include the information in the PI to notify the information. This enables the dynamic configuration.

The complementary DMRS may be mapped to resources subsequent to the resources to be preempted. Alternatively, the complementary DMRS may be mapped to symbols subsequent to the symbols to be preempted, in the symbols to which the PDSCH in the same slot is mapped. This can shorten a duration from occurrence of data for the URLLC UE to transmission of the data more than that for mapping the complementary DMRS to the symbols subsequent to the symbols to be preempted.

Six examples of information on the configuration of the complementary DMRS are disclosed below:
 (1) the number of symbols of the complementary DMRS;
 (2) the type of the complementary DMRS or may be an orthogonal method for the complementary DMRS;
 (3) the port number of the complementary DMRS;
 (4) a scrambling identifier of the complementary DMRS;
 (5) information on the sequence of the complementary DMRS, for example, a ZC root index such as the CS; and
 (6) combinations of (1) to (5) above.

Information on the resources with which the complementary DMRS is configured includes time resource information and frequency resource information. Seven examples of the information on the resources with which the complementary DMRS is configured are disclosed below:
 (1) the symbol number;
 (2) the slot number or may be the mini-slot number;
 (3) the subcarrier number or may be the subcarrier number in the PRB;
 (4) the RE number or may be the RE number in the PRB;
 (5) the REG number;
 (6) the PRB number; and
 (7) combinations of (1) to (6) above.

Although disclosed is notifying the configuration of the complementary DMRS with the PI, the configuration of the complementary DMRS may be notified via the RRC signaling. The notification may be given via the UE-dedicated RRC signaling. This can reduce the amount of information in the PI. Reception errors by the UE can be reduced.

Although disclosed is notifying the resources with which the complementary DMRS is configured with the PI, the resources with which the complementary DMRS is configured may be notified via the RRC signaling. The notification may be given via the UE-dedicated RRC signaling. This can reduce the amount of information in the PI. The reception errors by the UE can be reduced.

The operations of the gNB are disclosed. The gNB does not transmit the FL-DMRS for the eMBB UE with the configured resources for preemption. When the resources not only for the FL-DMRS but also for the PDSCH are intended for the resources for preemption, the gNB does not transmit data to be mapped to the PDSCH. The gNB does not transmit data for the eMBB UE with the configured resources for the complementary DMRS.

The gNB may transmit, in the symbols for the PDSCH in the same slot, the data for the eMBB UE to be transmitted with the resources for preemption or the resources for the complementary DMRS. The symbols for the PDSCH in the same slot may be symbols subsequent to the resources for preemption or symbols subsequent to the symbols for the complementary DMRS. Data for each eMBB UE to be transmitted, and the symbols in which the data is transmitted may be configurable.

This can reduce loss of the downlink data and the number of retransmissions.

The gNB may change the coding rate of the data for the eMBB UE to be transmitted with the resources for preemption or the resources for the complementary DMRS, and transmit the data. The gNB may change the coding rate of data in the symbols for the PDSCH in the same slot, and transmit the data. The gNB may change the coding rate of the data for the eMBB UE to be transmitted with the resources for preemption or the resources for the complementary DMRS, and the coding rate of data to be transmitted in the symbols in which the data for the eMBB UE is transmitted, and transmit the pieces of data.

With such a method, the gNB can transmit the data to be transmitted in the same slot. The gNB can transmit the downlink data with low latency.

The gNB may transmit, in the symbols subsequent to the symbols for preemption, the data for the eMBB UE to be transmitted with the resources for the complementary DMRS. The gNB may transmit, in the symbols subsequent to the symbols for preemption in the same slot, the data for the eMBB UE to be transmitted with the resources for the complementary DMRS.

The gNB may change the coding rate of the data for the eMBB UE to be transmitted with the resources for the complementary DMRS, and transmit the data in the symbols subsequent to the symbols for preemption in the same slot. The gNB may change the coding rate of the data subsequent to the symbols for preemption in the same slot, and transmit the data for the eMBB UE in the symbols subsequent to the symbols for preemption in the same slot. The gNB may change the coding rate of the data for the eMBB UE to be transmitted with the resources for the complementary DMRS and the coding rate of the data subsequent to the symbols for preemption in the same slot, and transmit the data for the eMBB UE in the symbols subsequent to the symbols for preemption in the same slot.

This can reduce the coding rate of the data for the eMBB UE to be transmitted with the resources for the complementary DMRS, and improve the demodulating performance in the gNB.

The gNB notifies the UE of information on the coding rate. The gNB may include the information in the PI for notifying the resources for preemption to notify the information. And/or, the gNB may include the information on the coding rate in the PI for notifying the information on the complementary DMRS to notify the information. Examples of the information on the coding rate include a coding rate and a data coverage within which the coding rate is applied.

Examples of the data coverage within which the notified coding rate is applied include the data for the eMBB UE to be transmitted with the resources for the complementary DMRS, data subsequent to the complementary DMRS symbols, and data subsequent to the symbols for preemption. The data coverage may be split, and the coding rate may be configured for each of the split data coverages. The gNB may associate each of the data coverages with the coding rate to notify them.

Consequently, the UE can easily demodulate the data for the eMBB UE to be transmitted with the resources for the complementary DMRS, and the data subsequent to the symbols for preemption.

The gNB uses the configured resources for preemption for the DL communication with the URLLC UE. The gNB maps the DL channels and/or signals for the URLLC UE to the resources for preemption. Examples of the DL channels include a data channel and a control channel. The PDCCH may be mapped as a control channel. The DCI may be mapped to the PDCCH, and transmitted. The URLLC UE receives the DL channels and/or signals.

Upon receipt of the PI of the resources for preemption from the gNB, the eMBB UE recognizes no DL transmission with the resources for preemption that are included in the PI. The eMBB UE also recognizes no transmission of the FL-DMRS. Upon receipt of the PI including the information on the complementary DMRS from the gNB, the eMBB UE recognizes that the complementary DMRS is to be transmitted with the resources for the complementary DMRS.

The eMBB UE can receive the complementary DMRS and perform demodulation with the complementary DMRS.

Figure 47:
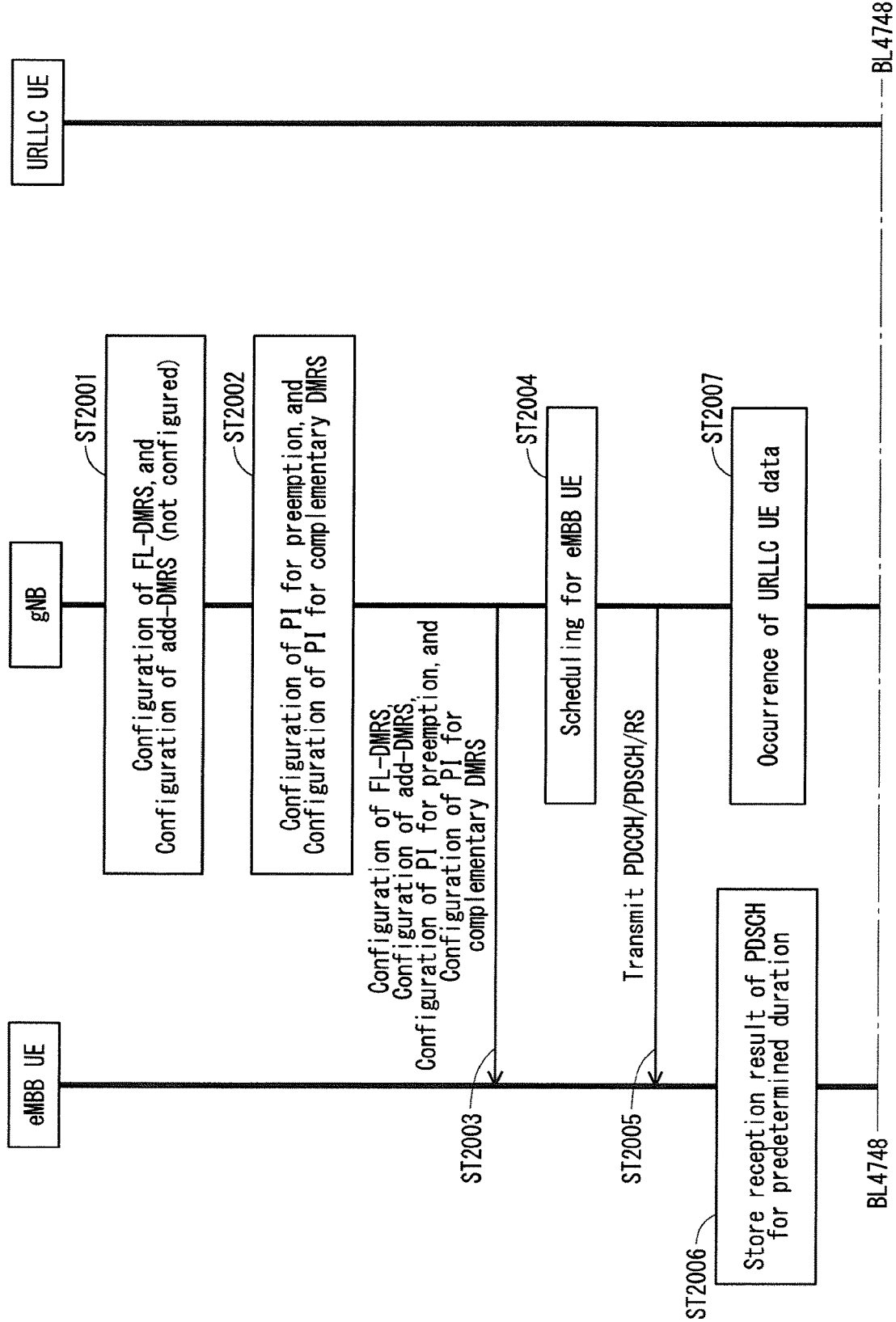
FIG. 47 illustrates an example sequence of processes for preempting the FL-DMRS when only the FL-DMRS is configured in a slot for the eMBB UE according to the seventh embodiment.
Figure 48:
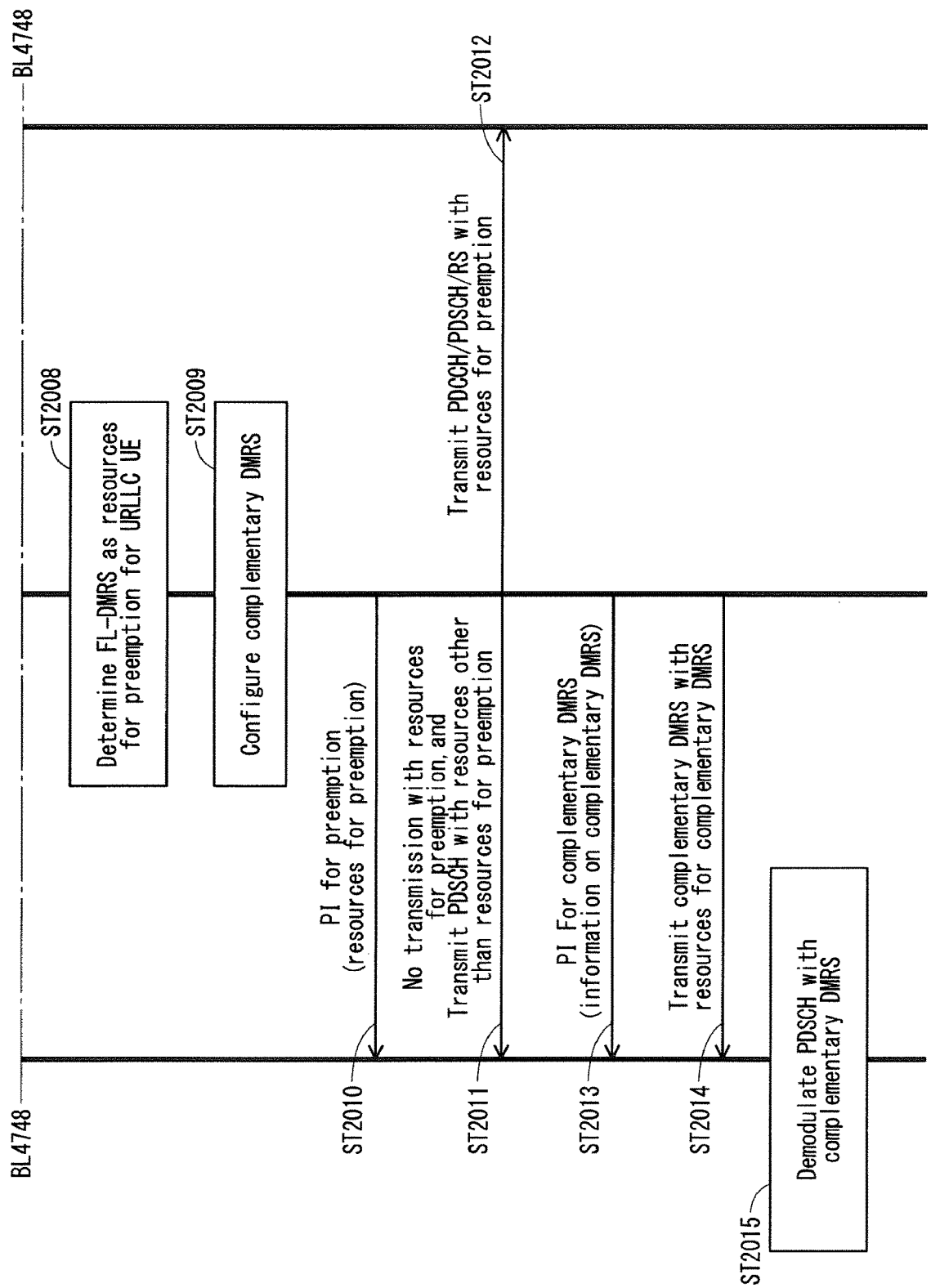
FIG. 48 illustrates the example sequence of processes for preempting the FL-DMRS when only the FL-DMRS is configured in a slot for the eMBB UE according to the seventh embodiment.

FIGS. 47 and 48 illustrate an example sequence of processes for preempting the FL-DMRS when only the FL-DMRS is configured in a slot for the eMBB UE. FIGS. 47 and 48 are connected across a location of a border BL4748. FIGS. 47 and 48 illustrate a case where the complementary DMRS is configured.

In Step ST2001, the gNB configures the FL-DMRS for the eMBB UE. The gNB does not configure the add-DMRS. In Step ST2002, the gNB configures, for example, the resources and the transmission timing of the PI for the eMBB UE. The gNB also configures, for example, the resources and the transmission timing of the PI for the complementary DMRS, for the eMBB UE. Examples of the transmission timing include a period, offset information, a slot number, and a symbol number. These may be configured for each UE or for each UE group.

The gNB may notify the eMBB UE of information indicating that the preempting processes are to be performed. The gNB may notify the information in Step ST2003. Consequently, the eMBB UE can recognize that the preempting processes are to be performed. Upon receipt of the information, the eMBB UE should use the configuration of the PI for preemption and the configuration for the complementary DMRS that have been notified in Step ST2003.

The gNB need not notify the eMBB UE of the information indicating that the preempting processes are to be performed. A notification of the configuration of the PI for preemption or the configuration for the complementary DMRS from the gNB may trigger the preempting processes. The eMBB UE determines that the preempting processes are triggered by the notification of the configuration of the PI for preemption or the configuration for the complementary DMRS in Step ST2003.

In Step ST2003, the gNB notifies the eMBB UE of configuration information of the FL-DMRS, configuration information of the add-DMRS, configuration information of the PI for preemption, and configuration information of the PI for the complementary DMRS. The gNB may give this notification via the RRC signaling or using a UE-dedicated notification.

In Step ST2004, the gNB performs scheduling for the eMBB UE. In Step ST2005, the gNB transmits the PDCCH, the PDSCH, and the RS to the eMBB UE according to a result of the scheduling. The eMBB UE receives the various configurations notified in Step ST2003, and the PDCCH, the PDSCH, and the RS notified in Step ST2005 to receive data mapped to the PDSCH.

In Step ST2006, the eMBB UE for which the preempting processes have been configured stores the reception result of the PDSCH for a predetermined duration. Upon receipt of the complementary DMRS configured in the same slot, the eMBB UE can demodulate the PDSCH in the same slot.

Upon occurrence of URLLC UE data in Step ST2007, the gNB determines the FL-DMRS of the eMBB UE as the resources for preemption for the URLLC UE in Step ST2008. The gNB which has determined the FL-DMRS as the resources for preemption configures the complementary DMRS in Step ST2009.

In Step ST2010, the gNB notifies the eMBB UE of the PI for preemption. In Step ST2011, the gNB does not perform transmission to the eMBB UE with the resources for preemption. The gNB transmits the PDSCH to the eMBB UE with resources other than the resources for preemption. In Step ST2012, the gNB transmits a slot for the URLLC UE to the URLLC UE with the resources for preemption. The gNB transmits the PDCCH, the PDSCH, and the RS to the URLLC UE in the slot.

In Step ST2013, the gNB transmits the PI for the complementary DMRS to the eMBB UE. In Step ST2014, the gNB transmits the complementary DMRS to the eMBB UE with the resources for the complementary DMRS. In Step ST2015, the eMBB UE demodulates the PDSCH with the complementary DMRS received with the information on the complementary DMRS which has been notified from the gNB, to receive data.

This can make the FL-DMRS for the eMBB UE preemptable. The eMBB UE can demodulate, with the complementary DMRS, the data mapped to the PDSCH, whereas the URLLC UE can receive the data transmitted to the URLLC UE with the resources for preemption. This enables the high-speed large-capacity communication for the eMBB UE, and the low-latency communication for the URLLC UE.

Another method for notifying the complementary DMRS is disclosed. The gNB notifies the UE of the information on the complementary DMRS via the RRC signaling. The gNB notifies, with the PI, the UE of configuration/non-configuration information on the complementary DMRS. Activation/deactivation may be used as the configuration/non-configuration information on the complementary DMRS. Activation is notified when the complementary DMRS is configured, and deactivation is notified when the complementary DMRS is not configured.

Consequently, the eMBB UE can recognize whether the complementary DMRS is configured, with the configuration and the resources for the complementary DMRS which have been notified via the RRC signaling. Although disclosed is an example of notifying the configuration/non-configuration information with the PI, only information indicating the configuration may be notified with the PI, or only information indicating the non-configuration may be notified with the PI. When only the information indicating the configuration is notified, the absence of such information should indicate the non-configuration. When only the information indicating the non-configuration is notified, the absence of such information should indicate the configuration.

These can reduce the amount of information notified with the PI.

Another method for notifying the complementary DMRS is disclosed. The gNB notifies the UE of information on candidates for the complementary DMRS via the RRC signaling. The number of the candidates may be one or more. The candidates may be numbered. The gNB notifies, with the PI, the UE of which candidate for the complementary DMRS is to be configured. Consequently, the eMBB UE can select information on the complementary DMRS which has been notified with the PI, from the information on candidates for the complementary DMRS which has been notified via the RRC signaling, and recognize the configuration of the complementary DMRS.

This can reduce the amount of information notified with the PI.

A part or the entirety of the configuration of the complementary DMRS may be identical to that of the add-DMRS. And/or, the frequency resources with which the complementary DMRS is configured may be identical to those of the add-DMRS. This can yield the characteristics equivalent to those of the add-DMRS. Further, there is no need to separately configure the complementary DMRS, which can facilitate the processes and the circuit configurations in the eNB and the UE.

When the complementary DMRS is configured in the same manner as the add-DMRS, such a configuration may be statically determined in a standard. Alternatively, information indicating that the complementary DMRS is configured in the same manner as the add-DMRS may be provided and notified with the PI. Alternatively, the information may be notified via the RRC signaling.

A plurality of configurations of the add-DMRS may be numbered. The gNB notifies, with the PI, the UE of which configuration of the add-DMRS is used. Consequently, the eMBB UE can, for example, select configuration information on the add-DMRS which has been notified with the PI, from configuration information on candidates for the add-DMRS which has been notified via the RRC signaling, and recognize the configuration information as the configuration of the complementary DMRS.

Another information on the complementary DMRS may include information on the power. The information on the power may be information on the power configured for the complementary DMRS. Alternatively, the information on the power may be information on a difference with the power configured for the FL-DMRS or information on a difference with the power configured for the PDSCH.

Configuring the information on the power of the complementary DMRS enables a configuration more appropriate for, for example, the resources for configuring the complementary DMRS, a state such as the speed of the eMBB UE, or a channel quality, which can improve the demodulating performance. Since configuring of excessively high power can be prevented, the power consumption in the gNB can be reduced.

As previously described, the gNB may notify the eMBB UE of the information on the power with the PI or via the RRC signaling. Alternatively, the information on the power may be statically predetermined in a standard.

The power configured for the complementary DMRS may be identical to that for the FL-DMRS. The power configured for the complementary DMRS may be statically predetermined in a standard. The information on the complementary DMRS can be reduced.

Figure 49:
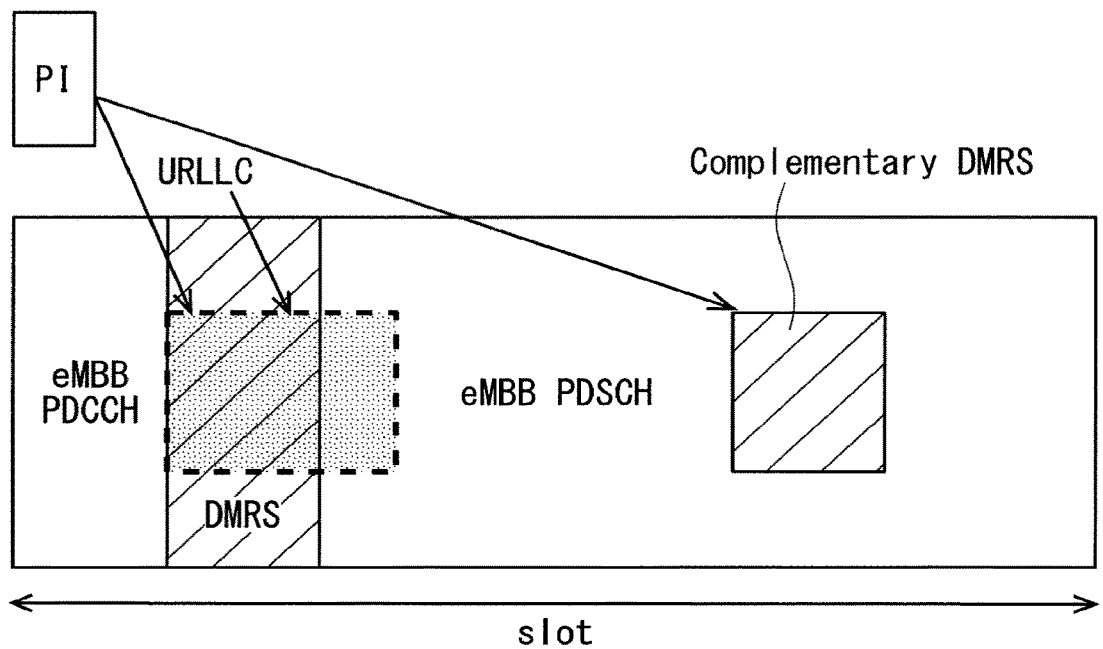
FIG. 49 illustrates an example of preempting the FL-DMRS when only the FL-DMRS is configured in one slot for the eMBB UE according to the seventh embodiment.

FIG. 49 illustrates an example of preempting the FL-DMRS when only the FL-DMRS is configured in one slot for the eMBB UE. The FL-DMRS is configured in the one slot for the eMBB UE. A part of the symbols to which the FL-DMRS and the PDSCH that are configured in the slot for the eMBB UE are mapped are preempted as the resources for the URLLC UE. The gNB does not perform transmission for the eMBB UE with the preempted resources. The gNB transmits a slot for the URLLC UE with the preempted resources. The gNB should transmit the DL channels and/or signals for the URLLC UE in the slot.

The gNB configures the complementary DMRS in the same slot. The gNB may configure only the preempted FL-DMRS as the complementary DMRS. The complementary DMRS may be configurable per RE or per REG in the frequency axis direction. Alternatively, the complementary DMRS may be configurable per resource for the FL-DMRS for each UE. The PDSCH is not mapped with the resources with which the complementary DMRS has been configured. The gNB transmits the complementary DMRS and does not transmit the PDSCH, with the resources with which the complementary DMRS has been configured.

The resources for the complementary DMRS on the frequency axis may be different from those for the FL-DMRS on the frequency axis. For example, the resources for the complementary DMRS on the frequency axis may be resources for the entirety of the frequency bands at which the PDSCH is mapped. This can improve the demodulating performance for channel variations on the frequency axis.

Since the method for transmitting the PI is identical to that in FIG. 46, the description thereof is omitted. The eMBB UE can receive the resources for the other PDSCHs excluding the resources to be preempted and the resources with which the complementary DMRS is configured. The eMBB UE receives the complementary DMRS configured in the same slot. The eMBB UE can demodulate the PDSCH with the complementary DMRS.

Figure 50:
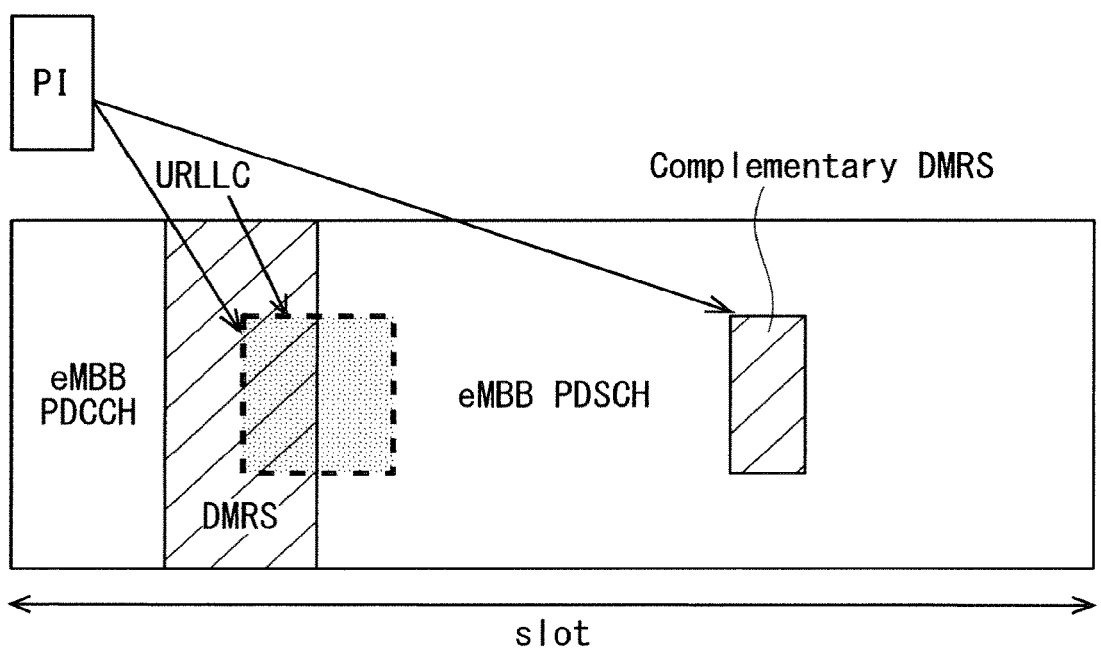
FIG. 50 illustrates an example of preempting the FL-DMRS when only the FL-DMRS is configured in one slot for the eMBB UE according to the seventh embodiment.

FIG. 50 illustrates an example of preempting the FL-DMRS when only the FL-DMRS is configured in one slot for the eMBB UE. The FL-DMRS is configured in the one slot for the eMBB UE. A part of the symbols to which the FL-DMRS and the PDSCH that are configured in the slot for the eMBB UE are mapped are preempted as the resources for the URLLC UE. The gNB does not perform transmission for the eMBB UE with the preempted resources. The gNB transmits a slot for the URLLC UE with the preempted resources. The gNB should transmit the DL channels and/or signals for the URLLC UE in the slot.

The gNB configures the complementary DMRS in the same slot. The gNB may configure only the preempted FL-DMRS as the complementary DMRS. The complementary DMRS may be configurable per symbol in the time axis direction. Alternatively, the complementary DMRS may be configurable per resource for the FL-DMRS for each UE. The PDSCH is not mapped with the resources with which the complementary DMRS has been configured. The gNB transmits the complementary DMRS and does not transmit the PDSCH, with the resources with which the complementary DMRS has been configured.

The resources for the complementary DMRS on the time axis may be different from those for the FL-DMRS on the time axis. For example, the resources for the complementary DMRS on the time axis may be n symbols (n 1). For example, making n larger than that of the original FL-DMRS can improve the demodulating performance for channel variations on the time axis.

Since the method for transmitting the PI is identical to that in FIG. 46, the description thereof is omitted. The eMBB UE can receive the resources for the other PDSCHs excluding the resources to be preempted and the resources with which the complementary DMRS is configured. The eMBB UE receives the complementary DMRS configured in the same slot. The eMBB UE can demodulate the PDSCH with the complementary DMRS.

Disclosed is making the FL-DMRS preemptable and configuring the complementary DMRS when only the FL-DMRS is configured for the eMBB UE (when the add-DMRS is not configured).

A part or the entirety of the configuration of the complementary DMRS may be identical to that of the FL-DMRS. And/or, the frequency resources with which the complementary DMRS is configured may be identical to those of the FL-DMRS. This can yield the characteristics equivalent to those of the FL-DMRS. Moreover, this can facilitate the processes and the circuit configurations in the gNB and the UE.

When the complementary DMRS is configured in the same manner as the FL-DMRS, such a configuration may be statically determined in a standard. Alternatively, information indicating that the complementary DMRS is configured in the same manner as the FL-DMRS may be provided and notified with the PI. Alternatively, the information may be notified via the RRC signaling. This can reduce the amount of information necessary for the gNB to configure the complementary DMRS for the UE.

The preempted FL-DMRS may be shifted. The preempted FL-DMRS is configured in another DL region in the same slot. The preempted FL-DMRS may be configured in the symbols subsequent to the symbols for preemption in the same slot. Consequently, when the FL-DMRS is preempted, the FL-DMRS which is shifted in time for demodulation is used.

The method for configuring data for the complementary DMRS and the PDSCH may be applied to a method for configuring data for the shifted FL-DMRS and the PDSCH. The gNB may notify the eMBB UE of information on shifting the FL-DMRS. For example, the information on the complementary DMRS may be an amount of shift. For example, information on the symbol number is the number of symbols to be shifted. For example, information on the RE number is the number of REs to be shifted.

Disclosed is that the complementary DMRS is generated with information on the complementary DMRS, and mapped to the DL resources. The FL-DMRS may differ in sequence to be generated, etc., depending on, for example, the symbol numbers of the symbols to which the FL-DMRS is mapped. Similarly when the complementary DMRS is generated, a sequence to be generated according to, for example, the symbol numbers of the symbols to which the complementary DMRS is mapped should be used.

As an alternative method, when the complementary DMRS is configured in the same manner as the FL-DMRS or when the FL-DMRS is shifted, the same DMRS as the original FL-DMRS may be used. Only the resources to be mapped may be made different. This enables demodulation with the configuration of the original FL-DMRS, whichever symbol the resources are mapped to. This facilitates the demodulating process and shortens the processing time.

Figure 51:
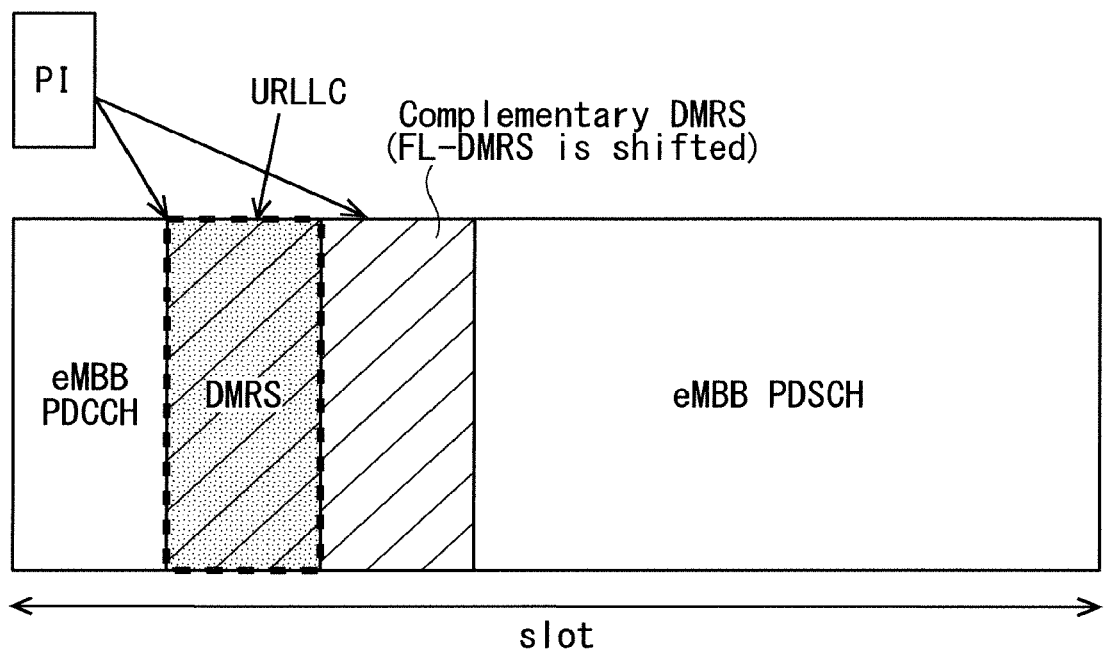
FIG. 51 illustrates an example of preempting the FL-DMRS when only the FL-DMRS is configured in one slot for the eMBB UE according to the seventh embodiment.

FIG. 51 illustrates an example of preempting the FL-DMRS when only the FL-DMRS is configured in one slot for the eMBB UE. FIG. 51 illustrates an example where the complementary DMRS has the same configuration as that of the FL-DMRS, and is obtained by shifting the FL-DMRS in time.

The FL-DMRS is configured in the one slot for the eMBB UE. The symbols to which the FL-DMRS for the eMBB UE is mapped are preempted as the resources for the URLLC UE. The gNB does not perform transmission for the eMBB UE with the preempted resources. Here, the gNB does not transmit the FL-DMRS for the eMBB UE. The gNB transmits a slot for the URLLC UE with the preempted resources. The gNB should transmit the DL channels and/or signals for the URLLC UE in the slot.

The gNB configures the complementary DMRS in the same slot. The complementary DMRS has the same configuration as that of the FL-DMRS, and is obtained by shifting the FL-DMRS in time. The PDSCH is not mapped with the resources with which the complementary DMRS has been configured. The gNB transmits the complementary DMRS and does not transmit the PDSCH, with the resources with which the complementary DMRS has been configured.

The PI is transmitted for the eMBB UE. The gNB includes, in the PI, information on the resources to be preempted for the eMBB UE and the information on the complementary DMRS to notify the PI to the eMBB UE. Examples of the information on the complementary DMRS include information indicating that the complementary DMRS has the same configuration as that of the FL-DMRS, and the number of symbols to be shifted.

Upon receipt of the PI, the eMBB UE recognizes no transmission with the resources to be preempted and recognizes the resources with which the complementary DMRS is configured.

The eMBB UE can receive the resources for the other PDSCHs excluding the resources to be preempted and the resources with which the complementary DMRS is configured. The eMBB UE receives the complementary DMRS configured in the same slot. The eMBB UE can demodulate the PDSCH with the complementary DMRS.

Figure 52:
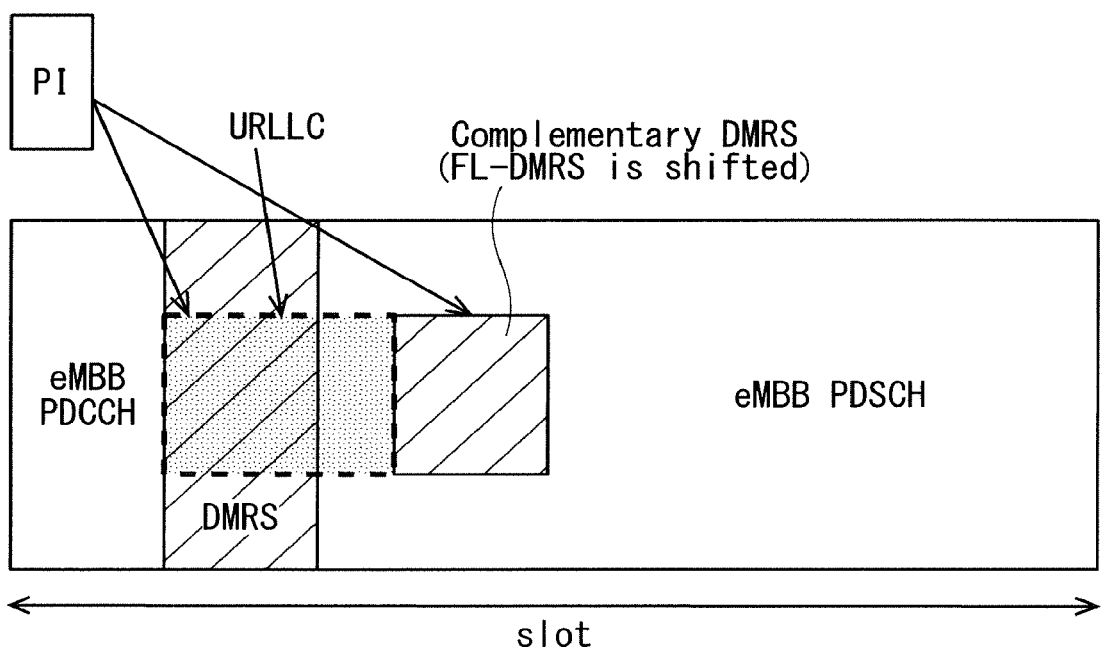
FIG. 52 illustrates an example of preempting the FL-DMRS when only the FL-DMRS is configured in one slot for the eMBB UE according to the seventh embodiment.

FIG. 52 illustrates an example of preempting the FL-DMRS when only the FL-DMRS is configured in one slot for the eMBB UE. FIG. 52 illustrates an example where the complementary DMRS has the same configuration as that of the FL-DMRS, and is obtained by shifting the FL-DMRS in time.

The FL-DMRS is configured in the one slot for the eMBB UE. A part of the symbols to which the FL-DMRS and the PDSCH that are configured in the slot for the eMBB UE are mapped are preempted as the resources for the URLLC UE. The gNB does not perform transmission for the eMBB UE with the preempted resources. Here, the gNB does not transmit the FL-DMRS for the eMBB UE. The gNB transmits a slot for the URLLC UE with the preempted resources. The gNB should transmit the DL channels and/or signals for the URLLC UE in the slot.

The gNB configures the complementary DMRS in the same slot. The complementary DMRS has the same configuration as that of the FL-DMRS, and is obtained by shifting the FL-DMRS in time. In FIG. 52, the complementary DMRS is configured by being shifted in time by the preempted resources. The PDSCH is not mapped with the resources with which the complementary DMRS has been configured. The gNB transmits the complementary DMRS and does not transmit the PDSCH, with the resources with which the complementary DMRS has been configured. Since the method for transmitting the PI is identical to that in FIG. 51, the description thereof is omitted.

The eMBB UE can receive the resources for the other PDSCHs excluding the resources to be preempted and the resources with which the complementary DMRS is configured. The eMBB UE receives the complementary DMRS configured in the same slot. The eMBB UE can demodulate the PDSCH with the complementary DMRS.

Although the configuration of the complementary DMRS is disclosed as a method for making the FL-DMRS preemptable when the FL-DMRS is configured and the add-DMRS is not configured for the eMBB UE, it is not limited to such. The complementary DMRS may be configured when the add-DMRS is configured. The gNB may configure the complementary DMRS in an arbitrary slot. The gNB may configure the complementary DMRS, for example, when the eMBB UE is moving at high speeds. The gNB may configure the complementary DMRS in addition to the FL-DMRS or the add-DMRS. Configuring the complementary DMRS can improve the demodulating performance.

The CSI-RS may be configurable as the resources for preemption. The method for configuring the complementary DMRS may be applied to a method for preempting the CSI-RS. A complementary CSI-RS is configured when the CSI-RS is configured as the resources for preemption. Configuring the complementary CSI-RS enables the eMBB UE to measure the complementary CSI-RS. The eMBB UE can derive the CSI by measuring the complementary CSI-RS, and report the CSI to the gNB.

This can increase the preemptable resources for the URLLC UE. This can yield the lower latency characteristics in the data communication for the URLLC UE.

The PDCCH may be configurable as the resources for preemption. The method for configuring the complementary DMRS may be applied to a method for preempting the PDCCH. A complementary PDCCH is configured when the PDCCH is configured as the resources for preemption. The complementary PDCCH may be mapped to a PDSCH region. The complementary PDCCH may be mapped to the resources on the frequency-time axes in a part of the PDSCH region. Configuring the complementary PDCCH enables the eMBB UE to receive the PDCCH.

This can increase the preemptable resources for the URLLC UE. For example, when data for the URLLC UE occurs, the data for the URLLC UE can be transmitted without waiting for transmission of the PDCCH even with the PDCCH transmission timing. This can yield the lower latency characteristics in the data communication for the URLLC UE.

The PTRS and the TRS may be used as the resources for preemption or excluded from the resources for preemption. Using the PTRS and the TRS as the resources for preemption can reserve many preemptable resources for the URLLC UE. The exclusion of the PTRS and the TRS from the resources for preemption does not degrade the demodulating performance of the eMBB UE.

The First Modification of the Seventh Embodiment

The CSI-RSs are described as DL reference signals (RSs). The CSI-RSs include a periodic CSI-RS for periodically configuring the CSI-RS, a semi-persistent CSI-RS for semi-persistently configuring the periodic CSI-RS, and an aperiodic CSI-RS for aperiodically configuring the CSI-RS.

The UE measures the CSI-RS to derive the CSI. The UE reports the derived CSI to the gNB. The methods for reporting the CSI include a periodic CSI report for periodically reporting the CSI, a semi-persistent CSI report for semi-persistently reporting the periodic CSI report, and an aperiodic CSI report for aperiodically reporting the CSI.

When the CSI-RS is not preempted, the data for the URLLC UE cannot be transmitted with the timing of the CSI-RS. Thus, the latency is increased. For solving such a problem, the CSI-RS should be made preemptable. The CSI-RS should be configurable as the resources for preemption. The CSI-RS may be configurable as the resources for preemption dedicatedly according to a type of the CSI-RS.

For example, the periodic CSI-RS and the semi-persistent CSI-RS may be configured as the resources for preemption, and the aperiodic CSI-RS need not be configured as the resources for preemption.

When the CSI-RS is preempted, the UE cannot derive the CSI with the CSI-RS. How to report the CSI in such an occasion is unknown. A method for solving such a problem is disclosed.

A case where the periodic CSI-RS is configured is disclosed.

When the periodic CSI report is configured and the periodic CSI-RS is preempted, the periodic CSI report is not transmitted. In the periodic CSI report, the CSI can be reported with the next period. Thus, the CSI-RS in the next period should be measured, and the result should be reported in the CSI report in the next period. Since the CSI is not reported only with the timing of the preempted periodic CSI-RS, the influence over the communication is less.

As an alternative method, when the periodic CSI-RS is preempted, transmission of the aperiodic CSI-RS may be configured. The result of measuring the aperiodic CSI-RS should be reported as the CSI in the CSI report in the next period. The gNB may include, in the PI, configuration information of the aperiodic CSI-RS to notify the PI to the eMBB UE. The eMBB UE can measure the aperiodic CSI-RS.

The gNB may include, in the PI, information for instructing the eMBB UE to report the measurement result of the aperiodic CSI-RS in the periodic CSI report to notify the PI to the eMBB UE. The eMBB UE measures the aperiodic CSI-RS with the PI, and reports a result of the derived CSI in the next periodic CSI report.

Even when the channel characteristics vary, the gNB can measure the variations and increase the communication quality.

As an alternative method, when the periodic CSI-RS is preempted, the gNB may transmit the same CSI as that in the previous periodic CSI report. As the channel variations in time between the gNB and the UE are smaller, the CSI obtained by measuring the preempted CSI-RS approximates to the previous periodic CSI. Thus, approximation with the previous periodic CSI is possible. For example, when variations in the channel characteristics in time between the gNB and the UE are smaller, such a method may be used.

When the CSI is derived by measuring the periodic CSI-RS a plurality of times, the CSI may be derived by excluding the preempted CSI-RS from the averaging process. The CSI should be reported in the CSI report. This can reduce the influence of the CSI-RS having failed to be measured.

When the CSI is derived by measuring the periodic CSI-RS a plurality of times, the CSI may be derived using the measurement result of the previous CSI-RS as a replacement for the preempted CSI-RS. The CSI should be reported in the CSI report. This can derive the CSI without changing the number of times averaging is performed. The processes of deriving the CSI and the circuit configuration can be facilitated.

The aforementioned method may be applied to a method to be applied when the semi-persistent CSI report is configured and the periodic CSI-RS is preempted. This produces the same advantages.

The aforementioned method may also be applied to a method when the aperiodic CSI report is configured and the periodic CSI-RS is preempted. This produces the same advantages.

When making the aperiodic CSI report is configured by deriving the CSI from the latest CSI-RS, the aperiodic CSI report need not be transmitted.

The aforementioned method may be statically predetermined in a standard. Since the UE and the gNB can share the processing method, malfunctions can be avoided. Alternatively, the gNB may notify the UE of the method via the RRC signaling. The method is semi-statically configurable. For example, the method is effective when the channel characteristics vary.

Alternatively, the gNB may include the method in the PI to notify the PI to the UE. For example, the PI may include information indicating whether the CSI report is transmitted. For example, the gNB may include, in the PI, information indicating that the CSI identical to the previous CSI is to be reported as the CSI report and notify the PI. The method for reporting the CSI is dynamically configurable by including the information in the PI and notifying the PI. For example, the method is effective when the channel characteristics vary in a short period of time.

The method in the case where the periodic CSI-RS is configured may be applied to the case where the semi-persistent CSI-RS is configured. This produces the same advantages.

When the aperiodic CSI-RS is configured, only the aperiodic CSI report is configured. In such a case, the method when making the aperiodic CSI report is configured by deriving the CSI from the latest CSI-RS may be applied. This produces the same advantages.

When the CSI-RS is preempted, the CSI may be derived from a measurement result of another RS. Examples of the other RS may include the DM-RS. The gNB notifies the UE of the configuration of the other RS. The UE measures the RS, derives the CSI, and notifies the gNB of this result as the CSI report.

The other RS may be an RS in a slot subsequent to the preempted slot. The RS in a slot prior to the configured CSI report should be used.

The gNB notifies the UE of information on the other RS with the PI. Alternatively, the gNB may notify the information on the other RS via the RRC signaling. The information on the complementary DMRS may be applied as the information on the other RS.

The gNB may notify, with the PI, the UE of whether the other RS is used. Alternatively, the gNB may notify whether the other RS is used, via the RRC signaling. When the other RS is not used, there is no need to notify the information on the other RS. Thus, the amount of information which the gNB needs to notify to the UE can be reduced.

This can preempt the CSI-RS. Making the CSI-RS preemptable can yield the lower latency characteristics in the communication for the URLLC UE.

The Second Modification of the Seventh Embodiment

The reference signals (RS) in the UL include a front loaded DMRS (FL-DMRS), an additional DMRS (add-DMRS), a phase tracking RS (PTRS), a tracking RS (TRS), and an SRS. For example, the FL-DMRS is mapped to the first one or two symbols in the PUSCH. Alternatively, the FL-DMRS is mapped to the third or fourth symbol in the PUSCH. The PUCCH may be mapped to the UL resources as a UL control channel.

The third embodiment discloses the method for preempting a symbol for the eMBB UE in the UL. However, making an arbitrary symbol for the eMBB UE preemptable may degrade the communication quality. A method for solving such a problem is disclosed.

When preemption in the UL is performed, the preemption should be performed by avoiding the resources for the RS and the PUCCH for the eMBB UE. The resources for the RS and the PUCCH in the UL for the eMBB UE are non-configurable as the resources for preemption in the UL.

FIG. 53 illustrates example preemption when the FL-DMRS, the add-DMRS, and the PUCCH and/or the SRS are configured for the eMBB UE. The gNB performs preemption by avoiding the resources for the RS and the PUCCH for the eMBB UE. The gNB preempts a part or all of the resources for the PUSCH.

The symbols to which the PUSCH for the eMBB UE is mapped are preempted as the resources for the URLLC UE. The eMBB UE does not perform transmission with the preempted resources. The eMBB UE transmits a slot (may be a mini-slot) for the URLLC UE with the preempted resources. The URLLC UE performs UL transmission of, for example, the PUCCH, the PUSCH, and the RS in the slot. The gNB receives, in the slot, for example, the PUCCH, the PUSCH, and the RS from the URLLC UE.

A preemption indication (PI) is transmitted for the eMBB UE. The gNB includes, in the PI, information on the resources to be preempted for the eMBB UE to notify the PI to the eMBB UE. The method disclosed in the third embodiment may be applied to a method for notifying the PI to be used for the preemption in the UL. Upon receipt of the PI, the eMBB UE can prevent transmission with the resources to be preempted. The eMBB UE transmits, for example, the PUSCH, the RS, and the PUCCH with resources excluding the resources to be preempted. The gNB receives, for example, the PUSCH, the RS, and the PUCCH with the resources excluding the resources to be preempted.

This can multiplex the UL transmission for the eMBB UE with the UL transmission for the URLLC UE. Enabling the early transmission from the URLLC UE can yield the low latency characteristics. Moreover, enabling transmission of the PUSCH for the eMBB UE enables the high-speed large-capacity communication.

Making symbols to which the RS and the PUCCH in the UL for the eMBB UE are mapped non-configurable as the resources for preemption in the UL disables transmission of data for the URLLC UE with the symbol timing with which the RS and the PUCCH are mapped. For example, when the data for the URLLC UE occurs with the timing, the resources for the URLLC UE cannot be reserved, and thus transmission of the data for the URLLC UE needs to be delayed.

For example, since the FL-DMRS in the UL consists of one or two symbols in NR, the transmission is delayed by the number of the symbols. This may increase the amount of latency in the communication of the URLLC UE. A method for solving such a problem is disclosed.

Only the resources to which the FL-DMRS is not mapped in the symbols to which the FL-DMRS is mapped may be configurable as the resources for preemption. The DMRS may be configured for each UE per RE. In such a case, the resources for preemption should be REs to which the FL-DMRS is not mapped. The PUSCH is transmitted in the REs excluding the REs to which the FL-DMRS is mapped, in the symbols to which the FL-DMRS is mapped. A transmission region of the PUSCH should be configurable as the resources for preemption.

The gNB includes, in the PI, information on the resources to be preempted for the eMBB UE to notify the PI to the eMBB UE. The resources to be preempted may be information indicated per RE. The resources for preemption are configurable according to the aforementioned method by being indicated per RE.

This can reserve the resources for the URLLC UE also in the symbols to which the FL-DMRS is mapped. Thus, there is no need to delay transmission of data for the URLLC UE by the number of the symbols to which the FL-DMRS is mapped. This can reduce an increase in the amount of latency in the communication of the URLLC UE.

Such a method should be applied to the other RSs. Only the resources to which the RS is not mapped in the symbols to which the RS is mapped are configurable as the resources for preemption. This can produce the same advantages.

Making the resources for all the RSs and the PUCCHs non-configurable as the resources for preemption reduces the resources for the URLLC UE. Further, this may disable early transmission of the data for the URLLC UE, which increases the amount of latency. A method for solving such a problem is disclosed.

When the add-DMRS is configured, the resources for the add-DMRS in the UL may be configurable as the resources for preemption in the UL. The eMBB UE does not transmit the add-DMRS, with the resources for the add-DMRS which are configured for preemption. Even when the add-DMRS is preempted, use of the FL-DMRS by the gNB can increase the possibility of demodulating the PUSCH.

FIG. 54 illustrates example preemption when the FL-DMRS, the add-DMRS, and the PUCCH and/or the SRS are configured for the eMBB UE. The gNB preempts the resources for the add-DMRS for the eMBB UE.

The symbols to which the add-DMRS for the eMBB UE is mapped are preempted as the resources for the URLLC UE. The eMBB UE does not perform transmission with the preempted resources. The eMBB UE does not transmit the add-DMRS. The eMBB UE transmits a slot for the URLLC UE with the preempted resources. The URLLC UE performs UL transmission of, for example, the PUCCH, the PUSCH, and the RS in the slot. The gNB receives, in the slot, for example, the PUCCH, the PUSCH, and the RS from the URLLC UE.

Since the method for transmitting the PI is identical to that in FIG. 53, the description thereof is omitted. The eMBB UE does not transmit the add-DMRS with the preempted resources. However, since the FL-DMRS is not preempted, the eMBB UE transmits the FL-DMRS. Although the gNB cannot receive the preempted add-DMRS for the eMBB UE, the gNB can receive the FL-DMRS. Thus, the gNB can increase the possibility of receiving data by demodulating the PUSCH with the FL-DMRS.

When the UL transmission occurs from the URLLC UE, the UL transmission from the URLLC UE is enabled without waiting for transmission of the add-DMRS. The transmission from the URLLC UE can yield the lower latency characteristics.

When the SRS is configured, the resources for the SRS may be configurable as the resources for preemption in the UL. When the resources for the SRS are configured as the resources for preemption in the UL, the eMBB UE does not transmit the SRS with the configured resources for preemption. The eMBB UE periodically transmits the SRS, for example, when the SRS is a periodic SRS or a semi-persistent SRS. The gNB, which has configured the SRS for preemption, can estimate a UL channel with the previous SRS transmitted from the UE.

Depending on the type of the SRS, the resources for the SRS may be configurable as the resources for preemption in the UL. For example, when the SRS is a periodic SRS or a semi-persistent SRS, the resources for the SRS are configurable as the resources for preemption in the UL. When the SRS is an aperiodic SRS, the resources for the SRS are non-configurable as the resources for preemption in the UL. This can flexibly configure the preemption depending on the type of the SRS.

When the PUCCH is configured as the UL resources, the resources for the PUCCH may be configurable as the resources for preemption in the UL. When the resources for the PUCCH are configured as the resources for preemption in the UL, the eMBB UE does not transmit the PUCCH with the configured resources for preemption. For example, when the PUCCH is a PUCCH for transmitting the periodic CSI, the eMBB UE periodically transmits the PUCCH. The gNB, which has configured the PUCCH for preemption, can estimate a DL channel with the previous CSI transmitted from the UE.

The resources for the PUCCH may be configurable as the resources for preemption in the UL according to the details of the PUCCH. For example, when the PUCCH is a PUCCH for the periodic CSI or the semi-persistent CSI, the resources for the PUCCH are configurable as the resources for preemption in the UL. When the PUCCH is a PUCCH for the aperiodic CSI, the Ack/Nack, the SR, or a beam failure recovery request, the resources for the PUCCH are non-configurable as the resources for preemption in the UL. This can flexibly configure the preemption according to the details of the PUCCH.

The aforementioned methods may be used in combination.

Figure 55:
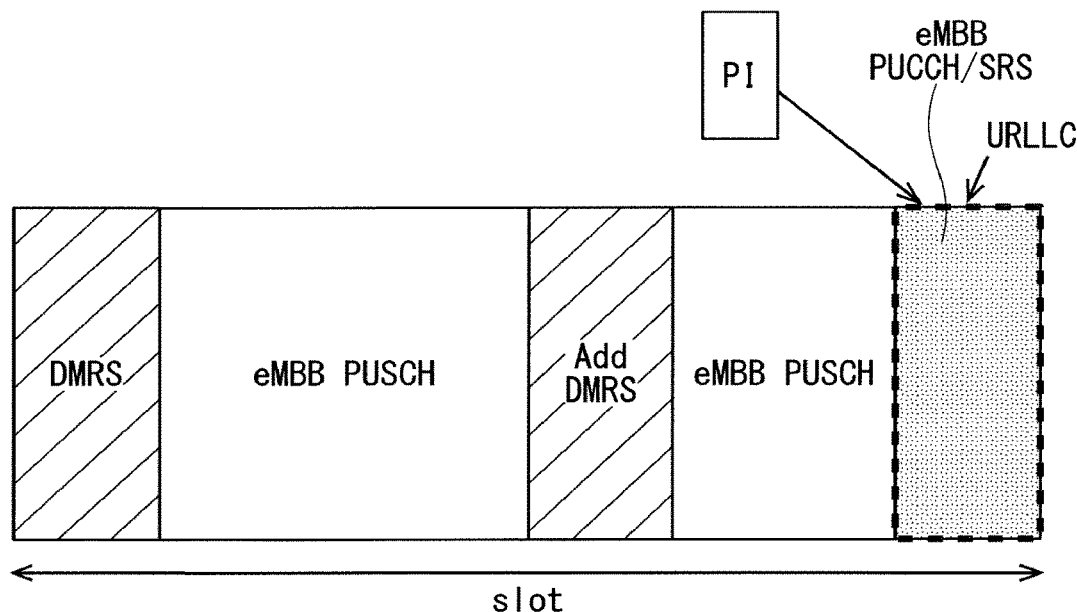
FIG. 55 illustrates example preemption when the FL-DMRS, the add-DMRS, and the PUCCH and/or the SRS are configured for the eMBB UE according to the second modification of the seventh embodiment.

FIG. 55 illustrates example preemption when the FL-DMRS, the add-DMRS, and the PUCCH and/or the SRS are configured for the eMBB UE. The gNB preempts the resources for the PUCCH and/or the SRS for the eMBB UE. For example, when the PUCCH is a PUCCH for the periodic CSI or the semi-persistent CSI, the gNB may preempt the resources for the PUCCH. When the SRS is a periodic SRS or a semi-persistent SRS, the gNB may preempt the resources for the SRS.

Since the preemption method is identical to that in FIG. 54, the description thereof is omitted. Preempting the PUCCH and/or the SRS for the eMBB UE can reserve many resources for the URLLC UE. When the UL transmission occurs from the URLLC UE, the UL transmission from the URLLC UE is enabled with low latency and at high speeds.

When the FL-DMRS is configured for the PUSCH, the FL-DMRS may be preemptable. When the FL-DMRS and the add-DMRS are configured for the eMBB UE, the FL-DMRS may be preemptable. The FL-DMRS may be configured as the resources for preemption. The eMBB UE does not transmit the FL-DMRS when the FL-DMRS is configured as the resources for preemption.

However, since the eMBB UE configures the add-DMRS, the eMBB UE transmits the add-DMRS. Even when the gNB cannot receive the FL-DMRS from the eMBB UE, the gNB can demodulate the data transmitted from the eMBB UE upon receipt of the add-DMRS.

When only the FL-DMRS is configured for the PUSCH (when the add-DMRS is not configured), the FL-DMRS may be preemptable. The FL-DMRS may be configured as the resources for preemption.

Merely making the FL-DMRS preemptable may disable the eMBB UE from demodulating data of the PUSCH. Some ingenuity is necessary. The solution may be application of the method for configuring the complementary DMRS which is disclosed in the seventh embodiment. Although the complementary DMRS in the DL is disclosed in the seventh embodiment, the complementary DMRS should be appropriately applied to the configuration in the UL.

The complementary DMRS is configured for the eMBB UE. The complementary DMRS is configured in a UL region in the same slot as that of the preempted FL-DMRS, and is used for demodulating the data of the PUSCH. When the FL-DMRS is preempted, the FL-DMRS cannot be used but the complementary DMRS is used for demodulation.

The eMBB UE does not transmit, to the gNB, data with the resources with which the complementary DMRS has been configured. The eMBB UE transmits the complementary DMRS with the resources with which the complementary DMRS has been configured. This can avoid a contention between transmission of the configured complementary DMRS and transmission of data.

As such, the method for configuring the complementary DMRS in the DL should be appropriately applied to the complementary DMRS in the UL. This can produce the same advantages.

Figure 56:
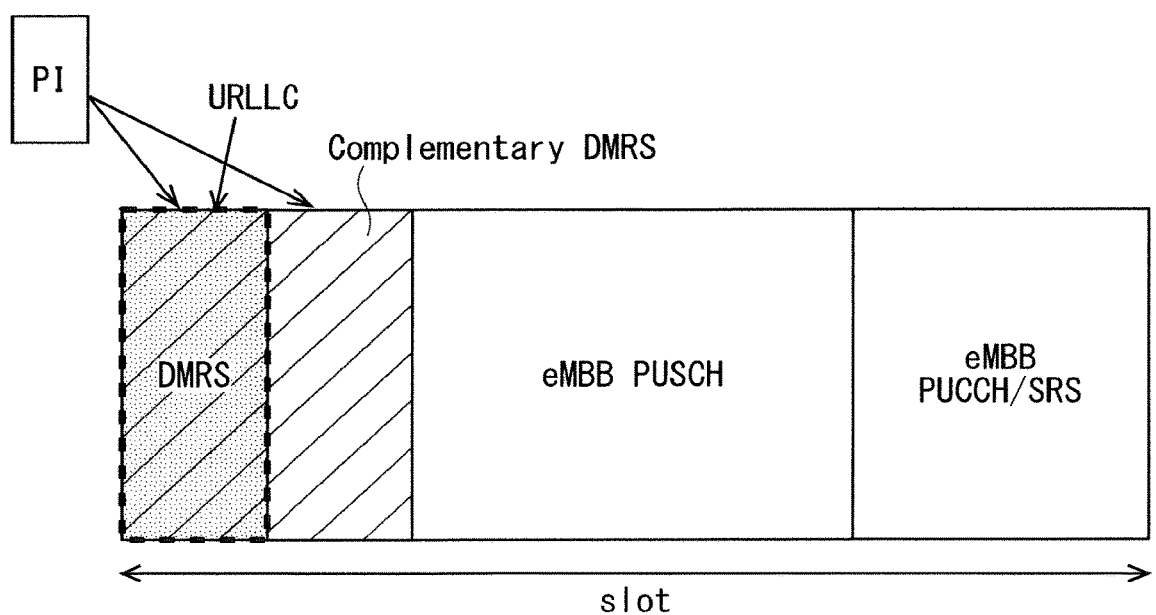
FIG. 56 illustrates an example of preempting the FL-DMRS when only the FL-DMRS is configured in one slot for the eMBB UE according to the second modification of the seventh embodiment.

FIG. 56 illustrates an example of preempting the FL-DMRS when only the FL-DMRS is configured in one slot for the eMBB UE. The FL-DMRS is configured in the one slot for the eMBB UE. The symbols to which the FL-DMRS for the eMBB UE is mapped are preempted as the resources for the URLLC UE. The eMBB UE does not perform transmission with the preempted resources. Here, the eMBB UE does not transmit the FL-DMRS. The eMBB UE transmits a slot for the URLLC UE with the preempted resources. The URLLC UE performs UL transmission of, for example, the PUCCH, the PUSCH, and the RS in the slot. The gNB receives, in the slot, for example, the PUCCH, the PUSCH, and the RS from the URLLC UE.

The gNB configures the complementary DMRS in the same slot. In the example, the FL-DMRS is configured as the complementary DMRS by being shifted in time to the symbol next to the FL-DMRS, that is, the first symbol of the PUSCH. The PUSCH is not mapped to the resources with which the complementary DMRS has been configured. The eMBB UE transmits the complementary DMRS and does not transmit the PUSCH, with the resources with which the complementary DMRS has been configured.

The PI is transmitted for the eMBB UE. The gNB includes, in the PI, information on the resources to be preempted for the eMBB UE and information on the complementary DMRS to notify the PI to the eMBB UE. Upon receipt of the PI, the eMBB UE recognizes no transmission with the resources to be preempted, transmits the complementary DMRS with the resources with which the complementary DMRS is configured, and recognizes no transmission of, for example, the other channels or RSs.

The eMBB UE does not perform transmission with the resources to be preempted, and transmits the complementary DMRS with the resources with which the complementary DMRS is configured. The gNB can receive the resources for the other PUSCHs excluding the resources with which the complementary DMRS is configured. The gNB receives the complementary DMRS configured in the same slot. The gNB can demodulate the PUSCH with the complementary DMRS.

As such, when the UL transmission occurs from the URLLC UE, the UL transmission from the URLLC UE is enabled with low latency and at high speeds without waiting for transmission of the FL-DMRS even with the transmission timing of the FL-DMRS. Since the eMBB UE transmits the complementary DMRS, the gNB can increase the possibility of receiving data by demodulating the PUSCH with the complementary DMRS.

Disclosed is that the eMBB UE does not transmit the SRS with the configured resources for preemption when the resources for the SRS are configured as the resources for preemption in the UL. As an alternative method, the SRS may be configured with resources different from those for preemption. The SRS may be referred to as a complementary SRS. The method for configuring the complementary DMRS which is disclosed in the seventh embodiment should be appropriately applied to a method for configuring the complementary SRS.

When the resources for the SRS are configured as the resources for preemption in the UL, the eMBB UE does not transmit the SRS but can transmit the configured complementary SRS, with the configured resources for preemption.

When the SRS is an aperiodic SRS, the SRS is configured with necessary timing and dynamically transmitted. For example, when the aperiodic SRS is configured as the resources for preemption, the complementary SRS is configured in another symbol. Consequently, the eMBB UE can transmit the complementary SRS in the other symbol. Thus, the gNB can receive the SRS from the eMBB UE with necessary timing.

The complementary SRS may be configured in a slot behind a slot to which the SRS configured as the resources for preemption is mapped. The SRS is often mapped to symbols rearward in a slot. For example, when such an SRS is preempted, if it is too late timing wise to configure the complementary SRS as the UL resources in the same slot, configuring the complementary SRS in the subsequent slots enables transmission of the SRS.

FIG. 57 illustrates an example preemption method when the complementary SRS is configured. FIG. 57 illustrates a case where the complementary SRS is configured in a slot next to a slot with the SRS to be preempted. The resources of the SRS for the eMBB UE are preempted as the resources for the URLLC UE in the slot #1 for the eMBB UE.

The eMBB UE does not perform transmission with the preempted resources. Here, the eMBB UE does not transmit the SRS. The eMBB UE transmits a slot for the URLLC UE with the preempted resources. The URLLC UE performs UL transmission of, for example, the PUCCH, the PUSCH, and the RS in the slot. The gNB receives, in the slot, for example, the PUCCH, the PUSCH, and the RS from the URLLC UE.

The gNB configures the complementary SRS in the next slot #2. In the example, the gNB configures the complementary SRS in the symbol next to the FL-DMRS in the slot #2, that is, the first symbol of the PUSCH. The PUSCH is not mapped to the resources with which the complementary DMRS has been configured. The eMBB UE transmits the complementary DMRS and does not transmit the PUSCH, with the resources with which the complementary DMRS has been configured.

The PI is transmitted for the eMBB UE. The gNB includes, in the PI, information on the resources to be preempted for the eMBB UE and information on the complementary DMRS to notify the PI to the eMBB UE. Upon receipt of the PI, the eMBB UE recognizes no transmission with the resources to be preempted, transmits the complementary SRS with the resources with which the complementary SRS is configured, and recognizes no transmission of, for example, the other channels or RSs.

The eMBB UE does not perform transmission with the resources to be preempted, and transmits the complementary SRS with the resources with which the complementary SRS is configured. The gNB can receive the resources for the other PUSCHs excluding the resources with which the complementary SRS is configured. The gNB receives the complementary SRS configured in the slot next to that with the SRS configured for preemption. The gNB can measure the UL channel quality with the complementary SRS.

As such, when the UL transmission occurs from the URLLC UE, the UL transmission from the URLLC UE is enabled with low latency and at high speeds without waiting for transmission of the SRS even with the transmission timing of the SRS. Since the eMBB UE transmits the complementary SRS, the gNB can increase the precision of the UL scheduling and management of beams by measuring the UL channel quality with the complementary SRS.

Disclosed is that the eMBB UE does not transmit the PUCCH with the configured resources for preemption when the resources for the PUCCH are configured as the resources for preemption in the UL. As an alternative method, the PUCCH may be configured with resources different from those for preemption. The PUCCH may be referred to as a complementary PUCCH. The method for configuring the complementary SRS should be appropriately applied to a method for configuring the complementary PUCCH. Similarly, since the gNB can receive the complementary PUCCH transmitted from the eMBB UE, the same advantages can be produced.

Figure 58:
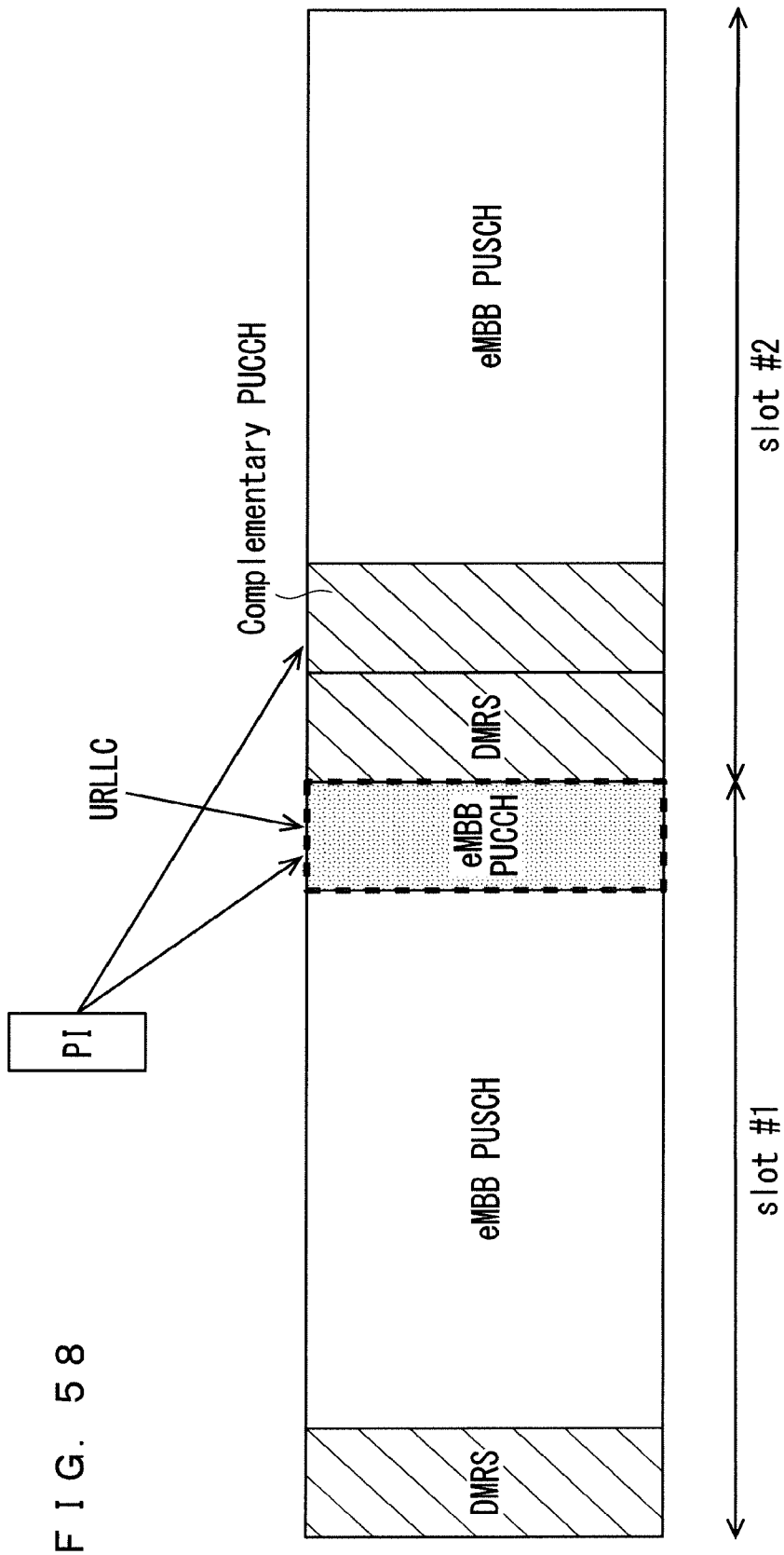
FIG. 58 illustrates an example preemption method when the complementary PUCCH is configured according to the second modification of the seventh embodiment.

FIG. 58 illustrates an example preemption method when the complementary PUCCH is configured. FIG. 58 illustrates a case where the complementary PUCCH is configured in the slot next to the slot with the SRS to be preempted. The resources of the PUCCH for the eMBB UE are preempted as the resources for the URLLC UE in the slot #1 for the eMBB UE.

Since the preemption method is identical to that in FIG. 57, the description thereof is omitted. The SRS should be replaced with the PUCCH.

The gNB receives the complementary PUCCH configured in the slot next to that with the PUCCH configured for preemption. The gNB can receive the UCI from the eMBB with the complementary PUCCH.

As such, when the UL transmission occurs from the URLLC UE, the UL transmission from the URLLC UE is enabled with low latency and at high speeds without waiting for transmission of the PUCCH even with the transmission timing of the PUCCH. Since the eMBB UE transmits the complementary PUCCH, the gNB can receive the UCI from the eMBB with the complementary PUCCH, and appropriately perform processes according to the UCI.

The PTRS and the TRS may be used as the resources for preemption or excluded from the resources for preemption. Using the PTRS and the TRS as the resources for preemption can reserve many preemptable resources for the URLLC UE. The exclusion of the PTRS and the TRS from the resources for preemption does not degrade the demodulating performance of the gNB.

Disclosed is a method for the gNB to notify the eMBB UE of information on the resources to be preempted for the eMBB UE and/or the information on the complementary DMRS with the PI. The notification method with the PI may be applied in the presence of a request for transmitting the UL data from the URLLC UE. The notification method should be applied, for example, when the URLLC UE has a scheduling request (SR) of the UL data or a buffer status report (BSR) of the UL data.

Upon receipt of the request for transmitting the UL data from the URLLC UE, the gNB notifies, with the PI, the eMBB UE of the information on the resources to be preempted for the eMBB UE and/or the information on the complementary DMRS.

The method may be used in, for example, grant-based UL data communication in URLLC. Upon receipt of the SR from the URLLC UE, the gNB determines the resources for preemption for the URLLC UE. The gNB determines the resources for the complementary DMRS when the DMRS for the eMBB UE is used as the resources for preemption. The gNB notifies, with the PI, the eMBB UE of the information on the resources to be preempted for the eMBB UE and/or the information on the complementary DMRS.

Consequently, the eMBB UE can obtain the information on the resources to be preempted and/or the information on the complementary DMRS.

Another method for the gNB to notify the eMBB UE of the information on the resources to be preempted for the eMBB UE and/or the information on the complementary DMRS is disclosed. The gNB notifies the information via the RRC signaling. The gNB may notify the information dedicatedly to each UE or for each UE group. Alternatively, the gNB may broadcast the information as broadcast information. The information may be broadcast information to be notified in response to a request from the eMBB UE. The gNB may notify the information dedicatedly to each UE in response to the request from the eMBB UE.

As previously described in the transmission without grant, the timing to perform the transmission without grant is semi-statically predetermined. When the transmission without grant is configured in the URLLC communication, the gNB notifies the URLLC UE of the timing to perform the transmission without grant, via the RRC signaling. In the first transmission without grant, the gNB notifies the resources for the transmission without grant also via the RRC signaling.

For example in the transmission without grant, the gNB configures the resources for preemption, with the timing to perform the transmission without grant and the resource configuration which are configured for the URLLC UE. The gNB includes the configured resources for preemption in the broadcast information addressed to the eMBB UE to broadcast the resources. This enables the eMBB UE to recognize the resource configuration for preemption.

The gNB may configure the complementary DMRS. The gNB includes information on the configured complementary DMRS in the broadcast information addressed to the eMBB UE to broadcast the information. This enables the eMBB UE to recognize the configuration of the complementary DMRS.

Consequently, the gNB need not use the PI for notifying the information on the resources to be preempted for the eMBB UE and/or the information on the complementary DMRS. The gNB need not transmit the PI. The resources for the PI need not be reserved. This can increase the use efficiency of the resources.

When the preempting URLLC UE is identical to the eMBB UE to be preempted, the gNB may configure the resources for preemption with the timing to perform the transmission without grant and the resource configuration for URLLC, and notify the UE of the resources for preemption. The gNB may configure the complementary DMRS and notify the UE of the complementary DMRS. Since the preempting URLLC UE is identical to the eMBB UE to be preempted, the gNB may give the dedicated notification to the UE via the RRC signaling, similarly as notifying the timing to perform the transmission without grant and the resource configuration.

Another method for the gNB to notify the eMBB UE of the information on the resources to be preempted for the eMBB UE and/or the information on the complementary DMRS is disclosed. The gNB notifies the information via the L1/L2 control signaling. The gNB may include the information in the DCI. The gNB may notify the DCI with the PDCCH. The gNB may notify the information dedicatedly to each UE or for each UE group.

As previously described in the transmission without grant, the timing to perform the transmission without grant is semi-statically predetermined. When the transmission without grant is configured in the URLLC communication, the gNB notifies the URLLC UE of the timing to perform the transmission without grant, via the RRC signaling. In the first transmission without grant, the gNB notifies the resources for the transmission without grant also via the RRC signaling.

For example, the method using the L1/L2 control signaling may be applied to the transmission without grant. The eMBB UE is provided with the information on the resources to be preempted for the eMBB UE and/or the information on the complementary DMRS as the information included in the DCI. The gNB configures the information, includes the information in the DCI, and notifies the eMBB UE of the information with the PDCCH. When the complementary DMRS is not used, the gNB need not notify the information on the complementary DMRS. The gNB may notify only information on the resources to be preempted for the eMBB UE.

Consequently, the gNB need not use the PI for notifying the information on the resources to be preempted for the eMBB UE and/or the information on the complementary DMRS. The gNB need not transmit the PI. The resources for the PI need not be reserved. This can increase the use efficiency of the resources.

The dynamic configuration is not possible upon notification via the RRC signaling as previously disclosed. Here, the gNB needs to notify the eMBB UE of the information on the resources to be preempted and/or the information on the complementary DMRS in a state where the eMBB UE to be preempted has not been determined yet. Thus, the amount of signaling for giving the dedicated notification to each of many UEs is increased. Alternatively, for example, when the number of the preempting URLLC UEs is increased, the broadcast information for broadcasting is increased.

A notification of the information on the resources to be preempted for the eMBB UE and/or the information on the complementary DMRS from the gNB to the eMBB UE via the L1/L2 control signaling enables a dynamic notification and a notification to the eMBB UE to be preempted. Thus, the aforementioned problems can be solved.

In the second transmission without grant, the gNB notifies a configuration of the resources for the transmission without grant via the L1/L2 control signaling. Here, the resources for the transmission without grant may be dynamically configured. The resources for the transmission without grant for the URLLC UE may be configured later than the PDCCH transmission timing for the eMBB UE. In such a case, the gNB cannot notify the information on the resources to be preempted, with the PDCCH for the eMBB UE.

When the preemption is performed with the transmission without grant to solve such a problem, the gNB should configure the resources for the transmission without grant for the URLLC UE earlier than the PDCCH transmission timing for the eMBB UE. Consequently, the gNB can notify the information on the resources to be preempted, with the PDCCH for the eMBB UE.

When the preemption is performed with the transmission without grant, the first transmission without grant may be configured. This produces the same advantages. As an alternative method, the resources for transmission without grant may be configured in advance for the case where configuring of the resources for transmission without grant for the URLLC UE is too late for the timing to notify information on the resources to be preempted with the PDCCH for the eMBB UE.

When configuring the resources for the transmission without grant in time for the PDCCH transmission timing for the eMBB UE, the gNB configures the resources for the transmission without grant for the URLLC UE as the resources to be preempted for the eMBB UE. When configuring of the resources for the transmission without grant is too late for the PDCCH transmission timing for the eMBB UE, the gNB should use the preset configuration of the resources for the transmission without grant.

Consequently, when there is no information on the resources to be preempted upon receipt of the PDCCH, the eMBB UE can use, as the resources for preemption, the configuration of the resources for transmission without grant which has been configured, for example, via the RRC signaling.

According to the disclosed method, even in the absence of UL transmission from the URLLC UE with resources and the timing to perform the transmission without grant, the eMBB UE for which the resources are configured as the resources for preemption cannot perform the UL transmission with the resources. Since the resources are not used, the use efficiency of the resources is reduced.

A method for solving such a problem is disclosed. When the preempting URLLC UE is identical to the eMBB UE to be preempted, the UE can perform UL transmission with the resources for preemption. In the absence of the UL transmission for URLLC with the resources for configuring the transmission without grant for URLLC, when the UL transmission for eMBB is scheduled in a slot for eMBB including the resources, the UE performs the UL transmission for eMBB.

Since the preempting URLLC UE is identical to the eMBB UE to be preempted, the UE can recognize the absence of the UL transmission with the resources with which the transmission without grant for URLLC has been configured. Thus, when the UL transmission for eMBB is scheduled with the resources with which the transmission without grant for URLLC has been configured, the UE performs the UL transmission for eMBB.

This can increase the use efficiency of the resources.

With the timing and resources to perform transmission without grant, priorities may be assigned to the UL transmission for URLLC and the UL transmission for eMBB. The priorities may be assigned, for example, according to the QoS or the QCI required for the communication service for URLLC. The priorities may be assigned, for example, according to a required amount of latency.

For example, when the amount of latency required for the communication service for URLLC is low, the UL transmission for URLLC is prioritized. Thus, the UE performs UL transmission for URLLC and does not perform UL transmission for eMBB. When the required amount of latency is high, the UE may prioritize and perform the UL transmission for eMBB, and need not perform the UL transmission for URLLC. An indicator for determining the priorities may have a threshold. For example, the amount of latency may have a threshold.

The priorities may be assigned according to, for example, the QoS or the QCI required for the communication service for eMBB. The priorities may be assigned according to, for example, the required communication quality. The priorities may be assigned according to a required error rate, for example, a bit error rate or a frame error rate.

For example, when the bit error rate required for the communication service for eMBB is low, the UL transmission for eMBB is prioritized. Thus, the UE performs the UL transmission for eMBB and does not perform the UL transmission for URLLC. When the required bit error rate is high, the UE may prioritize and perform the UL transmission for URLLC, and need not perform the UL transmission for eMBB. For example, a bit error rate for determining the priorities may have a threshold.

The priorities may be assigned according to a type of a signal or a channel to be mapped for eMBB. For example, when the PUSCH is used for eMBB with the timing and resources to perform transmission without grant, the UE prioritizes and performs the UL transmission for URLLC, and does not perform the UL transmission for eMBB.

The priorities may be assigned according to a type of the UCI included in the PUCCH to be mapped for eMBB. For example, when Ack/Nack is used for eMBB with the timing and resources to perform transmission without grant, the UE prioritizes and performs the UL transmission for eMBB, and does not perform the UL transmission for URLLC.

For example, when the DMRS is used for eMBB with the timing and resources to perform transmission without grant, the UE prioritizes and performs the UL transmission for eMBB, and does not perform the UL transmission for URLLC.

When the timing and resources to perform transmission without grant include the DMRS for eMBB, the UE may prioritize and perform the UL transmission for eMBB, and need not perform the UL transmission for URLLC. The priorities may be assigned with consideration given to inclusion of a part of the signals or channels for eMBB.

The priorities may be assigned with the timing and resources to perform transmission without grant, according to a type of a signal or a channel to be mapped for URLLC. The same method as that for eMBB may be applied thereto.

The configurations of the priorities may be combined. The flexible and appropriate configuration is possible, according to a channel or a signal with which the communication service for URLLC or the UL transmission is performed, or a channel or a signal with which the communication service for eMBB or the UL transmission is performed.

The configuration of the priorities and information necessary for the configuration may be statically predetermined, for example, in a standard. Both the gNB and the UE can recognize the configuration and the information. The malfunctions can be reduced. As an alternative method, the configuration of the priorities and the information necessary for the configuration may be notified from the gNB to the UE via the RRC signaling, or dedicatedly notified to each UE. The method is semi-statically configurable. The configuration is changeable as necessary.

As an alternative method, the information may be notified from the gNB to the UE via the MAC signaling. The early configuration is possible after the notification. The information may be subjected to the HARQ, and the reception errors in configuring the priorities can be reduced. As an alternative method, the information may be notified from the gNB to the UE via the L1/L2 signaling. The gNB may include the information in the DCI to notify the information with the PDCCH. The early configuration is possible after the notification. The dynamic change or configuration is possible.

A method for the gNB to recognize which one of the UL transmission for URLLC and the UL transmission for eMBB has been received from the UE with the resources configured for the transmission without grant is disclosed.

The gNB makes the determination, depending on whether the DMRS for URLLC has been received. When the symbol duration for URLLC is different from the symbol duration for eMBB, the gNB receives the DMRS using the symbol duration for URLLC, and determines whether the DMRS is a DMRS for URLLC configured for the UE. When determining that the DMRS is the DMRS for URLLC, the gNB determines the reception of the UL transmission for URLLC. Otherwise, the gNB determines the reception of the UL transmission for eMBB.

This enables the gNB to recognize which one of the UL transmission for URLLC and the UL transmission for eMBB has been received from the UE with the resources configured for the transmission without grant.

The DMRS for eMBB may be made different from the DMRS for URLLC. The gNB configures, for the UE, different DMRSs for eMBB and for URLLC. Upon receipt of the DMRS for URLLC, the gNB determines the UL transmission for URLLC. Otherwise, the gNB may determine the UL transmission for eMBB.

This enables the gNB to recognize which one of the UL transmission for URLLC and the UL transmission for eMBB has been received from the UE with the resources configured for the transmission without grant, even when the symbol duration for URLLC is the same as the symbol duration for eMBB.

Disclosed is that the gNB makes the determination depending on whether the DMRS for URLLC has been received. As an alternative method, a signal or a channel indicating the UL transmission for URLLC may be provided. Alternatively, a signal or a channel indicating the UL transmission for eMBB may be provided. A signal or a channel indicating the UL transmission for URLLC or the UL transmission for eMBB may be provided.

Alternatively, information indicating the UL transmission for URLLC or the UL transmission for eMBB may be provided. The gNB may include the information in the UCI and transmit the UCI with the PUCCH. The information, signal, or channel may be provided as the UL information, signal, or channel for URLLC, or the UL information, signal, or channel for eMBB.

For example, the information, signal, or channel is provided as the UL information, signal, or channel for URLLC. When performing the UL transmission for URLLC with the resources configured for the transmission without grant, the UE transmits the information, signal, or channel in the UL transmission. The gNB can recognize which one of the UL transmission for URLLC and the UL transmission for eMBB has been received from the UE, depending on whether to receive the information, signal, or channel.

For example, the information, signal, or channel is provided as the UL information, signal, or channel for eMBB. When performing the UL transmission for eMBB with the resources configured for the transmission without grant, the UE transmits the information, signal, or channel in the UL transmission. The gNB can recognize which one of the UL transmission for URLLC and the UL transmission for eMBB has been received from the UE, depending on whether to receive the information, signal, or channel.

The timing with which the information, signal, or channel is transmitted need not be the timing of the resources configured for the transmission without grant. The timing may be before or after the timing of the resources configured for the transmission without grant. The timing should be after the timing with which the gNB determines which one of the UL transmission for URLLC and the UL transmission for eMBB is performed with the resources configured for the transmission without grant.

The timing with which the information, signal, or channel is transmitted is, for example, the last symbol in a slot for eMBB. This configuration is possible wherever in the slot for eMBB the transmission for URLLC is performed. Alternatively, the timing with which the information, signal, or channel is transmitted is the first symbol in the next slot for eMBB. This can produce the same advantages. The gNB can configure, for the UE in advance, the timing with which the information, signal, or channel is transmitted, and notify the timing to the UE.

The configuration of the information, signal, or channel or the timing with which the information, signal, or channel is transmitted may be predetermined, for example, in a standard. Both the gNB and the UE can recognize the configuration and the timing.

The configuration for the complementary DMRS which is disclosed in the second modification may be statically predetermined, for example, in a standard. Both the gNB and the UE can recognize the configuration. This should be applied, for example, when the RS is preempted and then shifted so that the complementary DMRS is configured. For example, when the FL-DMRS is preempted, the FL-DMRS is shifted so that the complementary DMRS is configured. The symbol to be shifted is predetermined in a standard. Information necessary for configuring the complementary DMRS is predetermined in a standard. This can eliminate the need for notifying the information on the complementary DMRS and reduce the amount of information necessary for signaling.

The Third Modification of the Seventh Embodiment

In the grant-based (GB) UL data communication, the UE requests the uplink grant by transmitting the SR to the gNB. The SR is mapped to the PUCCH to be transmitted. The communication requiring high reliability such as URLLC requires not only enhancement of the reliability in transmission of data but also enhancement of the reliability of the SR.

Repeated transmission of the PUCCH including the SR is performed for enhancing the reliability of the SR. The repeated transmission of the PUCCH including the SR can increase the communication quality of the SR and enhance the reliability of the SR. The repeated transmission of the PUCCH includes a method for repeatedly transmitting the PUCCH in one symbol twice. The repeated transmission of the PUCCH also includes a method for repeatedly transmitting, in a plurality of slots, the PUCCH consisting of three or more symbols.

In the transmission of the SR, an SR transmission prohibition timer after transmission of the SR is configured. After the transmission of the SR, transmission of a new SR is prohibited for a duration until the expiration of the timer. Upon expiration of the timer, transmission of the new SR is permitted.

How to handle the SR transmission prohibition timer when the repeated transmission of the SR is configured is unknown. In the case where how to handle the SR transmission prohibition timer is unknown, inconsistencies in operation between the gNB and the UE may cause malfunctions. A method for solving such a problem is disclosed.

The repeated transmission of the SR to be transmitted while the SR transmission prohibition timer after transmission of the SR is enabled is permitted. This can avoid a failure of performing the repeated transmission of the SR due to the SR transmission prohibition timer. This enables the repeated transmission of the SR, and can enhance the reliability of the SR.

When the SR is transmitted, a restriction on the maximum number of transmissions of the SR is imposed. The SR is transmitted with a period configured for the SR until reception of the uplink grant including transmission of the first SR. The number of transmissions of the SR is restricted.

How to handle the maximum number of transmissions of the SR when the repeated transmission of the SR is configured is unknown. In the case where how to handle the maximum number of transmissions of the SR is unknown, inconsistencies in operation between the gNB and the UE may cause malfunctions. A method for solving such a problem is disclosed.

The number of repeated transmissions of the SR is not counted for restricting the maximum number of transmissions of the SR after transmission of the SR. Consequently, the restriction on the maximum number of transmissions is imposed with the number of transmissions of the SR with the period configured for the SR as conventionally performed. This can avoid reaching the maximum number of transmissions of the SR in a short period of time, and enhance the reliability of the SR.

As an alternative method, the number of repeated transmissions of the SR is counted for restricting the maximum number of transmissions of the SR after transmission of the SR. Consequently, the restriction on the maximum number of transmissions is imposed with the number of transmissions of the SR including the number of repeated transmissions of the SR. Thus, when the restriction on the maximum number of transmissions of the SR is reached, the process is shifted to the next process. The duration between the processes can be shortened. For example, when the quality of a channel is inferior, the process can be shifted to the next process earlier. Thus, the latency required for the process can be shortened. On the other hand, since the maximum number of transmissions of the SR is the same as the conventional one, the reliability can be obtained as conventionally obtained.

Whether the number of repeated transmissions of the SR is counted for restricting the maximum number of transmissions of the SR after transmission of the SR may be statically predetermined in a standard. Alternatively, the gNB may semi-statically configure, for the UE, whether to count the number of repeated transmissions of the SR to restrict the maximum number of transmissions of the SR after transmission of the SR. The gNB may notify whether to count the number of repeated transmissions of the SR to restrict the maximum number of transmissions of the SR after transmission of the SR, to the UE via the RRC signaling or dedicatedly to each UE. The gNB may notify whether to count the number of repeated transmissions of the SR to restrict the maximum number of transmissions of the SR after transmission of the SR, together with the configuration of the SR or the configuration of the PUCCH to be used for the SR.

This can reduce the malfunctions caused by the inconsistencies in operation between the gNB and the UE in the process of transmitting the SR, and enhance the reliability of the SR.

For example, the service such as the URLLC requires the low latency characteristics. The preempted communication in the UL is supported for obtaining the low latency characteristics in the UL. In the preempted communication in the UL, the UL data communication with GB requires high reliability of the SR. A method for solving such a problem is disclosed.

Preemption for the SR is made possible. The resources for the eMBB UE are preempted, and the SR for the URLLC UE is transmitted. The PUSCH and/or the RS and/or the PUCCH for the eMBB UE are preempted, and the SR for the URLLC UE is transmitted. The gNB configures the SR for the URLLC UE. The gNB may configure the repeated transmissions as the SR. The gNB preempts the resources for the eMBB UE, for the resources of the SR configured for the URLLC UE.

The eMBB UE does not perform transmission with the preempted resources. When the uplink data occurs, the URLLC UE transmits the SR with the resources of the configured SR. The gNB notifies the UE of the configuration of the SR for the URLLC UE or the PUCCH for transmitting the SR, via the RRC signaling. The SR for the URLLC UE or the PUCCH for transmitting the SR may be a PUCCH consisting of one or two symbols or a PUCCH consisting of three or more symbols.

How the eMBB UE recognizes the resources to which the PUCCH for transmitting the SR for the URLLC UE is mapped is a problem. A method for solving such a problem is disclosed. The gNB should notify the eMBB UE of the configuration of the PUCCH for transmitting the SR for the URLLC UE. The notification method may be the RRC signaling. The configuration of the PUCCH for transmitting the SR for the URLLC UE may be broadcast as broadcast information or dedicatedly notified to each UE.

The eMBB UE does not perform transmission with the resources to which the configured PUCCH for transmitting the SR is mapped. This can avoid a contention between transmission of the SR from the URLLC UE and transmission from the eMBB UE. The reliability of transmission of the SR from the URLLC UE can be enhanced.

When notifying the eMBB UE of the configuration of the PUCCH for transmitting the SR for the URLLC UE, the gNB has to notify the eMBB UE of the configuration in advance. Which eMBB UE is scheduled in a slot including the resources with which the PUCCH for transmitting the SR for the URLLC UE has been configured is unknown at the time of notification.

Although it is probable to apply a method for the gNB to notify all the eMBB UEs being served thereby, this reduces the use efficiency of the radio resources because resources required for the notification are enormous in volume. A method for solving such a problem is disclosed.

The method on the PI is applied as a method for the gNB to notify the eMBB UEs of the configuration of the PUCCH for transmitting the SR for the URLLC UE. The PI should include information on the PUCCH for transmitting the SR for the URLLC UE. The information on the complementary DMRS, which is disclosed in the seventh embodiment, should be appropriately applied to the information on the PUCCH for transmitting the SR for the URLLC UE. The PUCCH for transmitting the SR for the URLLC UE may be used instead of the complementary DMRS.

As such, notifying the eMBB UEs of the configuration of the PUCCH for transmitting the SR for the URLLC UE with the PI can limit the eMBB UEs to be notified, to the eMBB UEs scheduled in the slot to which the PUCCH for transmitting the SR is mapped. Thus, the resources required for notifying the eMBB UEs can be reduced, and the use efficiency of the radio resources can be increased.

FIG. 59 illustrates an example of configuring the preemption for the SR. The symbols to which the PUSCH for the eMBB UE is mapped are preempted as the resources for the URLLC UE. The eMBB UE does not perform transmission with the preempted resources. Here, the eMBB UE does not transmit the PUSCH. The eMBB UE transmits a slot (may be a mini-slot) for the URLLC UE with the preempted resources. The URLLC UE transmits the SR in the slot. In other words, the URLLC UE transmits the PUCCH for the SR in the slot. The gNB receives the SR from the URLLC UE in the slot.

Although transmission of the slot for the URLLC UE with the preempted resources is described above, one or more symbols for the URLLC UE may be transmitted instead of the slot. The method may be applied when the PUCCH for the SR is mapped not to the slot but to the one or more symbols. The URLLC UE transmits the SR in the symbols. The gNB receives the SR from the URLLC UE in the symbols.

The PI is transmitted for the eMBB UE. The gNB includes, in the PI, information on the resources to be preempted for the eMBB UE to notify the PI to the eMBB UE. The information on the resources to be preempted may be, for example, information on the PUCCH for transmitting the SR for the URLLC UE. Upon receipt of the PI, the eMBB UE recognizes no transmission with the resources to be preempted and no transmission of the PUSCH.

The eMBB UE does not perform transmission with the preempted resources. The gNB can receive the resources for the other PUSCHs.

As such, when the UL transmission occurs from the URLLC UE, the SR can be transmitted from the URLLC UE with low latency without waiting for transmission of the eMBB UE even with the transmission timing of the eMBB UE. The transmission of the SR from the URLLC UE with low latency enables the URLLC UE to receive the UL grant from the gNB earlier and transmit the UL data to the gNB earlier. Thus, the URLLC UE can perform the UL communication with low latency.

The disclosed method for preempting the resources for the eMBB UE for transmitting data of the URLLC UE should be appropriately applied to a method for preempting the resources for the eMBB UE, for the PUCCH for transmitting the SR for the URLLC UE. For example, the method disclosed in the second modification of the seventh embodiment should be appropriately applied. This can produce the same advantages.

For example, configuring the FL-DMRS for the eMBB UE as the resources for preemption and configuring the complementary DMRS can prevent degradation in the demodulating performance in the eMBB UE, and perform the UL communication of the URLLC UE with lower latency.

Although the method for preempting the resources for the eMBB UE for transmitting the SR for the URLLC UE is disclosed above, another method for enabling transmission of the SR for the URLLC UE with the resources for the eMBB UE is disclosed hereinafter.

When the SCS and the symbol duration for the URLLC UE are the same as those for the eMBB UE, the SR for the URLLC UE is multiplexed with the resources to which the DMRS for the eMBB UE is mapped. The multiplexing method should be code-multiplexing with the DMRS for the eMBB UE. Different orthogonal codes may be used. The configuration of the SR for the URLLC UE may be identical to that of the DMRS of the eMBB UE.

The configuration of the SR for the URLLC UE to be multiplexed with the DMRS for the eMBB UE should be notified in advance from the gNB to the UE. The configuration may be notified via the RRC signaling or with the DCI. The dynamic notification is possible. Consequently, the DMRS for the eMBB UE can be multiplexed with the SR for the URLLC UE. The gNB can receive the DMRS transmitted from the eMBB UE, and the data transmitted from the URLLC UE. Since the gNB can receive the data of the URLLC UE early, the low latency characteristics can be yielded in the communication of the URLLC UE.

The Fourth Modification of the Seventh Embodiment

In the grant-based communication in NR, the downlink data or the uplink data may be configured to be repeatedly transmitted over a plurality of slots. In the non-grant communication in NR, the uplink data may be configured to be repeatedly transmitted over a plurality of slots.

When repeated transmission over a plurality of slots (may be mini-slots) is configured for the URLLC UE, the repeated transmission for the URLLC UE may be performed across the slots for the eMBB UE. The conventional preemption method is a method for preempting one continuous resource upon occurrence of transmission data for the URLLC UE in one slot for the eMBB UE. Thus, preempting the repeated transmission of the URLLC UE across the slots for the eMBB UE is not possible. A method for solving such a problem is disclosed.

When the resources for the eMBB UE are multiplexed with the resources for the URLLC UE, the repeated transmission of data for the URLLC UE is made non-configurable. When the preempted communication is configured in the communication for the eMBB UE and the communication for the URLLC UE, the repeated transmission of data for the URLLC UE is made non-configurable. This can facilitate the preemption process.

Another method is disclosed. When the resources for the eMBB UE are multiplexed with the resources for the URLLC UE, the repeated transmission of data for the URLLC UE is made configurable. When the preempted communication is configured in the communication for the eMBB UE and the communication for the URLLC UE, the repeated transmission of data for the URLLC UE is made configurable.

Since this enables the repeated transmission of data for the URLLC UE, the reliability of data communication for the URLLC UE can be enhanced. The coverage of the data communication for the URLLC UE can be extended.

The gNB should configure the number of repeated transmissions. For example, the gNB should configure the number of repeated transmissions to avoid extending across any slots for the eMBB UE. The gNB should configure the number of transmissions that can be repeated in one slot. The gNB may configure the number of repeated transmissions so that a signal or a channel for the eMBB UE that is non-configurable as the resources for preemption does not contend with the repeated transmissions of data for the URLLC UE. This may be applied to a configuration of the repeated transmissions within one slot.

This can facilitate the preemption process. Since the repeated transmission is configurable in the communication for the URLLC UE, the reliability is enhanced.

The gNB may notify the URLLC UE of the configuration of the number of repeated transmissions via the L1/L2 control signaling. The gNB may include the configuration in the DCI, and notify the DCI with the PDCCH. The number of repeated transmissions is dynamically configurable according to a slot configuration of the eMBB UE.

The configuration on the number of repeated transmissions may be made different between the presence and the absence of multiplexing the resources for the eMBB UE with the resources for the URLLC UE. The gNB may configure the number of repeated transmissions for the URLLC UE a plurality of times. The gNB may give the notification via the RRC signaling. The gNB may select one of the plurality of configurations and notify the selected configuration to the URLLC UE. The gNB may give the notification via the L1/L2 control signaling. The gNB may include the configuration in the DCI, and notify the DCI with the PDCCH.

The number of repetitions is dynamically configurable according to the presence or the absence of multiplexing with the resources for the eMBB UE.

A method for preempting the repeated transmission of data for the URLLC UE across the slots for the eMBB UE is disclosed.

The preemption method in the DL is disclosed. The repeated transmission of the data for the URLLC UE is not performed with the resources to which the PDCCH and the FL-DMRS for the eMBB UE are mapped. The repeated transmission of the data for the URLLC UE is scheduled on the resources to which the PDCCH and the FL-DMRS for the eMBB UE are not mapped. This enables the eMBB UE to receive the PDCCH and the FL-DMRS. Upon receipt of the PDCCH and the FL-DMRS, the eMBB UE can receive data of the PDSCH.

Figure 60:
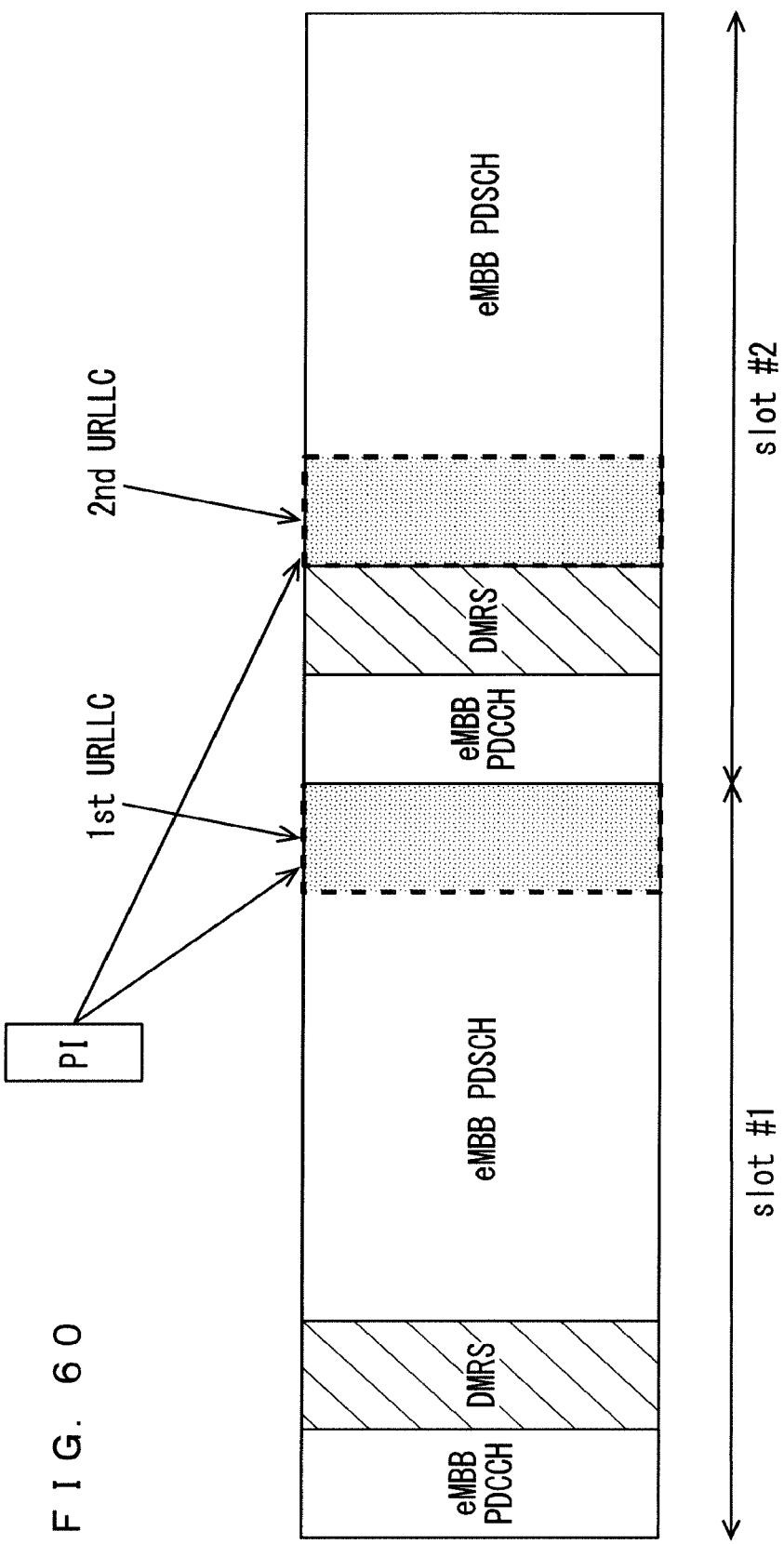
FIG. 60 illustrates an example method for preempting repeated transmission of data for the URLLC UE across slots for the eMBB UE according to the fourth modification of the seventh embodiment.

FIG. 60 illustrates an example method for preempting the repeated transmission of the data for the URLLC UE across the slots for the eMBB UE. It is assumed that the number of repeated transmissions of the data for the URLLC UE is two. The resources for the eMBB UE are preempted for the first data communication of the URLLC UE in the slot #1 for the eMBB UE. Normally, the gNB transmits the second data for the URLLC UE in the subsequent slot for the URLLC UE.

However, in the preemption as illustrated in FIG. 60, the slot for the first data communication of the URLLC UE is followed by the resources to which the PDCCH and the FL-DMRS for the eMBB UE are mapped. Thus, the slot for the URLLC UE cannot be reserved during this. The slot for the second data of the URLLC UE is configured in a symbol after the FL-DMRS in the slot #2 for the eMBB UE, and preempted.

The repeated data for the URLLC UE is transmitted in the slot for the URLLC UE that is preempted in the slot #2 for the eMBB UE.

The PI is transmitted for the eMBB UE. The gNB includes, in the PI, information on the resources to be preempted in the slot #1 and the slot #2 for the eMBB UE to notify the PI to the eMBB UE.

This enables the preemption process even when the repeated transmission for the URLLC UE is configured. Consequently, the repeated transmission for the URLLC UE can be performed with low latency, and the high reliability and the low latency characteristics can be yielded in the communication for the URLLC UE.

FIG. 60 illustrates that the repeated transmission of data for the URLLC UE is not performed with the resources to which the PDCCH and the FL-DMRS for the eMBB UE are mapped. When the other channels or RSs are mapped, the repeated transmission of data for the URLLC UE need not be performed with a part or all the resources for these channels or RSs. This can reduce the influence on the communication for the eMBB UE.

The repeated transmission of data for the URLLC UE may be scheduled on the resources for the FL-DMRS for the eMBB UE. In other words, the repeated transmission of data for the URLLC UE is not performed with the resources to which the PDCCH for the eMBB UE is mapped. The repeated transmission of data for the URLLC UE is scheduled on the resources to which the PDCCH for the eMBB UE is not mapped.

In such a case, the eMBB UE has a problem of failing to receive the FL-DMRS. The method disclosed in the seventh embodiment should be applied to a method for solving such a problem. This can produce the same advantages. Since the resources for the FL-DMRS are configurable as the resources for preemption, the data for the URLLC UE can be communicated earlier with low latency.

FIG. 61 illustrates an example method for preempting the repeated transmission of data for the URLLC UE across the slots for the eMBB UE. It is assumed that the number of repeated transmissions of data for the URLLC UE is three. FIG. 61 illustrates a case where the FL-DMRS for the eMBB UE is made configurable as the resources for preemption.

In the slot #1 for the eMBB UE, the resources to which the PDSCH for the eMBB UE is mapped are preempted for the first and second data communications of the URLLC UEs. Normally, the gNB transmits the third data for the URLLC UE in the subsequent slot for the URLLC UE.

In the preemption as illustrated in FIG. 61, the slot for the second data communication of the URLLC UE is followed by the resources to which the PDCCH for the eMBB UE is mapped. Thus, the slot for the URLLC UE cannot be reserved during this. The PDCCH for the eMBB UE is followed by the FL-DMRS, and the FL-DMRS is configured as the resources for preemption. The slot for the third data of the URLLC UE is configured in the FL-DMRS in the slot #2 for the eMBB UE, and preempted.

The repeated data for the URLLC UE is transmitted in the slot for the URLLC UE that is preempted in the slot #2 for the eMBB UE.

Since the FL-DMRS is preempted in the slot #2 for the eMBB UE, the eMBB UE cannot demodulate data in the slot #2 as it is. Thus, the method for configuring the complementary DMRS, which is disclosed in the seventh embodiment, is applied. In FIG. 61, the method for shifting the FL-DMRS after the preempted resources is applied.

Since this configures the DMRS after the resources preempted for the third data communication of the URLLC UE, the eMBB UE can demodulate the data in the slot #2.

The PI is transmitted for the eMBB UE. The gNB includes, in the PI, information on the resources to be preempted in the slot #1 and the slot #2 for the eMBB UE to notify the PI to the eMBB UE.

When the resources to be preempted for the first data of the URLLC UE and the resources to be preempted for the second data of the URLLC UE are continuous, the resources may be separate pieces of information or information on one continuous resource.

Since this can make the FL-DMRS for the eMBB UE configurable for preemption, the repeated transmission for the URLLC UE can be performed with low latency. Consequently, the repeated transmission for the URLLC UE can be performed with lower latency, and the high reliability and the low latency characteristics can be yielded in the communication for the URLLC UE.

When the resources of the PDCCH and/or the FL-DMRS for the eMBB UE are made non-configurable as the resources for preemption, the repeated transmission for the URLLC UE cannot be performed in consecutive slots for the URLLC UE. For example in FIG. 60, the first transmission and the second repeated transmission for the URLLC UE are discretely mapped with the resources for the PDCCH and the FL-DMRS for the eMBB UE sandwiched therebetween.

A scheduling method in such a case is disclosed. The gNB notifies the URLLC UE of the repeated transmission to be performed in discrete slots. The gNB notifies information on the discrete slots in which the repeated transmission is performed. The gNB notifies, for example, slot numbers at which transmission is impossible. The gNB notifies the number of repeated transmissions or the number of slots in which the repeated transmission is performed. Consequently, the URLLC UE can perform reception as many as the number of repetitions, in slots excluding the slots in which transmission is impossible. The slot numbers at which transmission is impossible may be consecutive or non-consecutive. A plurality of the slot numbers at which transmission is impossible may be configured.

The slot numbers at which transmission is impossible may be configured within a predetermined duration. Examples of the predetermined duration include a radio frame duration of the URLLC UE and one slot duration of the eMBB UE. The gNB notifies the UE of the configuration.

The gNB may make the configuration for the UE at predetermined intervals. The gNB notifies the UE of the configuration at predetermined intervals. For example, the gNB can make the configuration when the slot configuration of the eMBB UE is changed in time and the symbols to which the PDCCH or the FL-DMRS is mapped are changed.

The same configuration may be repeated at predetermined intervals. Repetitions of the same configuration may be statically predetermined, for example, in a standard. The gNB has only to notify the URLLC UE of the configuration once, which can reduce the amount of information necessary for the notification.

Another method is disclosed. The gNB notifies, for example, slot numbers at which transmission is possible. The gNB notifies the number of repeated transmissions or the number of slots in which the repeated transmission is performed. Consequently, the URLLC UE can perform reception as many as the number of repetitions, in the slots in which transmission is possible. The slot numbers at which transmission is possible may be consecutive or non-consecutive. A plurality of the slot numbers at which transmission is possible may be configured.

The slot numbers at which transmission is possible may be configured within a predetermined duration. The disclosed method may be applied to a method for configuring, within a predetermined duration, the slot numbers at which transmission is possible. This produces the same advantages.

The method for configuring the slot numbers at which transmission is impossible may be combined with the method for configuring the slot numbers at which transmission is possible. The slots within the predetermined duration and information indicating whether transmission is possible may be represented in a bitmap as the configuring method. For example, assuming that "0" represents that transmission is impossible and "1" represents that transmission is possible, the bitmap is configured with the number of bits as many as the number of slots within the predetermined duration. The gNB should notify the URLLC UE of the bitmap. The amount of information can be reduced more than that for notifying the slot numbers.

The gNB may notify the UE of multiplexing with the resources for the eMBB UE. The gNB may notify the subcarrier spacing (SCS) or the symbol duration of the resources to be multiplexed. A notification of the SCS or the symbol duration enables the URLLC UE to recognize which slot the repeated transmission may be impossible in. The repeated transmission should be made impossible in the slot in which the repeated transmission may be impossible.

The gNB may notify, via the RRC signaling, the UE of the information on the discrete slots in which the repeated transmission is performed. This is effective when a semi-static configuration is made. The gNB may notify the information via the MAC signaling. This is effective when the configuration is dynamically changed. The reception errors are reduced with application of the retransmission. Thus, the malfunctions caused by the inconsistencies between the gNB and the UE hardly occur.

The DCI may include the information on the discrete slots in which the repeated transmission is performed. The gNB may notify the DCI via the L1/L2 control signaling. This is effective when the configuration is dynamically changed. Since the configuration is changeable early, the configuration appropriate for, for example, a radio propagation situation or a use state of resources can be more flexibly made.

The RRC signaling, the MAC signaling, and the L1/L2 control signaling may be used in combination. The gNB may notify, for example, the number of repeated transmissions or the number of slots in which the repeated transmission is performed via the RRC signaling, and information indicating whether transmission is possible in the slots within the predetermined duration via the L1/L2 control signaling. The combined use of the signalings for the notification enables the configuration and the notification according to the frequencies of configuring the pieces of information.

In NR, a slot including symbols the number of which is less than 14 is supported. The slot is also referred to as a non-slot or a mini-slot. When mini-slots are used, slot numbers of the mini-slots need to be configured. A method for assigning the slot numbers to the mini-slots is disclosed. The slot numbers that are consecutive within a predetermined duration should be assigned. Examples of the predetermined duration include one slot and a radio frame.

Sub-numbers of a slot number may be assigned as the method for assigning the slot numbers to the mini-slots. When the slot number is 1, the slot numbers of the mini-slots configured in the slot may be, for example, 11, 12, and 13. A slot number and a mini-slot number may be configured by a plurality of bits. The slot number and the mini-slot number may be configured by bits representing the slot number and bits representing the mini-slot number. For example, assume, using four bits, that the first two bits represent the slot number and the latter two bits represent the mini-slot number. For example, when the slot number is 1 and the mini-slot number is 3, "0111" is used.

Consequently, when a mini-slot is used, the mini-slot can be identified by a number.

When the mini-slots are used for the URLLC UE, the information on the discrete slots in which the repeated transmission for the URLLC UE is performed may be, for example, information on the mini-slots. The information should be configured using the mini-slot numbers. The URLLC UE can perform the repeated transmissions as many as the number of repetitions, in the mini-slots in which transmission is possible.

A method for notifying the eMBB UE of the resources for preemption is disclosed. The gNB notifies, with the PI, the eMBB UE of information on the resources for preemption for the repeated transmissions including the first transmission of the URLLC UE.

When the repeated transmissions of the URLLC UE are performed across a plurality of slots for the eMBB UE, for example, the PI is provided with the timing between the slots. The gNB notifies, with the PI with the timing between the slots, the eMBB UE of the resources for preemption in each of the slots. This can reduce the amount of information to be included in each PI. The eMBB UE should receive the PI transmitted with the timing between the slots, in the slot that has been scheduled for its own UE.

As an alternative method, the information on the resources for preemption across a plurality of slots is included in, for example, the PI with the timing between the first slots. The gNB notifies, with the PI with the timing between the first slots, the eMBB UE of the resources for preemption in each of the slots. Consequently, the eMBB UE has only to receive the PI transmitted with the timing between the first slots, which can facilitate the reception process and reduce the power consumption.

The preemption method in the UL is disclosed. The repeated transmission of data for the URLLC UE is not performed with the resources to which the RS and the PUCCH for the eMBB UE are mapped. The repeated transmission of data for the URLLC UE is scheduled on the resources to which the RS and the PUCCH for the eMBB UE are not mapped. This enables the eMBB UE to transmit the RS and the PUCCH.

Upon receipt of the RS and the PUCCH, the gNB can perform data communication including the retransmission.

FIG. 62 illustrates an example method for preempting the repeated transmission of data for the URLLC UE across the slots for the eMBB UE. It is assumed that the number of repeated transmissions of data for the URLLC UE is two. The resources for the eMBB UE are preempted for the first data communication of the URLLC UE in the slot #1 for the eMBB UE. Normally, the URLLC UE transmits the second data for the URLLC UE in the subsequent slot for the URLLC UE.

However, in the preemption as illustrated in FIG. 62, the slot for the first data communication of the URLLC UE is followed by the resources to which the PUCCH/SRS and the FL-DMRS for the eMBB UE are mapped. Thus, the slot for the URLLC UE cannot be reserved during this. The slot for the second data of the URLLC UE is configured in a symbol after the FL-DMRS in the slot #2 for the eMBB UE, and preempted.

The repeated data for the URLLC UE is transmitted in the slot for the URLLC UE that is preempted in the slot #2 for the eMBB UE.

The PI is transmitted for the eMBB UE. The gNB includes, in the PI, information on the resources to be preempted in the slot #1 and the slot #2 for the eMBB UE to notify the PI to the eMBB UE.

The PI may be provided with the timing between the slots. The gNB notifies, with the PI with the timing between the slots, the eMBB UE of the resources for preemption in each of the slots. This can reduce the amount of information to be included in each PI. The eMBB UE may receive the PI to be transmitted with the timing between the slots, in the slot that has been scheduled for its own UE.

This enables the preemption process even when the repeated transmission for the URLLC UE is configured. Consequently, the repeated transmission for the URLLC UE can be performed with low latency, and the high reliability and the low latency characteristics can be yielded in the communication for the URLLC UE.

The repeated transmission of data for the URLLC UE may be performed with the resources to which the RS or the PUCCH except for the FL-DMRS for the eMBB UE is mapped. The repeated transmission of data for the URLLC UE is scheduled on the resources excluding the FL-DMRS for the eMBB UE. This enables earlier transmission of the data for the URLLC UE. Since the eMBB UE can transmit the FL-DMRS, the gNB can receive the data with the FL-DMRS.

When the resources for the FL-DMRS for the eMBB UE are made non-configurable as the resources for preemption, the repeated transmission for the URLLC UE may not be performed in consecutive slots for the URLLC UE. For example, the first transmission and the second repeated transmission for the URLLC UE are discretely mapped with the resources for the FL-DMRS for the eMBB UE sandwiched therebetween.

The aforementioned method on the DC should be appropriately applied to such a scheduling method. The transmission from the gNB to the UE in the DL should correspond to the transmission from the UE to the gNB in the UL.

The repeated transmission of data for the URLLC UE may be scheduled on the resources for the FL-DMRS for the eMBB UE. In such a case, the eMBB UE has a problem of failing to transmit the FL-DMRS. The method disclosed in the second modification of the seventh embodiment should be applied to a method for solving such a problem. This can produce the same advantages. Since the resources for the FL-DMRS are configurable as the resources for preemption, the data for the URLLC UE can be communicated earlier with low latency.

Figure 63:
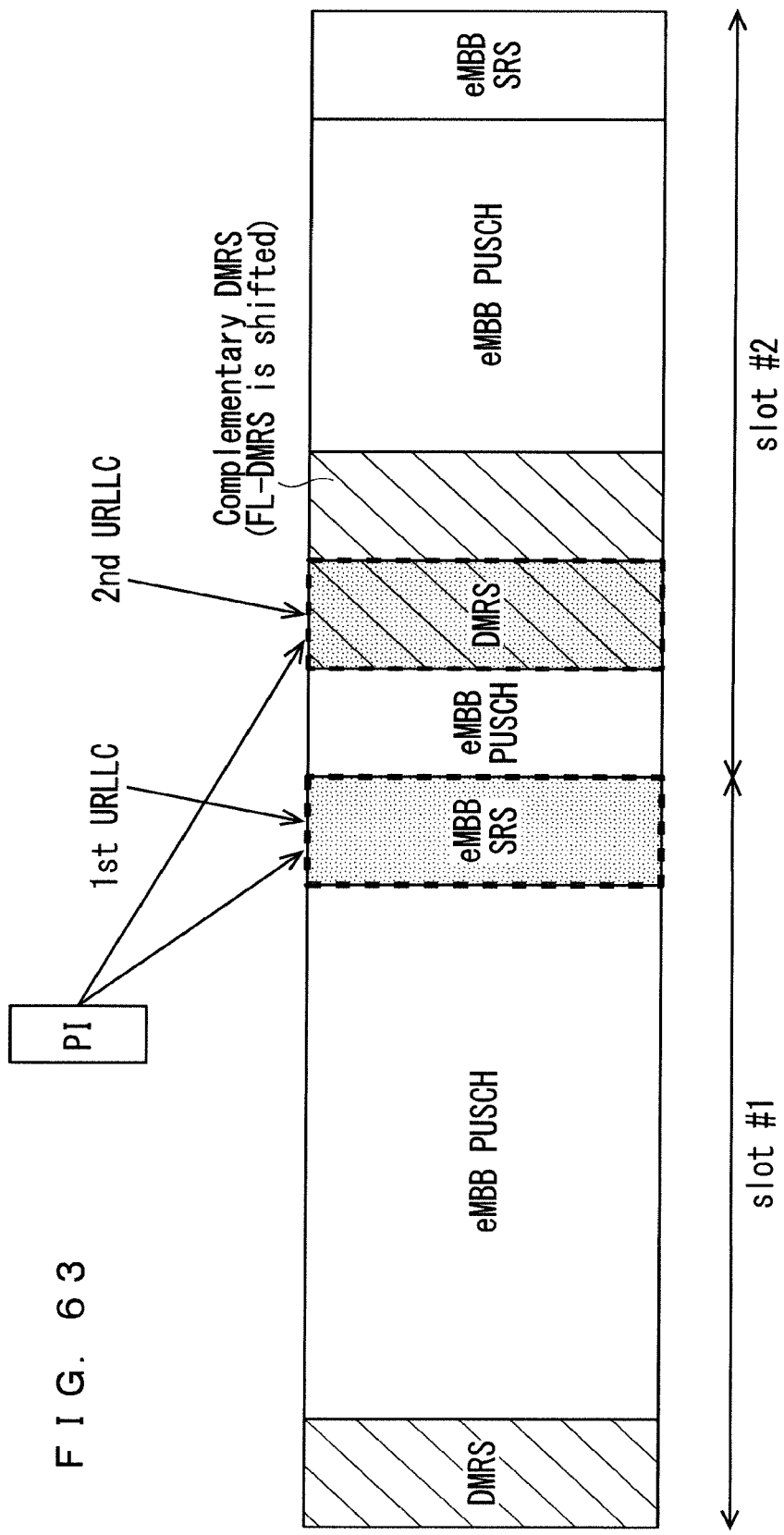
FIG. 63 illustrates an example method for preempting the repeated transmission of data for the URLLC UE across the slots for the eMBB UE according to the fourth modification of the seventh embodiment.

FIG. 63 illustrates an example method for preempting the repeated transmission of data for the URLLC UE across the slots for the eMBB UE. It is assumed that the number of repeated transmissions of data for the URLLC UE is two. FIG. 63 illustrates a case where the FL-DMRS for the eMBB UE is made configurable as the resources for preemption.

In the slot #1 for the eMBB UE, the resources to which the PUSCH for the eMBB UE is mapped are preempted for the first data communication of the URLLC UE. Normally, the URLLC UE transmits the second data for the URLLC UE in the subsequent slot for the URLLC UE.

In the preemption as illustrated in FIG. 63, the slot for the first data communication of the URLLC UE is followed by the resources to which the PUCCH for the eMBB UE is mapped. Thus, the slot for the URLLC UE cannot be reserved during this. The PUCCH for the eMBB UE is followed by the FL-DMRS, and the FL-DMRS is configured as the resources for preemption. The slot for the second data of the URLLC UE is configured in the FL-DMRS in the slot #2 for the eMBB UE, and preempted.

The repeated data for the URLLC UE is transmitted in the slot for the URLLC UE that is preempted in the slot #2 for the eMBB UE.

Since the FL-DMRS is preempted in the slot #2 for the eMBB UE, the gNB cannot demodulate the data in the slot #2 as it is. Thus, the method for configuring the complementary DMRS, which is disclosed in the second modification of the seventh embodiment, is applied. In FIG. 63, the method for shifting the FL-DMRS after the preempted resources is applied. The eMBB UE transmits the complementary DMRS after the preempted resources.

Since this configures the DMRS after the resources preempted for the second data communication of the URLLC UE, the gNB can demodulate the data in the slot #2.

The PI is transmitted for the eMBB UE. The gNB includes, in the PI, information on the resources to be preempted in the slot #1 and the slot #2 for the eMBB UE to notify the PI to the eMBB UE.

When the resources to be preempted for the first URLLC UE and the resources to be preempted for the second URLLC UE are continuous, the resources may be separate pieces of information or information on one continuous resource.

Since this can make the FL-DMRS for the eMBB UE configurable for preemption, the repeated transmission for the URLLC UE can be performed with low latency. Consequently, the repeated transmission for the URLLC UE can be performed with lower latency, and the high reliability and the low latency characteristics can be yielded in the communication for the URLLC UE.

Disclosed is the preemption method when the repeated transmission for the URLLC UE is performed across the slots for the eMBB UE. The method should be applied to the preemption when one slot includes symbols in which preemption is impossible, without extending across slots and the repeated transmission is performed across the symbols. Although slot number information is required across the slots, the slot number information may be unnecessary without extending across the slots.

Since this enables the repeated transmission of the URLLC UE even in the presence of a certain symbol in which preemption is impossible, the communication with high reliability and low latency is possible. Conversely, for example, the symbol in which preemption is impossible is configurable in one slot for the eMBB UE. A flexible slot format is configurable according to, for example, a communication service, the required QoS, or the radio propagation environment.

The Fifth Modification of the Seventh Embodiment

When preemption is impossible in symbols to which the PDCCH for the eMBB UE is mapped in the DL and data is transmitted to the URLLC UE, scheduling for the URLLC UE cannot be performed during the symbols to which the PDCCH is mapped. Thus, the latency in transmission to the URLLC UE is increased. A method for solving such a problem is disclosed.

The PDCCH for the eMBB UE is multiplexed with the resources for preemption for the URLLC UE in the symbols to which the PDCCH is mapped. The multiplexing method is disclosed. In the symbols to which the PDCCH for the eMBB UE can be mapped, the resources for the URLLC UE are mapped to the resources to which the PDCCH for the eMBB UE is not actually mapped.

In other words, the PDCCH for the eMBB UE is frequency-division multiplexed and/or time-division multiplexed with the resources for the URLLC UE in the symbols to which the PDCCH for the eMBB UE can be mapped. In the symbols to which the PDCCH for the eMBB UE can be mapped, the PDCCH for the eMBB UE is not necessarily mapped to all the REs. There may be some REs to which the PDCCH for the eMBB UE is not mapped. The resources for the URLLC UE should be scheduled using a part or all the REs to which the PDCCH for the eMBB UE is not mapped.

The gNB does not notify the eMBB UE of the resources for preemption. Since the REs to which the PDCCH for the eMBB UE is mapped are not preempted, the gNB can map the PDCCH for the eMBB UE, and the eMBB UE can receive the PDCCH even in the absence of the notification of the resources for preemption.

The method for the gNB to perform scheduling for the URLLC UE is a problem. A Control Resource Set (CORESET) is configured for the URLLC UE in a slot for multiplexing with the PDCCH for the eMBB UE. The CORESET is periodically configured with the resources to which the PDCCH may be mapped. The CORESET is configured for each UE or for each UE group. The CORESET for each UE group may be referred to as a group common CORESET.

The CORESET may be configured for the PDCCH for the eMBB UE. The gNB should configure the CORESET for the eMBB UE and the CORESET for the URLLC UE without any contention therebetween. Consequently, the gNB can multiplex the PDCCH for the URLLC UE with the symbols to which the PDCCH for the eMBB UE is mapped to transmit the resulting signal.

The gNB transmits scheduling information of data for the URLLC UE, using the PDCCH. Upon detection of its own PDCCH in the resources of the CORESET, the URLLC UE can receive the DCI and the scheduling information of data for its own UE. The URLLC UE receives the data according to the scheduling information.

Consequently, the URLLC UE can receive the data for the URLLC UE, in the symbols to which the PDCCH for the eMBB UE is mapped.

A plurality of CORESETs may be configured for the UE. A CORESET may be separately provided in the resources with which the PDCCH for the eMBB UE is multiplexed with the PDCCH for the URLLC UE. The resources to which the PDCCH for the eMBB UE is mapped in the resources with which these are not multiplexed may be made different from the resources to which the PDCCH for the eMBB UE is mapped in the resources with which these are multiplexed.

The resources to which the PDCCH for the URLLC UE is mapped in the resources with which these are not multiplexed may be made different from the resources to which the PDCCH for the URLLC UE is mapped in the resources with which these are multiplexed. Consequently, the CORESETs can be differently configured between the resources with which these are multiplexed and the resources with which these are not multiplexed. This can increase the use efficiency of the resources.

FIG. 64 illustrates a method for multiplexing the PDCCH for the eMBB UE with a slot (may be a mini-slot) for the URLLC UE. The PDCCH and data for the URLLC UE are mapped to the symbols to which the PDCCH for the eMBB UE can be mapped. The gNB configures, in the symbols to which the PDCCH for the eMBB UE can be mapped, the CORESET for the eMBB UE and the CORESET for the URLLC UE without any contention therebetween.

Consequently, the gNB can multiplex the PDCCH for the URLLC UE with the symbols to which the PDCCH for the eMBB UE is mapped to transmit the resulting signal.

The gNB may configure the CORESET for the URLLC UE, for the symbols to which the PDCCH for the eMBB UE can be mapped. The PDCCH for the eMBB UE is mapped to predetermined symbols from the beginning of the slot. Thus, the periodic configuration can be made according to the symbols.

For example, upon occurrence of data for the URLLC UE and even in the presence of symbols in which the PDCCH for the eMBB UE is transmitted with the timing to transmit the data, the PDCCH and the data for the URLLC UE can be transmitted in the symbols without a failure of transmission of the PDCCH for the eMBB UE.

Enabling early transmission to the URLLC UE can yield the low latency characteristics. Since the PDCCH for the eMBB UE can also be transmitted, data communication of the eMBB UE is possible. Thus, the high-speed large-capacity communication is possible.

When the repeated transmission is configured for the URLLC UE, scheduling for the URLLC UE should be performed with the PDCCH. The scheduling should be performed with the PDCCH to be transmitted in the first transmission slot. The gNB should include, in the DCI of the PDCCH, the scheduling information for the URLLC UE for multiplexing with the PDCCH for the eMBB UE to notify the DCI. Upon receipt of the DCI of the PDCCH, the URLLC UE can receive data to be multiplexed with the eMBB UE.

The scheduling information includes resource allocation information to which data for the URLLC UE is mapped. The resource allocation information may be resource allocation information on the frequency-time axes. The resource allocation information includes PRB information. The resource allocation information on the frequency axis may be used in combination with the resource allocation information on the time axis. The resource allocation information on the frequency axis includes an REG number, an RE number, and a subcarrier number. The resource allocation information on the time axis includes symbol information.

In the slot in which the data for the URLLC UE is multiplexed with the PDCCH for the eMBB UE, for example, the same resources as those for the slot for the first transmission cannot always be reserved. Thus, the data should be mapped to the slot in which the multiplexing is performed, by changing a modulating method or a coding rate. These pieces of information should be included as the scheduling information. Information indicating how many times of repeated transmission these pieces of scheduling information are applied at may be provided. The gNB may associate the scheduling information in the multiplexing with the information indicating how many times of the repeated transmission to notify the URLLC UE of these pieces of information.

Figure 65:
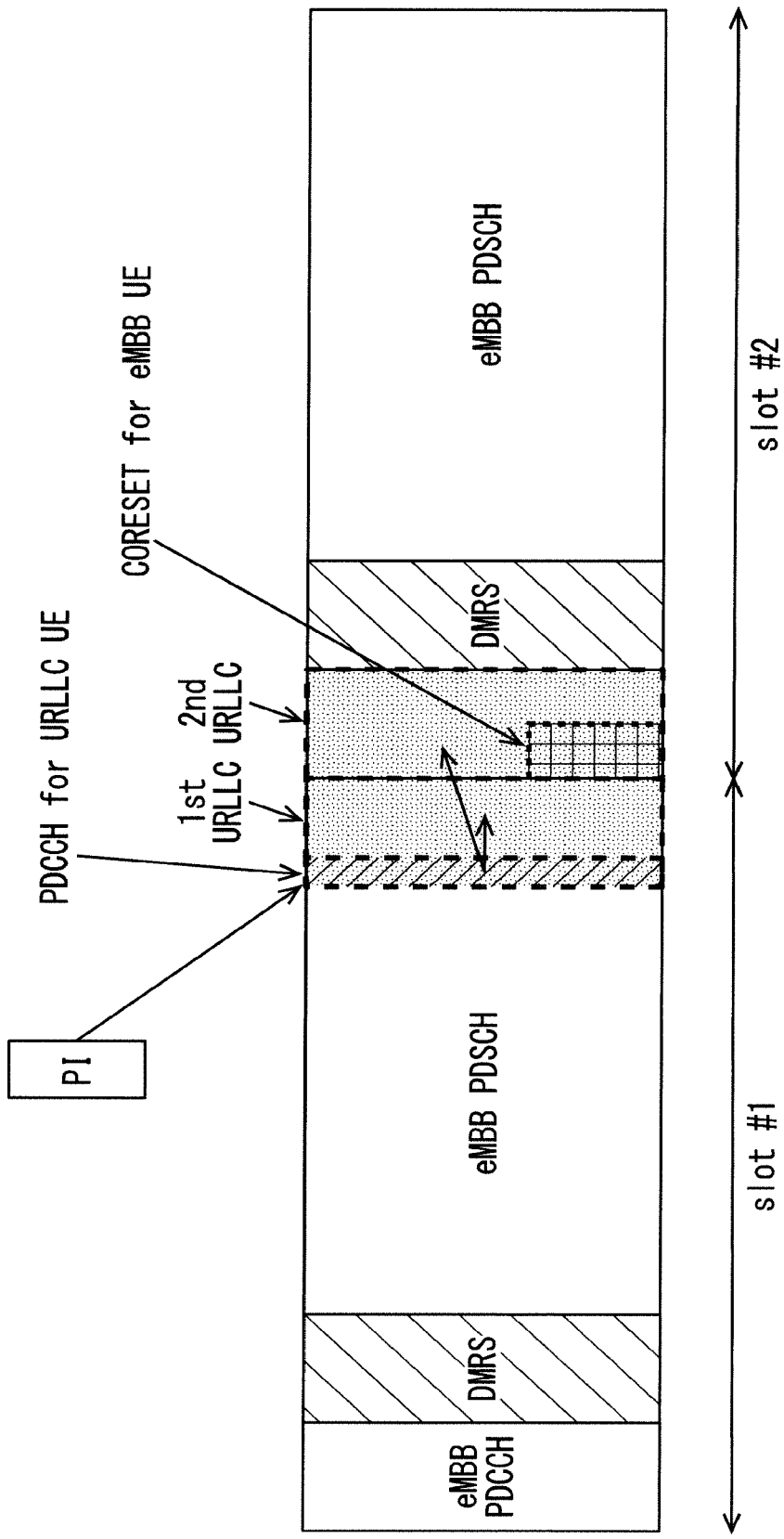
FIG. 65 illustrates a method for multiplexing the PDCCH for the eMBB UE with the slot for the URLLC UE according to the fifth modification of the seventh embodiment.

FIG. 65 illustrates a method for multiplexing the PDCCH for the eMBB UE with a slot for the URLLC UE. FIG. 65 illustrates the repeated transmission of data for the URLLC UE across slots for the eMBB UE. It is assumed that the number of repeated transmissions of data for the URLLC UE is two. The resources for the eMBB UE are preempted for the first data communication of the URLLC UE in the slot #1 for the eMBB UE.

The gNB transmits the second data in the subsequent slot for the URLLC UE. When the slot for the second data of the URLLC UE is used as the resources to which the PDCCH for the eMBB UE is mapped, the second data for the URLLC UE is mapped to the resources except for the CORESET for the eMBB UE as illustrated in FIG. 65.

The gNB includes, in the PDCCH for the URLLC UE to be transmitted in the slot for the first data of the URLLC UE, the scheduling information of the second data for the URLLC UE to notify the URLLC UE of the PDCCH. Consequently, the PDCCH for the eMBB UE can be multiplexed with the data for the URLLC UE in the symbols to which the PDCCH in the slot #2 for the eMBB UE can be mapped. The repeated data for the URLLC UE is transmitted in the slot #2 for the eMBB UE.

When the repeated transmission of data for the URLLC UE is configured to enhance the reliability, even in the presence of a symbol in which the PDCCH for the eMBB UE is transmitted with the timing to perform the repeated transmission, the data for the URLLC UE can be transmitted in the symbol without a failure of transmission of the PDCCH for the eMBB UE.

Enabling the early transmission to the URLLC UE can yield the high reliability and the low latency characteristics. Since the PDCCH for the eMBB UE can also be transmitted, data communication of the eMBB UE is possible. Thus, the high-speed large-capacity communication is possible.

The Sixth Modification of the Seventh Embodiment

In the DL, the resources to which the PDSCH for the eMBB UE is mapped may be split in time by preemption.

After a part of the resources for the PDSCH is transmitted, the resources for the eMBB UE may be preempted and thus not transmitted, and then the remaining PDSCH may be transmitted.

In such a case, there may be no continuity in the phase or the power of the PDSCHs, in transmission before and after the resources for preemption. Even though the DMRS is configured before or after the resources for preemption, the discontinuity in the phase or the power degrades the demodulating characteristics in the PDSCH with the resources in which the DMRS is not configured.

The method for configuring the complementary DMRS should be applied to a method for solving such a problem. The complementary DMRS should be configured so that the DMRSs are configured both before and after the resources for preemption. This can, for example, reduce the degradation in the demodulating characteristics when the preemption causes discontinuity in the phase or the power before and after the resources.

Figure 66:
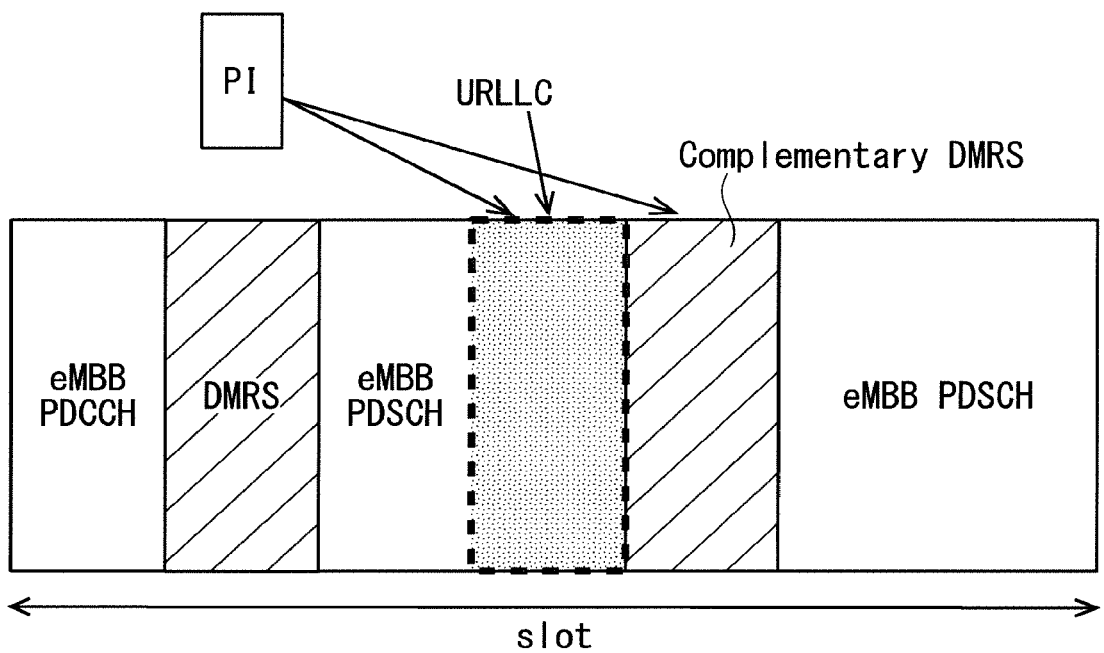
FIG. 66 illustrates an example of preempting the resources for the PDSCH when only the FL-DMRS is configured in one slot for the eMBB UE according to the sixth modification of the seventh embodiment.

FIG. 66 illustrates an example of preempting the resources for the PDSCH when only the FL-DMRS is configured in one slot for the eMBB UE. The gNB transmits the FL-DMRS and the PDSCH for the eMBB UE before the preemption, does not transmit anything for the eMBB UE with the resources for preemption, and transmits the PDSCH for the eMBB UE after the preemption.

Thus, there is no continuity in the phase or the power of the PDSCHs before and after the preemption. The eMBB UE can receive the FL-DMRS, and demodulate the PDSCH before the preemption with the FL-DMRS. However, when the eMBB UE demodulates the PDSCH after the preemption with the FL-DMRS, the discontinuity in the phase or the power degrades the demodulating characteristics.

To reduce such problems, the gNB configures the DMRS after the resources for preemption. The method for configuring the complementary DMRS as the DMRS should be applied. The method disclosed in the seventh embodiment should be appropriately applied.

The gNB configures the complementary DMRS for the eMBB UE in a PDSCH region after preemption, and transmits the complementary DMRS. The eMBB UE receives the complementary DMRS configured in the PDSCH after preemption, and demodulates the PDSCH. This can reduce the degradation in the demodulating characteristics of the PDSCH after preemption in the eMBB UE.

In the UL, the resources to which the PUSCH for the eMBB UE is mapped may be split in time by preemption. After a part of the resources for the PUSCH is transmitted, the resources for the eMBB UE may be preempted and thus not transmitted, and then the remaining PUSCH may be transmitted.

In such a case, there may be no continuity in the phase or the power of the PUSCHs in transmission before and after the resources for preemption. Even though the DMRS is configured before or after the resources for preemption, the discontinuity in the phase or the power degrades the demodulating characteristics in the PUSCH with the resources in which the DMRS is not configured.

The method for configuring the complementary DMRS should be applied to a method for solving such a problem. The complementary DMRS should be configured so that the DMRSs are configured both before and after the resources for preemption. This can, for example, reduce the degradation in the demodulating characteristics when the preemption causes discontinuity in the phase or the power before and after the resources.

Figure 67:
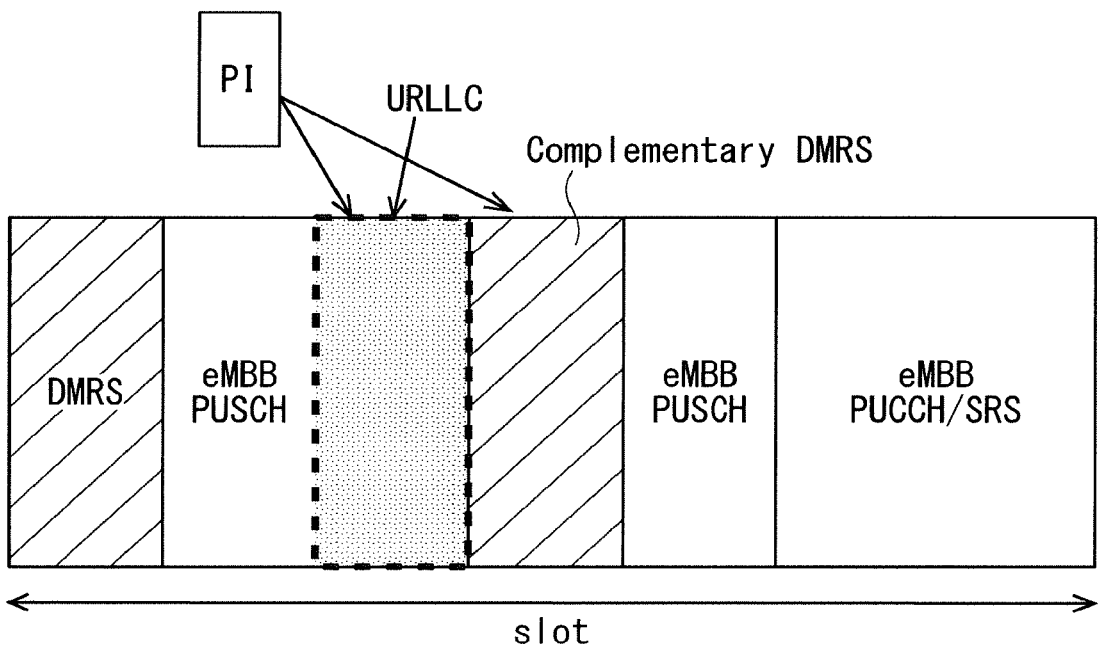
FIG. 67 illustrates an example of preempting the resources for the PUSCH when only the FL-DMRS is configured in one slot for the eMBB UE according to the sixth modification of the seventh embodiment.

FIG. 67 illustrates an example of preempting the resources for the PUSCH when only the FL-DMRS is configured in one slot for the eMBB UE. The eMBB UE transmits the FL-DMRS and the PUSCH before the preemption, does not transmit anything with the resources for preemption, and transmits the PUSCH after the preemption.

Thus, there is no continuity in the phase or the power of the PUSCHs before and after the preemption. The gNB can receive the FL-DMRS, and demodulate the PUSCH before the preemption with the FL-DMRS. However, when the gNB demodulates the PUSCH after the preemption with the FL-DMRS, the discontinuity in the phase or the power degrades the demodulating characteristics.

To reduce such problems, the gNB configures the DMRS after the resources for preemption. The method for configuring the complementary DMRS as the DMRS should be applied. The method disclosed in the second modification of the seventh embodiment should be appropriately applied.

The gNB configures the complementary DMRS for transmission from the eMBB UE, in a PUSCH region after preemption. The eMBB UE transmits the configured complementary DMRS. The gNB receives the complementary DMRS after preemption, and demodulates the PUSCH after preemption. This can reduce the degradation in the demodulating characteristics of the PUSCH after preemption in the gNB.

A plurality of complementary DMRSs may be configured in both of the DL and the UL. The method for configuring the complementary DMRS may be applied thereto.

FIG. 68 illustrates an example of configuring a plurality of complementary DMRSs in the UL. FIG. 68 illustrates an example of preempting a DMRS when only the DMRS is configured in one slot for the eMBB UE. The PUSCHs are configured before and after the DMRS. Two complementary DMRSs are configured before and after the resources for preemption.

Preempting the DMRS disables the gNB from demodulating the PUSCH from the eMBB UE. To solve such a problem, the complementary DMRS may be configured only before or after the DMRS. However, the discontinuity in the phase or the power of the PUSCHs before and after the preemption degrades the demodulating characteristics of the PUSCH for which the complementary DMRS is not configured.

To reduce such problems, the gNB configures the DMRSs before and after the resources for preemption. The method for configuring the complementary DMRS as the DMRS should be applied. The method disclosed in the second modification of the seventh embodiment should be appropriately applied.

The gNB configures the complementary DMRS in a PUSCH region before preemption, and configures the complementary DMRS in a PUSCH region after preemption. The eMBB UE transmits the configured two complementary DMRSs. The gNB receives the complementary DMRS before preemption, and demodulates the PUSCH before preemption. The gNB also receives the complementary DMRS after preemption, and demodulates the PUSCH after preemption.

This can reduce the degradation in the demodulating characteristics of the PUSCHs before and after preemption in the gNB.

Although the resources to be preempted are intended for the enhanced Mobile BroadBand (eMBB) categorized as the high-speed large-capacity communication and the preempting resources are intended for the Ultra Reliable Low Latency Communication (URLLC) categorized as the ultra-reliable low-latency communication, the application is not limited to these services. The communication services to be used for the resources to be preempted and the communication services to be used for the preempting resources are not limited to eMBB and URLLC.

Although the UE to be preempted (preempted UE) is a UE for the eMBB service (eMBB UE) and the preempting UE is a UE for the URLLC service (URLLC UE), the preempted UE and the preempting UE are not limited to the UEs for these services.

The Eighth Embodiment

Configuring the preempted transmission in the uplink communication of a communication service requiring the low latency can yield the low latency characteristics. However, merely configuring the preempted transmission may not be able to satisfy requirements of a communication service requiring not only the low latency characteristics but also the high reliability characteristics, for example, the URLLC service.

A solution to the problem is disclosed below.

The preempted transmission is configurable in the packet duplication where a packet is duplicated and the identical packets are transmitted with the DC. The preempted transmission is configurable in the MN during the packet duplication setup. The preempted transmission is also configurable in the SN during the packet duplication setup. Alternatively, the preempted transmission is configurable in one of the MN and the SN during the packet duplication setup. "during the packet duplication setup" may include the time during which the packet duplication setup is being processed.

The packet duplication may be configurable in the uplink communication in which the preempted transmission has been configured. When the packet duplication is performed in the uplink communication in which the preempted transmission has been configured, the preempted transmission is also configurable in the SN. As such, configuring both of the packet duplication and the preempted transmission can enhance not only the low latency characteristics but also the reliability.

In the packet duplication with the DC, the packet duplication is configured between the MN and the UE. Thus, the SN need not recognize the configuration of the packet duplication. The SN has only to perform processes identical to the normal processes for transmitting and receiving the packet data. As previously described, the RRC configuration is necessary for configuring the preempted transmission. Thus, when attempting to configure the preempted transmission with the packet duplication using the DC, the SN cannot recognize whether it is necessary to configure the preempted transmission. Thus, the SN has a problem of failing to configure the preempted transmission.

The method disclosed in the second embodiment should be applied as a solution to the problem. The transmission without grant should be used as a replacement for the preempted transmission. For example, the MN requests the SN to configure the preempted transmission. The MN requests the SN to configure the preempted transmission during the packet duplication setup. The SN notifies the MN of the configuration for the preempted transmission. The MN notifies the UE of the configuration for the preempted transmission that has been configured in its own node, and the configuration of the SN for the preempted transmission.

This can produce the same advantages as disclosed in the second embodiment. For example, the SN can recognize whether it is necessary to configure the preempted transmission, and configure the preempted transmission. Thus, the SN can configure the preempted transmission in the packet duplication with the DC. This yields the low latency characteristics and the high reliability characteristics.

The same holds true when the MN attempts to configure the packet duplication in the uplink communication in which the preempted transmission has been configured. The method disclosed in the second embodiment should be applied.

For example, the MN notifies the UE of configuring the packet duplication with the DC in the uplink communication in which the preempted transmission has been configured. Furthermore, the MN requests the SN to configure the preempted transmission. The MN may notify the SN of an instruction for configuring the preempted transmission. The SN notifies the MN of the configuration for the preempted transmission. The MN notifies the UE of the configuration for the preempted transmission that has been configured in its own node, and the configuration of the SN for the preempted transmission.

This can produce the same advantages as disclosed in the second embodiment. For example, the SN can recognize whether it is necessary to configure the preempted transmission, and configure the preempted transmission. Thus, the MN can configure the packet duplication in the uplink communication in which the preempted transmission has been configured. This yields the low latency characteristics and the high reliability characteristics.

The preempted transmission may be configurable in the packet duplication where a packet is duplicated and the identical packets are transmitted with the CA. The preempted transmission is configurable in the cell where the packet duplication is to be performed during the packet duplication setup. "during the packet duplication setup" may include the time during which the packet duplication setup is being processed.

The packet duplication (CA) may be configurable in the uplink communication in which the preempted transmission has been configured. When the packet duplication is performed in the uplink communication in which the preempted transmission has been configured, the preempted transmission is also configurable in the cell where the packet duplication is to be performed.

The methods disclosed in the second embodiment should be applied to these methods. The transmission without grant should be used as a replacement for the preempted transmission. This can produce the same advantages.

The embodiments and the modifications are merely illustrations of the present invention, and can be freely combined within the scope of the present invention. Any constituent elements of the embodiments and the modifications can be appropriately modified or omitted.

A subframe in the embodiments and the modifications is an example time unit of communication in the fifth generation base station communication system. The subframe may be configured per scheduling. The processes described in the embodiments and the modifications as being performed per subframe may be performed per TTI, per slot, per sub-slot, or per mini-slot.

While the invention is described in detail, the foregoing description is in all aspects illustrative and does not restrict the present invention. Therefore, numerous modifications and variations that have not yet been exemplified are devised without departing from the scope of the present invention.

DESCRIPTION OF REFERENCES

200 communication system, 202 communication terminal device, 203 base station device.

The invention claimed is:

1. A communication system, comprising:
a communication terminal device; and
a plurality of nodes configured to be connected to the communication terminal device for radio communication and to provide a split bearer for the communication terminal device,
wherein the communication terminal device is configured to perform uplink transmission to an uplink transmission node among the plurality of nodes, and
the uplink transmission node is determined by an uplink transmission node determination process, performed by the communication terminal device or a master node among the plurality of nodes, in which a node that provides the uplink transmission from the communication terminal device with lower latency, based on a symbol duration supported by the node, among the plurality of nodes is determined as the uplink transmission node.

2. The communication system according to claim 1,
wherein the master node among the plurality of nodes is configured to perform the uplink transmission node determination process.

3. The communication system according to claim 2,
wherein the master node is configured to perform the uplink transmission node determination process based on determination information for determining the uplink transmission node, and
the master node is configured to:
obtain determination information associated with a secondary node of the split bearer among the plurality of nodes; and
determine the uplink transmission node based on the determination information associated with the secondary node and determination information associated with the master node, wherein the determination information indicates that the secondary node has a shorter symbol duration than the master node.

4. The communication system according to claim 1,
wherein the communication terminal device is configured to perform the uplink transmission node determination process.

5. The communication system according to claim 4,
wherein the communication terminal device is configured to perform the uplink transmission node determination process based on determination information for determining the uplink transmission node, and
the communication terminal device is configured to:
obtain determination information associated with each of the plurality of nodes; and
determine the uplink transmission node based on the determination information associated with each of the plurality of nodes.

6. A communication terminal device configured to perform radio communication with a plurality of nodes that provide a split bearer, the communication terminal comprising:
processing circuitry configured to perform uplink transmission to an uplink transmission node selected by an uplink transmission node determination process,
wherein the uplink transmission node determination process is a process, performed by the communication terminal device or a master node among the plurality of nodes, for determining, as the uplink transmission node, a node that provides the uplink transmission from the communication terminal device with lower latency, based on a symbol duration supported by the node, among the plurality of nodes.

7. A communication node included in a plurality of nodes and configured to provide a split bearer for a communication terminal device together with another communication node included in the plurality of nodes, the communication node comprising:
processing circuitry configured to operate the communication node as an uplink transmission node to be used by the communication terminal device for uplink transmission, by being selected by an uplink transmission node determination process,
wherein the uplink transmission node determination process is a process, performed by the communication terminal device or a master node among the plurality of nodes, for determining, as the uplink transmission node, a node that provides the uplink transmission from the communication terminal device with lower latency, based on a symbol duration supported by the node, among the plurality of nodes.

* * * * *